United States Patent
Ballaro et al.

(10) Patent No.: US 8,359,245 B1
(45) Date of Patent: Jan. 22, 2013

(54) TAXONOMY AND DATA STRUCTURE FOR AN ELECTRONIC PROCUREMENT SYSTEM

(75) Inventors: Charles A. Ballaro, Apex, NC (US); Alexey Lef, Chennai (IN); David W. Frink, Raleigh, NC (US)

(73) Assignee: SciQuest Inc., Cary, NC (US)

(*) Notice: Subject to any disclaimer, the term of this patent is extended or adjusted under 35 U.S.C. 154(b) by 977 days.

(21) Appl. No.: 12/283,276

(22) Filed: Sep. 9, 2008

Related U.S. Application Data

(63) Continuation-in-part of application No. 12/007,815, filed on Jan. 15, 2008.

(60) Provisional application No. 61/130,028, filed on May 27, 2008.

(51) Int. Cl.
*G06Q 30/00* (2012.01)

(52) U.S. Cl. ...................................................... 705/27.1

(58) Field of Classification Search ................. 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 5,710,889 A | 1/1998 | Clark et al. | |
| 5,861,906 A | 1/1999 | Dunn et al. | |
| 5,895,454 A | 4/1999 | Harrington | |
| 5,970,475 A | 10/1999 | Barnes et al. | 705/27 |
| 6,003,006 A | 12/1999 | Colella et al. | 705/2 |
| 6,016,499 A | 1/2000 | Ferguson | |
| 6,095,410 A | 8/2000 | Andersen et al. | |
| 6,134,549 A | 10/2000 | Regnier et al. | |
| 6,144,726 A | 11/2000 | Cross | 379/112 |
| 6,175,836 B1 | 1/2001 | Aldred | |
| 6,249,773 B1 | 6/2001 | Allard et al. | |
| 6,493,742 B1 | 12/2002 | Holland et al. | |
| 6,505,172 B1 | 1/2003 | Johnson et al. | |
| 6,513,038 B1 | 1/2003 | Hasegawa et al. | |
| 6,564,213 B1 | 5/2003 | Ortega et al. | |
| 6,622,127 B1 | 9/2003 | Klots et al. | |
| 6,629,079 B1 | 9/2003 | Spiegel et al. | |
| 6,687,693 B2 | 2/2004 | Cereghini et al. | |
| 6,728,758 B2 * | 4/2004 | Sato | 709/206 |
| 6,775,658 B1 | 8/2004 | Zothner | |
| 6,795,707 B2 * | 9/2004 | Martin et al. | 455/446 |
| 6,850,900 B1 | 2/2005 | Hare et al. | 705/26 |
| 6,892,185 B1 | 5/2005 | Van Etten et al. | 705/27 |
| 6,920,430 B1 | 7/2005 | Berton et al. | 705/26 |
| 6,961,734 B2 | 11/2005 | Kauffman | 707/103 Z |
| 7,082,408 B1 | 7/2006 | Baumann et al. | |

(Continued)

FOREIGN PATENT DOCUMENTS

| | | |
|---|---|---|
| JP | 2002-175217 | 6/2002 |
| WO | WO 01/42882 A2 | 6/2001 |

OTHER PUBLICATIONS

B. Omelayenko et al. "An Analysis of Integration Problems of XML-Based Catalogs for B2B Electronic Commerce", Proceedingd of the 9th IFIP 2.6 Working Conference on Database Semantics (DS-9), Apr. 25-28, Hong-Kong, 2001.*

(Continued)

*Primary Examiner* — Naeem Haq
(74) *Attorney, Agent, or Firm* — Morgan, Lewis & Bockius LLP

(57) ABSTRACT

A computer-implemented method is described, performed at a server hosting an electronic procurement system. Supplier catalog data is received at the server from a plurality of respective suppliers associated with the electronic procurement system. The supplier catalog data is in a plurality of formats. The supplier catalog data is converted from the respective plurality of formats to respective common format catalog data. The respective common format catalog data is added to a database.

37 Claims, 126 Drawing Sheets

U.S. PATENT DOCUMENTS

| | | | |
|---|---|---|---|
| 7,117,165 B1 | 10/2006 | Adams et al. | 705/26 |
| 7,124,107 B1 | 10/2006 | Pishevar et al. | 705/37 |
| 7,146,002 B1 | 12/2006 | Smith et al. | |
| 7,308,416 B2 | 12/2007 | Peachey-Kountz et al. | |
| 7,350,698 B2 | 4/2008 | Viswanath et al. | |
| 7,359,871 B1 | 4/2008 | Paasche et al. | 705/26 |
| 7,366,684 B1 | 4/2008 | Douglas | 705/26 |
| 7,379,781 B2 | 5/2008 | Treichler et al. | |
| 7,478,058 B2 | 1/2009 | Byrne | |
| 7,640,193 B2 | 12/2009 | Crespo et al. | 705/26 |
| 7,644,197 B1 | 1/2010 | Waldorf et al. | |
| 7,647,247 B2 | 1/2010 | Abraham et al. | 705/26 |
| 7,698,167 B2 * | 4/2010 | Batham et al. | 705/26.62 |
| 7,715,548 B2 | 5/2010 | Croak et al. | |
| 7,752,146 B2 | 7/2010 | Lert, Jr. | |
| 7,848,953 B2 | 12/2010 | Kahlon et al. | |
| 7,970,671 B2 | 6/2011 | Hahn-Carlson et al. | |
| 8,024,236 B2 | 9/2011 | Vitulli et al. | |
| 8,046,275 B2 | 10/2011 | Simon et al. | |
| 8,170,998 B2 | 5/2012 | Churi et al. | |
| 2001/0034733 A1 | 10/2001 | Prompt et al. | |
| 2001/0042023 A1 | 11/2001 | Anderson et al. | 705/26 |
| 2001/0051917 A1 | 12/2001 | Bissonette et al. | |
| 2002/0007287 A1 | 1/2002 | Straube et al. | |
| 2002/0052801 A1 | 5/2002 | Norton et al. | 705/26 |
| 2002/0055888 A1 | 5/2002 | Beran et al. | 705/26 |
| 2002/0065736 A1 | 5/2002 | Willner et al. | |
| 2002/0077939 A1 | 6/2002 | Nicastro et al. | 705/29 |
| 2002/0078039 A1 | 6/2002 | Cereghini et al. | |
| 2002/0111879 A1 | 8/2002 | Melero et al. | 705/26 |
| 2002/0120714 A1 | 8/2002 | Agapiev | |
| 2002/0133466 A1 | 9/2002 | Pugh | |
| 2002/0143726 A1 | 10/2002 | Planalp et al. | |
| 2002/0161861 A1 | 10/2002 | Greuel | |
| 2002/0174089 A1 | 11/2002 | Tenorio | 707/1 |
| 2002/0178120 A1 | 11/2002 | Reid et al. | 705/59 |
| 2003/0028507 A1 | 2/2003 | Pauliks et al. | |
| 2003/0040935 A1 | 2/2003 | Magee | 705/1 |
| 2003/0105684 A1 | 6/2003 | Dunn et al. | |
| 2003/0120641 A1 | 6/2003 | Pelletier | 707/3 |
| 2003/0126024 A1 | 7/2003 | Crampton et al. | |
| 2003/0130910 A1 | 7/2003 | Pickover et al. | 705/27 |
| 2003/0135582 A1 | 7/2003 | Allen et al. | |
| 2003/0144924 A1 | 7/2003 | McGee | |
| 2003/0149631 A1 | 8/2003 | Crampton et al. | |
| 2003/0220843 A1 | 11/2003 | Lam et al. | 705/26 |
| 2003/0225650 A1 | 12/2003 | Wilson et al. | |
| 2004/0034595 A1 | 2/2004 | Kugeman et al. | 705/40 |
| 2004/0059645 A1 | 3/2004 | Wirth, Jr. | 705/27 |
| 2004/0103042 A1 | 5/2004 | Ryu et al. | 705/26 |
| 2004/0117290 A1 | 6/2004 | Shacham | 705/37 |
| 2004/0117355 A1 | 6/2004 | Lef et al. | 707/3 |
| 2004/0148232 A1 * | 7/2004 | Fushimi et al. | 705/27 |
| 2004/0172344 A1 | 9/2004 | Stockwell et al. | |
| 2004/0177114 A1 | 9/2004 | Friedman et al. | |
| 2004/0210489 A1 | 10/2004 | Jackson et al. | |
| 2004/0210526 A1 | 10/2004 | Brown | 705/40 |
| 2004/0267629 A1 | 12/2004 | Herrmann et al. | 705/26 |
| 2004/0267630 A1 | 12/2004 | Au et al. | 705/26 |
| 2004/0267676 A1 | 12/2004 | Feng et al. | 705/400 |
| 2005/0060245 A1 | 3/2005 | Hoffman et al. | 705/28 |
| 2005/0075979 A1 | 4/2005 | Leavitt et al. | 705/40 |
| 2005/0086122 A1 | 4/2005 | Cirulli et al. | 705/26 |
| 2005/0149415 A1 | 7/2005 | Furphy et al. | |
| 2005/0165659 A1 | 7/2005 | Gruber | 705/26 |
| 2005/0177507 A1 | 8/2005 | Bandych et al. | 705/40 |
| 2005/0187825 A1 | 8/2005 | Kirkley | |
| 2005/0240493 A1 | 10/2005 | Johnson et al. | 705/27 |
| 2005/0246216 A1 | 11/2005 | Rosen, III et al. | 705/8 |
| 2005/0262088 A1 | 11/2005 | Solis et al. | |
| 2006/0089907 A1 | 4/2006 | Kohlmaier et al. | |
| 2006/0224412 A1 | 10/2006 | Frank et al. | 705/1 |
| 2006/0235789 A1 | 10/2006 | Koch | 705/39 |
| 2006/0259427 A1 | 11/2006 | Randell et al. | 705/40 |
| 2006/0287954 A1 | 12/2006 | DeWitt et al. | 705/40 |
| 2007/0016514 A1 | 1/2007 | Al-Abdulqader et al. | 705/37 |
| 2007/0038566 A1 | 2/2007 | Shestakov et al. | 705/44 |
| 2007/0038567 A1 * | 2/2007 | Allaire et al. | 705/50 |
| 2007/0050261 A1 | 3/2007 | Lin | |
| 2007/0100842 A1 | 5/2007 | Wykes et al. | 707/100 |
| 2007/0124213 A1 | 5/2007 | Esau et al. | |
| 2007/0143665 A1 | 6/2007 | Machiraju et al. | 715/513 |
| 2007/0185785 A1 | 8/2007 | Carlson et al. | |
| 2007/0232223 A1 | 10/2007 | Bilange | |
| 2007/0255578 A1 | 11/2007 | Salomon et al. | |
| 2007/0299736 A1 | 12/2007 | Perrochon et al. | 705/26 |
| 2008/0091577 A1 | 4/2008 | Holmes et al. | |
| 2008/0114712 A1 | 5/2008 | Gleim et al. | |
| 2008/0120189 A1 | 5/2008 | Singh et al. | |
| 2008/0162164 A1 | 7/2008 | Segler et al. | 705/1 |
| 2008/0189341 A1 | 8/2008 | Blea et al. | |
| 2008/0195506 A1 | 8/2008 | Koretz et al. | 705/27 |
| 2008/0228625 A1 | 9/2008 | Isaf et al. | |
| 2008/0281662 A1 | 11/2008 | Ginsburg et al. | |
| 2008/0312987 A1 | 12/2008 | Damodaran et al. | |
| 2009/0157548 A1 | 6/2009 | Gong | 705/44 |
| 2009/0222279 A1 | 9/2009 | Reiz | 705/1 |
| 2009/0289107 A1 | 11/2009 | Prentice | |
| 2010/0023452 A1 | 1/2010 | Brown | 705/40 |
| 2010/0030675 A1 | 2/2010 | Hanan et al. | 705/34 |

OTHER PUBLICATIONS

No Author, "Open Catalog Interface" Release 2.0B, © 2000 SAP AG.*

Joerg Leukel et al. "Coordination and Exchange of XML Catalog Data in B2B", Proceedings of the 5th International Conference on E-Commerce Research (ICECR-5), Oct. 23-27, 2002, Montreal, Kanada.*

Notice of Allowance, U.S. Appl. No. 12/283,280, Jan. 28, 2011, 11 pgs.

Office Action, Canadian Patent Application 2513715, Aug. 31, 2009, 4 pgs.

Office Action, European Patent Application 03787246.2, Mar. 22, 2007, 5 pgs.

Office Action, U.S. Appl. No. 12/283,274, Dec. 22, 2010, 13 pgs.
Office Action, U.S. Appl. No. 12/283,277, Sep. 29, 2010, 9 pgs.
Office Action, U.S. Appl. No. 12/283,278, Jun. 9, 2010, 9 pgs.
Office Action, U.S. Appl. No. 12/283,278, Jan. 22, 2010, 7 pgs.
Office Action, U.S. Appl. No. 12/283,280, Aug. 19, 2009, 15 pgs.
Office Action, U.S. Appl. No. 12/283,280, Jan. 28, 2009, 14 pgs.
Office Action, U.S. Appl. No. 12/286,506, Jul. 28, 2010, 15 pgs.
Office Action, U.S. Appl. No. 12/286,506, Sep. 30, 2009, 13 pgs.
Office Action, U.S. Appl. No. 12/286,508, Oct. 14, 2009, 16 pgs.
Office Action, U.S. Appl. No. 12/286,508, Jun. 22, 2010, 18 pgs.
Supplementary European Search Report, EP Application 03787246, Aug. 16, 2006, 2 pgs.

Watson, Tailor catalogs to capture savings, Purchasing, Dec. 13, 2007, vol. 136, Iss. 15, 2 pgs.

International Search Report for PCT/US2003/038346 dated Jan. 3, 2005.

Office Action for U.S. Appl. No. 10/318,814, dated Oct. 5, 2004.
Notice of Allowability for U.S. Appl. No. 10/318,814, Apr. 27, 2005.
Ballaro, U.S. Appl. No. 12/283,274, Sep. 9, 2008, Office Action mailed Sep. 6, 2011, 15 pgs.

Ballaro, U.S. Appl. No. 12/286,506, Sep. 29, 2008, Final Office Action mailed Sep. 22, 2011, 12 pgs.

Ballaro, U.S. Appl. No. 12/283,279, Sep. 9, 2008, Office Action mailed Sep. 29, 2011, 12 pgs.

Ballaro, U.S. Appl. No. 12/283,281, Sep. 9, 2008, Office Action mailed Oct. 6, 2011, 67 pgs.

Ballaro, U.S. Appl. No. 12/283,277, Sep. 9, 2008, Office Action mailed Oct. 7, 2011, 15 pgs.

Ballaro, U.S. Appl. No. 12/007,815, Jan. 15, 2008, Office Action mailed Oct. 27, 2011, 20 pgs.

Ballaro, U.S. Appl. No. 12/286,507, Sep. 29, 2008, Final Office Action mailed Oct. 27, 2011, 24 pgs.

Ballaro, U.S. Appl. No. 12/283,275, Sep. 9, 2008, Notice of Allowance mailed Jun. 30, 2011, 8 pgs.

Ballaro, U.S. Appl. No. 12/283,280, Sep. 9, 2008, Notice of Allowance mailed Jul. 12, 2011, 7 pgs.

Ballaro, U.S. Appl. No. 12/286,508, Sep. 29, 2008, Notice of Allowance mailed Jul. 25, 2011, 7 pgs.

Ballaro, U.S. Appl. No. 12/283,278, Sep. 9, 2008, Notice of Allowance mailed Sep. 27, 2011, 8 pgs.

"Commerce One Announces Largest Commercially-Available Pre-Packaged Catalog Content for Rapid Implementation of Electronic Procurement," Business Editors. Business Wire, New York: Jun. 10, 1998, 3 pgs.

Notice of Allowance, U.S. Appl. No. 12/283,275, Mar. 16, 2011, 14 pgs.

Notice of Allowance, U.S. Appl. No. 12/283,280, Mar. 24, 2011, 6 pgs.

Notice of Allowance, U.S. Appl. No. 12/286,508, Mar. 16, 2011, 11 pgs.

Office Action, U.S. Appl. No. 12/007,815, May 13, 2011, 18 pgs.

Final Office Action, U.S. Appl. No. 12/283,277, May 2, 2011, 10 pgs.

Office Action, U.S. Appl. No. 12/283,282, Apr. 13, 2011, 17 pgs.

Office Action, U.S. Appl. No. 12/286,506, Mar. 14, 2011, 15 pgs.

Office Action, U.S. Appl. No. 12/286,507, May 13, 2011 24 pgs.

Ballaro, Office Action, U.S. Appl. No. 12/283,282, Nov. 3, 2011, 33 pgs.

Ballaro, Notice of Allowance, U.S. Appl. No. 12/283,281, May 25, 2012, 19 pgs.

Usama Fayyad, Optimizing Customer Insight, Intelligent Enterprise, vol. 6, Iss. 8, May 13, 2003, 5 pgs.

Ballaro, Office Action, U.S. Appl. No. 12/007,815, dated Apr. 27, 2012, 20 pgs.

Ballaro, Office Action, U.S. Appl. No. 12/283,277, dated Mar. 30, 2012, 17 pgs.

Ballaro, Office Action, U.S. Appl. No. 12/283,279, dated Mar. 29, 2012, 14 pgs.

Ballaro, Office Action, U.S. Appl. No. 12/286,506, dated Feb. 7, 2012, 13 pgs.

* cited by examiner

| | | PROFILE I LOGOUT | | 6 ITEM(S) | GO |
|---|---|---|---|---|---|
| | USER MANAGEMENT - PENDING USERS | SEARCH FOR SUPPLIER PROFILE | | | |
| HOME | MY FAVORITES | PRODUCT SEARCH | CARTS | APPROVALS | HISTORY | SETTLEMENT | USER MGT ▼ | ? |
| USERS | REGISTRATIONS | USER IMPORT | HR CONFIGURATION | | | | | |

420

CREATE USER

PENDING REGISTRATION(S): 4                                                                                                    ◀PAGE 1 OF 1▶

| NAME | USER NAME | PHONE | EMAIL | DEPARTMENT | POSITION | APPROVAL |
|---|---|---|---|---|---|---|
| FIRST USER | FUSER | (000) 000-0000 | FUSER@COMPANY.COM | ☐ | --- | APPROVE |
| SECOND USER | SEUSER | (000) 000-0001 | SEUSER@COMPANY.COM | ☐ | --- | APPROVE |
| THIRD USER | TUSER | (000) 000-0002 | TUSER@COMPANY.COM | ☐ | --- | APPROVE |
| FOURTH USER | FOUSER | (000) 000-0003 | FOUSER@COMPANY.COM | ☐ | --- | APPROVE |

| | | | | | |
|---|---|---|---|---|---|
| 3:34 PM | NEIL | PUNCHOUT ACCESS REMOVED | PUNCHOUT ACCESS | GATEWAY, INC. | | |
| 3:34 PM | NEIL | PUNCHOUT ACCESS ADDED | PUNCHOUT ACCESS | XEROX | | |
| 3:34 PM | NEIL | PUNCHOUT ACCESS ADDED | PUNCHOUT ACCESS | FISCHER SCIENTIFIC | | |
| 3:34 PM | NEIL | PUNCHOUT ACCESS ADDED | PUNCHOUT ACCESS | WEST PRESS | | |
| 3:34 PM | NEIL | PUNCHOUT ACCESS ADDED | PUNCHOUT ACCESS | IKON OFFICE PRODUCTS | | |
| 7:49 AM | CHRISTINE | MODIFIED | PERMISSIONS: CART/REQUISITION | MODIFY PO | VALUE | FALSE (INHERITED) | FALSE |
| 7:49 AM | CHRISTINE | MODIFIED | PERMISSIONS: CART/REQUISITION | CLAUSES IN PR/PO WITHDRAW PR | VALUE | FALSE (INHERITED) | FALSE |
| 7:49 AM | CHRISTINE | MODIFIED | PERMISSIONS: CART/REQUISITION | BYPASS REVIEW | VALUE | FALSE (INHERITED) | FALSE |
| 7:49 AM | CHRISTINE | MODIFIED | PERMISSIONS: CART/REQUISITION | ALLOW EDITING OF TAX, SHIPPING, AND HANDLING | VALUE | FALSE (INHERITED) | FALSE |
| 7:49 AM | CHRISTINE | MODIFIED | PERMISSIONS: CART/REQUISITION | LINE-LEVEL EXTERNAL ATTACHMENTS | VALUE | FALSE (INHERITED) | FALSE |
| 7:49 AM | CHRISTINE | MODIFIED | PERMISSIONS: CART/REQUISITION | VIEW SENSITIVE CREDIT CARD DETAILS | VALUE | FALSE (INHERITED) | FALSE |
| 7:49 AM | CHRISTINE | MODIFIED | PERMISSIONS: CART/REQUISITION | SELECT CREDIT CARD FROM PROFILE | VALUE | FALSE (INHERITED) | FALSE |
| 7:49 AM | CHRISTINE | MODIFIED | PERMISSIONS: CART/REQUISITION | MANUALLY OVERRIDE PRICING | VALUE | FALSE (INHERITED) | FALSE |
| 7:49 AM | CHRISTINE | MODIFIED | PERMISSIONS: CART/REQUISITION | EDIT CREDIT CARD | VALUE | FALSE (INHERITED) | FALSE |
| 7:49 AM | CHRISTINE | MODIFIED | PERMISSIONS: CART/REQUISITION | EDIT PO NUMBER | VALUE | FALSE (INHERITED) | FALSE |
| 7:49 AM | CHRISTINE | MODIFIED | PERMISSIONS: CART/REQUISITION | EDIT USER'S CART ASSIGNEES | VALUE | FALSE (INHERITED) | FALSE |
| 7:49 AM | CHRISTINE | MODIFIED | PERMISSIONS: CART/REQUISITION | ASSIGN CART TO ANOTHER USER | VALUE | FALSE (INHERITED) | FALSE |
| 7:49 AM | CHRISTINE | MODIFIED | PERMISSIONS: CART/REQUISITION | DO NOT PERMIT PLACE ORDER | VALUE | FALSE (INHERITED) | FALSE |

RESULTS PER PAGE 20 ☐                              ◁PAGE 1 ☐ OF 11▷

*FIG. 4T (cont)*

| | | | | | 6 ITEM(S) | GO |
|---|---|---|---|---|---|---|
| MY PROFILE | PROFILE \| LOGOUT | | | | | |
| | | | | | SEARCH FOR SUPPLIER PROFILE ▷ | |
| | | | | | PROFILE ▷ | ? |

HOME | MY FAVORITES | PRODUCT SEARCH | CARTS | APPROVALS | HISTORY | | CHANGE PASSWORD
---|---|---|---|---|---|---|---

520 ⌒

USER SETTINGS | PERMISSIONS | PURCHASING | MATERIALS MGT | HISTORY | SETTLEMENT
520a | 520b | 520c | | |

CUSTOM FIELDS | FINANCIAL APPROVERS | PURCHASING/APPROVAL LIMITS | ADDRESSES | PRODUCT VIEWS | PUNCHOUT ACCESS
 | | 520d | 520e | 520f |

?

| LIMIT | VALUE | OVERRIDE ROLE |
|---|---|---|
| REQUISITION LIMIT | 100 | ☐ |
| REQUISITION LINE ITEM LIMIT | 50 | ☐ |
| REQUISITION APPROVAL LIMIT | 200 | ☐ |
| REQUISITION LINE ITEM APPROVAL LIMIT | 100 | ☐ |
| PURCHASE ORDER LIMIT | 0 | ☐ |
| PURCHASE ORDER LINE ITEM LIMIT | 0 | ☐ |
| PURCHASE ORDER APPROVAL LIMIT | 0 | ☐ |
| PURCHASE ORDER LINE ITEM APPROVAL LIMIT | 0 | ☐ |
| LIMITED PURCHASE ORDER LIMIT | 0 | |
| LINE ITEM LIMITED PURCHASE ORDER LIMIT | 0 | |

SAVE

West Organization | MY PROFILE | PROFILE | LOGOUT | [search] | 6 ITEM(S) | GO

SEARCH FOR | SUPPLIER PROFILE ▽ | ⊕ | ?

| HOME | MY FAVORITES | PRODUCT SEARCH | CARTS | APPROVALS | HISTORY | SETTLEMENT | PROFILE ▽ | ? |

USER SETTINGS | PURCHASING | PERMISSIONS | MATERIALS MGT | HISTORY | CHANGE PASSWORD

SHOPPING/CART | ORDERS | APPROVALS | ACCOUNTS PAYABLE | ADMINISTRATION | MATERIALS MGT | CUSTOM FIELDS PERMISSIONS | ?

530

| PERMISSION | VALUE | OVERRIDE ROLE |
|---|---|---|
| BUDGET | | |
| VIEW BUDGET DETAILS | x | ☐ |
| CREATE/EDIT BUDGET DETAILS | x | ☐ |

| PERMISSION | VALUE | OVERRIDE ROLE |
|---|---|---|
| SETTLEMENT MANAGER | | |
| CREATE/VIEW RECEIPTS | ✓ | ☐ |
| ENABLE BLIND RECEIVING - (HIDE ORDER QUANTITY DURING RECEIVING) | x | ☐ |
| VIEW INVOICES | ✓ | ☐ |
| CREATE/EDIT INVOICES | ✓ | ☐ |
| SET INVOICE AS PAYABLE | ✓ | ☐ |
| SET INVOICE AS PAID | x | ☐ |
| MATCH DOCUMENTS WITHIN TOLERANCES | x | ☐ |
| FORCE MATCH DOCUMENTS | x | ☐ |
| UNMATCH DOCUMENTS | x | ☐ |
| RESEND INVOICES TO EXTERNAL SYSTEM | x | ☐ |

[SAVE]

| | | | | | REQUISITION TYPE | | | | |
|---|---|---|---|---|---|---|---|---|---|
| EQUIPMENT TAB | | | | | | | | | |
| VIEW PERSONAL LIST | ✓ | | | | VIEW PERSONAL LIST | ✓ | ☐ | ☐ | ☐ |
| EDIT PERSONAL LIST | ✓ | | | | EDIT PERSONAL LIST | ✓ | | | |
| VIEW ORGANIZATION VALUES | ✓ | | | | VIEW ORGANIZATION VALUES | ✓ | | | |
| CREATE VALUES FOR PERSONAL LIST | ✓ | | | | CREATE VALUES FOR PERSONAL LIST | ✓ | | | |
| FUND/GRANT (BG/DYN) | | | | | SEARCHABLE CUSTOM FIELD VALUES (51) | | | | |
| VIEW PERSONAL LIST | ✓ | ☐ | ☐ | ☐ | VIEW PERSONAL LIST | ✓ | ☐ | ☐ | ☐ |
| EDIT PERSONAL LIST | ✓ | | | | EDIT PERSONAL LIST | ✓ | | | |
| VIEW ORGANIZATION VALUES | ✓ | | | | VIEW ORGANIZATION VALUES | ✓ | | | |
| CREATE VALUES FOR PERSONAL LIST | ✓ | | | | CREATE VALUES FOR PERSONAL LIST | ✓ | | | |
| LOCATION | | | | | SERVICE REQUEST | | | | |
| VIEW PERSONAL LIST | ✓ | ☐ | ☐ | ☐ | VIEW PERSONAL LIST | ✗ | ☐ | ☐ | ☐ |
| EDIT PERSONAL LIST | ✓ | | | | EDIT PERSONAL LIST | ✗ | | | |
| VIEW ORGANIZATION VALUES | ✓ | | | | VIEW ORGANIZATION VALUES | ✗ | | | |
| CREATE VALUES FOR PERSONAL LIST | ✓ | | | | CREATE VALUES FOR PERSONAL LIST | ✗ | | | |
| ORGANIZATION (SB) | | | | | SERVICE REQUEST? | | | | |
| VIEW PERSONAL LIST | ✓ | ☐ | ☐ | ☐ | VIEW PERSONAL LIST | ✗ | ☐ | ☐ | ☐ |
| EDIT PERSONAL LIST | ✓ | | | | EDIT PERSONAL LIST | ✗ | | | |
| VIEW ORGANIZATION VALUES | ✓ | | | | VIEW ORGANIZATION VALUES | ✗ | | | |
| CREATE VALUES FOR PERSONAL LIST | ✓ | | | | CREATE VALUES FOR PERSONAL LIST | ✗ | | | |

[SAVE]

```
[Weet Organization]  PROFILE | LOGOUT                                                      | 6 ITEM(S) |
                     BROWSE BY CATEGORY                      SEARCH FOR SUPPLIER PROFILE ☐
HOME   | MY FAVORITES | PRODUCT SEARCH | CARTS | APPROVALS | HISTORY | SETTLEMENT |   MORE >> ☐
SEARCH TOOLS | MY FAVORITES                       CATEGORIES                                    ?

CATEGORY SEARCH > FURNITURE > FURNITURE AND FURNISHINGS > ACCOMMODATION FURNITURE > OUTDOOR FURNITURE

⊞ ⧉ LAB SUPPLIES
⊞ ⟐ OFFICE COMPUTER
⊞ ⟡ MRO / FACILITIES
⊟ ⟐ FURNITURE
   ⊟ FURNITURE AND FURNISHINGS   VIEW (INCL. SUB-CATEGORIES)
      ⊟ ACCOMMODATION FURNITURE   VIEW (INCL. SUB-CATOGORIES)
         ⊞ BABY AND TODDLER FURNITURE AND ACCESSORIES   VIEW (INCL. SUB-CATEGORIES)
         ⊞ FURNITURE   VIEW (INCL. SUB-CATEGORIES)
         ⊞ GENERAL FURNITURE PARTS AND ACCESSORIES   VIEW (INCL. SUB-CATEGORIES)
         ⊞ OFFICE FURNITURE   VIEW (INCL. SUB-CATEGORIES)
         ⊟ OUTDOOR FURNITURE   VIEW (INCL. SUB-CATORIES)
            ↳ BICYCLE RACKS   VIEW
            ↳ FLOWER STANDS   VIEW
            ↳ OUTDOOR BENCHES   VIEW
            ↳ OUTDOOR CHAIRS   VIEW
            ↳ OUTDOOR SWINGS   VIEW
            ↳ OUTDOOR TABLE OR PICNIC TABLES   VIEW
            ↳ OUTDOOR UMBRELLAS   VIEW
            ↳ OUTDOOR CLOTHES DRYER   VIEW
      ⊞ CLASSROOM AND INSTRUCTIONAL AND INSTITUTIONAL FURNITURE AND FIXTURES   VIEW (INCL. SUB-CATEGORIES)
      ⊞ COMMERCIAL AND INDUSTRIAL FURNITURE   VIEW (INCL. SUB-CATEGORIES)
   ⊞ INFORMATION TECHNOLOGY BROADCASTING AND TELECOMMUNICATIONS   VIEW (INCL. SUB-CATEGORIES)
   ⊞ PRINTING AND PHOTOGRAPHIC AND AUDIO AND VISUAL EQUIPMENT AND SUPPLIES   VIEW (INCL. SUB-CATEGORIES)
   ⊞ SERVICE INDUSTRY MACHINERY AND EQUIPMENT AND SUPPLIES   VIEW (INCL. SUB-CATOGORIES)
   ⊞ STRUCTURES AND BUILDING AND CONSTRUCTION AND MANUFACTURING COMPONENTS AND SUPPLIES   VIEW (INCL. SUB-CATOGORIES)
⊞ ⟐ SERVICES
⊞ ⟐ MANUFACTURING
⊞ ⟐ BOOKS
⊞ ⟐ ELECTRONICS
⊞ ✱ SPECIALTY
⊞ ⟐ FOOD/FOOD EQUIPMENT
⊞ ⟐ SUPPLIES MANAGER
```

| HOME | MY FAVORITES | PRODUCT SEARCH | CARTS | APPROVALS | HISTORY | SETTLEMENT | CATALOG MGT |
|---|---|---|---|---|---|---|---|
SUPPLIERS | CATEGORIES | SUPPLIER CLASSES | CATEGORY CLASSES | PRODUCT VIEWS | PRICING | MAP ATTRIBUTES | CONSORTIUM MGT | ENABLEMENT

PRICE SETS | SCIENCE CATALOG   PRICE REVIEW FILES

-PRICE SET SEARCH
SUPPLIER NAME/ID:
PRICE SET TYPE: ALL
PRICE SET VERSION STATUS: NOT REVIEWED
SHOW AUDIT HISTORY OF PRICE SETS: ☐

[SEARCH]   960   SEARCH FOR SUPPLIER   970

PRICE SET VERSIONS BECOME EFFECTIVE IMMEDIATELY UPON APPROVAL. NEW PRODUCTS REQUIRE A SEARCH LOAD BEFORE THEY BECOME VIEWABLE. SEARCH LOADS ARE DONE MONDAY THROUGH FRIDAY EVENINGS.
-HIDE PRICE SET DETAILS

RESULTS PER PAGE [50]   PRICE SETS   TOTAL NUMBER OF RESULTS FOUND: 9   APPROVE SELECTED PRICE SET VERSIONS ☐ [GO]   ◁PAGE [1] OF 1 ▷?

| SUPPLIER ▲ | | SET NAME | | | | | | | | |
|---|---|---|---|---|---|---|---|---|---|---|
| VERSION | NOTE | | DATE AVAILABLE | REVIEWED BY... | DATE REVIEWED | CURRENCY | CONTRACT | COMMENTS | PRICE SET TYPE | STATUS | EDIT... |

AMERSHAM BIOSCIENCES INC. - DO NOT TOUCH   ORGANIZATION PRICE

| VERSION | NOTE | DATE AVAILABLE | REVIEWED BY... | DATE REVIEWED | CURRENCY | CONTRACT | COMMENTS | PRICE SET TYPE | STATUS | EDIT... SELECT |
|---|---|---|---|---|---|---|---|---|---|---|
| 4 | GE_HEALTHCARE_BIO_SCIENCE_WEE... MORE... | 6:37 PM | | | USD | NO CONTRACT | | ORGANIZATION | NOT REVIEWED | ☐ |
| 3 | CURRENT-1 | 8:37 PM | BOB TRAUB | 7:23 AM | USD | NO CONTRACT | | ORGANIZATION | APPROVED | ☐ |

CORPORATE EXPRESS   ORGANIZATION PRICE

| VERSION | NOTE | DATE AVAILABLE | REVIEWED BY... | DATE REVIEWED | CURRENCY | CONTRACT | COMMENTS | PRICE SET TYPE | STATUS | EDIT... SELECT |
|---|---|---|---|---|---|---|---|---|---|---|
| 1 | CORPORATE_EXPRESS_WEET_102560... MORE... | 7:06 AM | | | USD | NO CONTRACT | | ORGANIZATION | NOT REVIEWED | ☐ |
| 0 | | 11:19 PM | | | | | | | IMPLICITLY APPROVED | |

DEMO STOCKROOM   ORGANIZATION PRICE

| VERSION | NOTE | DATE AVAILABLE | REVIEWED BY... | DATE REVIEWED | CURRENCY | CONTRACT | COMMENTS | PRICE SET TYPE | STATUS | EDIT... SELECT |
|---|---|---|---|---|---|---|---|---|---|---|
| 3 | | 8:46 AM | | | USD | NO CONTRACT | | ORGANIZATION | NOT REVIEWED | ☐ |
| 2 | | 5:38 AM | BOB TRAUB | 7:08 AM | | | | | APPROVED | ☐ |

| GRAINGER, INC. | | ORGANIZATION PRICE | | USD | | NO CONTRACT | ORGANIZATION | EDIT... |
|---|---|---|---|---|---|---|---|---|
| VERSION | NOTE | DATE AVAILABLE | REVIEWED BY... | DATE REVIEWED | DATE EFFECTIVE | COMMENTS | STATUS | SELECT |
| 1 | GRAINGER WEET 102410.CSV WAS T...MORE... | 6:15 PM | | | | | NOT REVIEWED | ☐ |
| 0 | | 7:05 PM | | | | | IMPLICITLY APPROVED | ☐ |
| MATRIX TECHNOLOGIES | | ORGANIZATION PRICE | | USD | | NO CONTRACT | ORGANIZATION | EDIT... |
| VERSION | NOTE | DATE AVAILABLE | REVIEWED BY... | DATE REVIEWED | DATE EFFECTIVE | COMMENTS | STATUS | SELECT |
| 1 | | 12:29 PM | | | | PRICING UPDATE | NOT REVIEWED | ☐ |
| 0 | | 11:19 PM | | | | | IMPLICITLY APPROVED | ☐ |
| OFFICE MAX | | ORGANIZATION PRICE | | USD | | NO CONTRACT | ORGANIZATION | EDIT... |
| VERSION | NOTE | DATE AVAILABLE | REVIEWED BY... | DATE REVIEWED | DATE EFFECTIVE | COMMENTS | STATUS | SELECT |
| 1 | OFFICE_MAX_CONTRACT_WEET_10239...MORE... | 11:27 AM | | | | | NOT REVIEWED | ☐ |
| 0 | | 11:19 PM | | | | | IMPLICITLY APPROVED | ☐ |
| SCIQUEST, INC | | ORGANIZATION PRICE | | USD | | NO CONTRACT | ORGANIZATION | EDIT... |
| VERSION | NOTE | DATE AVAILABLE | REVIEWED BY... | DATE REVIEWED | DATE EFFECTIVE | COMMENTS | STATUS | SELECT |
| 6 | | 11:28 AM | | | | | NOT REVIEWED | ☐ |
| 5 | | 7:46 AM | | | | IMPORTING NON-ERRORED ROWS | NOT REVIEWED | ☐ |
| 4 | | 7:39 AM | | | | | NOT REVIEWED | ☐ |
| 3 | | 10:20 AM | | | | | NOT REVIEWED | ☐ |
| 2 | | 11:40 AM | | | | | NOT REVIEWED | ☐ |
| 1 | | 11:40 AM | | | | | NOT REVIEWED | ☐ |
| 0 | | 7:44 AM | | | | | NOT REVIEWED | ☐ |

| PRODUCT DESCRIPTION | | CATALOG NO. | SIZE/PACKAGING | UNIT PRICE | QUANTITY | EXT PRICE ☐ |
|---|---|---|---|---|---|---|
| ADD NON-CATALOG ITEM FOR THIS SUPPLIER... | | | | | | |
| 1 KIT, LAPTOP COMPUTER 7000 MORE INFO... | | 4333117 | EA | 9.99 | 1 EA | 9.99 ☐ EDIT |
| MANUFACTURER NAME APPLIED BIOSYSTEMS | TAXABLE ✓ | | INTERNAL NOTE | | NO NOTE | |
| MANUFACTURER PART NUMBER 4333117 | CAPITAL EXPENSE X | | INTERNAL ATTACHMENTS | | | |
| UNSPSC: 43-21-15-03 | COMMODITY CODE MISCELLANEOUS | | ADD ATTACHMENT... | | | |
| MORE INFO... | REPLENISH STOCK X | | EXTERNAL NOTE | | NO NOTE | |
| | | | ATTACHMENTS FOR SUPPLIER | | | |
| | | | ADD ATTACHMENT... | | | |
| | | | PO CLAUSES | | | |
| | | | NO CLAUSE | | | |
| 2 KIT, LAPTOP COMPUTER 7000 MORE INFO... | | 4333117 | EA | 9.99 | 1 EA | 9.99 ☐ EDIT |
| MANUFACTURER NAME APPLIED BIOSYSTEMS | TAXABLE ✓ | | INTERNAL NOTE | | NO NOTE | |
| MANUFACTURER PART NUMBER 4333117 | CAPITAL EXPENSE X | | INTERNAL ATTACHMENTS | | | |
| UNSPSC: 43-21-15-03 | COMMODITY CODE MISCELLANEOUS | | ADD ATTACHMENT... | | | |
| MORE INFO... | REPLENISH STOCK X | | EXTERNAL NOTE | | NO NOTE | |
| | | | ATTACHMENTS FOR SUPPLIER | | | |
| | | | ADD ATTACHMENT... | | | |
| | | | PO CLAUSES | | | |
| | | | NO CLAUSE | | | |

| | | | | EDIT |
|---|---|---|---|---|
| | SUPPLIER SUBTOTAL | 19.98 | | |
| | TAX1 | 0.00 | | |
| | TAX2 | 0.00 | | |
| | SHIPPING | 0.00 | | |
| | HANDLING | 0.00 | | |
| | SUPPLIER TOTAL | 19.98 USD | | |
| CONTRACT | | NO VALUE | | |
| PO NUMBER | | TO BE ASSIGNED | | |
| QUOTE NUMBER | | NO VALUE | | |
| PO CLAUSES | | | | |
| NO CLAUSE | | | | |

CDW ☐ MORE INFO... — VIEW/EDIT BY LINE ITEM...

| MANUFACTURER PART NUMBER | CCS55121 | COMMODITY CODE | MISCELLANEOUS | EXTERNAL NOTE | NO NOTE |
| UNSPSC: | 43-21-16-00 | REPLENISH STOCK | X | ATTACHMENTS FOR SUPPLIER | |
| MORE INFO... | | | | ADD ATTACHMENT... | |
| | | | | PO CLAUSES | |
| | | | | NO CLAUSE | |

| | |
|---|---|
| SUPPLIER SUBTOTAL | 9.99 |
| TAX1 | 0.00 |
| TAX2 | 0.00 |
| SHIPPING | 0.00 |
| HANDLING | 0.00 |
| SUPPLIER TOTAL | 9.99 USD |

| | |
|---|---|
| SUBTOTAL | 2,148.95 |
| TAX1 | 0.00 |
| TAX2 | 0.00 |
| SHIPPING | 0.00 |
| HANDLING | 0.00 |
| TOTAL | 2,148.95 USD |

SHIPPING, HANDLING, AND TAX CHARGES ARE CALCULATED AND CHARGED BY EACH SUPPLIER. THE VALUES SHOWN HERE ARE FOR ESTIMATION PURPOSES, BUDGET CHECKING, AND WORKFLOW APPROVALS.

SEE CONFIGURATION FOR THIS REQUISITION

PO STATUS FILTERS

INCLUDE PO'S WITH ANY OF THESE STATUSES

----SHOW ALL----

ONLY INCLUDE PO'S WITH THESE STATUSES

----SHOW ALL----

SEARCH

PO DEPARTMENTS
----WORKFLOW----
PENDING
REJECTED
PARTIALLY REJECTED
COMPLETE
----SUPPLIER----
SENT TO SUPPLIER
SUPPLIER PROCESSING
CANCELLED
PARTIALLY SHIPPED
FULLY SHIPPED
OVER SHIPPED
----RECEIPT----
PARTIALLY RECEIVED
FULLY RECEIVED
OVER RECEIVED
----INVOICE----
PARTIALLY INVOICED
FULLY INVOICED
OVER INVOICED
----MATCHING----
PARTIALLY MATCHED
FULLY MATCHED
NO MATCHES
----A/P STATUS----
OPEN
CLOSED

PO STATUS
NO INVOICES
NO RECEIPTS
REQUIRES RECEIPTS
NO SHIPMENTS
WITH CREDITS
WITH RETURNS
WITH CANCELLATION
WITH BACKORDERS
WITH SUPPLIER MODIFICATIONS
WITH FORCED MATCHES

Electronic Procurement System Server 3720 Memory/Storage

| Category 4402 |
| --- |
| UNSPSC    Part Number 4404 |
| Product Description 4406 |
| Packaging UOM 4408 |
| CorporateList(USD) 4410 |
| Product Size 4412 |
| Manufacturer Name 4414 |
| Manufacturer Part Number 4416 |
| Lead Time 4418 |
| Is Hazardous Material?  4420 |
| Health Hazards 4422 |
| Physical Hazards 4424 |
| Is Radioactive? 4426 |
| Is Minor Radioactive? 4428 |
| Is Recycled? 4430 |
| Is Controlled Substance? 4432 |
| Controlled Substance Flag Description 4434 |
| Is Toxin?  4436 |
| Is Select Agent? 4438 |
| CAS Number 4440 |
| MSDS URL 4442 |
| Image URL 4444 |
| More Information URL 4446 |
| Searchable Keywords 4448 |
| Price Code 1 4450 |
| Price Code 2 4452 |
| Long Description 4454 |

THIS SECTION CONTAINS THE DEFAULT, SCIQUEST-MANTAINED PACKAGE UOM VALUES. IT IS PERMANENTLY READ-ONLY.

| 4852 DEFAULT SUPPLIER VALUE | 4854 SYSTEM VALUE |
|---|---|
| BAG | BG - BAG |
| BD | BD - BUNDLE |
| BG | BG - BAG |
| BK | BK - BOOK |
| BO | BO - BOTTLE |
| BOOK | BK - BOOK |
| BOT | BO - BOTTLE |
| BOTTLE | BO - BOTTLE |
| BOX | BX - BOX |
| BT | BO - BOTTLE |
| BTL | BO - BOTTLE |
| BUNDLE | BD - BUNDLE |
| BX | BX - BOX |
| C62 | PC - PIECE |

NEW

THIS SECTION CONTAINS THE DEFAULT, SCIQUEST-MAINTAINED PRODUCT SIZE UOM VALUES. IT IS PERMANENTLY READ-ONLY.

| 4862 ~ DEFAULT SUPPLIER VALUE | 4864 ~ SYSTEM VALUE |
|---|---|
| ASSAYS | ASSAY - ASSAY (VOLUME) |
| Ci | Ci - CURIE (RADIOACTIVITY) |
| EXTRA LARGE | XLG - EXTRA LARGE (LENGTH) |
| GBq | GBq - GIGABECQUEREL (RADIOACTIVITY) |
| L | L - LITER (VOLUME) |
| LG | LG - LARGE (LENGTH) |
| LARGE | LG - LARGE (LENGTH) |
| MBq | MBq - MEGABECQUEREL (RADIOACTIVITY) |
| MD | MD - MEDIUM (LENGTH) |
| MEDIUM | MD - MEDIUM (LENGTH) |
| PC | PC - PIECE (VOLUME) |
| PIECE | PC - PIECE (VOLUME) |
| SM | SM - SMALL (LENGTH) |
| ... | ...... |

[NEW] ~ 4860

INITIAL FAVORITES ENTRY ← 10100

| ACTIVE FOLDERS | EDIT FOLDERS | | | | | LEGEND | ? |
|---|---|---|---|---|---|---|---|
| UNCHECK ALL | | | | | DETAILS | ADD TO ACTIVE CART | |
| FOLDER NAME/ PRODUCT NICKNAME | | SUPPLIER | CATALOG NO. | QTY. | PRICE ESTIMATE | | SELECT |
| ▷ MY FAVORITES  ADD NON-CATALOG ITEM... | | | | | | | ☐ |
| 2-FLUORO-3-(TRIFLUOROMETHYL) BENZYL ALCOHOL, 96%, 0.25g | | LANCASTER SYNTHESIS | 12306-0.25g | 1 | 9.99 USD | ☐ | ☐ |
| AA CONTRACT TEST-BUFFER ASL_LYSIS BUFFER FOR USE WITH QIAAMP DNA STOOL MINI KIT (CAT NO. 51504), 560 mL | | QIAGEN, INC. | 19082 | | UNAVAILABLE | | |
| AA CONTRACT TEST-CONTRACTED PRODUCT... 📄 | | VWR SCIENTIFIC PRODUCTS | 3384-0448 | 2 | 450.00 USD | ☐ | ☐ |
| AA CONTRACT TEST- SECOND CONTRACTED ITEM... 📄 | | VWR SCIENTIFIC PRODUCTS | CONTRACT-2 | 1 | 1,000.00 USD | ☐ | ☐ |
| AIRPORE TAPE SHEETS, MICROPOROUS TAPE SHEETS FOR COVERING 96-WELL BLOCKS: 25 SHEETS PER PACK. AIRPORE MICROPOROUS TAPE SHEETS ARE IDEAL FOR BACTERIAL CULTIVATION IN BLOCKS, AS THEY PROMOTE GAS EXCHANGE DURING CULTURING | | FISHER SCIENTIFIC | NC9942890 CHECK AVAILABILITY... | 1 | 37.00 USD | ☐ | ☐ |
| BENZYLQUISQUALIC ACID | | FAVORITE DESCRIPTION WHEN INITIALLY ADDED TO FAVORITES BY | B-1073 1mg | | UNAVAILABLE | | |
| BOTTLE, DROP-DISPENSING, TEF30ML ⊘ | | INDUSTRIES | 16354-320 | 1 | 37.99 USD | ☐ | ☐ |
| BUFFER ASL_LYSIS BUFFER FOR USE WITH QIAAMP DNA STOOL MINI KIT (CAT NO. 51504), 560 mL | | INDUSTRIES | 19082 | 1 | 8.88 EUR | ☐ | ☐ |
| CAD- HISPEED PLASMID MAXI KIT (25), FOR ULTRAFAST PURIFICATION OF UP TO 750μg PLASMID OR COSMID DNA | | INDUSTRIES | 111 | 1 | 13.45 USD | ☐ | ☐ |
| HISPEED PLASMID MAXI KIT (25), FOR ULTRAFAST PURIFICATION OF UP TO 750μg PLASMID OR COSMID DNA | | INDUSTRIES | 111 | 1 | 13.45 USD | ☐ | ☐ |

FIG. 53

| PRODUCT DISCONTINUED | | | | | | | | |
|---|---|---|---|---|---|---|---|---|
| HOME | MY FAVORITES | PRODUCT SEARCH | CARTS | HISTORY | SETTLEMENT | ITEM/PRICE | SALES ORDERS | INVENTORY MANAGEMENT |

MORE>> ▽  ⓧ  ?

DASHBOARD | SEARCH SUBMISSIONS | SUBMIT DATA | ITEMS | PRICE SETS | EXTRACTS | CONFIGURATION | ATTRIBUTE SEARCH

+ CLICK FOR ITEM MASTER SEARCH  ?

RESULTS FOR: INDUSTRIES +BUFFER +ASL    FOR THE SELECTED ITEM   CREATE NEW ITEM ▽ GO
SHOW ITEM DETAILS

RESULTS FOUND FOR YOUR SEARCH: 1

RESULTS PER PAGE 30 ▽      MARK AS DISCONTINUED
                            MARK FOR DELETION
                            MARK AS DISCONTINUED  ?
                            SYNDICATE
                            REACTIVATE

| WEIGHT ▽ | SUPPLIER △ | PRODUCT CATEGORY △ | PRODUCT UNSPSC | CATALOG # △ | PRODUCT DESCRIPTION △ | WITH EDITS | MFG NAME △ | MFG CAT NO △ | CT | |
|---|---|---|---|---|---|---|---|---|---|---|
| 100 | INDUSTRIES | BUFFERS | | 19082 | BUFFER ASL, LYSIS BUFFER FOR USE WITH QIAAMP DNA STOOL MINI KIT (CAT NO. 51504), 560mL | | | | EA | 560mL ▽ |

FIG. 53
*(CONT'D-1)*

| ACTIVE FOLDERS | EDIT FOLDERS | UPDATED FAVORITES | | | | LEGEND ? | |
|---|---|---|---|---|---|---|---|
| UNCHECK ALL | | | | | DETAILS | ADD TO ACTIVE CART | |
| FOLDER NAME/ PRODUCT NICKNAME | | SUPPLIER | CATALOG NO. | QTY. | PRICE ESTIMATE | | SELECT |
| ▷ MY FAVORITES   ADD NON-CATALOG ITEM... | | | | | | | ☐ |
| 2-FLUORO-3-(TRIFLUOROMETHYL) BENZYL ALCOHOL, 96%, 0.25g | | LANCASTER SYNTHESIS | 12306-0.25g | 1 | 9.99 USD | | ☐ |
| AA CONTRACT TEST-BUFFER ASL LYSIS BUFFER FOR USE WITH QIAAMP DNA STOOL MINI KIT ( CAT NO. 51504), 560 mL | | QIAGEN, INC. | 19082 | UNAVAILABLE | | | ☐ |
| AA CONTRACT TEST-CONTRACTED PRODUCT... | | VWR SCIENTIFIC PRODUCTS | 3384-0448 | 2 | 450.00 USD | | ☐ |
| AA CONTRACT TEST- SECOND CONTRACTED ITEM... | | VWR SCIENTIFIC PRODUCTS | CONTRACT-2 | 1 | 1,000.00 USD | | ☐ |
| AIRPORE TAPE SHEETS, MICROPOROUS TAPE SHEETS FOR COVERING 96-WELL BLOCKS: 25 SHEETS PER PACK, AIRPORE MICROPOROUS TAPE SHEETS ARE IDEAL FOR BACTERIAL CULTIVATION IN BLOCKS, AS THEY PROMOTE GAS EXCHANGE DURING CULTURING | | FISHER SCIENTIFIC | NC9942890 CHECK AVAILABILITY... | 1 | 37.00 USD | | ☐ |
| BENZYLQUISQUALIC ACID | | A.G. SCIENTIFIC | B-1073 1mg | UNAVAILABLE | | | ☐ |
| BOTTLE, DROP-DISPENSING, TEF 30ML | | VWR INTERNATIONAL | 16354-320 | 1 | 37.99 USD | | ☐ |
| BUFFER ASL LYSIS BUFFER FOR USE WITH QIAAMP DNA STOOL MINI KIT (CAT NO. 51504), 560 mL | | INDUSTRIES | 19082 | UNAVAILABLE | | | ☐ |
| CAD- HISPEED PLASMID MAXI KIT (25), FOR ULTRAFAST PURIFICATION OF UP TO 750μg PLASMID OR COSMID DNA | | INDUSTRIES | 111 | 1 | 13.45 USD | | ☐ |
| HISPEED PLASMID MAXI KIT (25), FOR ULTRAFAST PURIFICATION OF UP TO 750μg PLASMID OR COSMID DNA | | INDUSTRIES | 111 | 1 | 13.45 USD | | ☐ |

*FIG. 53 (CONT'D-2)*

SUPPLIER / LINE ITEM DETAILS

HIDE LINE DETAILS

LANDCASTER SYNTHESIS ⊟ MORE INFO...    ADD TO FAVORITES ▽ GO

FOR SELECTED LINE ITEMS

| | EDIT |
|---|---|
| CONTRACT PO NUMBER | TO BE ASSIGNED BASED ON THE SUPPLIER SETTINGS (BLANKET PO) |
| PRICING CODE QUOTE #1 | |
| PO CLAUSES | VIEW/EDIT BY LINE ITEM... |

ADD NON-CATALOG ITEM FOR THIS SUPPLIER

| PRODUCT DESCRIPTION | | CATALOG NO | SIZE/PACKAGING | UNIT PRICE | QUANTITY | EXT. PRICE |
|---|---|---|---|---|---|---|
| 1 2-FLUORO-3-(TRIFLUOROMETHYL) BENZYL ALCOHOL, 96%, 0.25g MORE INFO... | | 12306-0.25g | 0.25g EA | 9.99 | 1 EA | 9.99 USD ☐ EDIT |
| | TAXABLE<br>CAPTIAL EXPENSE<br>COMMODITY CODE<br>REPLENISH STOCK | SUPPLIER SPECIFIC ATTACHMENTS | EXTERNAL NOTE<br>ATTACHMENTS FOR SUPPLIER<br>ADD ATTACHMENT | | | |
| | | ✓<br>X MISCELLANEOUS<br>X | | | | |

MOLECULAR FORMULA C$_8$H$_6$F$_4$O
UNSPSC 12-35-00-00
MORE INFO

| | |
|---|---|
| SUPPLIER SUBTOTAL | 9.99 |
| TAX 1 | 1.00 |
| TAX 2 | 0.50 |
| SHIPPING | 20.00 |
| HANDLING | 30.00 |
| SUPPLIER TOTAL | 61.49 USD |

TAXONOMY AND DATA STRUCTURE FOR AN ELECTRONIC PROCUREMENT SYSTEM

RELATED APPLICATIONS

This application is a continuation-in-part of U.S. patent application Ser. No. 12/007,815, "Procurement System and Method Over a Network Using a Single Instance Multi-Tenant Architecture," filed on Jan. 15, 2008, which is hereby incorporated entirely herein by reference.

This application claims the benefit and priority of U.S. Provisional Patent Application Ser. No. 61/130,028, filed on May 27, 2008, which is hereby incorporated entirely herein by reference.

This application is related to U.S. patent application Ser. No. 10/318,814, filed Dec. 13, 2002, now U.S. Pat. No. 6,944,613 entitled "Method and System for Creating a Database and Searching the Database for Allowing Multiple Customized Views, issued on Sep. 13, 2005, which is hereby incorporated entirely herein by reference.

{5003} Reference to this application removed.

{5004} This application is related to U.S. patent application Ser. No. 12/283,275, "Shopping Cart Management in an Electronic Procurement System" filed on the same date as this application, which is hereby incorporated entirely herein by reference.

{5006} This application is related to U.S. patent application Ser. No. 12/283,274, "Workflow and Material Management in an Electronic Procurement System" filed on the same date as this application, which is hereby incorporated entirely herein by reference.

{5006} This application is related to U.S. patent application Ser. No. 12/283,279, "Multi-Currency Normalization In An Electronic Procurement System" filed on the same date as this application, which is hereby incorporated entirely herein by reference.

{5007} This application is related to U.S. patent application Ser. No. 12/283,280, "Form Management In An Electronic Procurement System" filed on the same date as this application, which is hereby incorporated entirely herein by reference.

{5008} This application is related to U.S. patent application Ser. No. 12/283,277, "Identifying and Resolving Discrepancies Between Purchase Documents and Invoices" filed on the same date as this application, which is hereby incorporated entirely herein by reference.

{5009} This application is related to U.S. patent application Ser. No. 12/283,278, "Providing Substitute Items When An Ordered Item Is Unavailable" filed on the same date as this application, which is hereby incorporated entirely herein by reference.

{5010} This application is related to U.S. patent application Ser. No. 12/283,278, "Prioritizing Order And Receipt Of Items Between Users" filed on the same date as this application, which is hereby incorporated entirely herein by reference.

{5011} This application is related to U.S. patent application Ser. No. 12/283,282, "Invoice Workflow" filed on the same date as this application, which is hereby incorporated entirely herein by reference.

FIELD OF INVENTION

The present invention relates generally to the field of procurement and, in particular, to a system and method for customized searching, procurement, data modeling, and order processing over a network using a single instance system that supports multi-tenants in a multi-business to multi-consumer type environment.

BACKGROUND OF INVENTION

Current e-commerce systems and methods provide consumers and businesses the ability to browse product lines and consummate sales transactions. However, current e-commerce systems do not allow for easy customization of the needed functionality to facilitate the transaction. While current systems can be customized for a specific business or customer, the customization is a time consuming and complicated task. These customizations must generally be hard coded into the application by the developers, thereby incurring increases in costs, delay in implementation, and loss of productivity. In the field of procurement, for example, an organization in need of a product or service generally has contractual relationships with multiple vendors to provide the desired product or service. The contractual relationship may define such terms as price, lot size, form of delivery, amount of discount, and other business rules. These rules may become complex as one term may influence other terms, such as different levels of discounts based on the number of items ordered.

Procurement systems also generally require order authorization from a procurement officer of the organization or someone in charge of reviewing the orders for compliance with internal policies of the organization, in addition to the contractual relationships with the vendors. These orders must be processed and tracked as the orders progress through the approval process such that the individuals placing orders are notified of whether the order was approved or denied, as well as for internal audit purposes. Therefore, there is a need for a system and method that can provide an efficient and simple procurement process that is easily customizable for multiple organizations and multiple vendors with simple and complex business terms, and can also provide a single point-of-access for both businesses and consumers to interface, interact, and implement and execute transactions, in accordance with existing or newly defined relationships, using a custom and configurable methodology for realizing their requirements.

SUMMARY OF THE INVENTION

Accordingly, the present invention is directed to a procurement system and method over a network using a single instance multi-tenant architecture that substantially obviates one or more problems due to limitations and disadvantages of the related art.

An object of the present invention is to provide a system and method that can provide an efficient and simple procurement process that is easily customizable for multiple organizations and multiple vendors with simple and complex business terms, and can also provide a single point-of-access for both businesses and consumers to interface, interact, and implement and execute transactions, in accordance with existing or newly defined relationships, using a custom and configurable methodology for realizing their requirements.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a single instance, multi-tenant procurement system includes an access module to provide access to a plurality of end users associated with an organization to their respective accounts, each account being customized by a super user of the organization, a search engine to execute searches for products offered by one or more suppliers, a transaction module to process and track one or more requisitions generated by the plurality of end users, a business rules module to apply business rules established between the organization and the one or more suppliers to process the requisitions, and a data repository to store data generated on the system.

In another aspect, a method includes the steps of accessing a single instance, multi-tenant procurement system through an access module, customizing one or more end user accounts of an organization through the access module by a super user of the organization, executing searches for products offered by one or more suppliers through a search engine, processing one or more requisitions generated on the one or more end user accounts by applying business rules established between the organization and the one or more suppliers to process the requisitions, and storing generated data in a data repository.

In yet another aspect, a computer program product including a computer readable medium having stored thereon computer executable instructions that, when executed on a computer, configures the computer to perform a method including the steps of accessing a single instance, multi-tenant procurement system through an access module, customizing one or more end user accounts of an organization through the access module by a super user of the organization, executing searches for products offered by one or more suppliers through a search engine, processing one or more requisitions generated on the one or more end user accounts by applying business rules established between the organization and the one or more suppliers to process the requisitions, and storing generated data in a data repository.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings:

FIG. 5E illustrates an exemplary user purchasing tool in accordance with the present invention;

FIG. 5F illustrates an exemplary punch-out access tool in accordance with the present invention;

FIGS. 5G-5M illustrate exemplary user permission tools in accordance with the present invention;

FIGS. 5N-5O illustrate exemplary materials management tools in accordance with the present invention;

FIGS. 6A-6J illustrate exemplary organization setup tools in accordance with the present invention;

FIGS. 8A-8D illustrate exemplary search engines in accordance with the present invention;

FIGS. 9A-9F illustrate exemplary catalog management tools in accordance with the present invention;

FIGS. 11A-D illustrates an exemplary cart and requisition tool in accordance with the present invention;

FIG. 13 illustrates an exemplary purchase order approval tool in accordance with the present invention; and FIG. 14 illustrates an exemplary history tool in accordance with the present invention.

FIG. 44 illustrates a data structure for catalog attributes that may be associated in some embodiments with items in a catalog.

FIG. 46 illustrates an exemplary screenshot of a user's view of item pricing provided by suppliers.

FIG. 48B illustrates a unit quantity mapping, showing a plurality of unit translation functions.

FIG. 48C illustrates a unit value, showing a plurality of unit translation functions.

FIG. 52 illustrates an exemplary field management interface in accordance with the present invention.

FIG. 53 illustrates an exemplary update favorite(s) process flow in accordance with the present invention.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of client-server compatible system containing any type of client, network, server, and database elements.

The terms module, engine, and application are used interchangeably herein.

Figure 1:
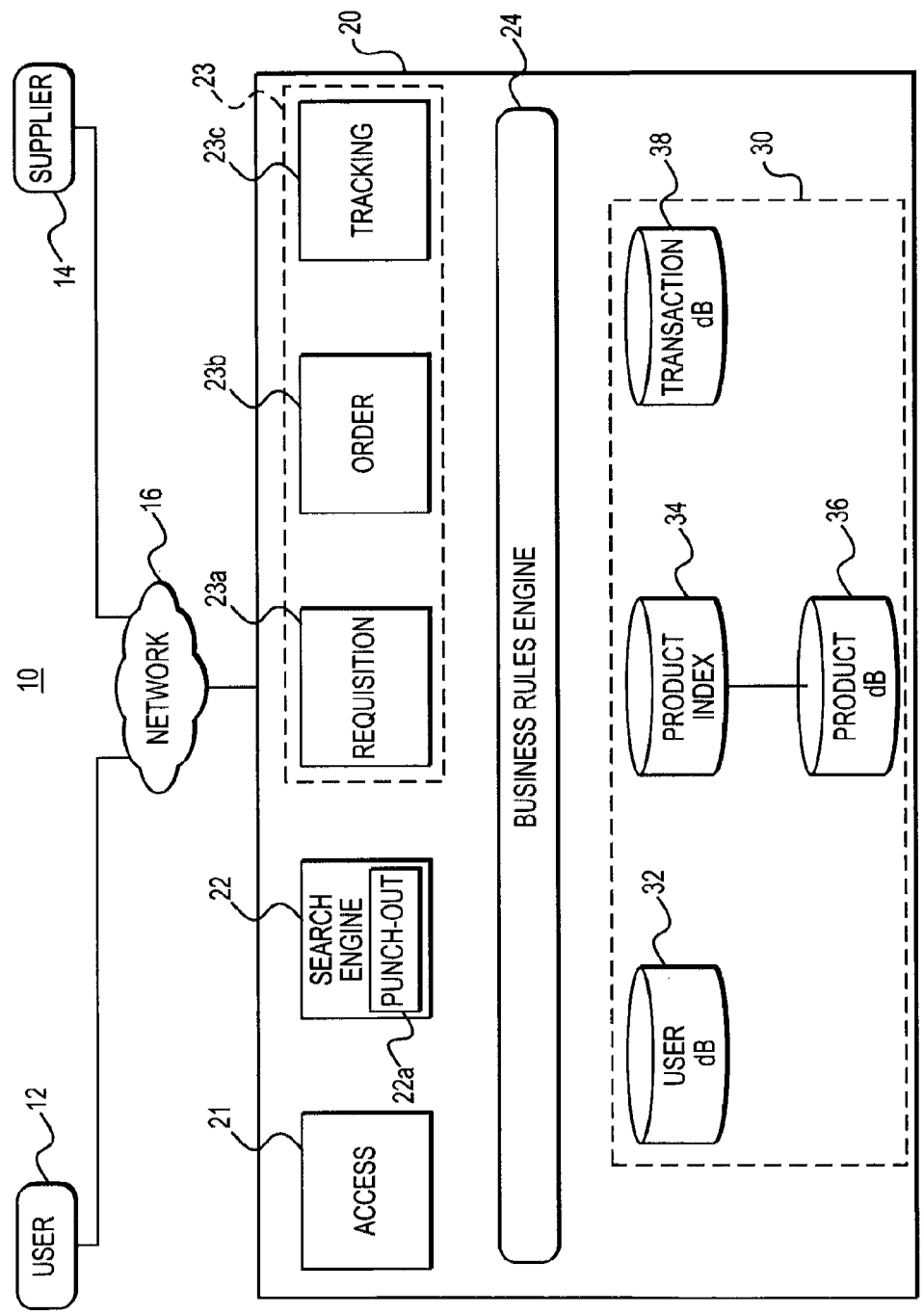
FIG. 1 is a block diagram illustrating an exemplary embodiment of an eProcurement system in accordance with the present invention.

FIG. 1 is a block diagram illustrating an exemplary embodiment of an eProcurement system in accordance with the present invention. The term "eProcurement architecture" used herein refers to a system and method that facilitates customized searching, data modeling, and order processing over an electronic network, using a client-server type architecture, where multi-tenants (e.g., end users/consumers, supplier users, etc.) can realize each of their specific business requirements with respect to the process of initiating and consummating transactions. In general, the eProcurement architecture of the present invention facilitates transactions between end users and suppliers. The end users may be individual users or members of an organization, such as a company or institution. For example, the end users may be any member of the organization authorized for performing procurement operations for the organization or the end user may be an individual of a sole proprietorship.

In a multi-person organization, procurement operations of the organization are setup in a multi-level structure with a group of individuals who make requests for requisitions and an authorizing entity (e.g., manager) who approve such requests based on the organization's procurement policies. There may be a plurality of individuals assigned as the authorizing entity, and the authorizing entity may itself include multiple levels of authority with each higher level having more control over the procurement operations. The procurement policies may define the levels of authority, such as who can order what, and include one or more contractual relationships between the organization and one or more suppliers. By way of example only, the procurement policy may define that the lowest level end user of a particular department can only order certain products or services while a higher level end user can order or authorize orders of broader categories of products and/or services. In another example, the procurement policy may require that certain products or services be ordered exclusively from a supplier with an exclusive contract with the organization. As another example, the procurement policy may require that a particular product be ordered in a predetermined lot size due to a contractual discount negotiated from a particular supplier. The eProcurement architecture of the present invention facilitates transactions between multiple end users of any level of any organization with multiple suppliers taking into account the procurement policies associated with each end user and supplier on a single platform (i.e., single instance, multi-tenant architecture).

As shown in FIG. 1, the eProcurement system 10 of the present invention includes end users 12, supplier users 14, and the procurement module 20 connected over a data communications network 16. The procurement module 20 includes access module 21, search engine 22, transaction module 23, business rules engine 24, and data repository 30. The data repository 30 may include one or more databases to store user data 32, hosted product index 34, product data 36, and transaction data 38.

The access module 21 allows the end users and suppliers to set up and gain access to their respective accounts in the eProcurement system 10. For example, the access module 21 may include registration/account setup procedures to create a new account on the eProcurement system 10. The access module 21 may also include authentication procedures (e.g., login ID and password) to determine the identity of the user and the user's profile (e.g., associated organization, level of access, etc.) before granting access to the procurement module 20. Once granted access, the user may configure the account for customized access. If the user is a "super user" (i.e., a user with higher levels of access, such as a procurement supervisor of an organization), the super user may set conditions for access of other users from his organization. If the user is a supplier, the supplier user may create or update the supplier account or provide/update product/service information (e.g., product catalog).

The search engine 22 allows the user to search through the hosted product index 34 to find a product and/or service provided by the one or more suppliers. In general, the search engine 22 searches through the hosted product index 34, which contains tokenized data of all the products from all the suppliers stored in the product database 36. The search results of the search are processed by the business rules engine 24 and displayed to the user based on the business rules set for the user and the user's organization. The search engine 22 includes a punch-out module 22a that allows the user to "punch-out" to an unhosted supplier catalog for products/services not available through the eProcurement system 10. The user can only access those punch-out suppliers configured for him/her according to the business rules engine 24.

The transaction module 23 includes one or more of requisition module 23a, order module 23b, and tracking module 23c to facilitate a transaction with one or more suppliers. The requisition module 23a processes items selected by the user from the search engine 22 and creates a requisition. If authorization is required, the requisition module 23a notifies the designated authorizing entity of the requisition to obtain authorization. If the requisition is denied, the requisition module 23a sends a notification back to the user of the decision. If the requisition is approved, the user is notified and the requisition either a) is sent to order module 23b, or b) is marked as "complete" based on the business rules engine 24 because not all requisitions are necessarily converted to orders. The order module 23b converts the requisition into a purchase order according to the business rules in the business rules engine 24. The order module 23b sends the purchase order to the appropriate supplier in the proper format(s) designated for that supplier. Once the purchase order has been sent, the tracking module 23 receives confirmation of the purchase orders from the suppliers and keeps track of the purchase orders through the fulfillment process.

In general, a user (i.e., end user, super user, supplier user, etc.) gains access to the procurement module 20 through the access module 21. The access module 21 may include security measures, such as authentication (e.g., providing user ID and password), to identify the user by accessing the user data stored in the user database 32. User accounts may also be created through the access module 21. For example, a user (generally a super user) creates an account on the eProcurement system 10 by registering through the access module 21. The account may also be created by a system administrator of the eProcurement system 10 off-line who gives access to the user via emailing a registration link to the access module 21. Once an account has been created, the user may access the eProcurement system 10 through the access module 21.

Figure 2:
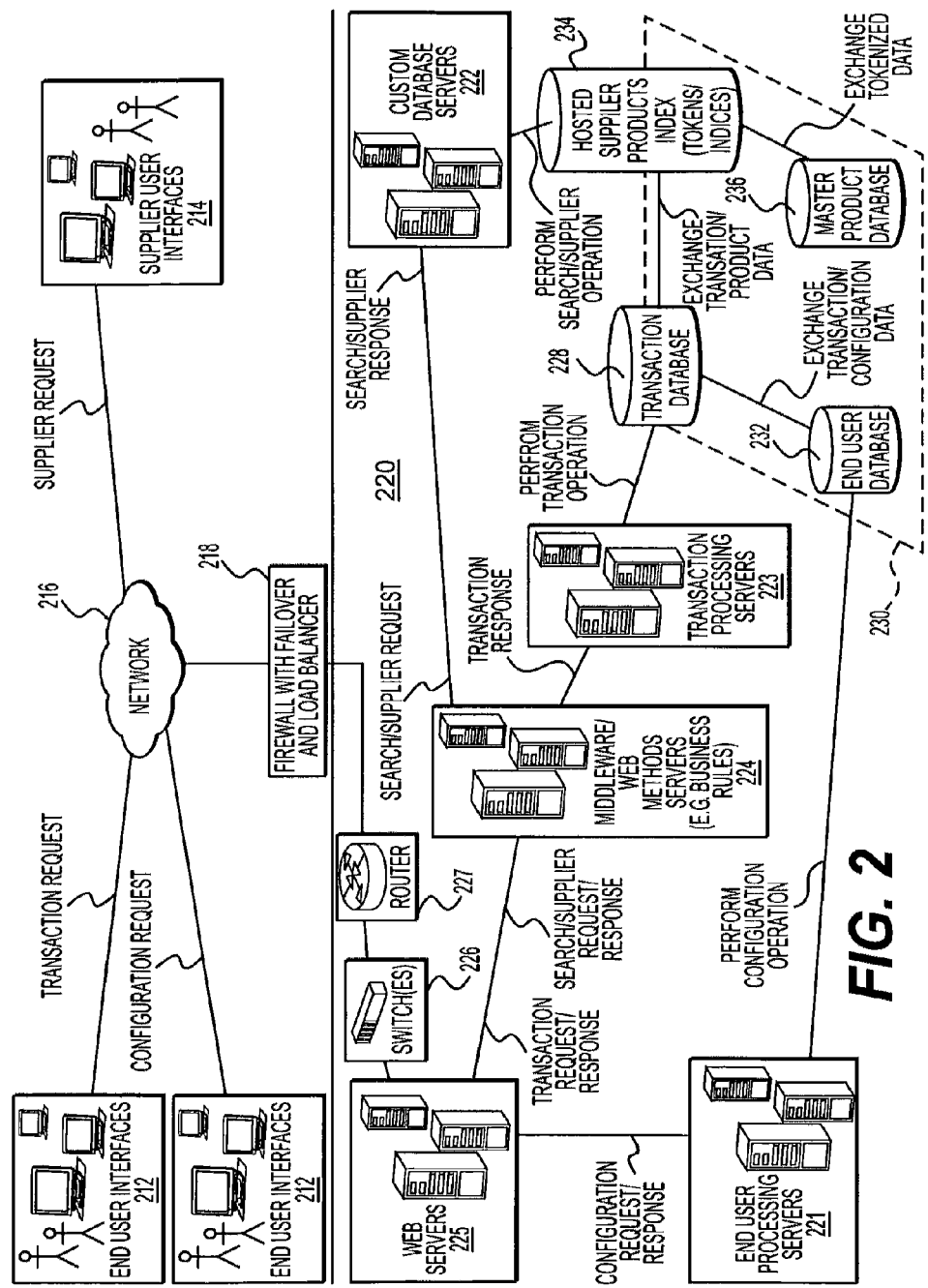
FIG. 2 illustrates an exemplary embodiment of an eProcurement architecture in accordance with the present invention.

FIG. 2 illustrates an exemplary embodiment of an eProcurement architecture in accordance with the present invention. As shown in FIG. 2, the eProcurement architecture of the present invention may include one or more end user/consumer interfaces 212 and supplier user interfaces 214, which may connect to one or more servers 220 over a wired or wireless network 216. These one or more servers 220 may be for user processing (e.g., end user processing servers 221), product database hosting (e.g., custom database servers 222), transaction processing (e.g., transaction processing servers 223), middleware/web methods (e.g., middleware/web methods servers (e.g., business rules) 224—e.g., for implementing business rules between end users and supplier users), and communication processing (e.g., web servers 225), such as streaming data/media, file hosting (e.g., FTP—File Transfer Protocol—server), web serving (e.g., HTTP/HTTPS, WWW, CGI—Common Gateway Interface, ASP—Active Server Pages, Servlets, JSP—Java Server Pages, etc.), facsimile transmission, proxy, telnet, chat, list, mail (e.g., SMTP—Simple Mail Transfer Protocol), news (e.g., NNTP—Network News Transfer Protocol), groupware, and other communication/data processing purposes. These one or more servers 220 may be hosted behind or outside a firewall 218 with or without failover and/or load balancers. These one or more servers 220 may be hosted over the Internet, within the same Intranet and/or subnet, on different Intranets and/or subnets, or in any other inter-networked configuration of network 216. The servers 220 may be implemented on Microsoft™ Windows NT/2000/XP™/XP Professional/Server™/Vista™ (e.g., Microsoft™ Internet Information Services (IIS)), Apache, Unix™, z/OS™, z/VM™, Linux™, VMS, Netscape Enterprise Server™, iPlanet™ Web Server, Sun Java System Web Server, Oracle™ Server, SQL Server™ (e.g., Microsoft™, Sybase™, MySQL™ etc.), Terradata server applications, or any other compatible server technology.

End user interfaces 212 and supplier user interfaces 214 may be implemented on Internet web browsers such as Microsoft Internet Explorer™, Netscape Navigator™, Mozilla™ Firefox™, Opera, Satori, Blazer, or any other Internet web browser capable of sending and receiving data using the Hypertext Transfer Protocol (HTTP). The data may be transferred over an encrypted and authenticated communication layer (i.e., using secure HTTP, or as more commonly known, HTTPS). End user interfaces 212 and supplier user interfaces 214 may be implemented using a combination of HTML (Hypertext Markup Language), Macromedia Flash™, XML (Extensible Markup Language), CGI (Client Gateway Interface), ASP (Active Server Pages), JSP™ (JavaServer Pages), PHP (Hypertext Preprocessor), Java, C/C++, Visual Basic™, Visual Basic Script, Perl™, Tcl/Tk, SQL (Structured Query Language), and any other relevant markup/programming/scripting/query language or development environment.

Communication from the end user interfaces 212 and supplier user interfaces 214 to the server or plurality of servers 220, via the firewall 218 with failover and load balancer, may be implemented over wired communication protocols through network 216. For example, at the Wide Area Network (WAN) level or at the Local Area Network (LAN) level, routed Internet Protocol (IP) packets may be transported using the IEEE 802.3 Ethernet standard, for example, on the data link network layer. However, any network standard may be used, whether for packet encapsulation, path determination and logical addressing, or physical addressing, at any layer of these layers without departing from the scope of the invention. Also, the packet data may be transported over interconnected hubs (not shown), switches 226, routers 227, and other network elements. At the WAN level, protocols such as Packet over Synchronous Optical Network (SONET) or Synchronous Digital Hierarchy (SDH), Asynchronous Transfer Mode (ATM) over SONET, Multi-protocol Label Switching (MPLS), packet over Frame Relay, or other analogous protocols may be used to deliver data over longer distances. Interconnect repeaters, multiplexers (e.g., add/drop), and cross connects may be used to facilitate and ensure accurate transmission over the long-haul from point-to-point.

Communication from the end user interface 212 and supplier user interfaces 214 to the server or plurality of servers 220, via the firewall 218 with failover and load balancer, may also be implemented over wireless communication protocols over network 216. For example, at the LAN level (i.e., WiFi), standards such as 802.11a, 802.11b, 802.11g, and 802.11n may be used to deliver data from point-to-point. Similarly, at the Metropolitan Area Network (MAN)/WAN level, standards such as 802.16e (i.e., WirelessMAN), WiMax, Universal Mobile Telecommunications System (UMTS) over Wideband Code Division Multiple Access (W-CDMA), GSM, GPRS, or EDGE may also be used to deliver data from point-to-point. As with the wired networks, other standards and protocols may be used without departing from the scope of the invention.

The eProcurement architecture of the present invention includes a data repository 230. The data repository 230 may be implemented using one or more databases to store end user data 232, hosted product index 234, master product data 236, and transaction data 238, in accordance with business rules (implemented via, for example, a business rules engine 24). The data repository 230 may be implemented using any type of data storage device without departing from the scope of the present invention. Moreover, the data repository 230 may be managed by any database platform (e.g., Oracle, Microsoft Access, IBM DB2, etc.) without departing from the scope of the present invention.

End user interfaces 212 and supplier user interfaces 214 may also allow an implemented feature that enables the setting of user configuration preferences. This feature allows a super user, with enhanced administrative capabilities, to have full access to the features of end user and supplier user interfaces. Some of these features may include: sending an email notification of a specific requisition order, and a corresponding link for accessing the same; full access to the features of the end user and supplier user interfaces; the capability to approve or reject a full order or a specific order item requested by an end user; the capability to take ownership and/or control of a specific requisition order, which may be organized according to a product or supplier category; the capability to expedite or accelerate an order through to specific steps along the ordering process, including the final review step; and, the capability to invoke and view a summary and history of each end user's latest order activity.

Moreover, a super user, for example, may design and/or otherwise configure and customize the style, type, layout, and level of data that is displayed on the respective end user interface 212 and supplier interface 214 for their respective organizations. A super user is also able to invoke a setup feature to choose which end users may have access to specific suppliers. Furthermore, a super user may also determine what information is required from the end users and supplier users of their respective organization, and determine the level of access at which an end user may access a specific supplier within the hosted supplier products catalog. This capability enables a super user to configure, for example, whether an end user can view specific products from specific suppliers, the currencies given for product/item pricing, and place orders. Moreover, the end user interface of the present invention allows for features of the present invention to be configured as permission driven. As such, certain features may be accessible to each end user, based on the end user's precedence within the organization, which likely affects his/her corresponding permission level. In addition, each feature is configurable to each end user based on a set of variable options. These variable options may include the ability to set a specific layout/view, a preferred number of search results, a preferred list of products, or a preferred list of suppliers. Also, each feature may include a help function that allows an end user to resolve inquiries or difficulties relating to the feature. The end user interface implementation is usually account login-based and, as described in further detail above, may encompass multiple server types (e.g., running a Linux OS), a redundant firewall and load balancer, and a priority-based software programming architecture (e.g., implemented in JAVA and JSP).

Figure 3:
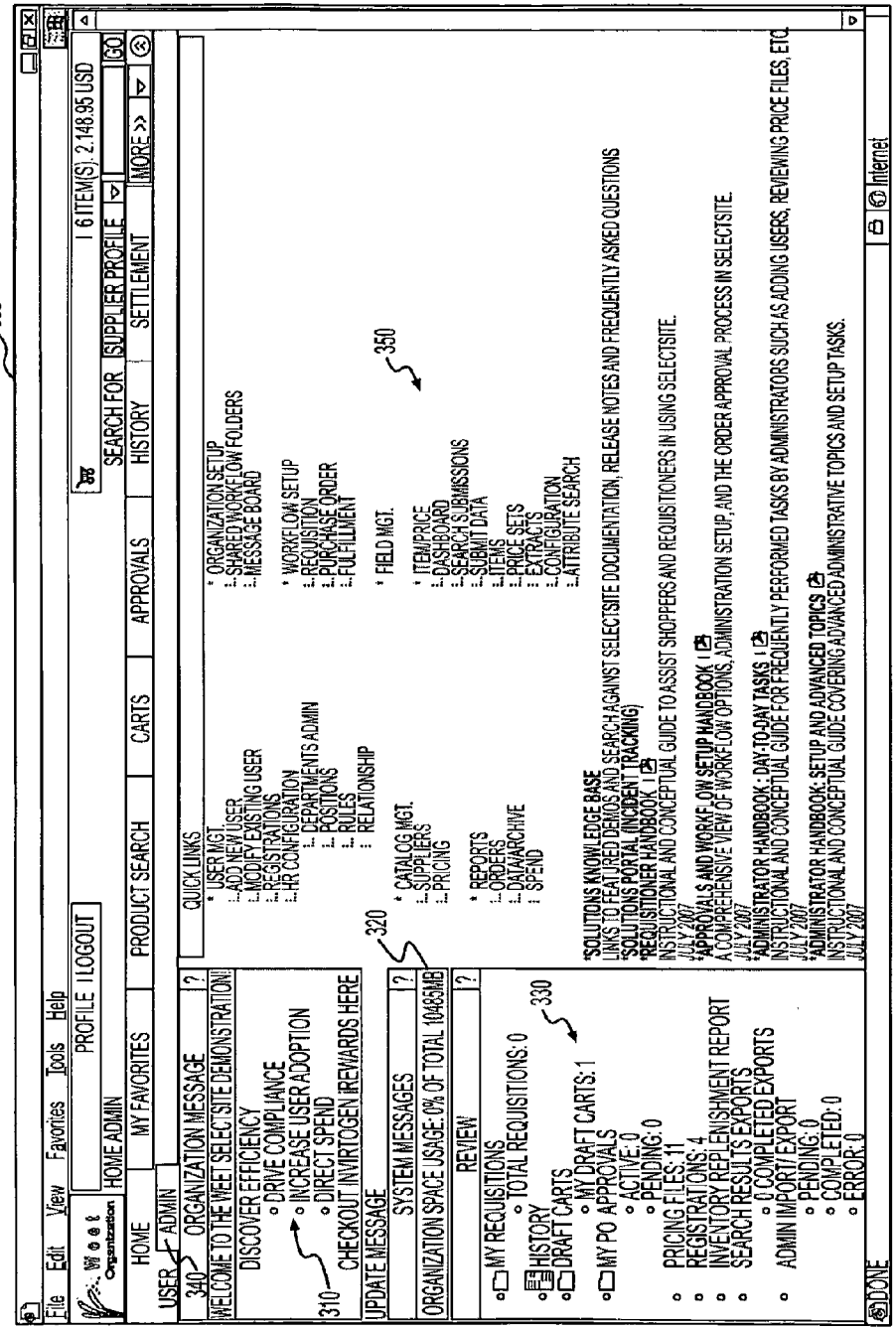
FIG. 3 illustrates an exemplary user interface in accordance with the present invention.

FIG. 3 illustrates an exemplary user interface in accordance with the present invention. For purposes of example only, an end user interface is used to describe various aspects of the present invention. As shown in FIG. 3, user interface 300 provides customized information for the user. For example, the user is a member of a fictitious group named Weet Organization. The user interface 300 includes one or more of an organizational message area 310, any system message area 320, and task items area 330. In the example shown, the user is a super user and therefore, the "Admin" tab 340 is active. Had the user been an end user, the "User" tab would be active and the "Admin" tab 340 either would not be displayed or would be inactive. All of these areas and information displayed therein may be customized through the access module 21. Any configuration definitions are then stored in the user database 32 and invoked upon access/login.

FIG. 3 illustrates an exemplary embodiment of the configuration tools available to a super user. In general, the eProcurement system 10 of the present invention provides a super user the tools needed to configure every aspect of the eProcurement process of an organization for complete customization, thereby effectuating a single instance multi-tenant architecture. That is, the eProcurement system 10 establishes a centralized system that is customizable for each user and/or organization, thereby providing a robust and yet an efficient eProcurement system. More specifically, configuration tool 350 allows a super user to customize the configuration of the eProcurement system 10 specifically for an organization and its users. While exemplary configuration tools are shown, other tools may be included without departing from the scope of the present invention.

Figure 4A:
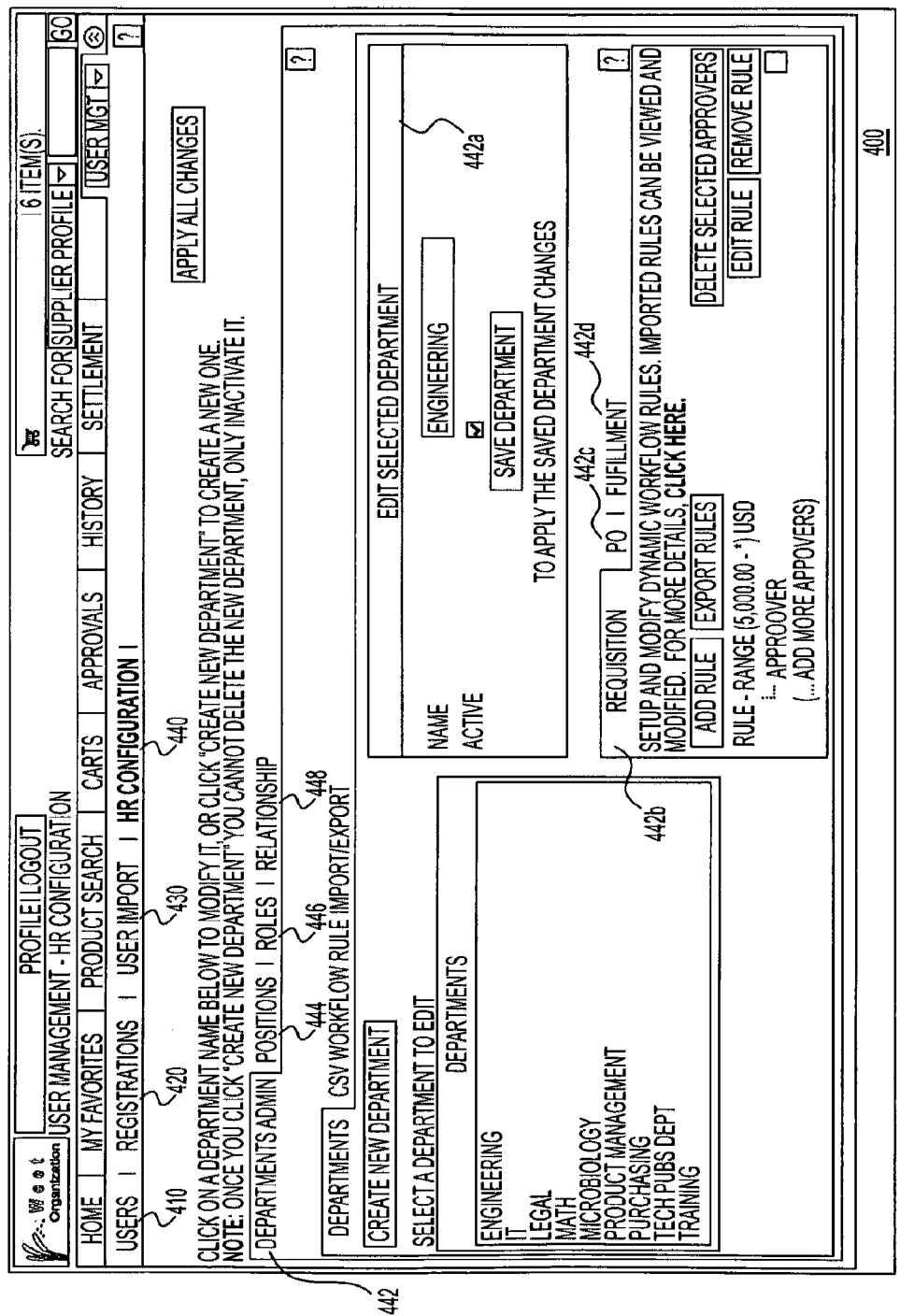
FIGS. 4A-4T illustrate exemplary user management tools in accordance with the present invention.
Figure 4B:
Figure 4C:
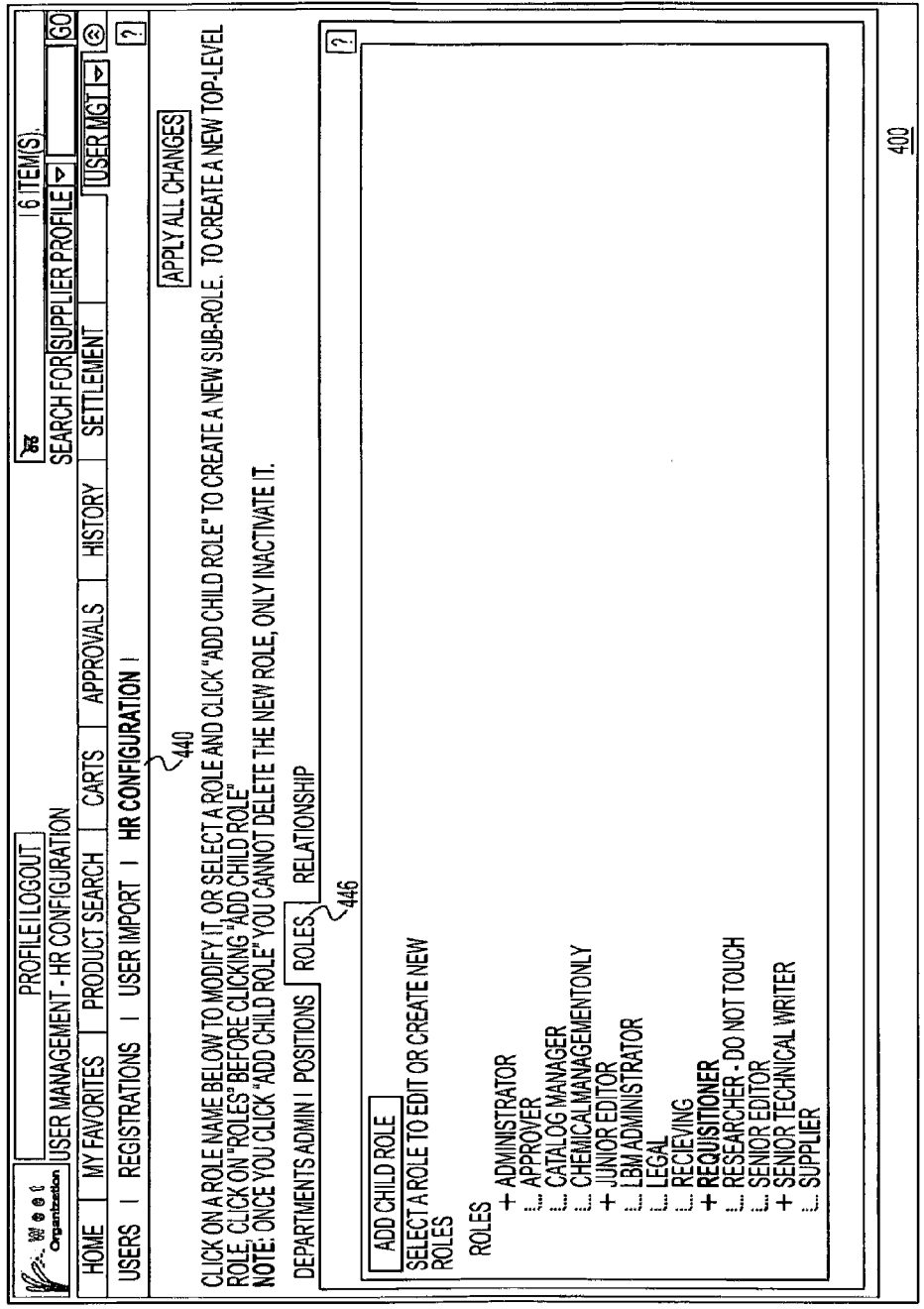
Figure 4D:
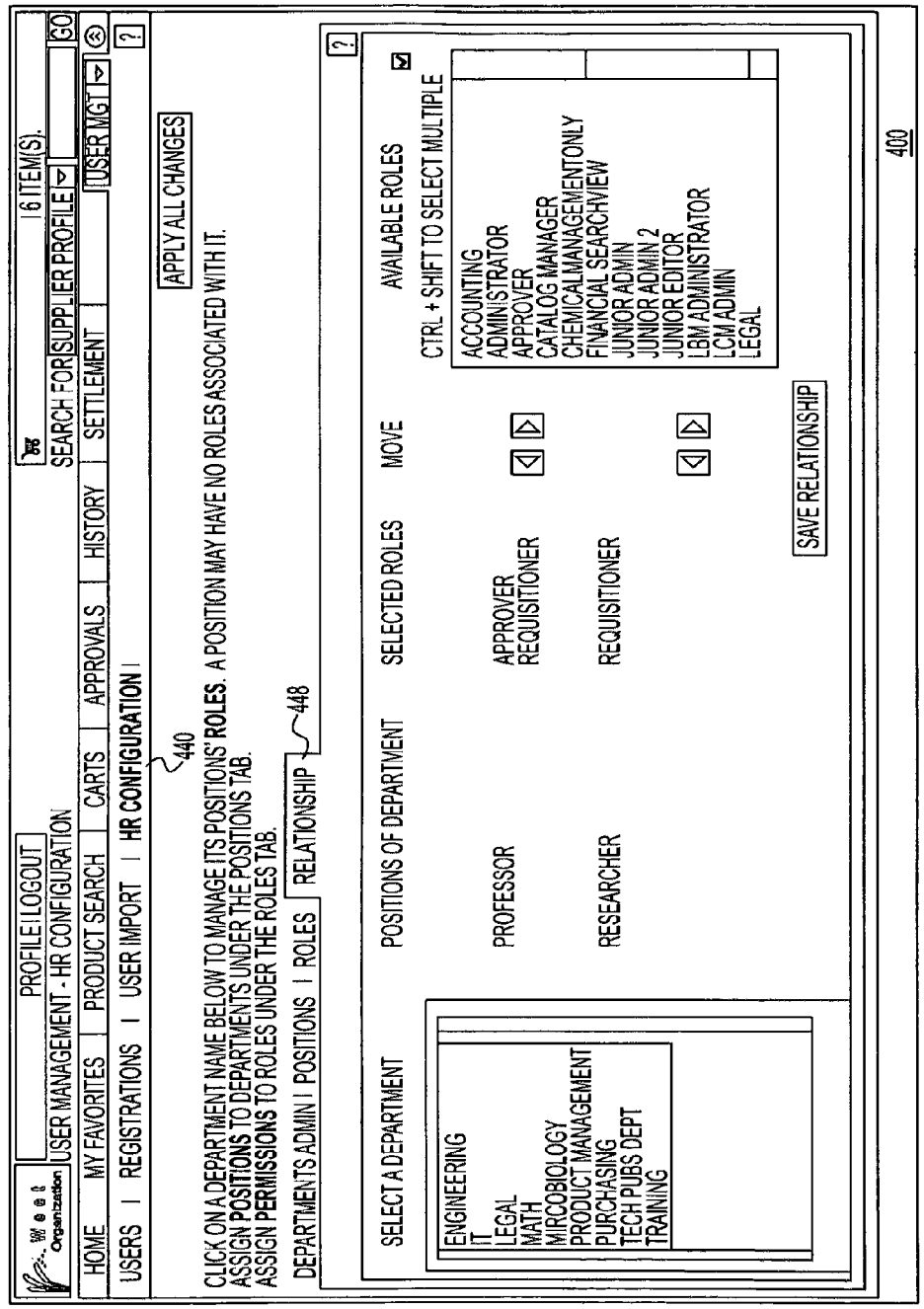

FIG. 4A illustrates an exemplary user management tool 400 to create or modify user access, manage user registration, and define the organizational structure. For example, FIG. 4A illustrates a user access human resources (HR) configuration tool 440. In particular, HR configuration tool 440 allows the super user to establish and describe the organization. For example, the HR configuration tool 440 may be used to define various departments of the organization (442), various positions of the organization (444), various roles of the users in the organization (446), and relationships between the roles, positions, and departments defined for the organization (448). As shown in FIG. 4A, the various departments of the organization that require procurement services may be "Engineering," "IT," "Legal," "Math," etc. As shown in FIG. 4B, there may be various positions within the organization, such as "Buyer," "Documentation Editor," "Professor, "Researcher," etc. As shown in FIG. 4C, the HR configuration tool 440 is used to define various roles of the users within the organization, such as "Administrator," "Approver," "Catalog Manager," etc. As shown in FIG. 4D, the HR configuration tool 440 is used to define the relationship between the department, position, and role of the users. For example, a "Professor" in "Engineering" may be designated as an "Approver" and "Requisitioner" for the organization while a "Researcher" of "Engineering" may only be a "Requisitioner." In this manner, the HR configuration tool 440 provides a simple yet efficient mechanism to define the organization for which the eProcurement system 10 is to be utilized.

Figure 4E:
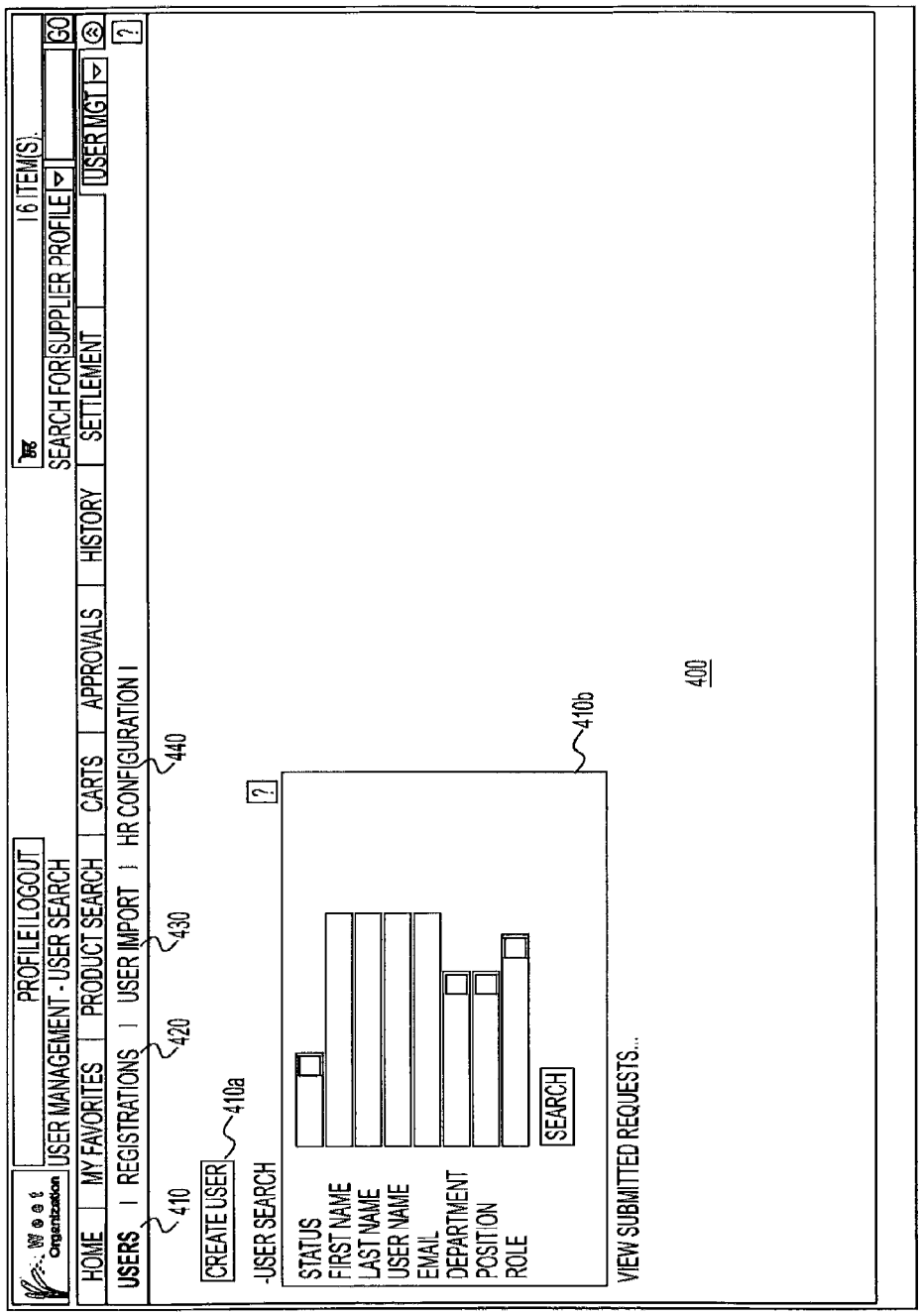

Once the organization has been defined through the HR configuration tool 440, user access tool 410 may be used to create or modify a user's access to the eProcurement system 10 for the user's organization. As shown in FIG. 4E, the user access tool 410 may be used to create a new user access account (410a) or the user database 32 may be searched (410b) for an existing user in the eProcurement system 10. To create a user access account, the user access tool 410 requires entry of the user's personal information (e.g., name, phone number(s), email address) and authentication information (e.g., login ID and password). In addition, the user's department and position information as created through the HR configuration tool 440 is also provided. In an exemplary embodiment, the department and position information created through the HR configuration tool 440 are shown in a drop-down menu for easy selection and entry. To simplify the creation of an account, existing user files may be imported into the user database through the user import 430. Once a user access account has been created, the newly created accounts are activated through the user registration monitor 420. As shown in FIG. 4F, a list of new user access requests is presented in the user registration monitor 420. A designated approver for the organization then reviews and approves the user access account to be activated for the user.

Figure 4G:

In accordance with an exemplary embodiment of the present invention, every aspect of the organization may be defined and customized in the eProcurement system 10. For example, as shown in FIG. 4A, once a "Department" has been created for an organization, the created department may be activated (442a). Moreover, each department may be defined with business rules related to the department's requisition (442b), purchase orders (442c), and fulfillment (442d). For example, FIG. 4A shows that the "Engineering" department has been designated as an active department with the "Requisition" and "Purchase Order" rules including a list of approvers for the Engineering department. As shown in FIG. 4B, a created position may be designated for a created department. For example, FIG. 4B shows that the organization has the "Professor" position for the "Engineering," "Math," "Microbiology," and "Purchasing" departments. FIG. 4G illustrates an exemplary embodiment of the HR configuration tool 440 for defining roles of the organization.

Figure 4H:
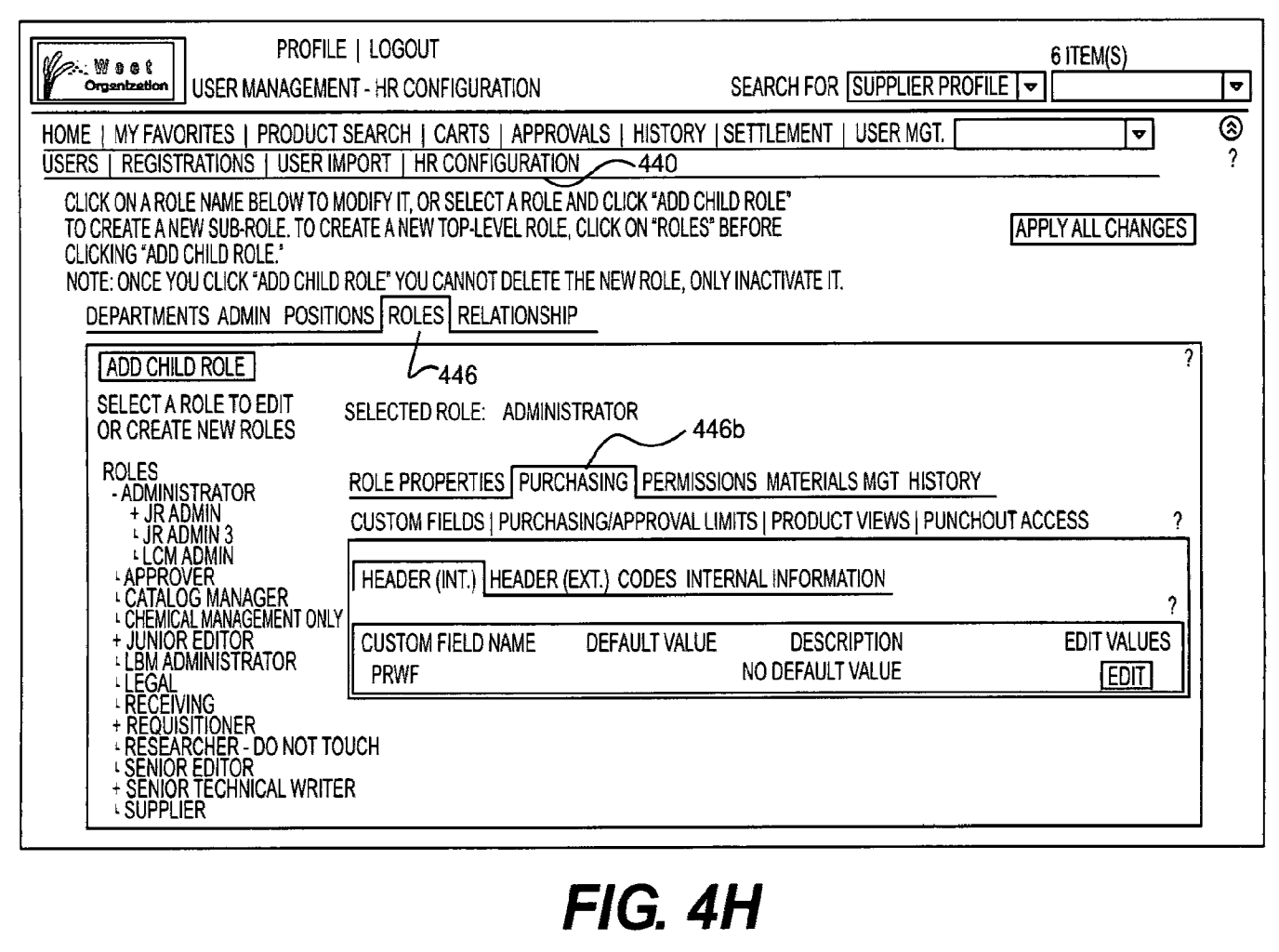
Figure 4I:
Figure 4J:
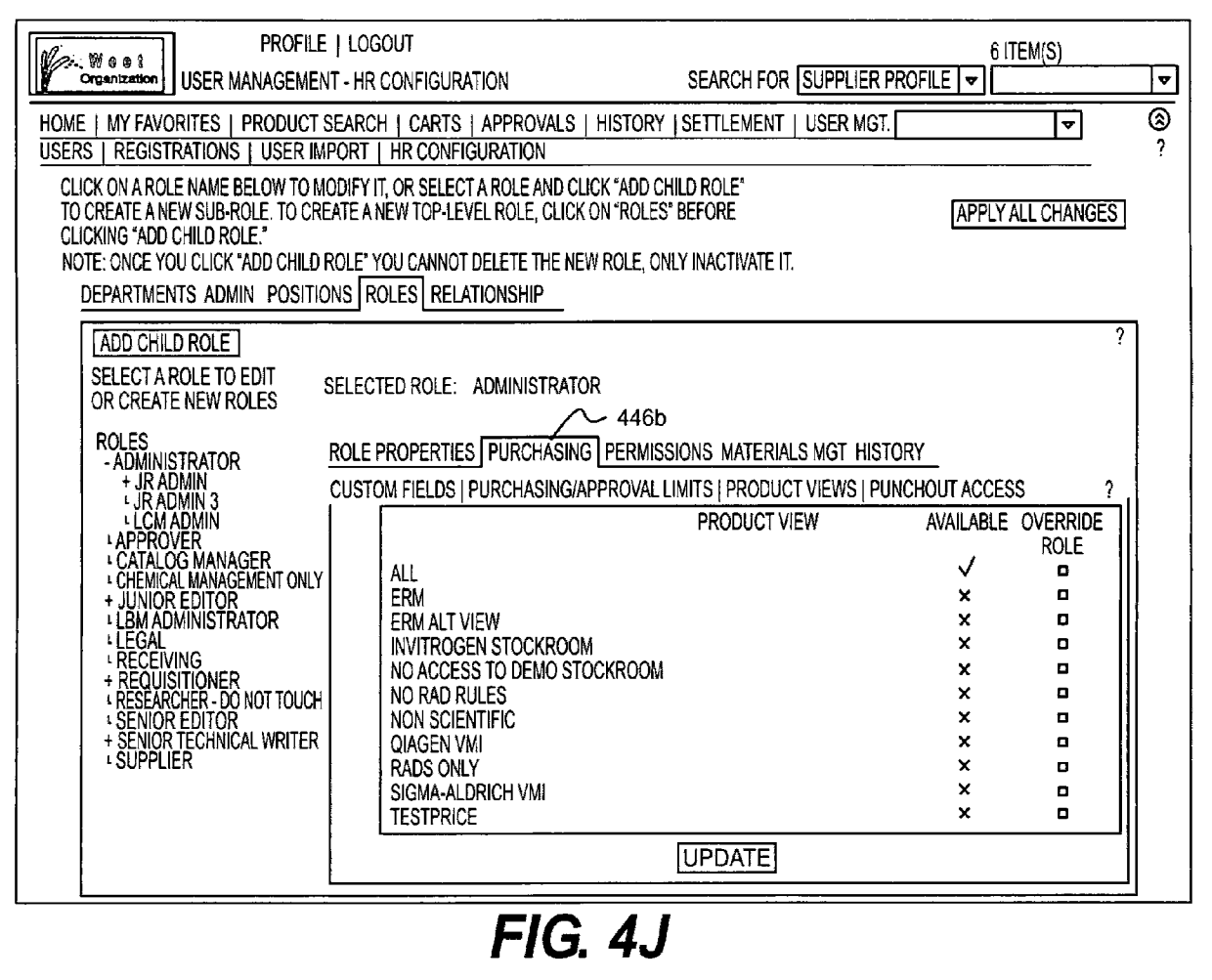
Figure 4K:
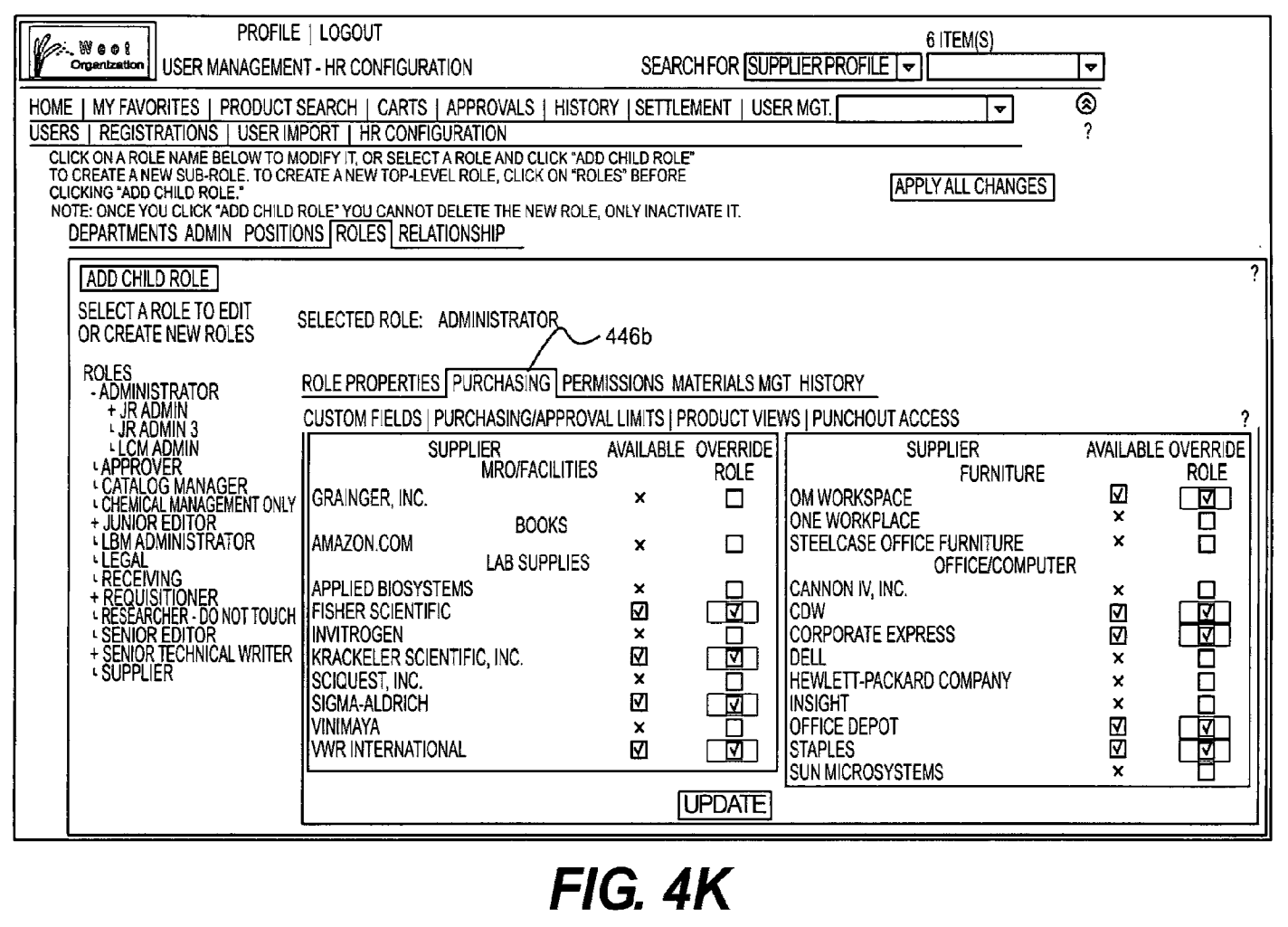
Figure 4L:
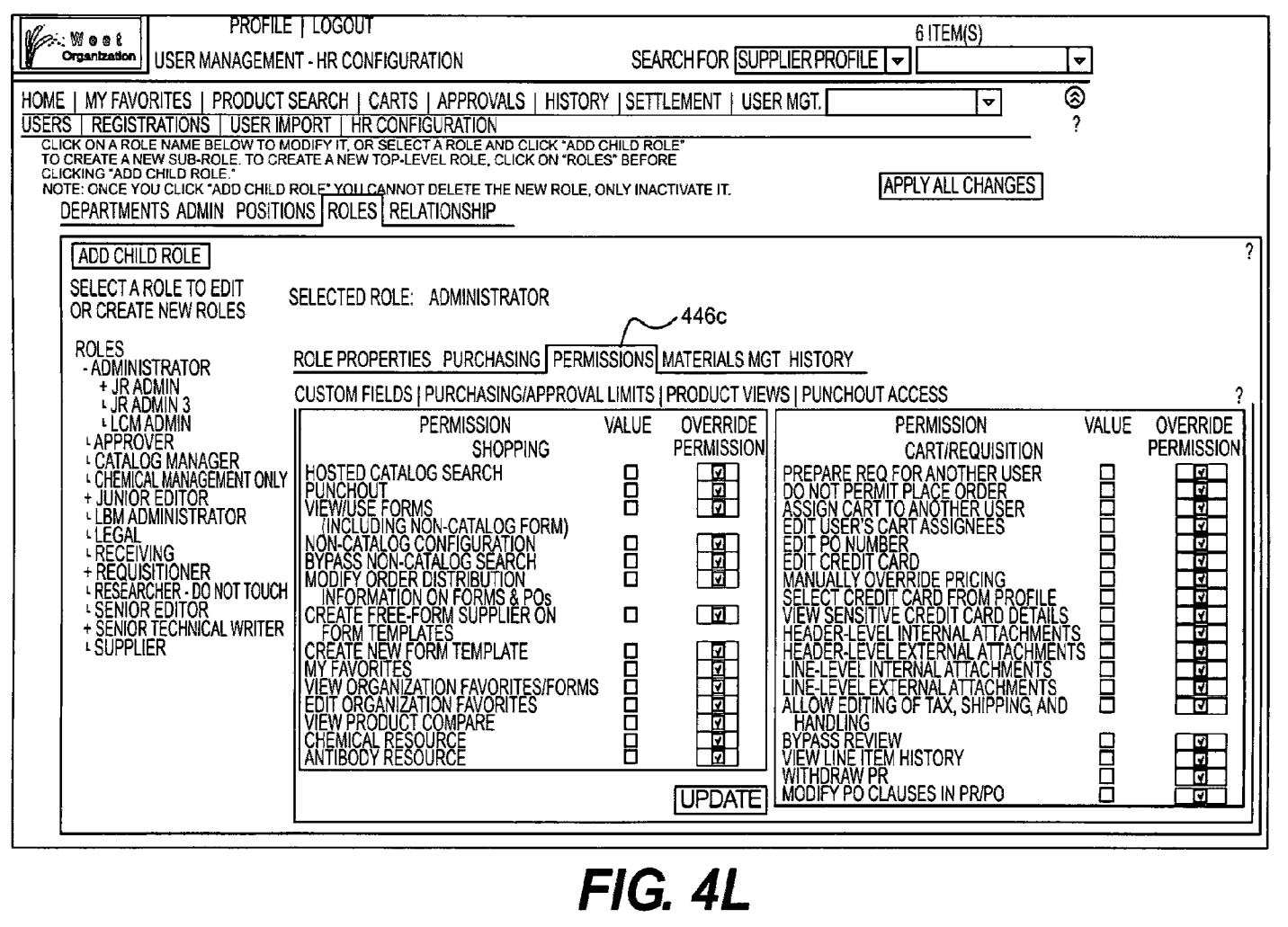
Figure 4M:
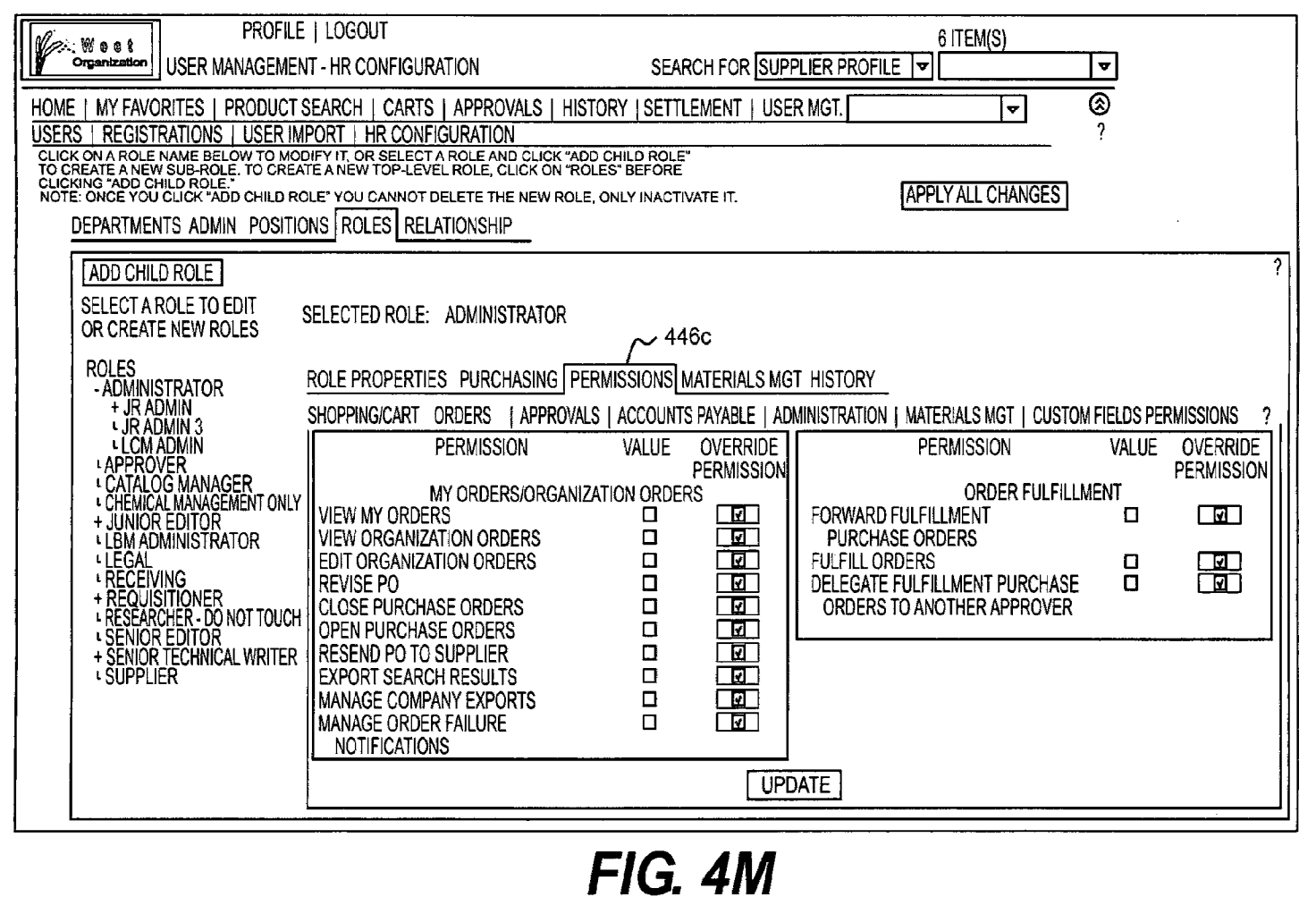
Figure 4N:
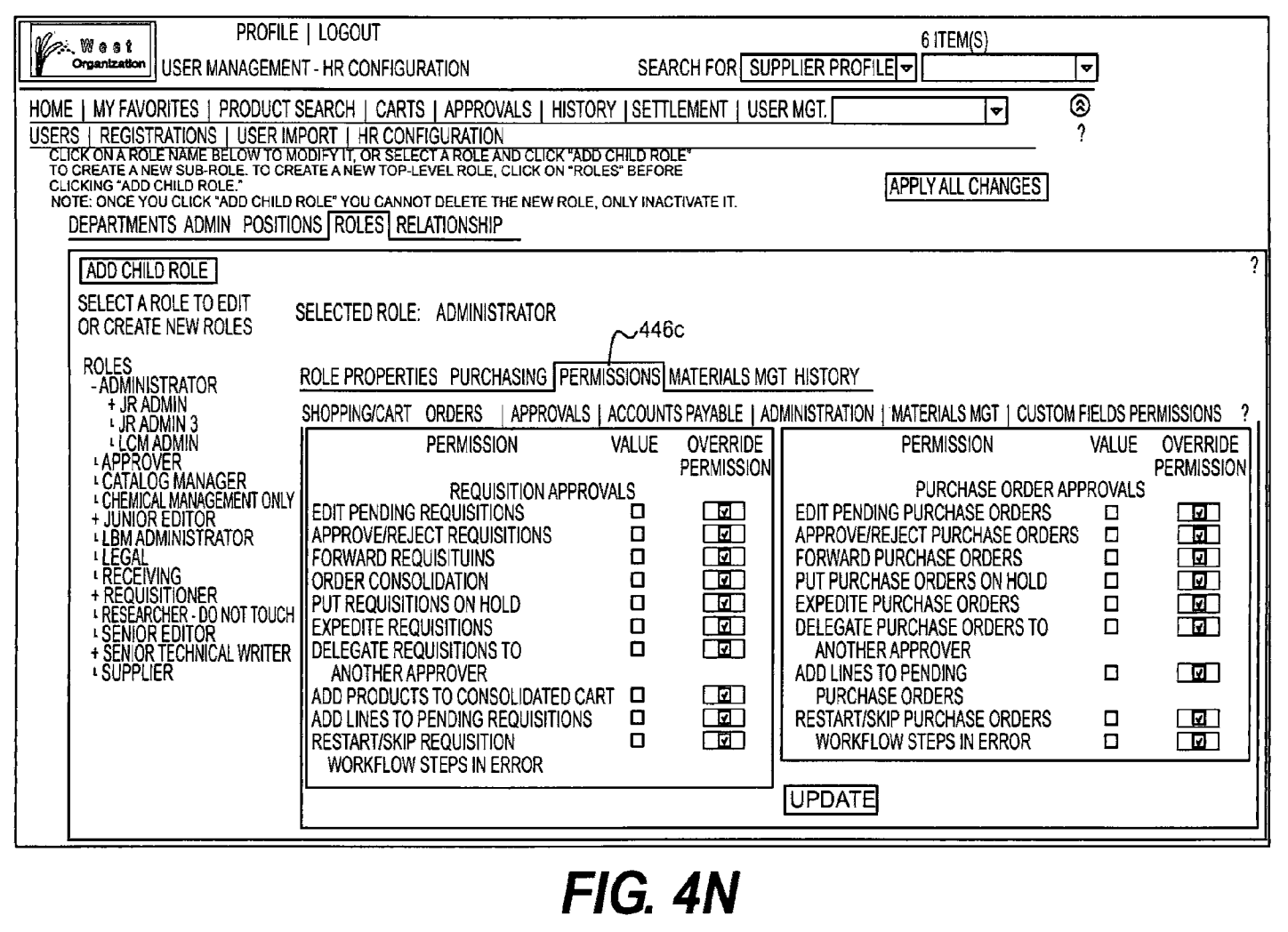
Figure 4P:
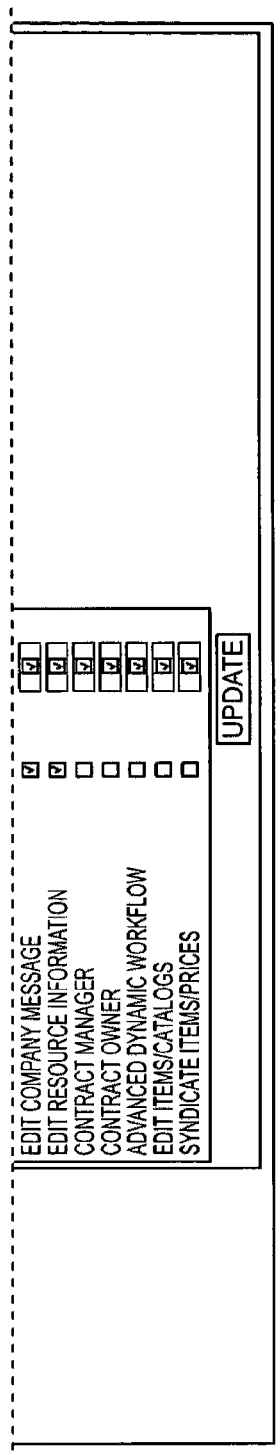
Figure 4Q:
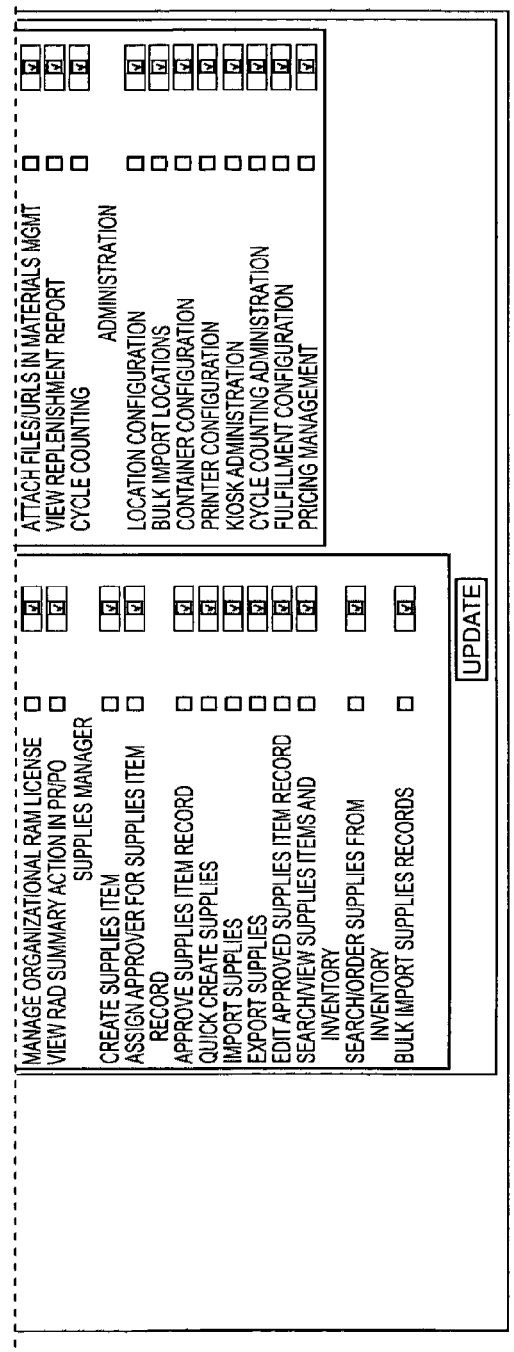
Figure 4R:
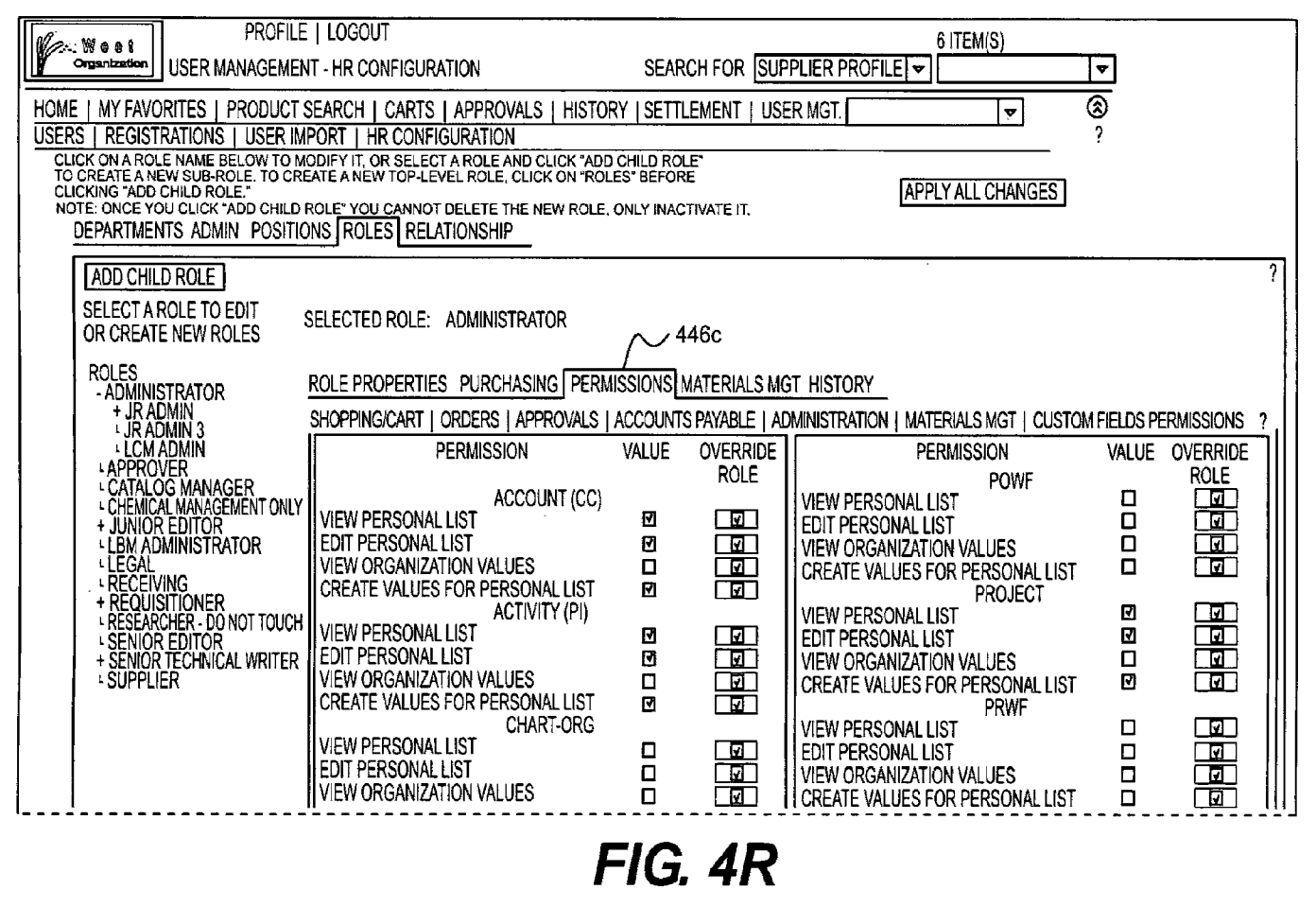
Figure 4R:
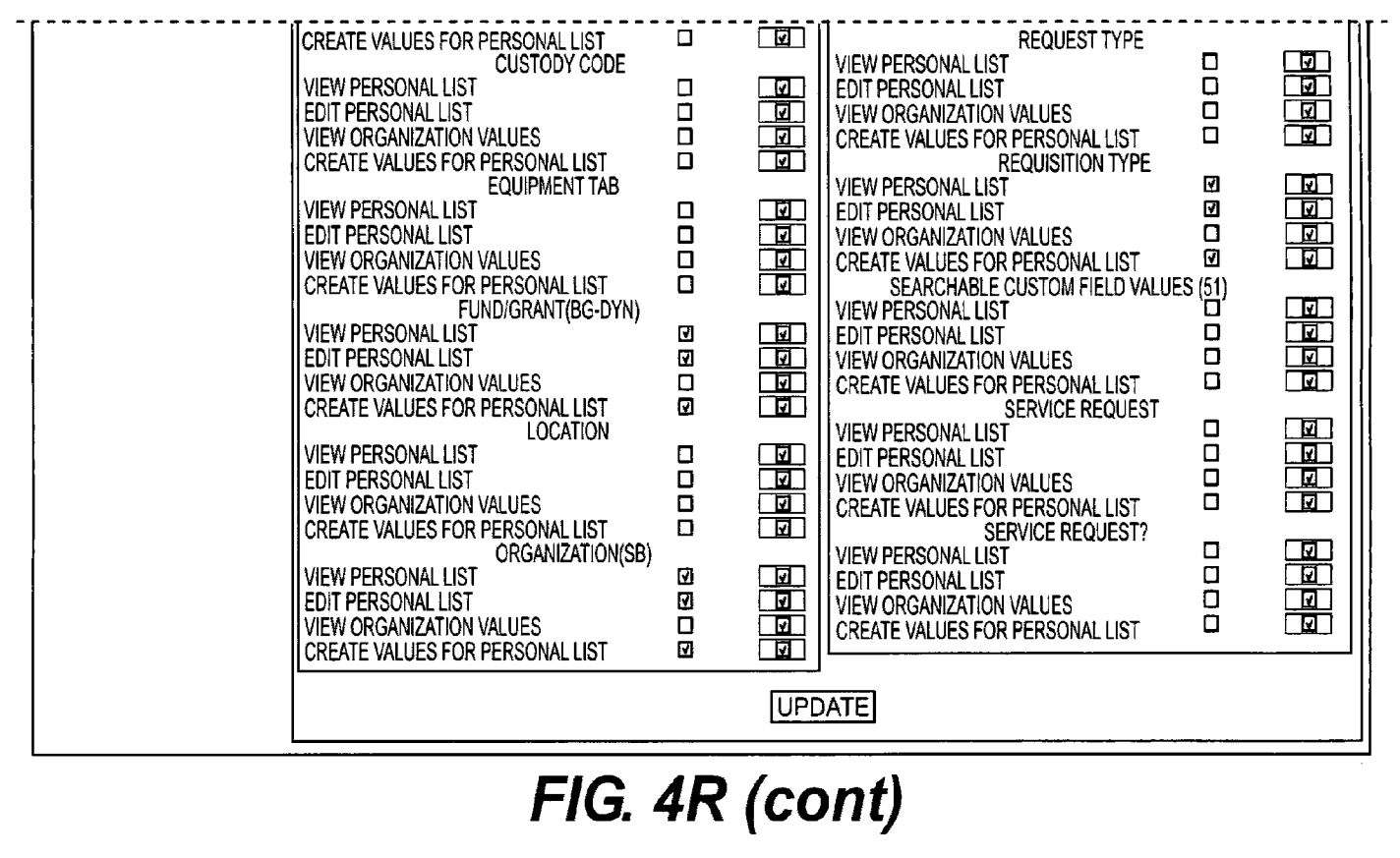
Figure 4S:
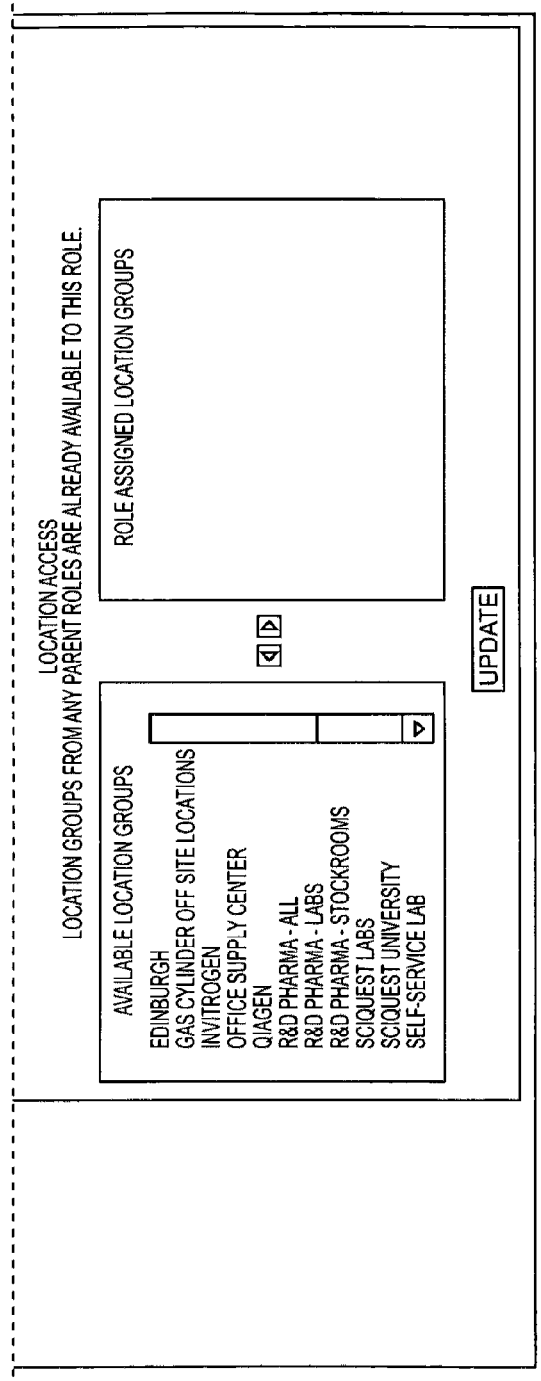
Figure 4T:
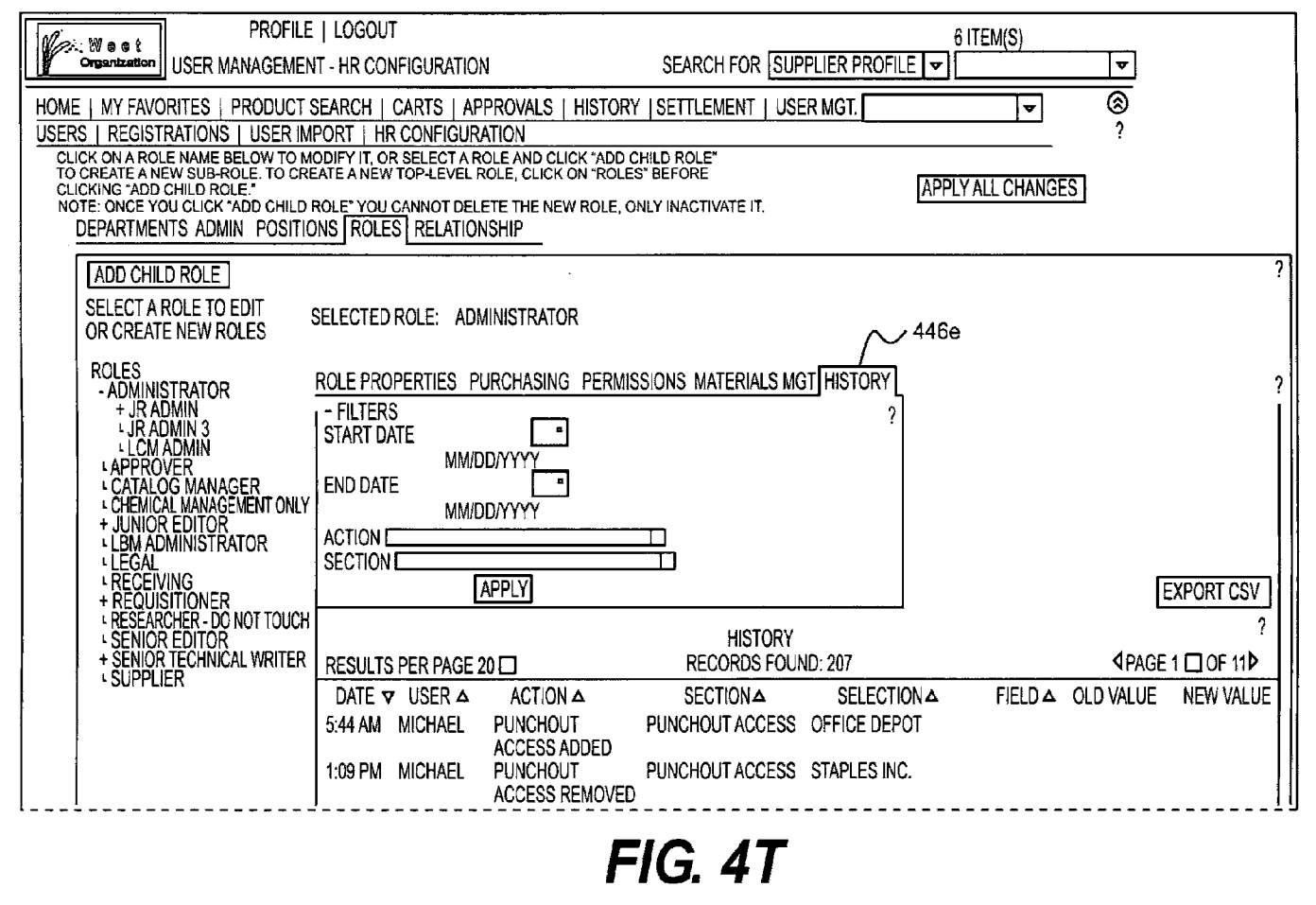

For each role, the roles configuration tool 446 is used to define the role properties (446a), purchasing properties (446b), access permissions (446c), materials management rules (446d), and history of modifications to these definitions (446e). For example, for the role of "Administrator," the role properties 446a (FIG. 4G) may include whether the designated role is active in the organization and the purchasing properties 446b may include definitions of any internal and external purchasing codes and information (e.g., "PRWF") (FIG. 4H), purchasing/approval limits (FIG. 4I), allowed product views (FIG. 4J), and allowed punch-out access (FIG. 4K). The access permissions 446c may be defined for the roles including shopping cart permissions (FIG. 4L), orders (FIG. 4M), approvals (FIG. 4N), accounts payable (FIG. 4O), administration (FIG. 4P), management of materials (FIG. 4Q), and custom fields permissions (FIG. 4R). The materials management 446d defines the available projects and location of groups to the various roles (FIG. 4S). The history section 446e keeps track of a history of all the actions (e.g., modified, created, product view added, product view removed, punch-out access added, punch-out access removed, project added, project removed, location added, location removed, etc.) and the sections to which the actions were applied (e.g., role properties, product views, punch-out access, materials management, permissions, purchasing/approval limits, custom field permission definitions, etc.) including the old value of the parameter and the new value of the parameter (FIG. 4T).

Figure 5A:
FIG. 5A illustrates an exemplary user setting tool in accordance with the present invention.

Once the internal organizational structure and descriptions of key positions of users in the organization have been defined using the user management tool 400, specific users and their level of access may be defined. As discussed above, the level of access of a user may be assigned globally based on their positions and/or roles in the organization. In addition, the eProcurement architecture of the present invention allows customization down to specific individuals all within the single instance, multi-tenant environment. For example, FIG. 5A illustrates an exemplary user profile tool 500 for defining a user's account in the eProcurement system of the present invention. As shown, the user profile tool 500 includes one or more of a user setting tool 510, user purchasing tool 520, user permissions tool 530, user materials management tool 540, and user setting history tool 550. These tools provide customization of the user's account for various levels of access to the eProcurement system of the present invention all within the single instance, multi-tenant environment.

Figure 5B:
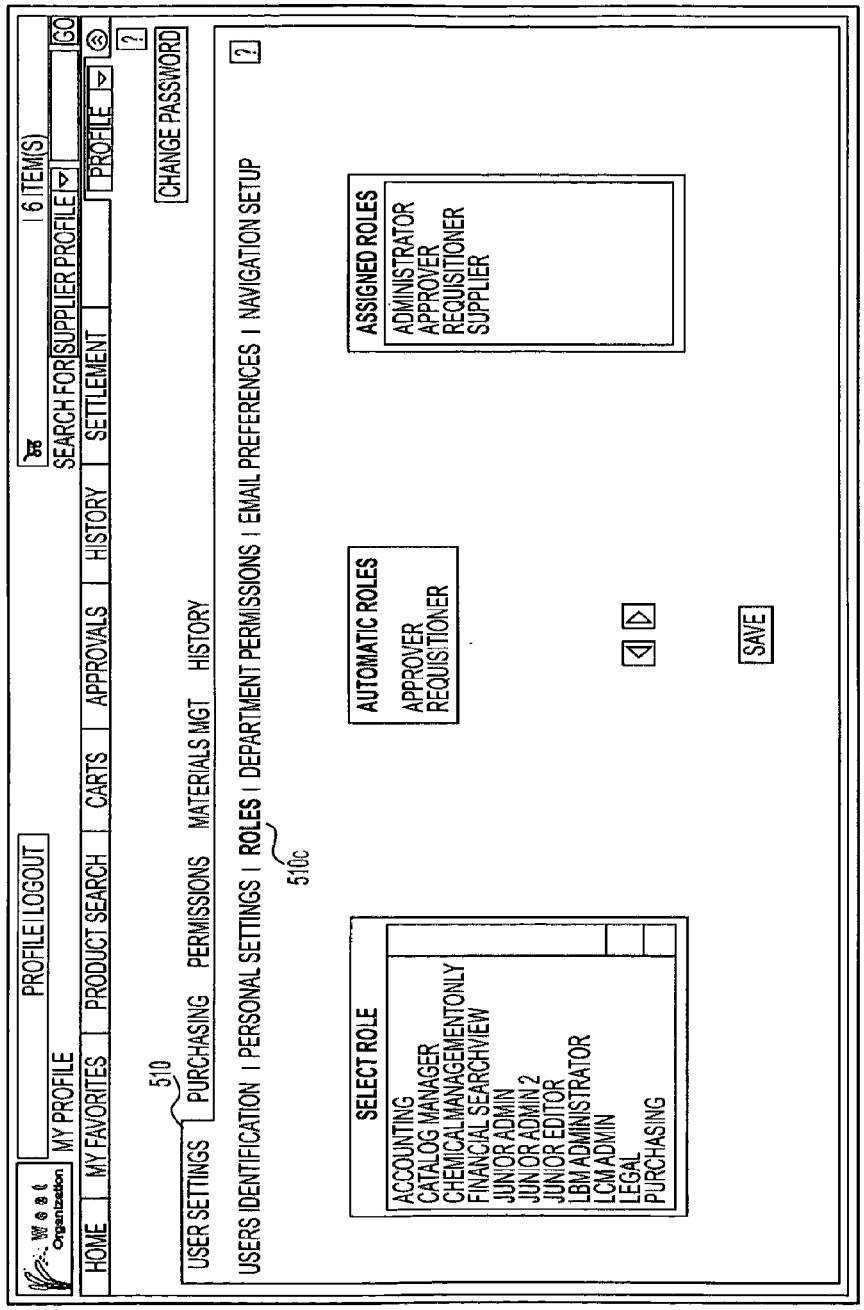
FIG. 5B illustrates an exemplary roles selection tool in accordance with the present invention.
Figure 5C:
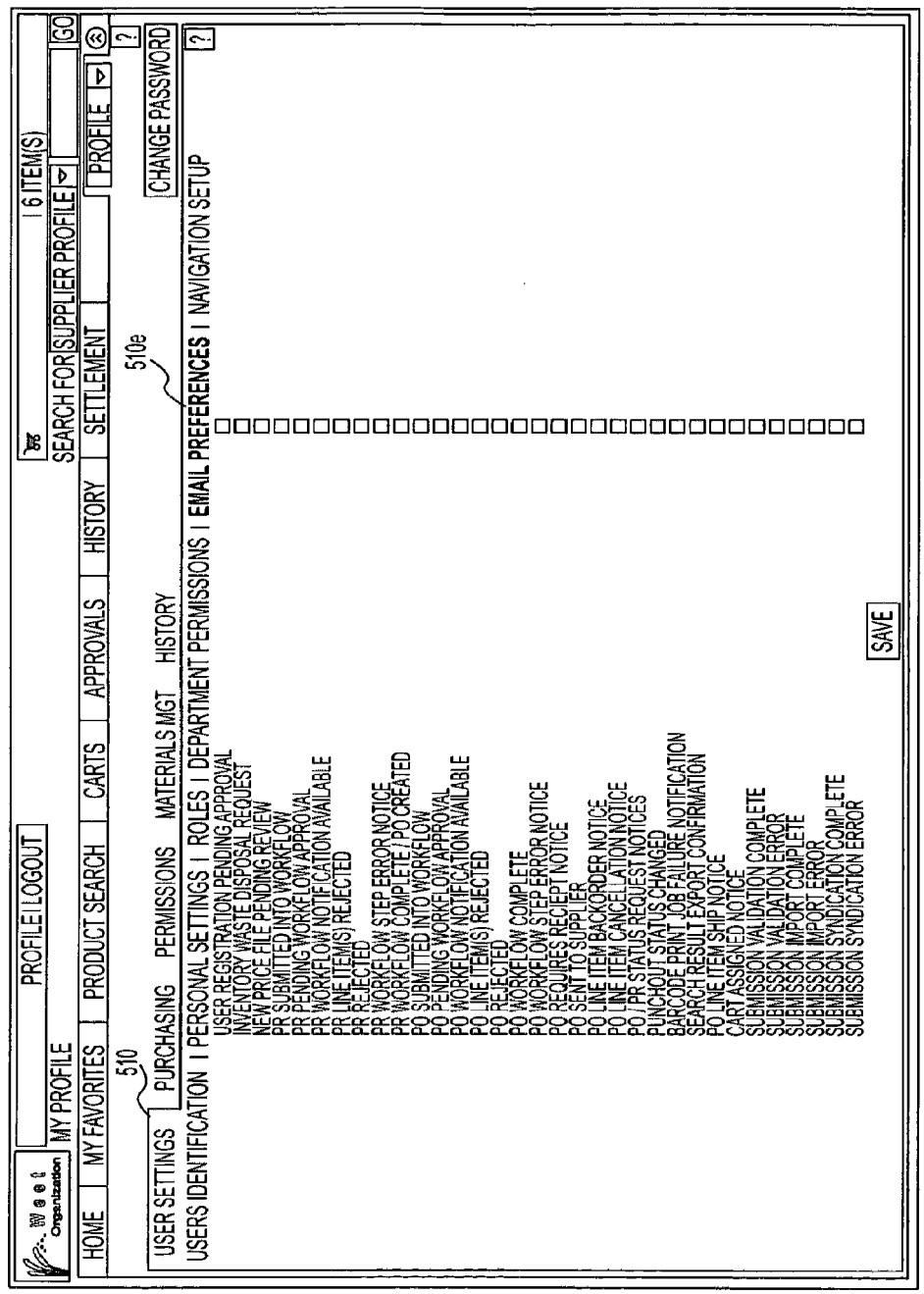
FIG. 5C illustrates an exemplary email preference tool in accordance with the present invention.
Figure 5D:
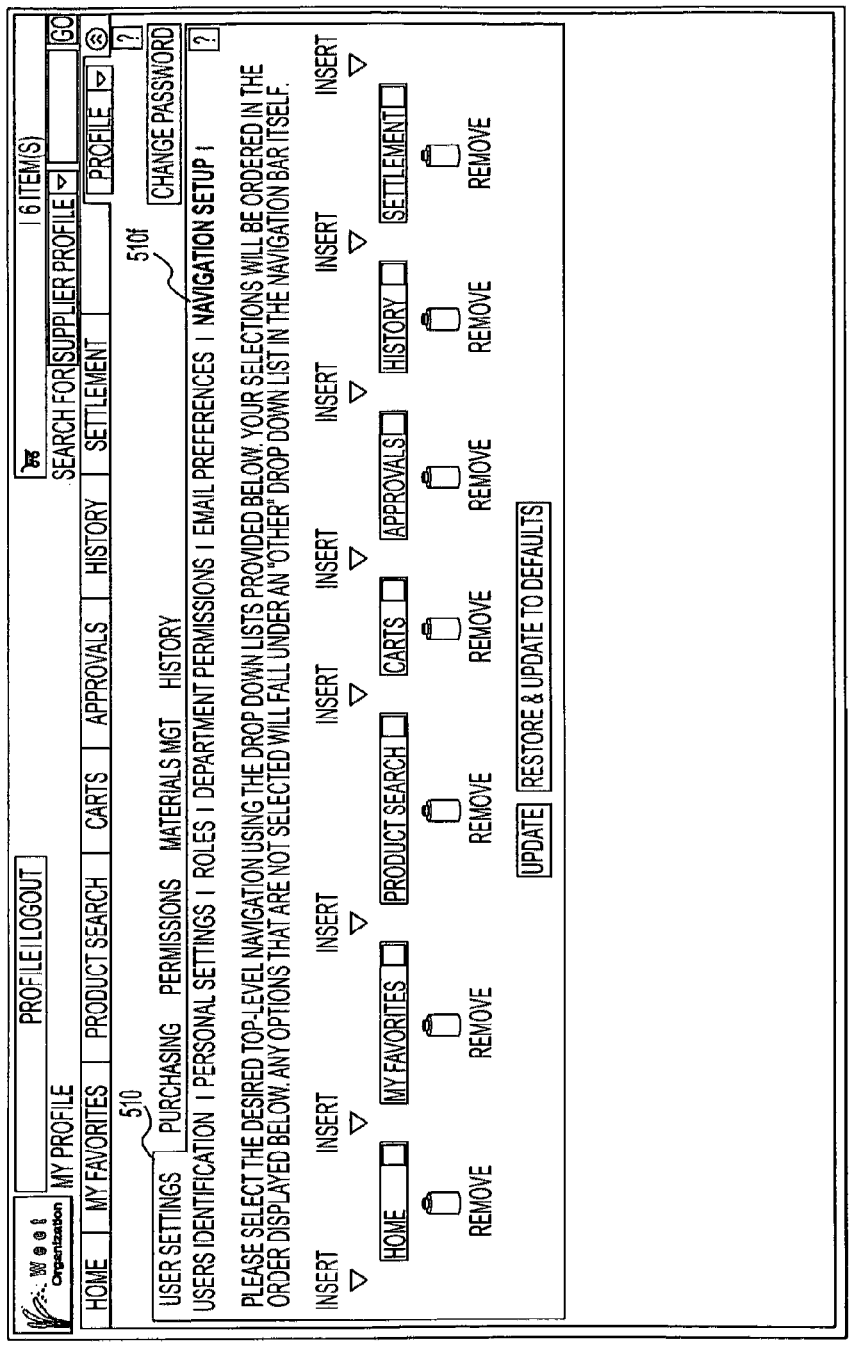
FIG. 5D illustrates an exemplary navigation setup tool in accordance with the present invention.

For example, as shown in FIG. 5A, an exemplary user setting tool 510 of the present invention shows that the user is a "Professor" in the "Engineering" department. As discussed above, users in this department and position have default levels of access defined by a super user using the user management tool 400. However, because a user may have additional roles assigned to the user that are beyond the normal scope of the user's position, the eProcurement system of the present invention allows a super user to modify the user's level of access on an individual level. For example, FIG. 5B illustrates an exemplary roles selection tool 510c to modify the roles assigned to the selected user. Through the roles selection tool 510c, a super user may be able to specifically tailor the roles of a user down to the individual level to provide customized access to the eProcurement system of the present invention. Similarly, the user's departmental permissions may be modified using the department permissions tool 510d. Various aspects of the user's account may also be customized, such as the user's personal settings 510b, email preferences 510e, and navigation setup 510f. As with the user management tool 400 and the roles/permissions tools 510c and 510d, all customizations may be performed by simply activating/deactivating a function available on the eProcurement system of the present invention. For example, FIG. 5C illustrates an exemplary email preference tool 510e, which lists all of the action notifications that may be received via email. A user only has to activate/deactivate a preference by selecting the notifications the user wishes to receive via email. Similarly, FIG. 5D illustrates an exemplary navigation setup tool 510f. As shown, a user simply selects the navigation tools to be displayed (or removed) from the top-level navigation bar.

Figure 5F:
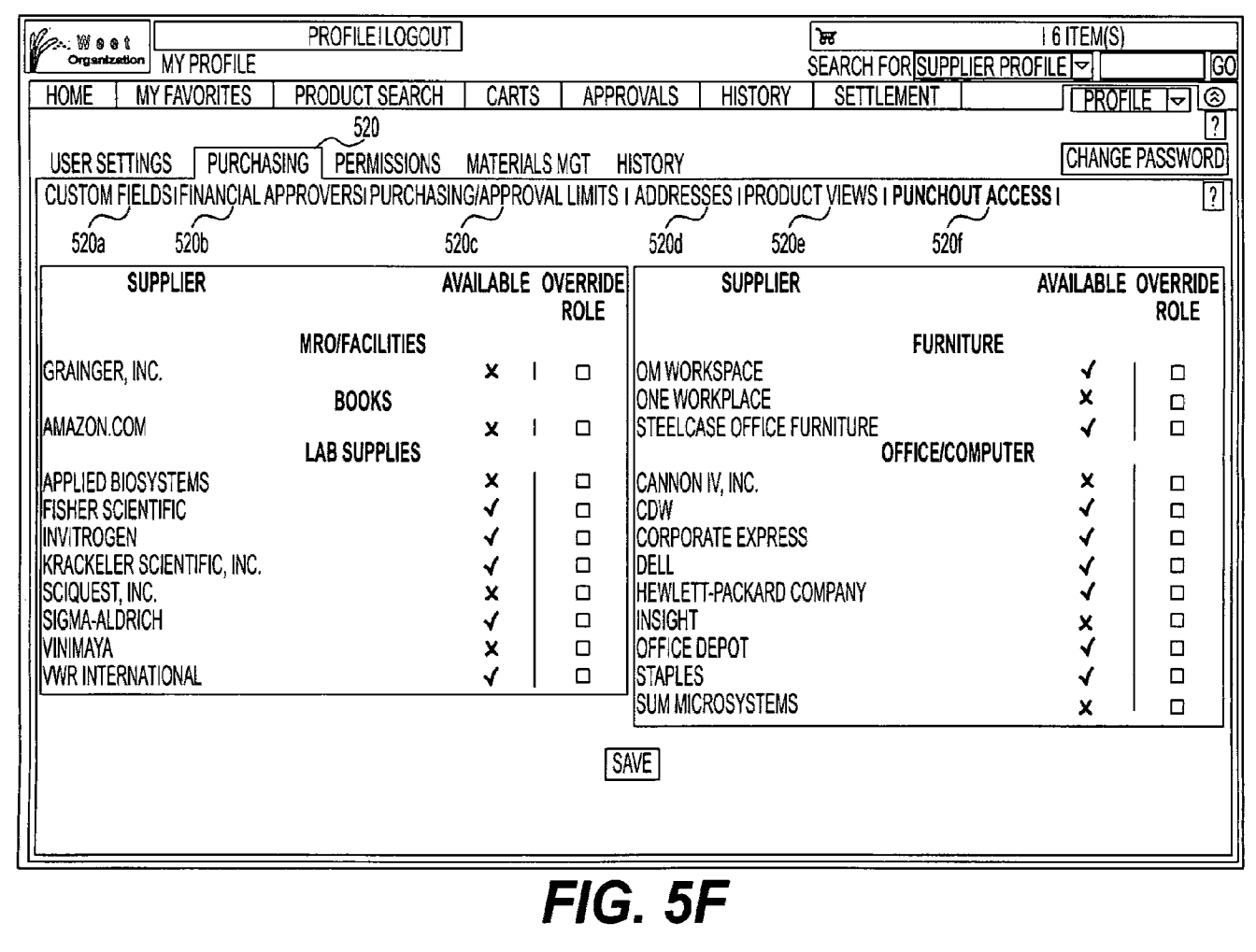

The user purchasing tool 520 shown in FIG. 5E allows a super user to define the purchasing activities of the user. For example, as shown in FIG. 5E, user purchasing tool 520 includes one or more of the custom fields tool 520a, financial approvers tool 520b, purchasing/approval limits tool 520c, shipping/billing address tool 520d, product views tool 520e, and punch-out access tool 520f. The custom fields tool 520a is similar to the purchasing properties tool 446b (FIG. 4H) to define the internal and external codes needed to make a purchase (e.g., product code). The financial approvers tool 520b designates purchase approvers for the user. Default, preferred, and additional approvers may be designated through the financial approvers tool 520*b* as well as removing approvers for the user. The purchasing/approval limits tool 520*c* designates the limits of purchases and/or approvals of purchases allowed for the user. FIG. 5E illustrates an exemplary view of the purchasing/approval limits tool 520*c*. As shown, the limit values of various activities related to purchases may be defined for the user. The shipping/billing address tool 520*d* designates the shipping/billing address associated with the user. The product views tool 520*e* designates the type of products the user is allowed to view. The punch-out access tool 520*f* designates the punch-out catalogs that are allowed to be accessed by the user. For example, FIG. 5F illustrates an exemplary punch-out access tool 520*f*. As discussed above, these settings may be designated as a default based on the department/position/role assigned to the user. However, these tools may be used to customize the default settings for the specific individual user in accordance with the present invention.

Figure 5G:
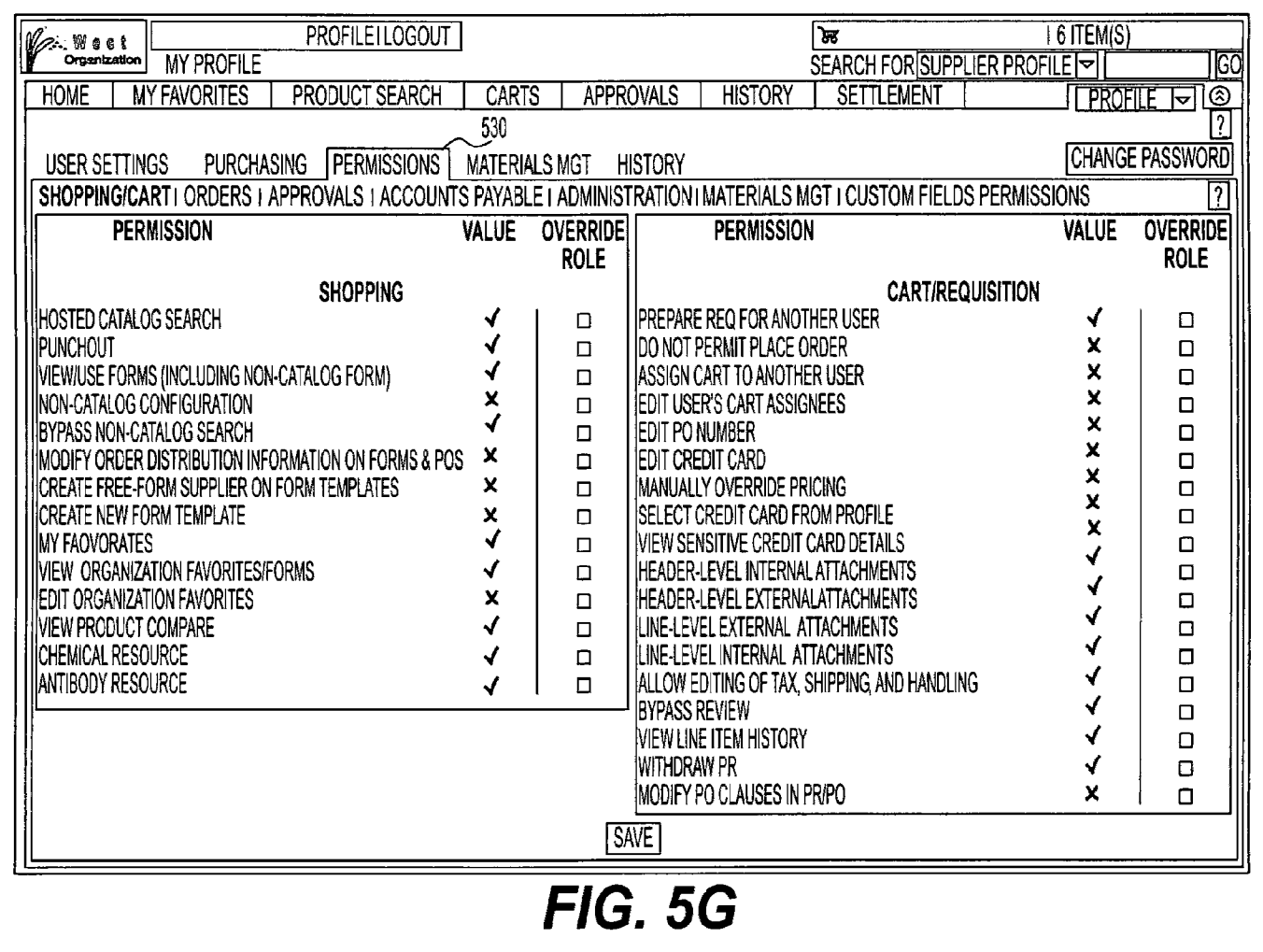
Figure 5H:
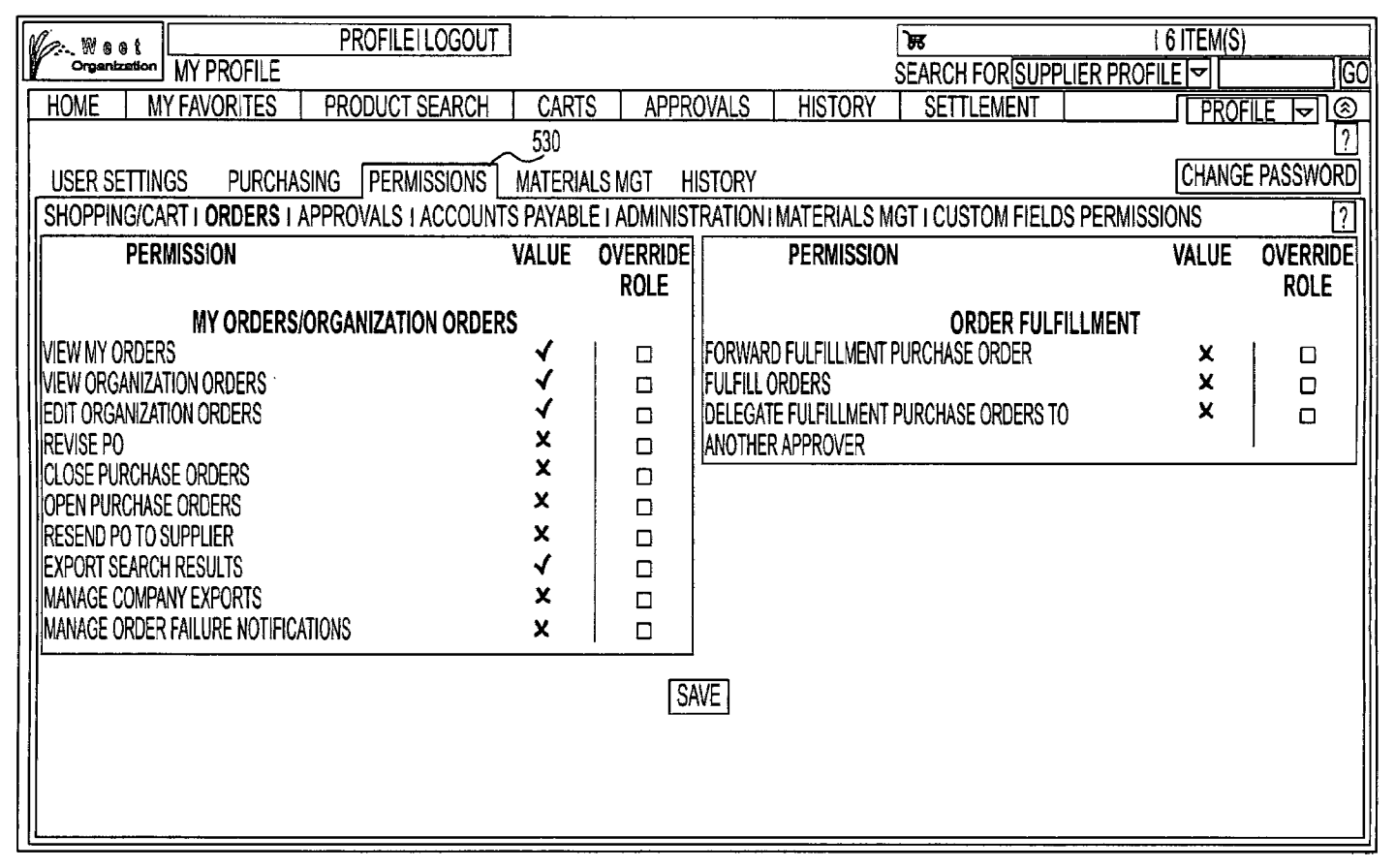
Figure 5I:
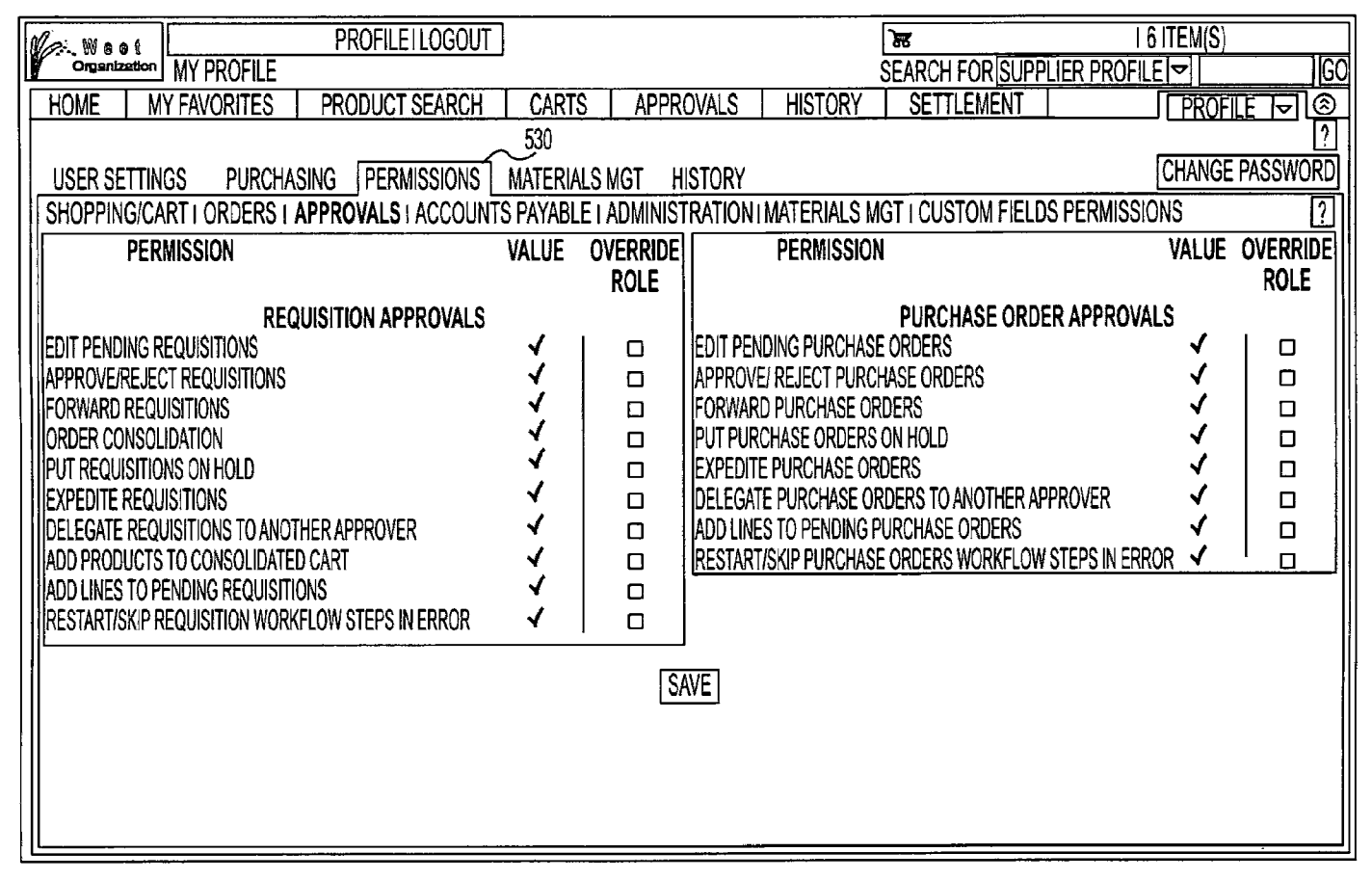
Figure 5K:
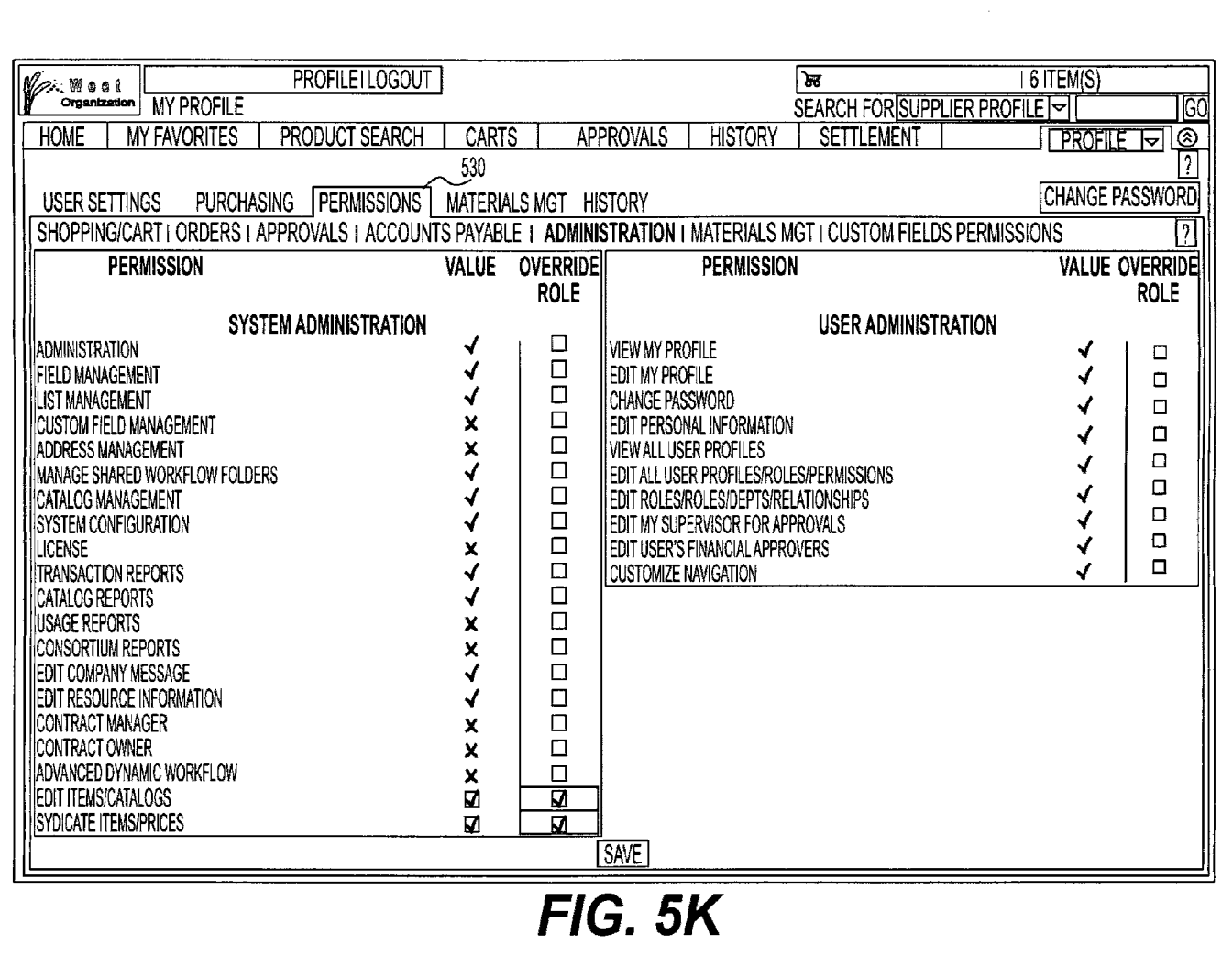
Figure 5L:
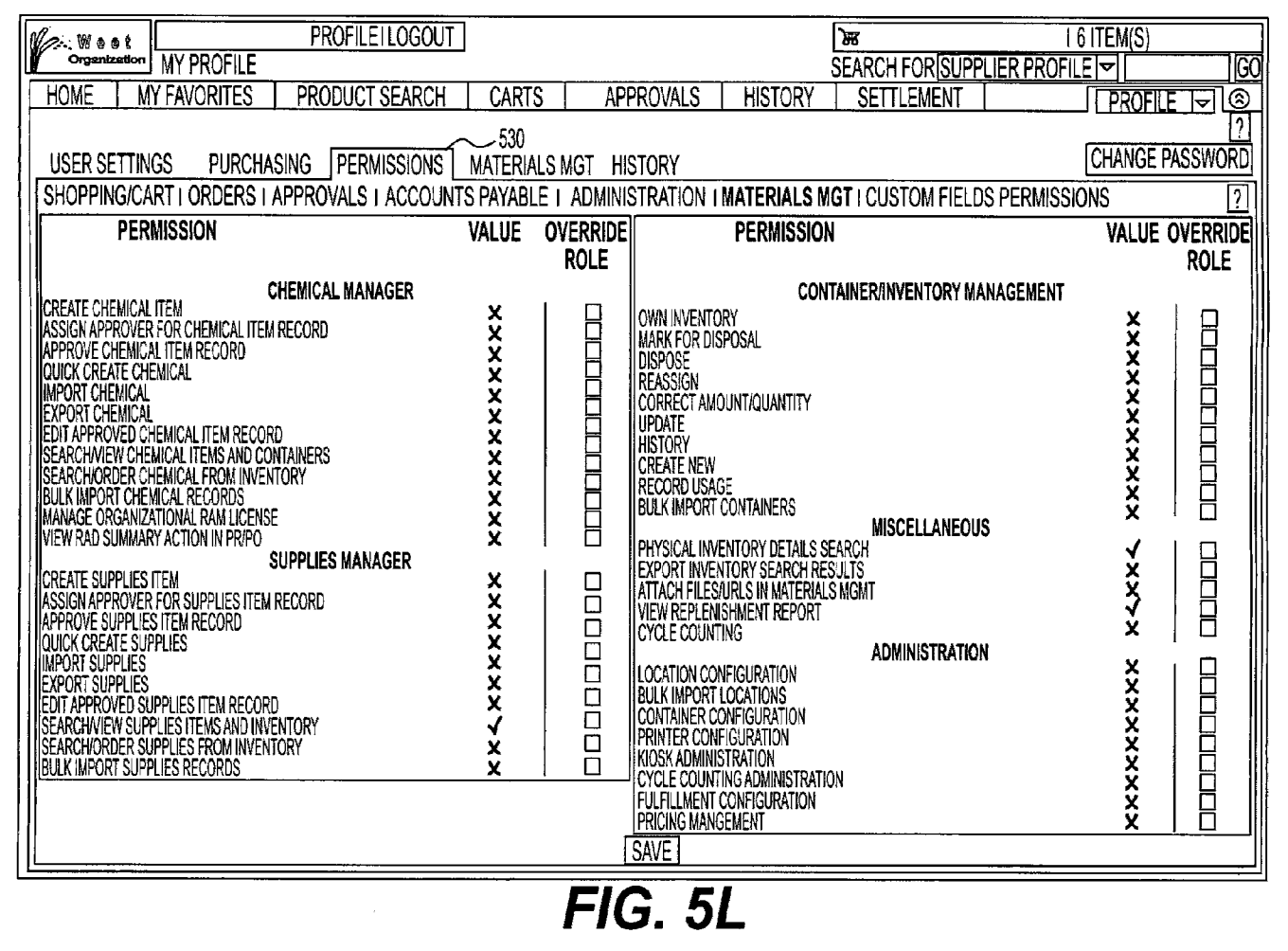
Figure 5M:
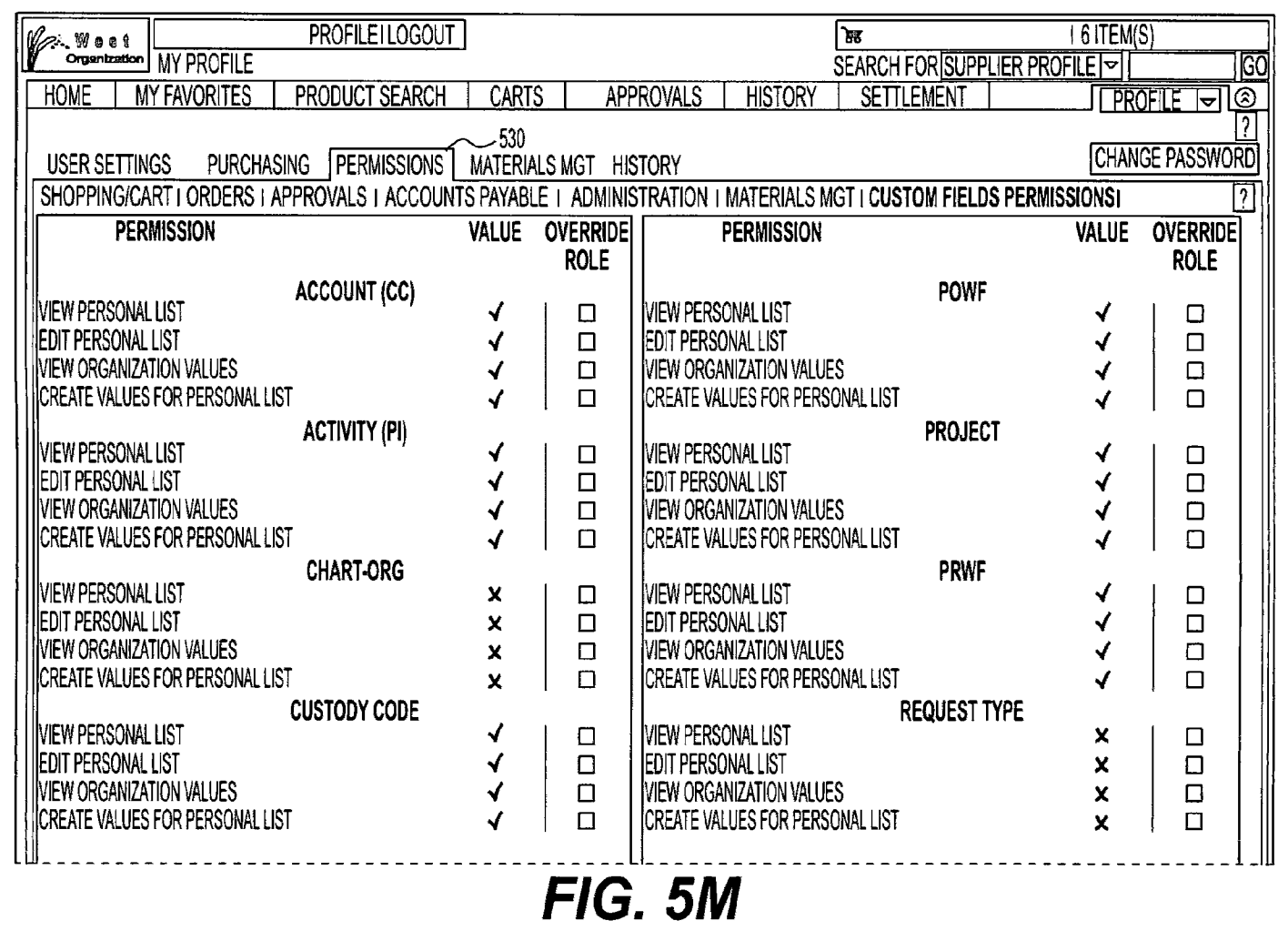
Figure 5N:
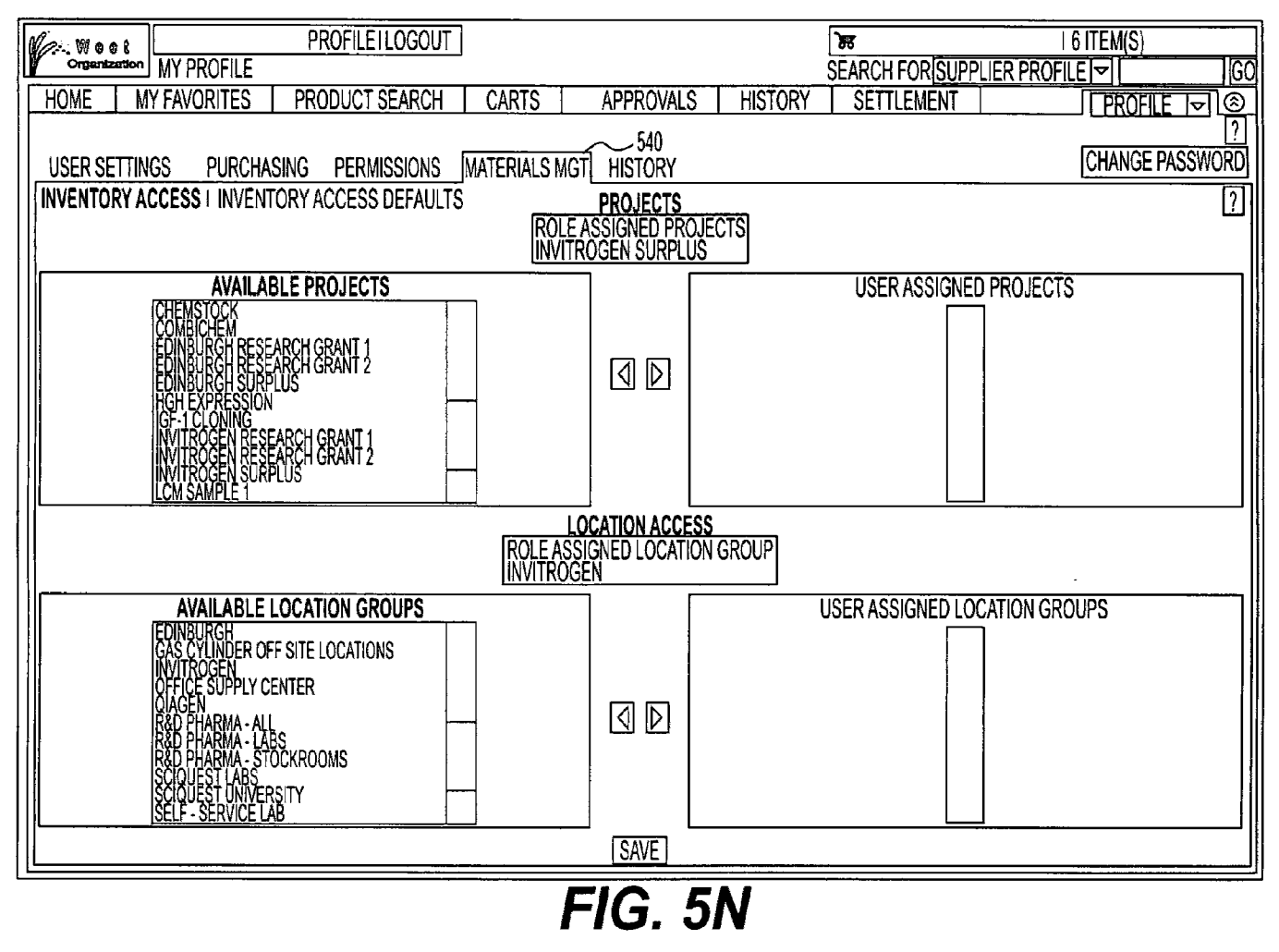

In a similar fashion, the user permissions tool 530 includes one or more of tools to customize the user's access to the shopping cart (FIG. 5G), order processing (FIG. 5H), approval processing (FIG. 5I), accounts payable processing (FIG. 5J), administration permissions (FIG. 5K), materials management (FIG. 5L), and custom fields permissions (FIG. 5M). The materials management tool 540 designates inventory locations based on projects and groups (FIG. 5N) as well as default/preferred access locations (FIG. 5O). As discussed above, the history tool 550 keeps track of all actions/changes made to the various parameters.

Figure 6A:
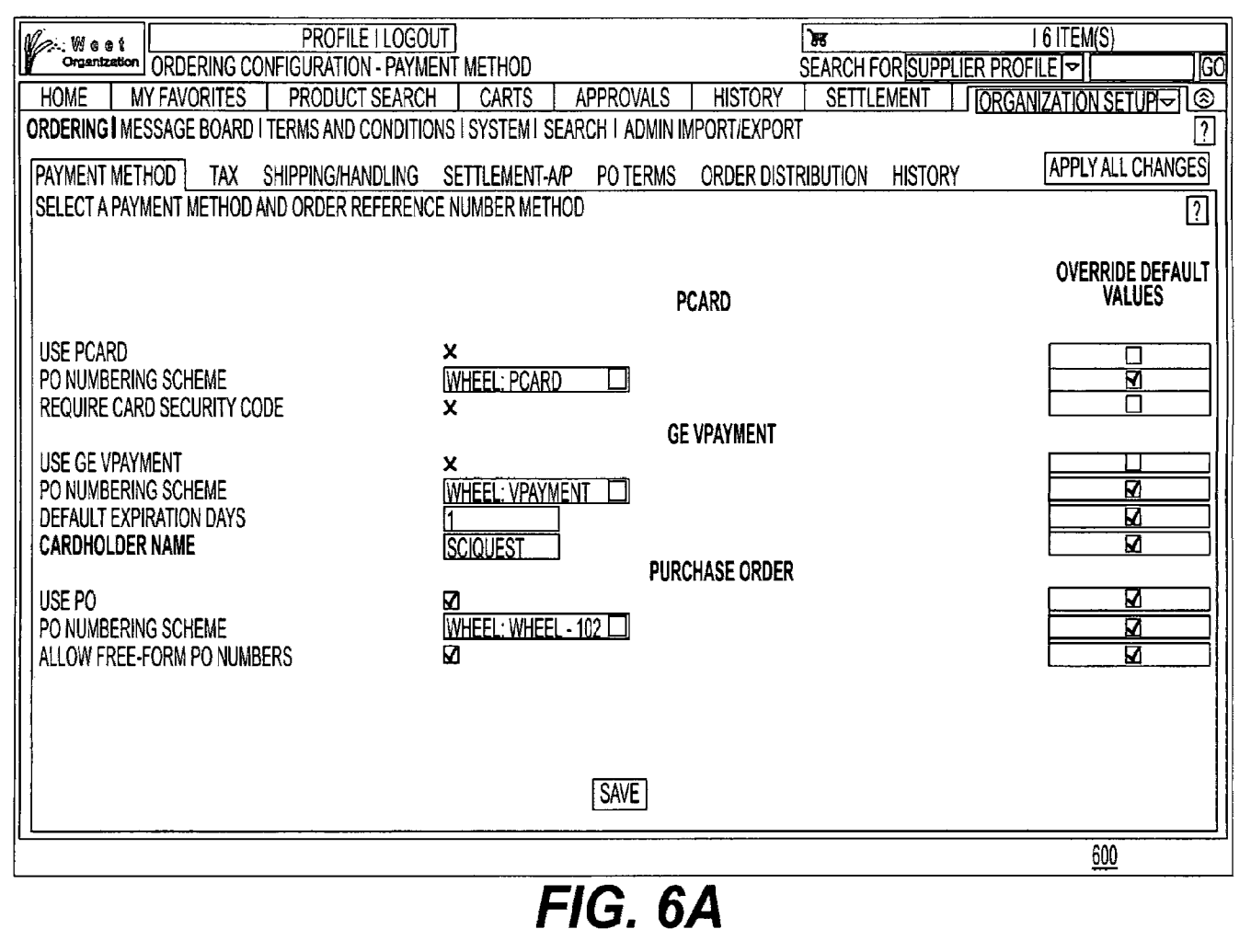
Figure 6B:
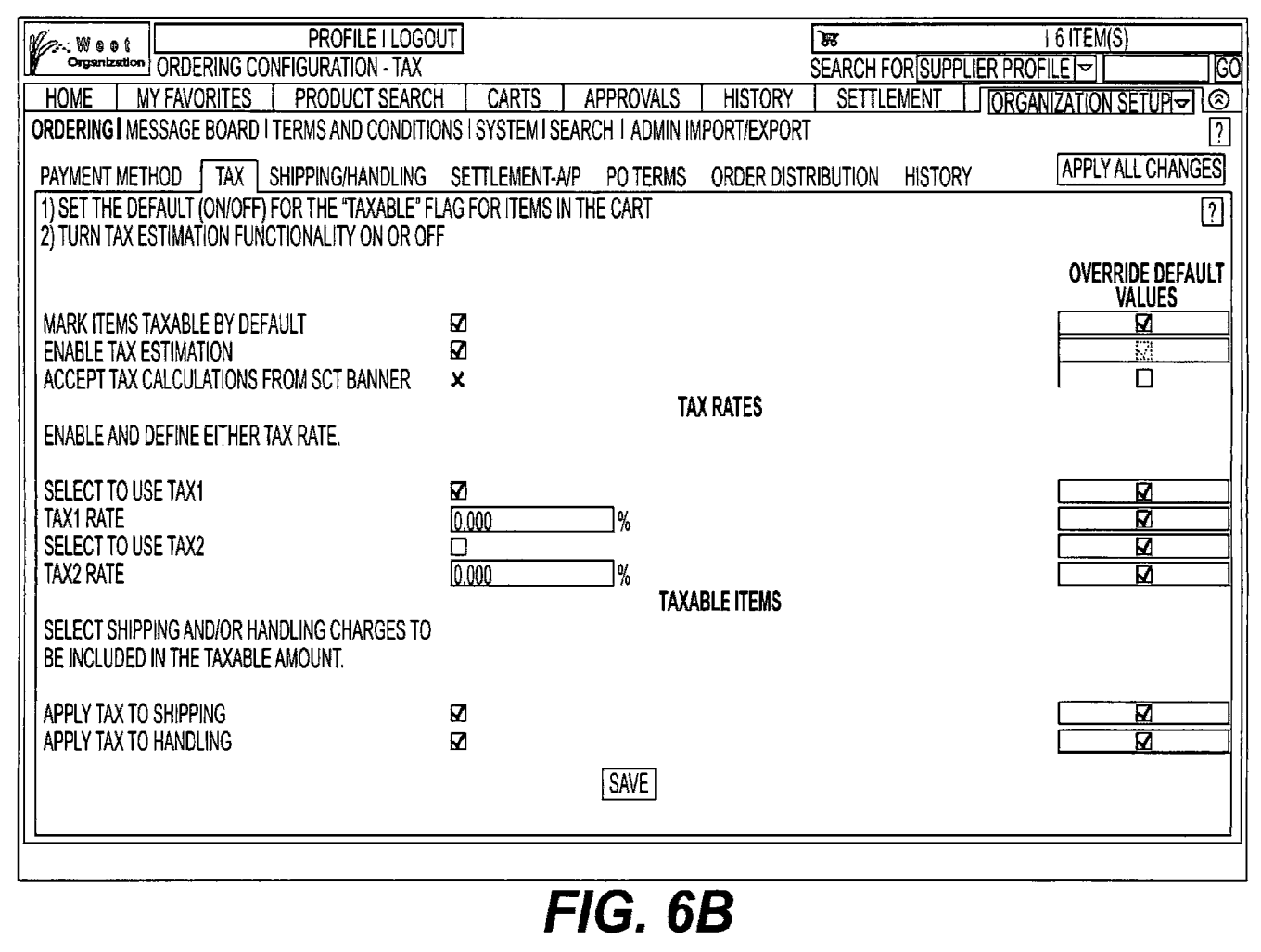
Figure 6C:
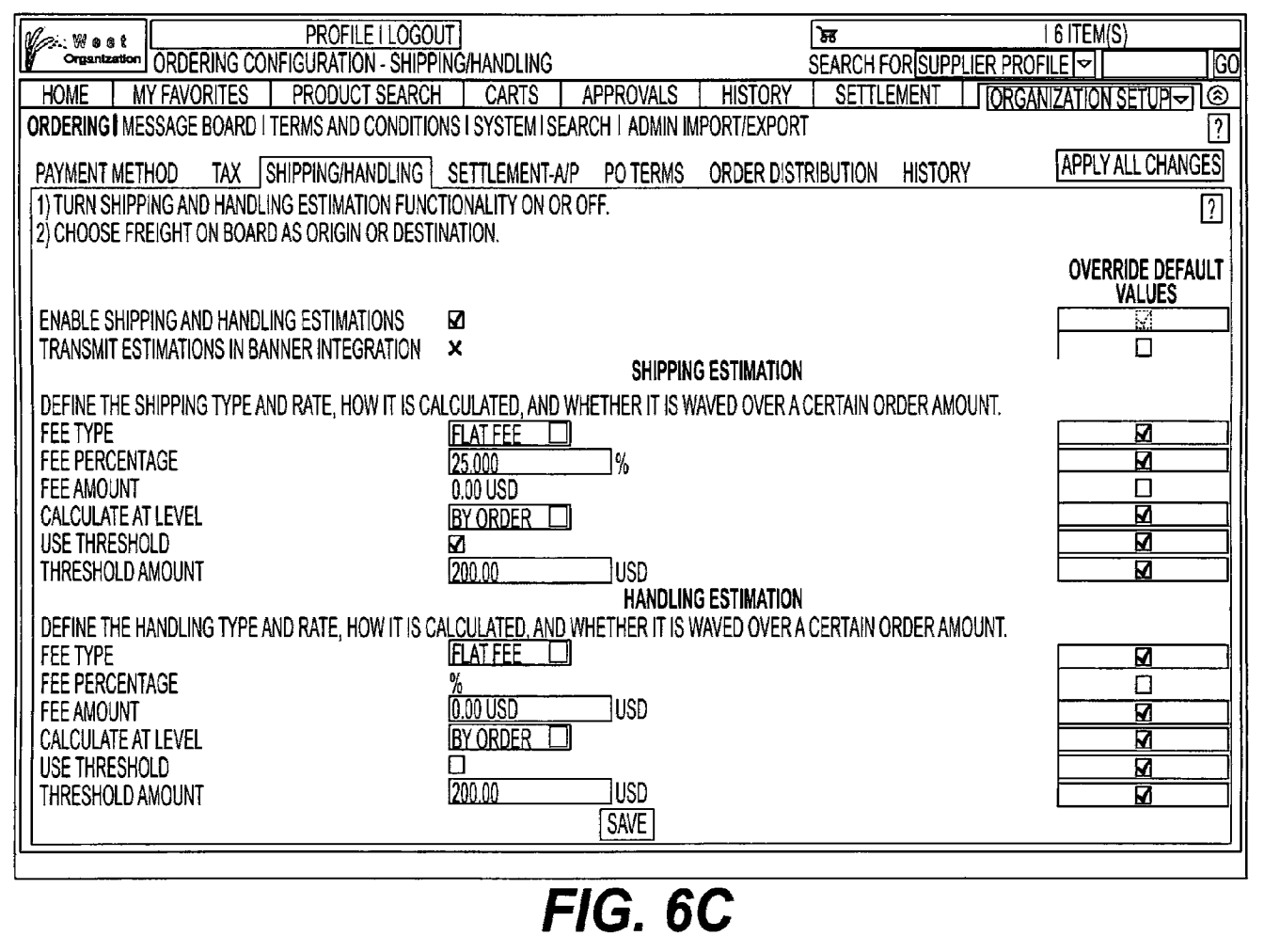
Figure 6D:
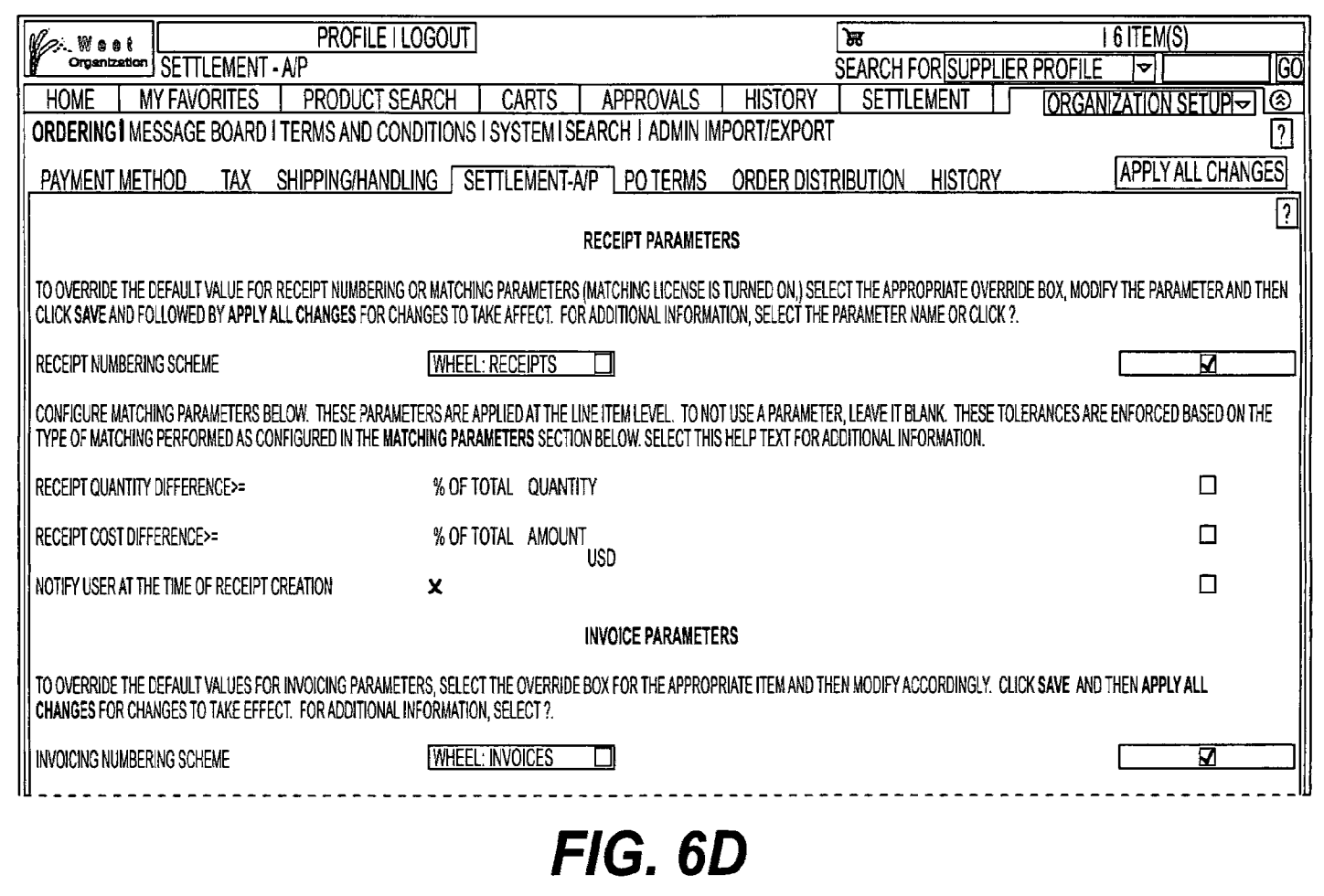
Figure 6D:
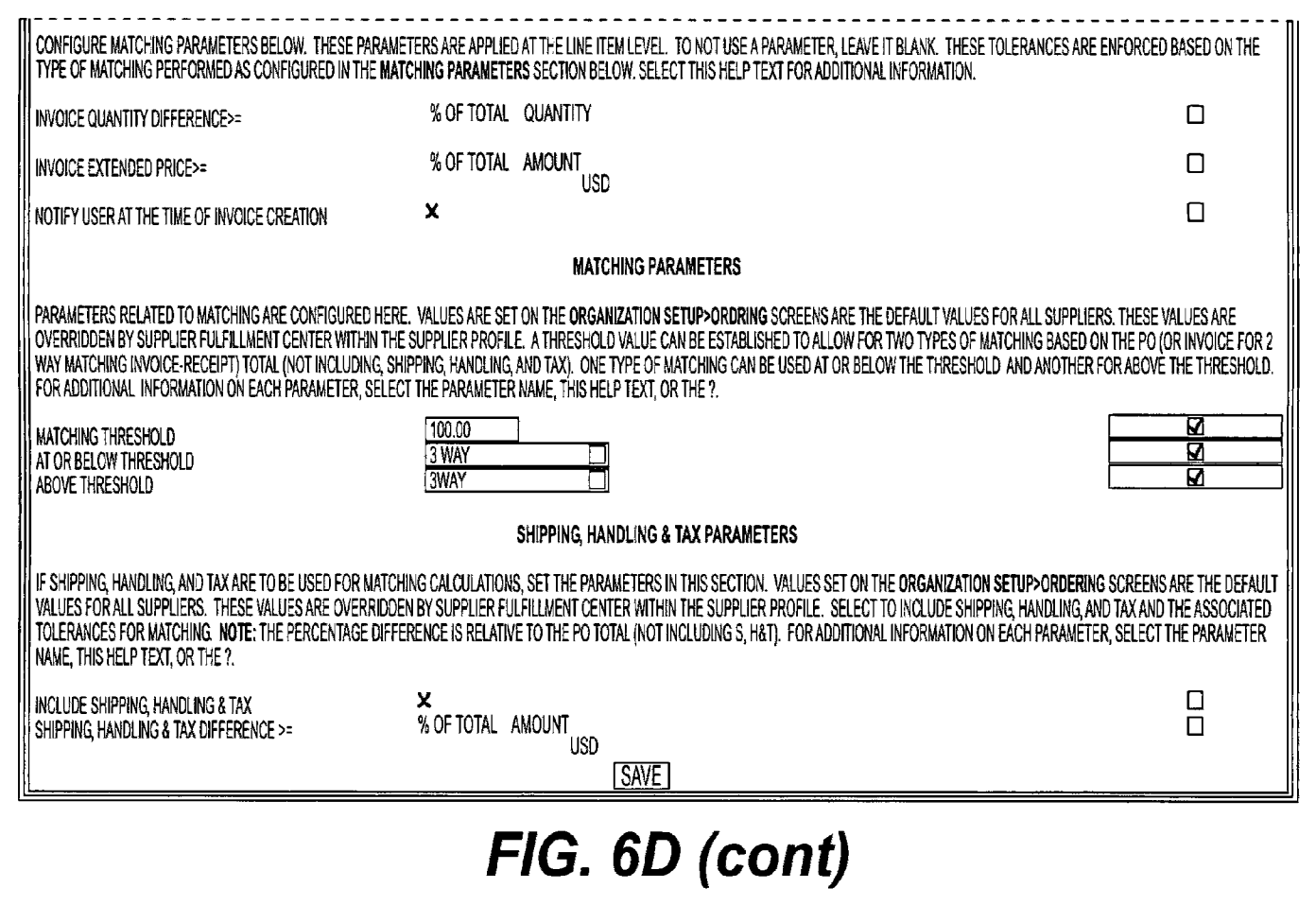
Figure 6E:
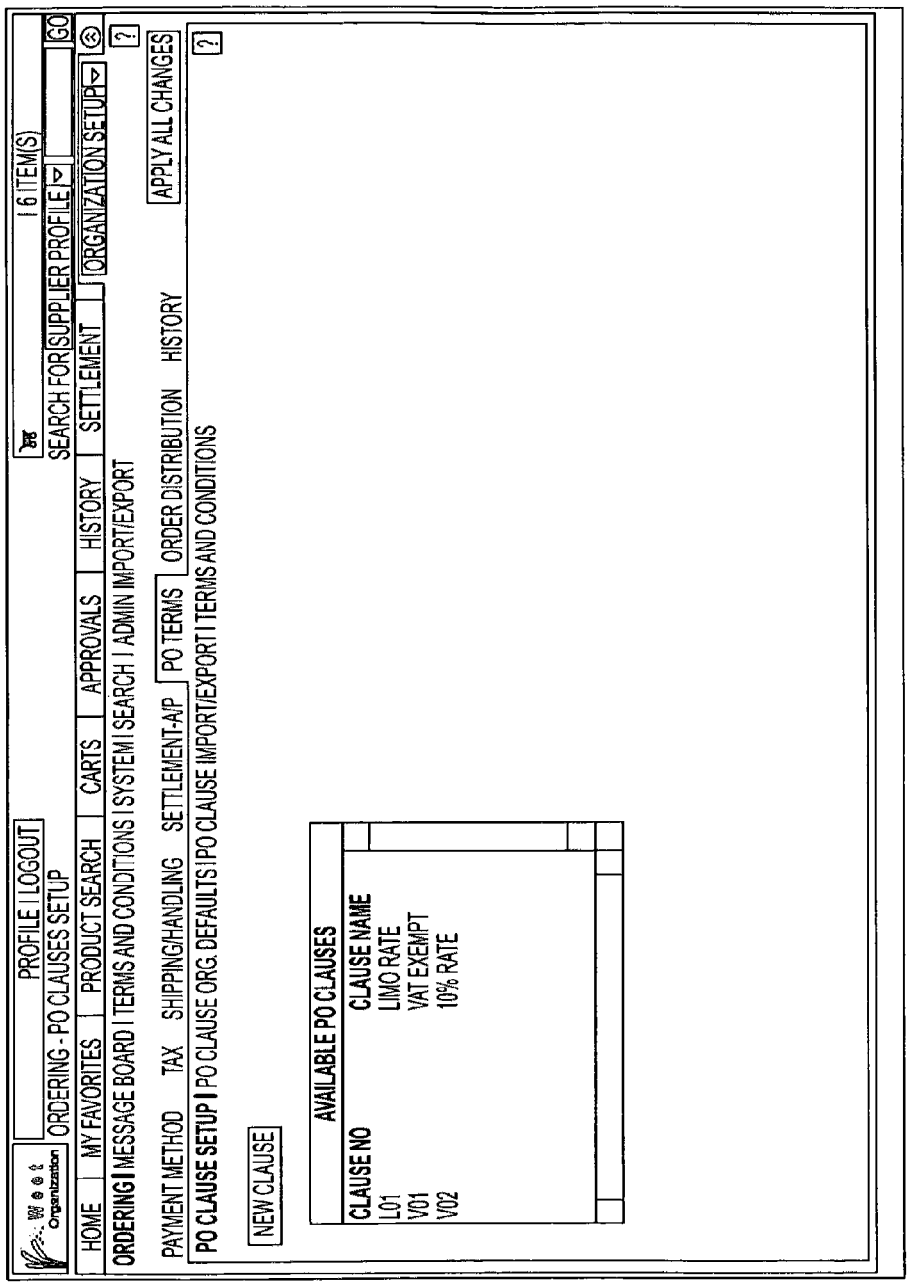
Figure 6F:
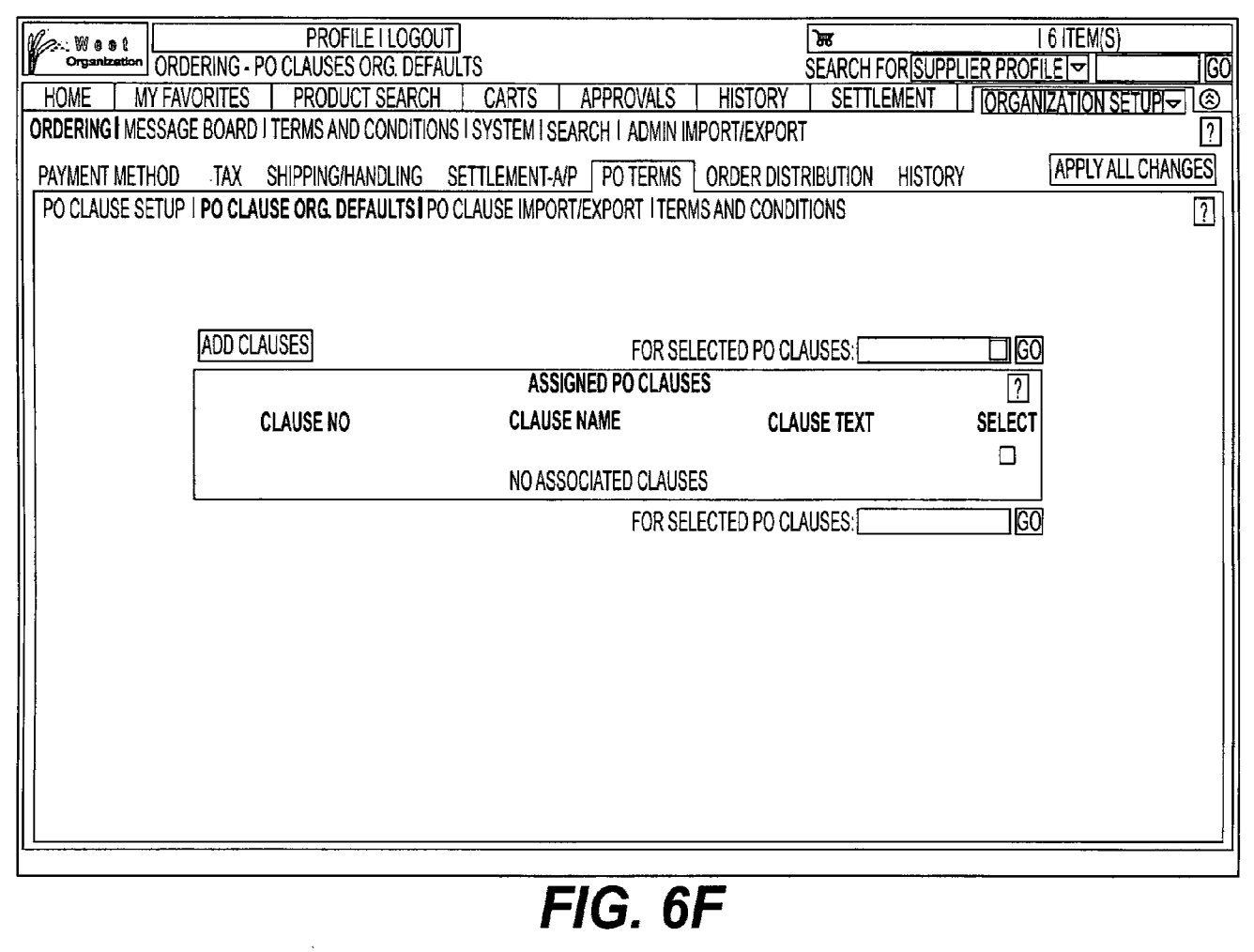
Figure 6G:
Figure 6H:
Figure 6J:
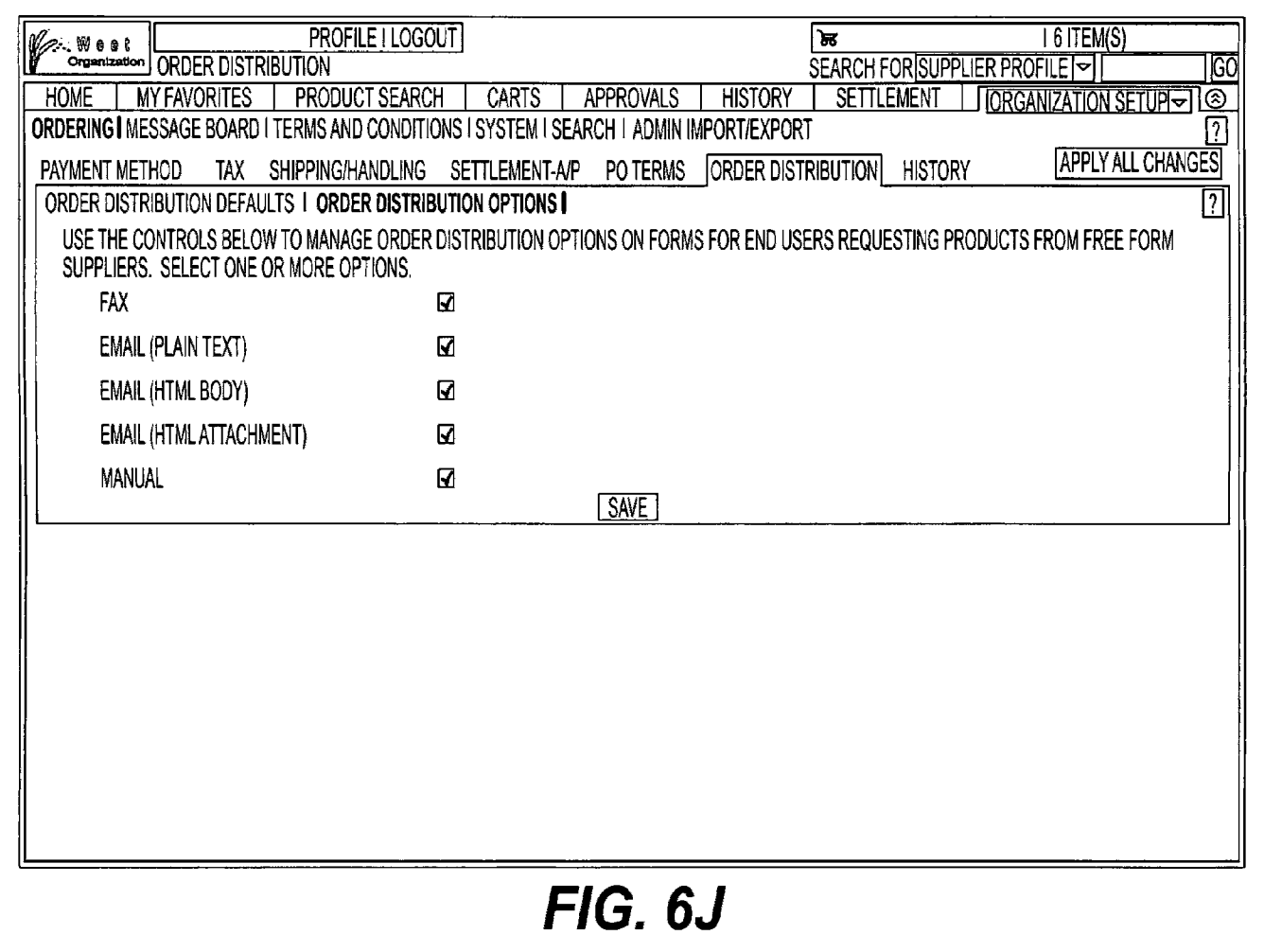

FIG. 6A illustrates an exemplary organization setup tool 600 for designating business rules such as method of payment (FIG. 6A), tax (FIG. 6B), shipping/handling (FIG. 6C), settlement (FIG. 6D), purchase order terms (FIGS. 6E-G), order distribution process (FIGS. 6I-J), and history of all actions effectuated through the organization setup tool. By organizing all of the terms and conditions of an order for each organization in a single instance, multi-tenant architecture, each requisition effectuated on the eProcurement system of the present invention is processed efficiently.

Figure 7:
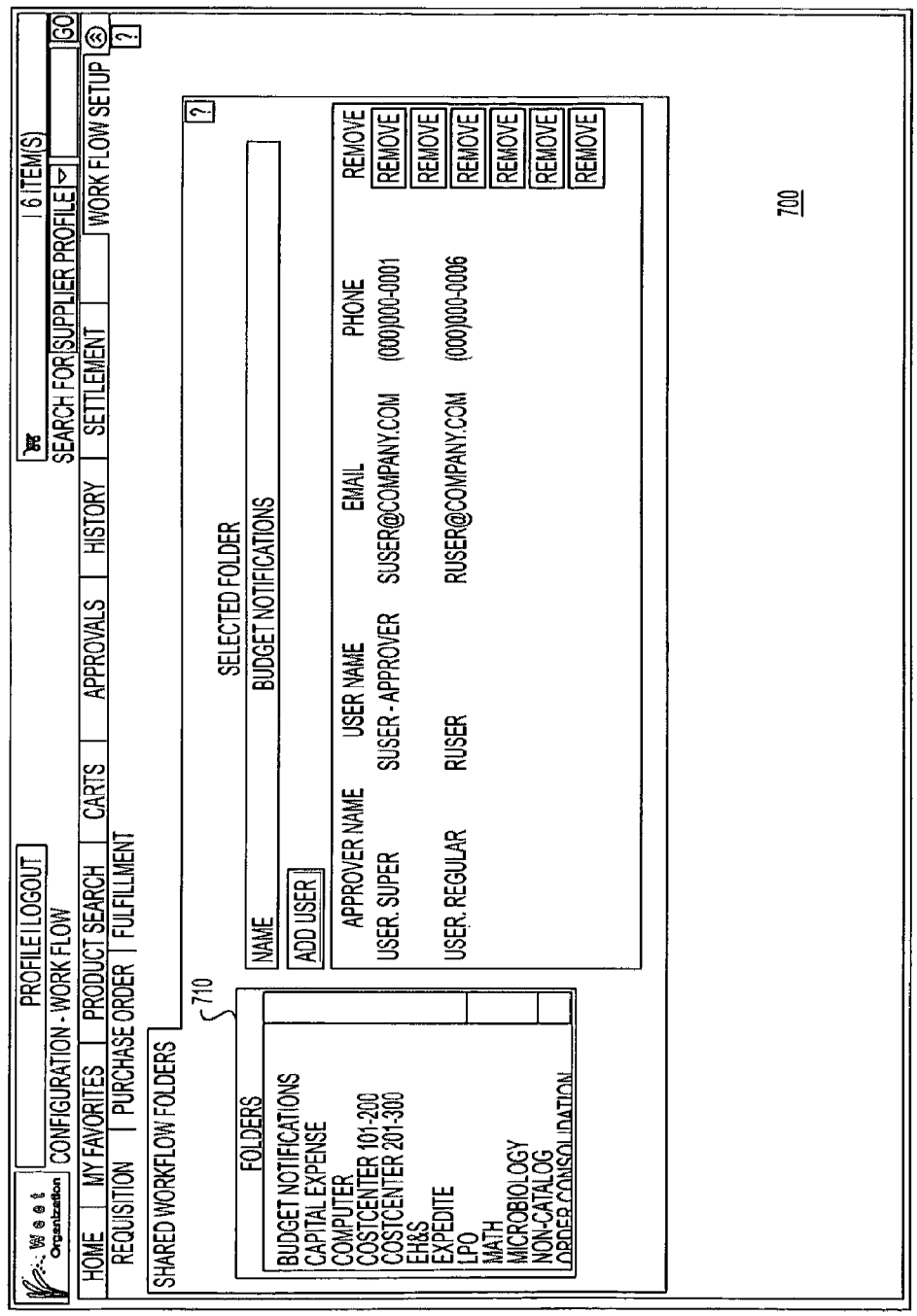
FIG. 7 illustrates an exemplary workflow setup tool in accordance with the present invention.

FIG. 7 illustrates an exemplary workflow setup tool 700 to define the workflow process of a requisition, purchase order, and fulfillment. As shown in FIG. 7, the workflow setup tool 700 in accordance with the present invention creates a shared workflow space 710 and allows for the assignment of users (e.g., individual users, or users of various user roles) to be included in the workflow process.

Other configuration tools include document setup tool (FIG. 54, document setup interface) to organize documents related to requisitions, purchase orders, and sales orders for access by the user. The document setup tool keeps track of the name of the document creator, version number, and any deployment dates, as well as other data related to the document. Moreover, the eProcurement system in accordance with the present invention includes a field management tool (FIG. 52, exemplary field management interface) that allows super users to create, modify, and manage every field/parameter related to the procurement process used on the system. Accordingly, the eProcurement system of the present invention may be custom tailored for each organization/user role/user while maintaining its single instance, multi-tenant environment.

As shown in FIG. 2, end user interfaces 212 and supplier user interfaces 214 according to the present invention provide access to the plurality of modules of the eProcurement system 10 (FIG. 1). As described above, the end user interface 212 is configurable by both end user and super users. Moreover, the end user interface 212 includes one or more features, for example, such as searching and viewing a hosted supplier products catalog, invoking purchase/requisition orders, consummating sales transactions, invoking status queries and viewing the response, and setting end user configuration preferences as described further below. For example, the search and view feature allows for searching via product description, supplier name, manufacturer name, catalog no. (SKU), a filtering capability, and by browsing: catalog/non-catalog items, suppliers, or contracts. A user may invoke any of these search inputs alone or in combination with others. Also, Boolean and fuzzy logic functionality is available for searching and allows a user to devise targeted search strategies that may return more accurate search results. Once a user has invoked a search using any of the inputs described, the user may then view the returned results. The returned results can be filtered by a user based on category or supplier. Also, a user may choose to organize the returned results such that similar results are listed in proximity of one another. For example, a user may organize returned results by weight, supplier, category, catalog number, product description, UOM, product size, price, quantity, and/or currency.

The catalog may be implemented as single instance but multi-tenant (or, as multiple instance, single-tenant), and may further include custom views of items as set by each internal end user and/or organization. An end user may specify favorites within the catalog. Such favorites are available for later viewing or purchasing by the end user. Any updates made to an end user favorite within the catalog will be automatically propagated to the end user's favorite(s) view as well (FIG. 53, an exemplary update favorite(s) process flow). The catalog may allow for supplier classifications and multiple products may be linked to a single supplier. Also, the catalog can be activated or deactivated through a simple click on the end user interface, and specific product categories can be globally manipulated and applied to affect all end users. Each catalog may contain information regarding one or more suppliers, and a master product database is primarily tasked with populating each hosted supplier products catalog. This master product database is a relatively large database with a plurality of attributes related to one or more specific products.

In addition to the hosted supplier products catalog, punch-out catalogs may also be implemented as an alternative and supplement to the hosted supplier products catalog, and are made available, for example, when the hosted supplier products catalog does not yield sufficient or satisfactory results. The punch-out catalogs link to outside/third-party catalogs, are not hosted, and may also contain end user organization-specific prices. Processing modules executed on the custom database servers invoke each punch-out instance. Multiple punch-out catalogs may be accessible by a single end user. An end user can return from a punch-out catalog to the hosted supplier products catalog, and the remainder of the features of the eProcurement architecture, via a submit feature, which will then return to the processing module that initially invoked the punch-out instance. Punch-out catalogs may be configured to display relevant catalogs to an end user, based on the end user organization. An end user can browse punch-out catalogs to search for more accurate results and may, subsequently, invoke a requisition order via the third-party web site and order processing methods. Also, one or more purchase orders can be sent from one or more punch-out catalogs, but each punch-out order session may generate a single purchase order that may ultimately include orders from non-punch-out or hosted catalogs.

Further, with respect to the hosted supplier products catalog, there may be a feature implemented to allow both its searching and viewing. The search/view catalog feature is invoked via a processing module that executes on the custom database servers. Upon the execution of such a search by an end user, search results can be displayed via the end user interface. The catalog search results can be displayed, for example, using a static or dynamic interactive list or table, attachment, graphic, or link. An end user may also have the option of choosing the appropriate supplier(s) from which to place an order. Upon an end user's selection of a particular supplier, the relevant supplier data is then forwarded to the transaction processing feature. The end user may later invoke a status query, via a processing module executed on the custom database servers, on a preexisting order and, subsequently, receive status notifications regarding the order.

The search feature may be implemented using several sub-features such as, for example, customized annotations (with icons) of preferred/contract suppliers, a product/supplier filter, and a product size filter. The search feature is invoked by a processing module that is executed on the custom database servers. The customized annotations (with icons) of preferred/contract suppliers allows certain products to be highlighted within search results. Furthermore, the product/supplier filter of the search feature allows certain products to be displayed, while others are hidden, depending on specific filter criteria chosen by the end user/organization. Such criteria may include, for example, price thresholds, hazard level, approximate delivery date, product size, supplier, and/or currency.

The search architecture is based upon an indexed, tokenized-type implementation. This search architecture may include a search engine and a tokenization feature, both of which are invoked via processing modules executed on the custom database servers. Product elements such as the product name, industry, price, currency, and availability, among others, are primarily used to generate a product search index (e.g., a token). The process of generating a product search index/token is called "tokenization" and may be executed by a tokenization feature invoked via a processing module. The indices/tokens generated as a result of the tokenization feature, which relate to various products of a multitude of suppliers, may be stored within and executed on the hosted supplier products catalog. Searching is executed against "verticals." A vertical is designed similar to a drill-down menu architecture that consists of root nodes and leaf nodes, which are children of their respective roots. Through the use of tokenization and verticals, a layer of abstraction is added that is unique in comparison to typical text-based searching of a large database, like the master product database. This added layer of abstraction allows for better organization of the underlying data. As a consequence, the use of tokens to search verticals, which organize supplier product data and search the hosted supplier products catalog, enables an efficient and methodical search strategy to be executed. Search results returned from searching the hosted supplier products catalog are forwarded back to the search engine and may appear via the end user or supplier user interfaces. For an end user, designated preferred suppliers usually appear first in the search results.

Further contained within the search architecture, a feature to allow the invocation of status queries and viewing of the response may be implemented. This feature allows a plurality of end users to send queries/requests via middleware/web methods, or direct Internet posting techniques, to the product catalog. The feature is itself invoked by a processing module that executes on the custom database servers. Such queries/requests may be intended for finding, buying, or managing products. Such products may be those of preferred contractors that are matched to the end user based on a plurality of criteria like permission, product type, industry, price, quality control metrics, delivery date, warranty types, currency, and/or locale. Each product catalog may contain information regarding one or more specific products. A master product database populates the hosted supplier products catalog with various types of information relating to one or more specific products. The various types of information may include a "stock keeping unit" (SKU) identifier, supplier information, and product category/description/attribute information.

Further also to the search architecture, an in-stock query feature may be implemented to allow an end user, through the middleware/web methods, or direct Internet posting techniques, to determine whether any supplier might have a particular product in-stock, and/or the warehouse/location where that stock is maintained. The feature is itself invoked by a processing module that executes on the custom database servers. Once the in-stock query feature is invoked, relevant suppliers are sent individual queries. Subsequently, each supplier response to an in-stock query is processed and the appropriate end user is notified after the in-stock query receives the supplier response(s), but before returning to the processing module.

Moreover, a quick order feature may also be implemented to enable several other sub-features such as, for example, searching by product category, SKU identifier, currency, or host product category number/supplier part number. The feature is itself invoked by a processing module that executes on the custom database servers. Subsequently, the order feature is initially invoked by an end user that has completed a quick order search. Thus, the quick order feature enables an end user that may have knowledge of specific product attributes to perform an expedited search, retrieve search results, and proceed to ordering.

The search results of a product search exhibit other features of the invention such as those related to the presentation of results. For example, suppliers and categories contained within search results can be displayed using different customizable icons, which may be used to highlight specific suppliers and product categories. Such results can also be ranked according to priority based on whether they are supplied from preferred or contracted suppliers, a preferred category of products from suppliers, or a preferred currency. Non-preferred or non-contracted supplier or currency results may also presented to end users. Moreover, a product comparison chart can be invoked to highlight the differences and similarities among two or more products. The chart can contain static or dynamic presentation attributes based in part on supplier-provided data. For example, the in-stock attribute, a dynamic presentation attribute, can be used to identify whether specific products are actually available in a supplier's inventory, and their corresponding prices and/or currencies. A search result list can be organized by category and/or vendor based on end user preferences. Also, icons can be used to further display and highlight relevant information regarding products such as, for example, whether products are hazardous, toxic, poisonous, or are considered to be controlled substances. A proprietary taxonomy can also be implemented against modeling product categories to enable more efficient searching and, ultimately, user-friendly, organized search results.

Figure 8A:
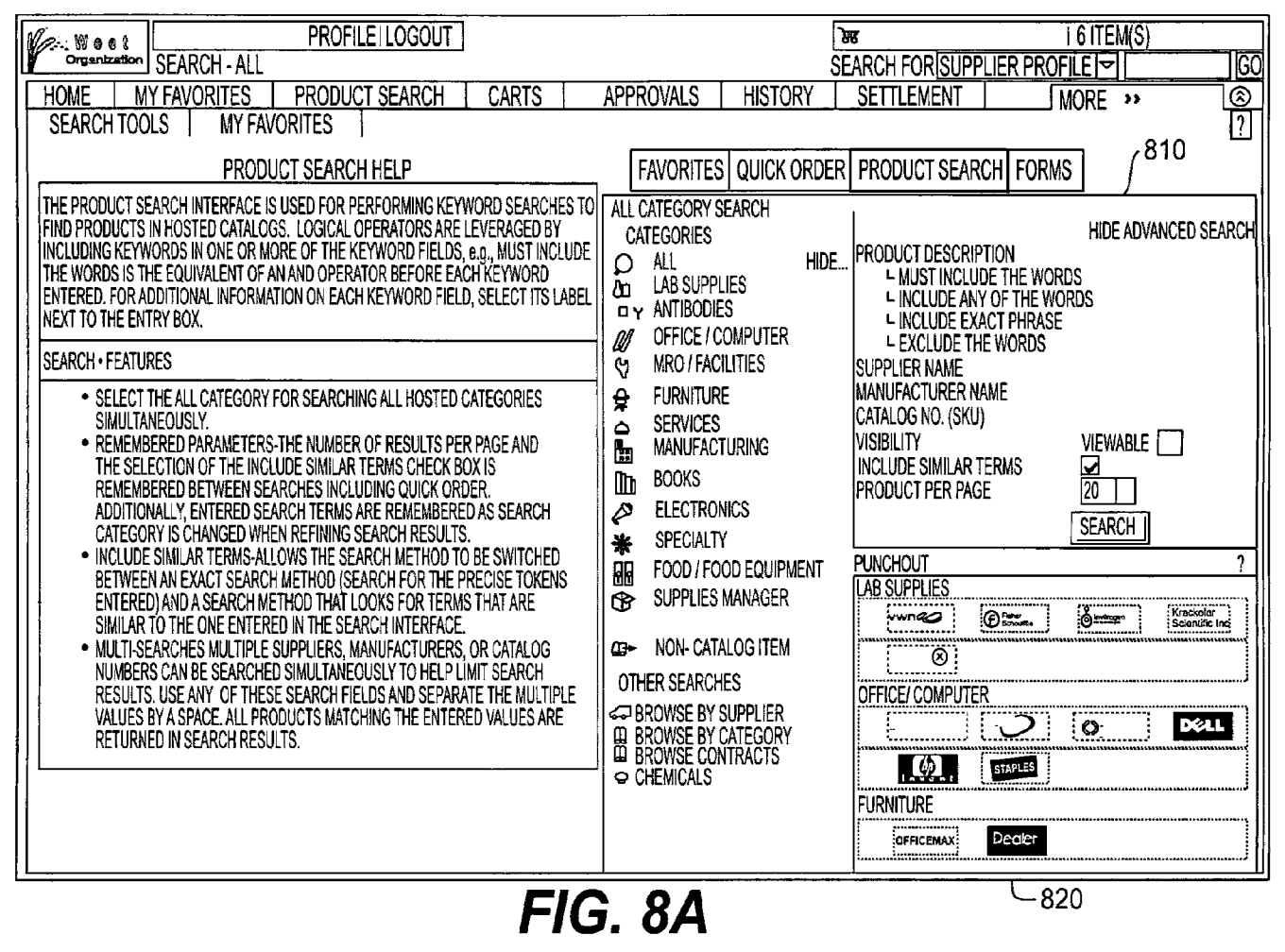
Figure 8B:
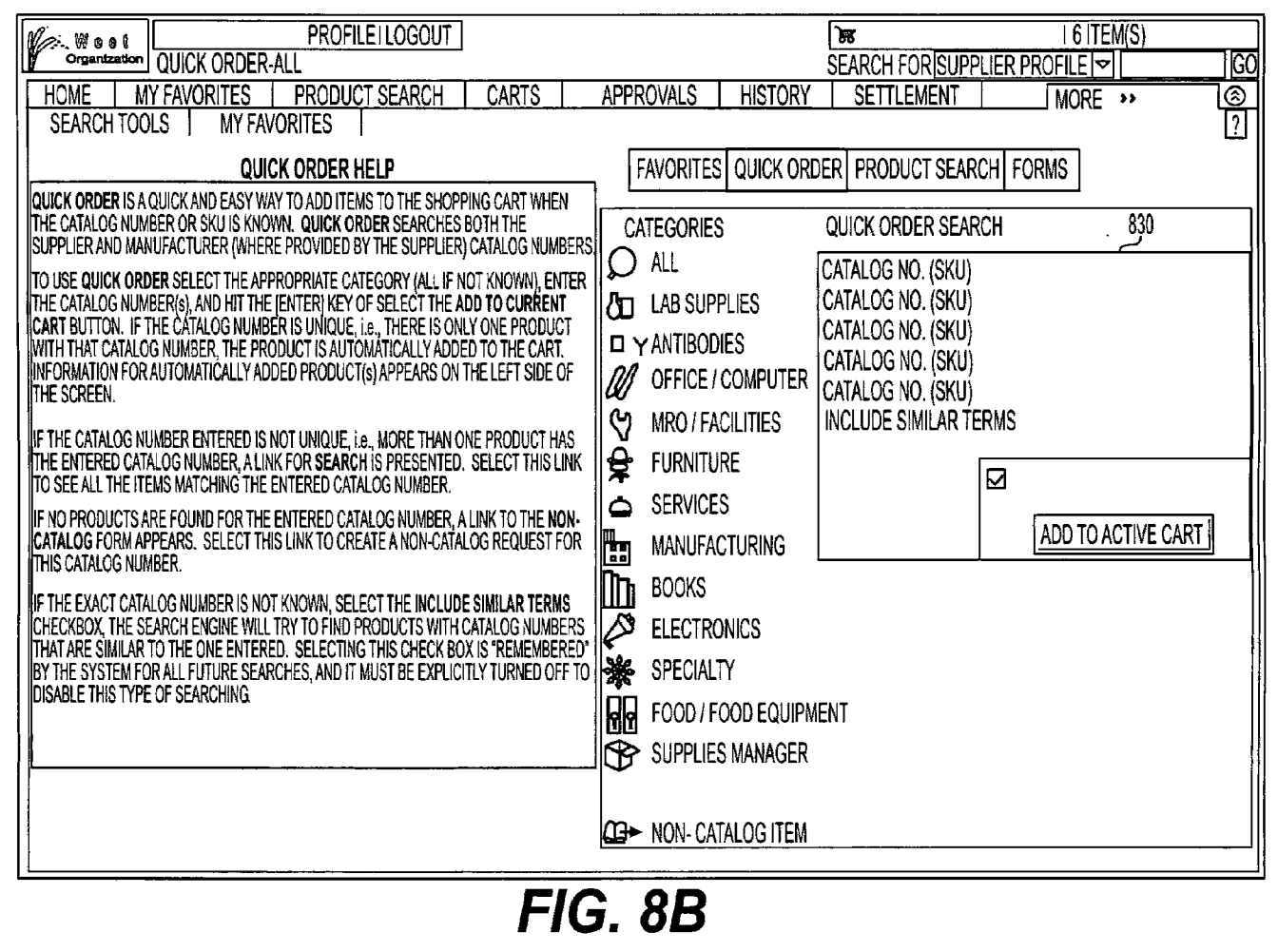
Figure 8C:
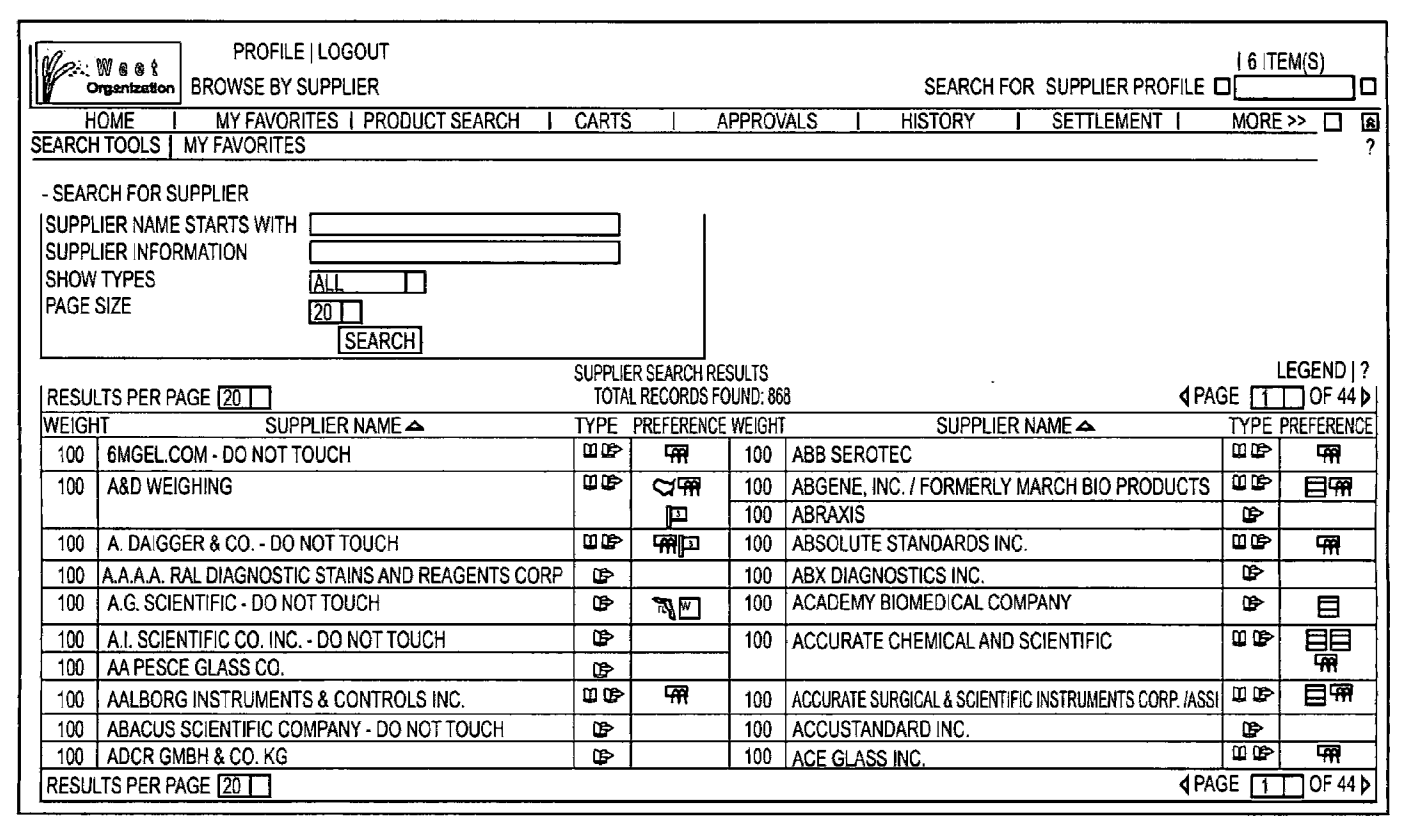

FIGS. 8A-8D illustrate exemplary search engines in accordance with the present invention. For example, FIG. 8A illustrates an exemplary parametric search engine 810 and punch-out catalogs 820. FIG. 8B illustrates an exemplary quick order search engine 830. FIG. 8C illustrates an exemplary browsing engine based on suppliers. FIG. 8D illustrates an exemplary browsing engine based on categories of the products and/or services. Other search engines may be used without departing from the scope of the present invention. Therefore, an eProcurement system in accordance with the present invention couples the configuration tools described above for customizing access to specified suppliers and/or specified types of products based on department, position, roles, and/or permissions of the user for each organization with various search engines in a single instance, multi-tenant architecture.

As shown in FIG. 2, the supplier user interface 214 in accordance with the present invention and further described below is configurable by supplier users and super users, and includes one or more features, for example, such as accessing a supplier hosted products catalog, viewing and responding to purchase orders, consummating sales transactions, viewing and responding to status queries, and setting supplier user configuration preferences. Each individual end user and supplier user may have a different interface from another end user and supplier user, respectively. Furthermore, the supplier end user interface of the present invention may allow a plurality of supplier users to send queries/requests via middleware/web methods server 224 to custom database servers 222, and to a hosted supplier products catalog 234 that is multi-tenant managed. A remote supplier user query/request is sent via the supplier end user interface 214 over the Internet, or other networked connection, and is first received by the web servers 225 after passing through the firewall 218. Then, the web server 225 passes the query/request to the middleware/web methods server 224, where business rules may be enforced. Subsequently, depending on whether the query/request is related to a transaction or a user search, it is either forwarded to the transaction processing servers 223 or custom database servers 222, respectively. For either type of query/request, the hosted supplier products catalog 234 is then readily accessible via processing modules for exchanging transaction/product data, or performing a search/supplier operation. The hosted supplier products catalog 234 can serve as a quasi-link between the end user interface and the supplier interface because it is accessible by both interfaces. Supplier users can access the catalog via the middleware/web methods servers 224, which then forward the supplier access request to the custom database servers 222 and processing modules for execution, in order, for example, to update their own supplier data. End users may be able to search multiple suppliers within the catalog via the end user interface 212, subject to access rules set by a super user. End users may search the catalog for specific end user product requirements via the middleware/web methods servers 224, which forward the end user search request to custom database servers 222 and processing modules for execution. Subsequently, the end user may then invoke requisition and purchase orders via the middleware/web methods servers 224, which forward the end user order to the transaction processing servers 223 for execution.

As described above, to support the product search function, the eProcurement system of the present invention includes a master catalog database of all the products from all the suppliers hosted on the system to implement a single instance, multi-tenant environment. Accordingly, the eProcurement system of the present invention includes a catalog management tool 900. The catalog management tool 900 includes one or more of supplier tool 910, categories tool 920, supplier classification tool 930, category classification tool 940, product views tool 950, pricing tool 960, map attributes tool 970, and consortium management tool 980.

Figure 9A:
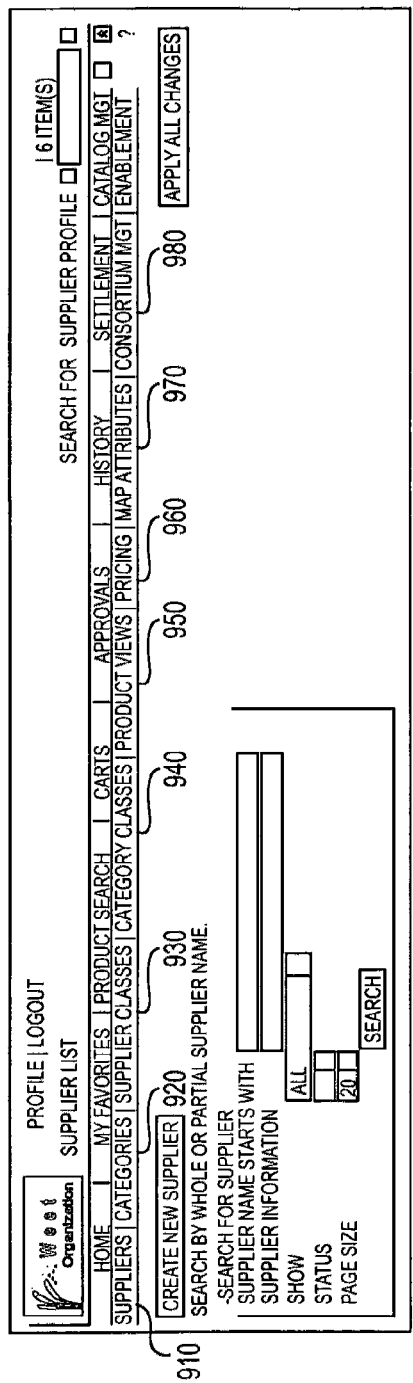
Figure 9B:
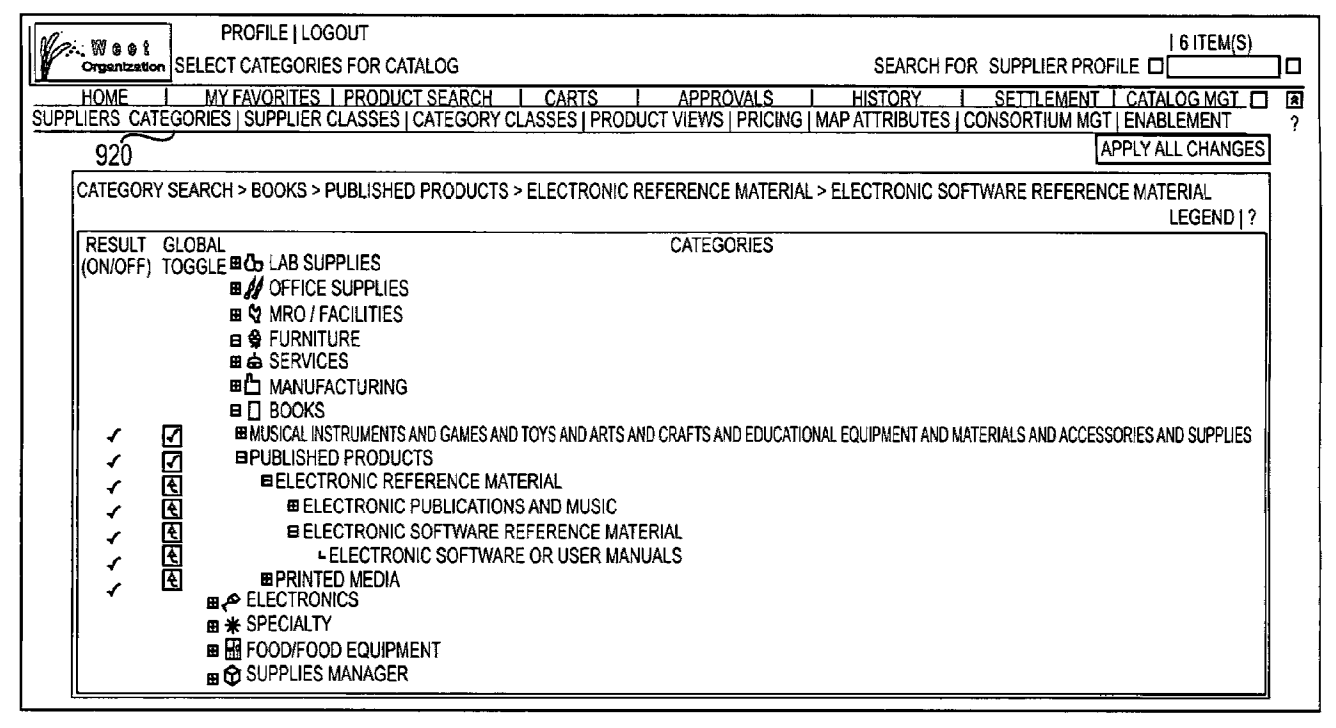
Figure 9C:
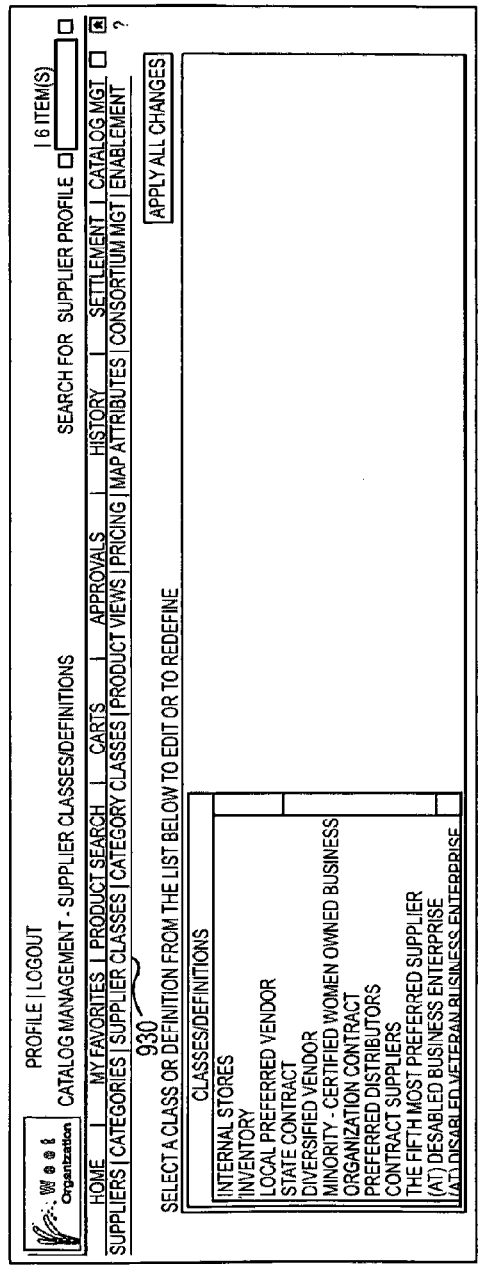
Figure 9D:
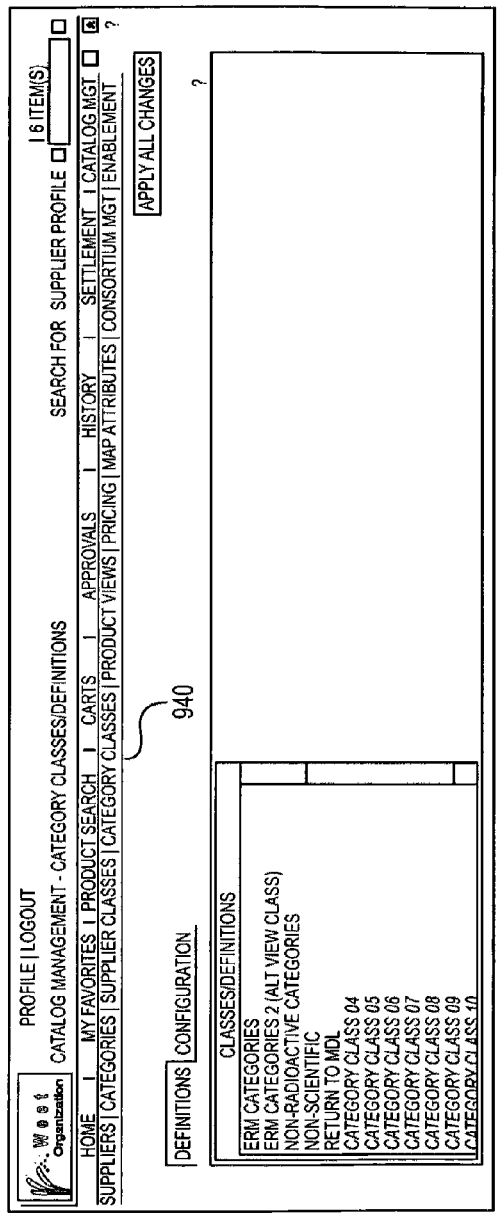
Figure 9E:
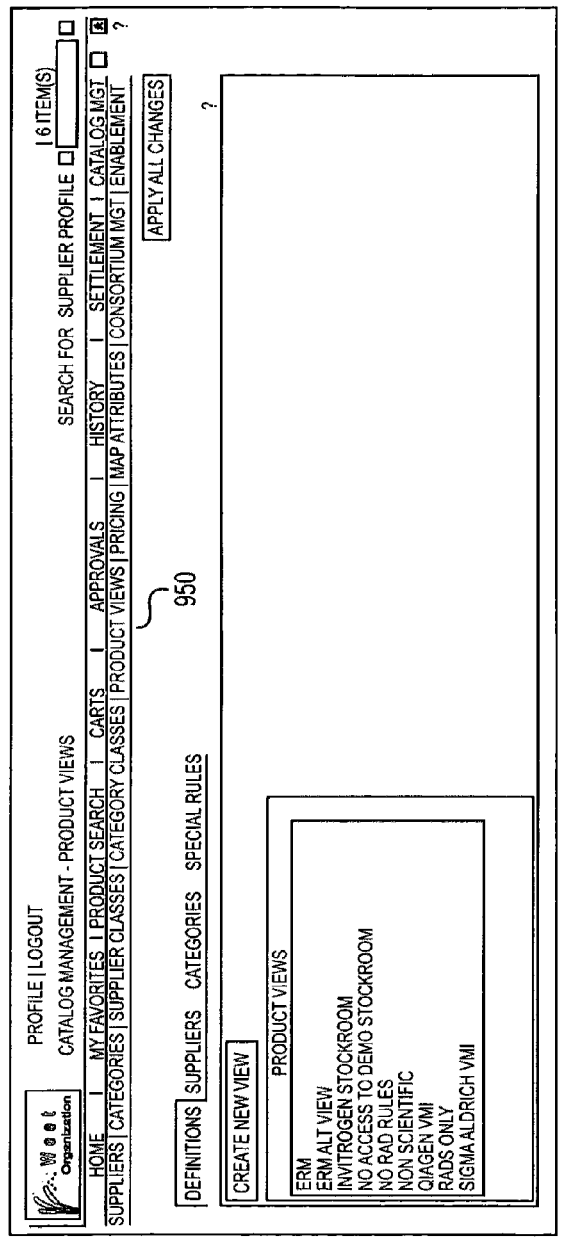

FIG. 9A illustrates an exemplary catalog management tool 900 with an exemplary supplier tool 910 invoked. The supplier tool 910 includes a search engine that searches for existing suppliers hosted in the eProcurement system of the present invention. Furthermore, the supplier tool 910 adds new suppliers not yet hosted in the system. FIG. 9B illustrates an exemplary categories tool 920 that configures all the products offered from the hosted suppliers into defined categories. Classifications for suppliers and product categories within the system of the present invention are defined and managed by the supplier classification tool 930 (FIG. 9C) and category classification tool 940 (FIG. 9D). In particular, new classes of suppliers and product categories may be created, defined, and configured as needed through the supplier classification tool 930 and category classification tool 940. In addition, existing classifications of suppliers and product categories may be modified. The product views tool 950 manages the views of products based on the defined supplier and product categories (FIG. 9E).

FIG. 9F illustrates an exemplary pricing tool in accordance with the present invention. As shown, pricing tool 960 manages various pricing sets of each hosted supplier for the hosted products (or, the tool 960 may also be applied to non-catalog items, forms, or other non-hosted suppliers or products/items). The pricing set types may include organizational prices, contract prices, list prices, and consortium prices. Other pricing sets may be used without departing from the scope of the invention. The pricing tool 960 tracks versions of each type of pricing sets, status of the pricing sets (e.g., implicitly approved, not reviewed, rejected, approved, etc.), as well as the audit history of each pricing set. Accordingly, the appropriate pricing set may be tracked, managed, and invoked for each organization for each type of product.

Other types of catalog management tool 900 include the map attribute tool 970 and consortium tool 980. The map attribute tool 970 manages various parameters of the procurement activity, such as product codes, parameter format, and unit of measure (UOM). For example, commodity code configuration parameters may be set through the map attribute tool 970 to determine if and how the category taxonomy is to be mapped to, for example, an organization's set of category/commodity values. The commodity codes may be modified as categories, sub-categories, and on down to the product level. The list of values may be set manually or imported/exported from/to an already existing file. As another example, universal product codes (e.g., UN/SPSC) and UOM may also be configured to be mapped to an internal organization codes for automatic conversion when searching, viewing, and ordering products. Further, UOM may be mapped from standard UOM to organization specific UOM. The consortium tool 980 defines various consortiums that an organization may be a member of and offer consortium pricing by designating a supplier as a consortium supplier. Hence, all organizations that are members of the consortium will be offered the consortium pricing set when ordering from the designated supplier.

As shown in FIG. 2, the server technology of the present invention includes a middleware/web methods server 224 that hosts a variety of features related to administrative services management, content management, and application management described above. The middleware/web methods server 224 may, for example, manage business rules (i.e., the relationships) between end users and suppliers based, in part, on contractual terms or other arrangements, as processed according to the price and file management feature. For example, supplier user-side business rules may, for example, designate preferences regarding delivery terms (e.g., restrictions against odd lot sales, FOB preference, carrier preference, etc.), and price and insurance terms (e.g., CIF preference, applicable sales tax, etc.). Similarly, end user-side business rules may, for example, designate preferences regarding preferred suppliers, delivery terms (e.g., FOB preference, default quantity, carrier preference, etc.), and price and insurance terms (e.g., CIF preference, applicable sales tax, etc.). At least one advantage of implementing end user-side and supplier user-side business rules is the capability to generate customized purchase orders in accordance with contractual or default business rules. Such purchase orders are created by the invoke requisition/purchase orders feature, which is invoked via processing modules that are executed on the custom database servers 222. Middleware/web methods server 224 may apply default ordering, sales, delivery, and other terms in the instance where an end user and supplier user do not have existing contractual terms or other arrangements.

Figure 10:
FIG. 10 illustrates an exemplary contracts management tool in accordance with the present invention.

The middleware/web methods server 224, as well as the transaction processing server 223, implements the price and file management feature to access existing contracts between end users and suppliers. The feature is usually implemented as a component of the middleware/web methods server 224, but may also be invoked via transaction processing modules that are executed on the transaction processing servers. Contract management algorithms may also be implemented as a sub-feature of the price and file management feature. For example, the algorithms are usually responsible for accessing, retrieving, and processing data from each respective end user and supplier that might have negotiated a contract. FIG. 10 illustrates an exemplary contracts management tool 1000 that may be used to manage the contracts between an organization and a supplier. The contract data is accessible by the transaction processing servers 223 and transaction database 238. Suppliers are able to submit product prices and other product related data via the price and file management feature. Furthermore, multiple pricing/currency schemes can be created by suppliers for end user organizations and may be based on contractual terms negotiated between end user organizations and suppliers. Individual end users within the same organization, for example, may be assigned different price/currency schemes that may be based on different contractual terms with an individual supplier. A designated end user (e.g., a "contract manager"), akin to a super user, can be assigned the responsibility for managing and choosing the pricing schemes displayed to each individual end user within the organization. The designated end user may also be tasked with ranking the spending thresholds for triggering a new price tier. Individual end users are capable of accessing pricing schemes for supplier products where the end users have been granted access by the designated end user or super user. By default, the lowest supplier pricing scheme available is first displayed to the end user, although other pricing schemes may also be available and accessible.

The following algorithm, for example, may be implemented to determine which pricing scheme should be displayed to an individual end user. First, all pricing schemes for a specific product may be denoted as accessible. A filter-type method may then be used to exclude pricing schemes denoted as inaccessible to the end user organization and, thus, allowing only accessible pricing schemes. Another filter-type method may be used to determine which accessible pricing schemes, if any, are related to contracts negotiated between the end user organization and accessible suppliers. If no pricing schemes are related to any contracts, then a default/general pricing scheme is displayed to the end user. Finally, if at least one pricing scheme is related to any related contracts, then a filter-type method excludes those pricing schemes related to contracts deemed inaccessible to this end user, and permits the accessible pricing schemes to be displayed. The displayed accessible pricing schemes would, however, be subject to the end user spending thresholds, which may be set by a super user. When an end user invokes the generation of a purchase/requisition order, the appropriate pricing scheme is referenced and can be based upon available contractual terms with the appropriate supplier.

An end user organization can manage pricing schemes such that distinct contracts are assigned to specific end users or super users. The feature to manage pricing schemes is invoked via transaction processing modules executed on the transaction processing servers 223. The specific end users or super users have the ability to approve or reject contracts, and set extended dates. Moreover, supplier users have the ability to create multiple pricing/currency schemes that may be based on contractual terms with end user organizations. Whether an individual end user/organization is a constituent of a trade group, department, or other organization, may influence the pricing/currency scheme determination. Supplier users can also have the ability to load single or multiple pricing/currency schemes for end users within the same data sink (e.g., hosted supplier products catalog), which may later be processed by the price and file management feature and assigned to each respective end user. Moreover, end users can designate specific products from supplier pricing/currency schemes as favorites. End user favorites can be dynamically updated with the lowest available supplier pricing scheme.

The transaction processing servers 223 of the present invention may execute transaction processing modules that query, update, and/or create data model instances within the transaction database 238. Moreover, end users can also approve, request to modify, or reject supplier products within hosted catalogs, and can also assign and route specific supplier products to other appropriate end users for review, dependent upon end user specific attributes like title within the organization. For example, certain end users may be able to access hazardous and/or expensive supplier products, while other end users may not be able to do so based on their precedence/role within the end user organization. Similarly, certain end users may also have the ability to make high-volume orders, while others may not. The hosted supplier products catalog 234 may be routinely updated by each supplier user at his/her discretion, or on a monthly, quarterly, or annual basis, and may contain data from suppliers such as, for example, custom product lists and end user organization-specific prices/currencies.

Figure 11A:
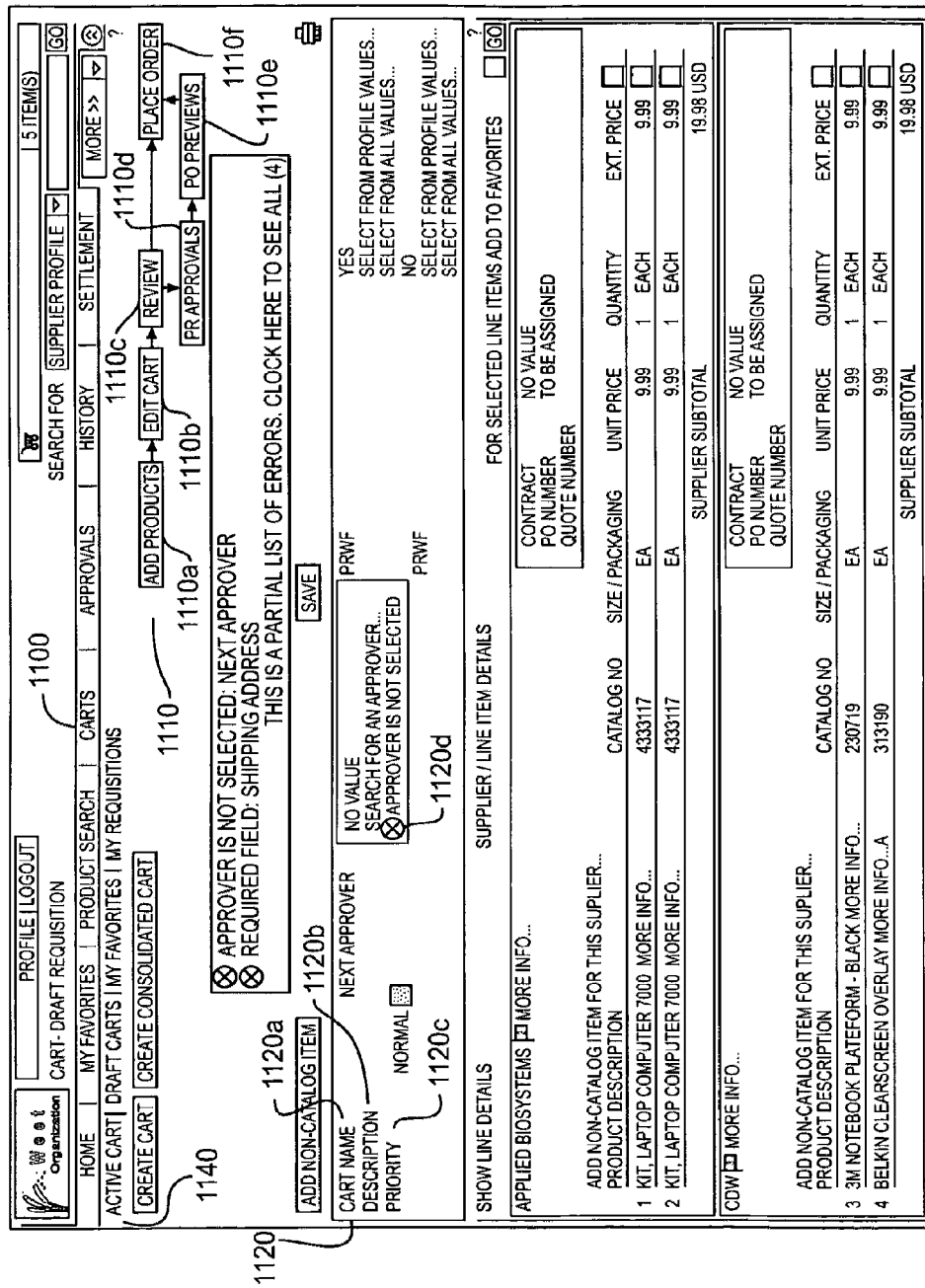

FIG. 11A illustrates an exemplary cart and requisition tool 1100 in accordance with the present invention. As shown in FIG. 11A, the cart and requisition tool 1100 includes an active cart 1140 for tracking the items designated for purchase from the search results described above. In an exemplary embodiment illustrated in FIG. 11A, the active cart 1140 includes requisition workflow tool 1110 that displays a live view of the requisition process for the items in the cart. For example, the requisition workflow tool 1110 displays the status of the requisition from the point at which a product is added 1110*a*, the cart is edited 1110*b*, the requisition is reviewed 1110*c*, and the order is placed 1110*f*. The requisition workflow tool 1110 further displays a purchase requisition approval step 1110*d* as well as a purchase order preview step 1110*e*. Each of the status boxes 1110*a*-1110*f* of the requisition workflow tool 1110 may be invoked to activate the tool that manages the corresponding status. For example, invoking the "Add Products" box 1110*a* (e.g., clicking on the box) activates the search engine to search for additional products to be added to the cart 1140. Invoking the "Edit Cart" box 1110*b* activates the active cart 1140 for editing the products in the cart. Invoking the "Review" box 1110*c* activates a summary of the products included in the requisition, including, for example, accounting codes, billing and shipping addresses, and other customizable data elements that may be configured by the user's organization. Invoking the "PR Approvals" box 1110*d* displays the set of workflow/approval steps an invoked requisition will be processed through prior to order creation. Invoking the "PO Preview" box 1110*e* activates a list of purchase orders that are generated if the invoked requisition is approved. Invoking the "Place Order" box 1110*f* submits the invoked requisition to the steps of the workflow/approval process.

Cart information 1120 such as cart name 1120*a*, description 1120*b*, priority 1120*c*, and assigned approver 1120*d* are also displayed and may be edited. The cart information 1120 further includes supplier and line item details organized alphabetically, for example, according to each supplier's name, and lists each chosen product description, catalog number, size and/or packaging data, unit price, quantity ordered, price, and currency. For each supplier there is also a corresponding supplier subtotal that is calculated according to the total of products chosen by the user.

Figure 11B:
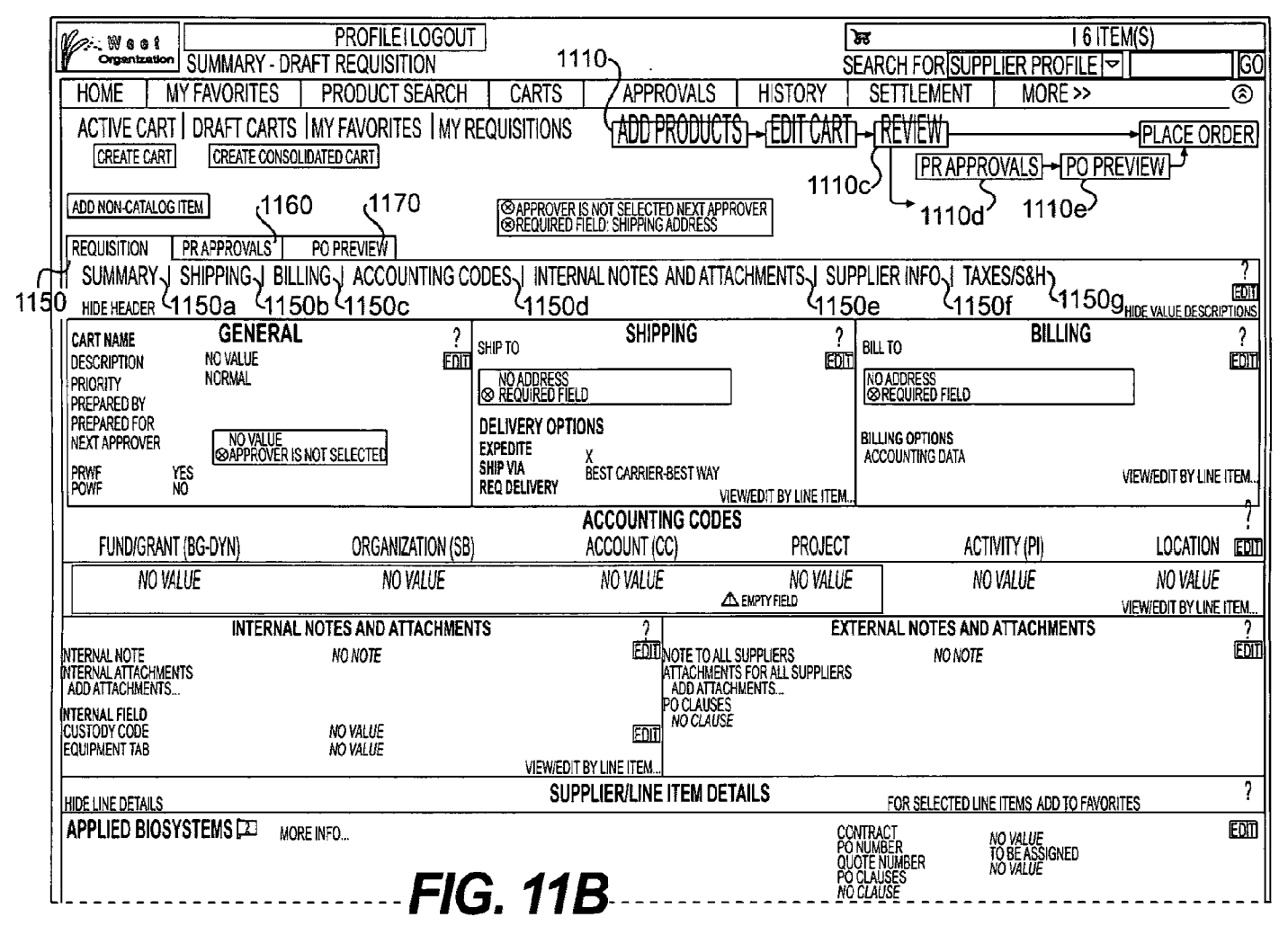

FIG. 11B illustrates further details of the exemplary cart and requisition tool 1100 in accordance with the present invention. As shown, the cart and requisition tool 1100 includes a requisition review tool 1150, purchase request approval tool 1160, and purchase order preview tool 1170. As described above, the various status boxes (e.g., 1110*c*-1110*e*) in the requisition workflow tool 1110 activate the corresponding tool 1150-1170. As shown in FIG. 11B, the requisition review tool 1150 displays information about the requisition being built. For example, as shown, the requisition review tool 1150 includes a summary page 1150*a* that displays all the information regarding the requisition being reviewed, such as the general information, shipping information, billing information, accounting codes, internal/external notes and attachments, as well as supplier/line item details of the products in the cart 1140. All of the information shown in the requisition summary page 1150*a* may be edited by invoking the corresponding tool, such as the shipping/handling tool 1150*b*, billing tool 1150*c*, accounting code tool 1150*d*, notes and attachment tool 1150*e*, supplier information tool 1150*f*, and taxes/S&H pricing tool 1150*g*.

For instance, the shipping/handling tool 1150*b* may be used to set the shipping address of the products in the purchase order as well as designate delivery options, such as "expedite," "shipping method," and "requested delivery date." The billing tool 1150*c* may be used to set the billing address and billing options, such as accounting dates. The accounting tool 1150*d* may be used to designate the accounting information of the requisition, such as any fund/grant contacts, organization information, account numbers, product codes, activity summaries, and location. The notes and attachments tool 1150*e* may be used to designate any internal codes associated with the products in the purchase order, such as custody codes and equipment codes used in the organization. The supplier information tool 1150*f* may be used to assign or modify supplier information for the products in the order, such as contract information with the supplier, purchase order number, quote number, and purchase order clauses. The taxes/S&H tool 1150*g* may be used to define the tax/S&H information related to purchases from a particular supplier, such as tax percentage and/or S&H cost from total purchase price (e.g., 0% tax, free shipping if over $200 purchase, etc.).

Figure 11C:
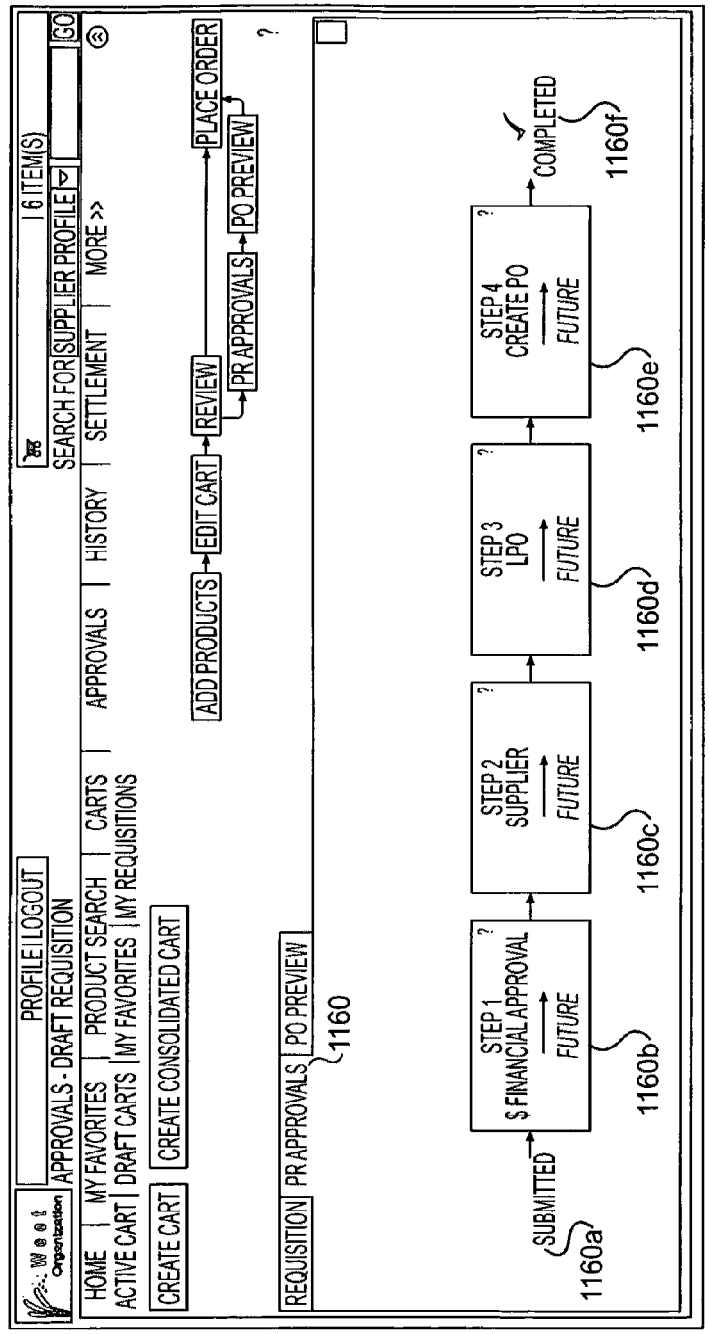

FIG. 11C illustrates an exemplary purchase request approval tool 1160 that corresponds to the purchase requisition approval step 1110*d* in accordance with the present invention. The exemplary purchase request approval tool 1160 graphically portrays the status of the requisition being reviewed (e.g., submission of the purchase requisition 1160*a*, financial approval 1160*b*, supplier approval/processing 1160*c*, LPO 1160*d*, purchase order creation 1160*e*, and completion 11600. As with the requisition workflow tool 1110 (FIG. 11B), each workflow/approval step status box may be invoked to activate a tool, corresponding to each workflow/approval step, to view the reason(s) underlying the workflow engine's invocation of that step. Other intervening or superseding steps may also be portrayed without departing from the scope of the present invention.

Figure 11D:
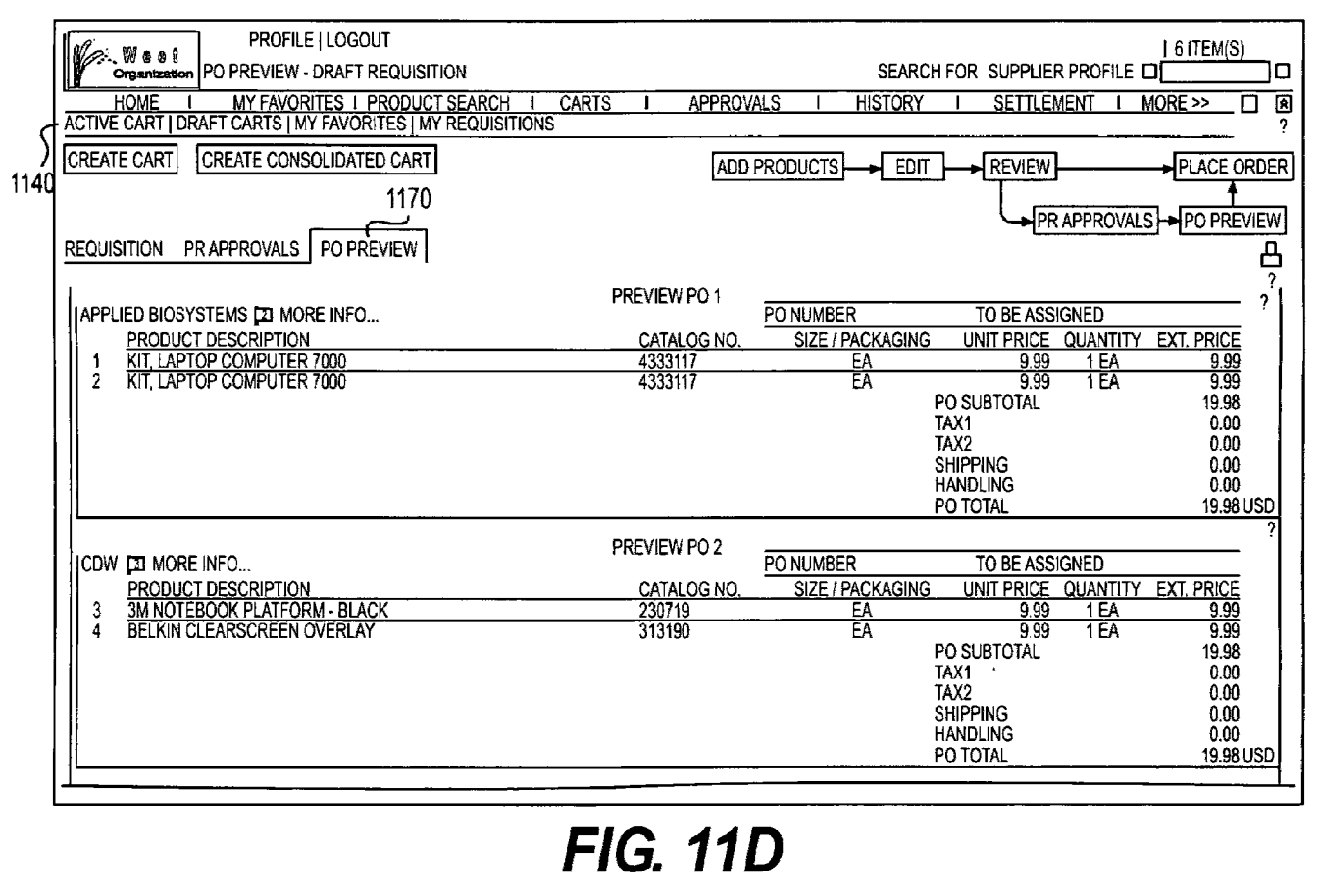

FIG. 11D illustrates an exemplary purchase order preview tool 1170 that corresponds to the purchase order preview step 1110*e* in accordance with the present invention. The purchase order preview tool 1170 permits the user to preview the purchase orders that will be generated from the current active cart 1140. The active cart 1140 corresponding to that user is queried and the preview purchase orders are displayed, as shown, in alphabetical order according to supplier name. Other methods of ordering or retrieving the purchase orders corresponding to the user may also be used without departing from the scope of the present invention.

With reference to FIG. 2, the feature to invoke purchase/requisition orders may be hosted on the middleware/web methods servers 224 and managed by the eProcurement architecture of the present invention such that it is executed consistently with end user and supplier user business rules as described above. From a high-level point-of-view, this feature is implemented based on whether the order information sought to be processed by an end user is internal to the organization or supplier related. If the information is internal, it is processed accordingly via the end user 212, the middleware/web methods servers 224, through to the custom database servers 222, and then to the hosted supplier products catalog 234; otherwise, the information is processed similarly except that the appropriate supplier related databases (e.g., the master product database 236, and the transaction database 238) may also be invoked.

An auto purchase order feature is available via the middleware/web methods servers 224 and is invoked via transaction processing modules executed on the transaction processing server 223, and can populate entries of a purchase order in accordance with applicable end user and supplier contractual terms. The auto purchase order feature allows for the generation of distribution, and payment, rule-based purchase orders based on the customizations effectuated by a super user of the organization in the manner described above. For example, the feature can automatically insert legal terms (e.g., the right to cure product defects, what constitutes rejection and/or revocation of an order, what may constitute a material defect, the seller's return policy, the buyer's acceptance policy, etc.), as well as other non-legal terms and conditions (e.g., preferred delivery dates, shipping and handling instructions, appropriate contact/authorized personnel, payment and receipt of payment instructions, etc.), based on a contract that may be in place between an end user organization and a supplier. If no contract is in place, then the auto purchase order feature may prompt the user or automatically insert default terms and conditions, whether legal or non-legal. The feature may create receipts for each end user initiated transaction/purchase order and add multiple transactions/purchase orders to a single receipt. For capable suppliers, automated responses can be accepted for display to the end user. Such automated responses may include, for example, order acknowledgement and advanced shipping notice. Also, a document search sub-feature allows searching any existing transactions/purchase orders. The auto purchase order feature also supports supplier pricing schemes modeled using the U.S. Dollar as well as all other currency types (e.g., Euro, Yen, Pound, Peso, etc.).

Figure 12:
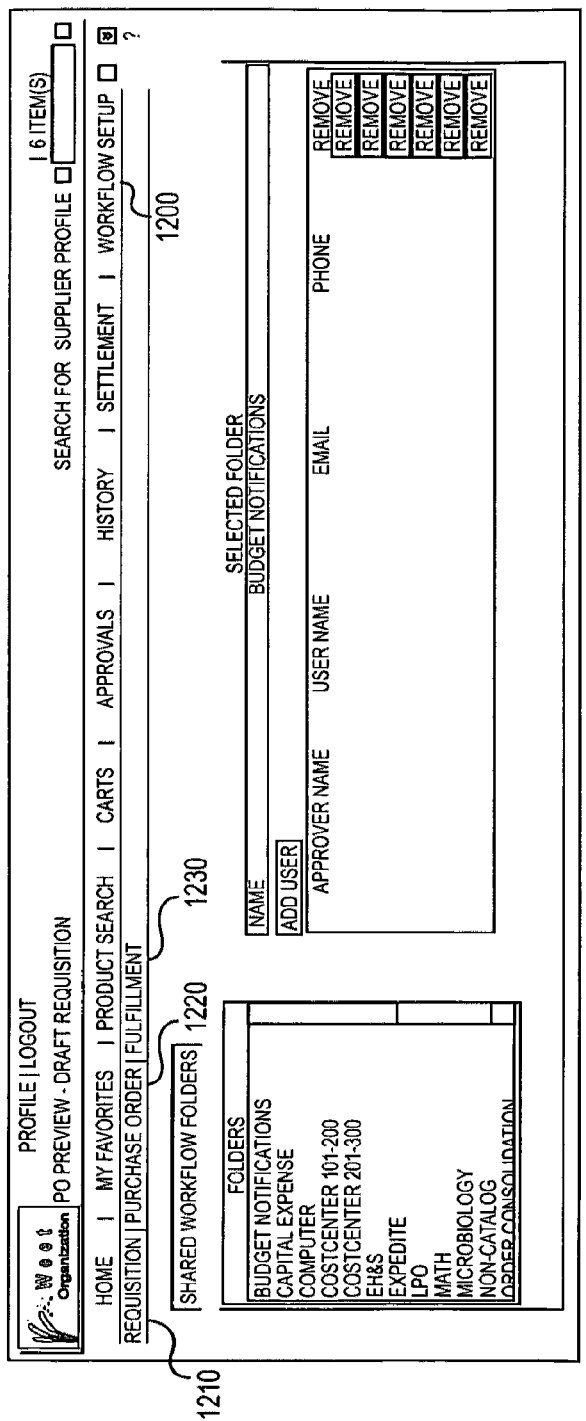
FIG. 12 illustrates an exemplary workflow setup tool in accordance with the present invention.

FIG. 12 illustrates an exemplary workflow setup tool in accordance with the present invention. As shown, the workflow setup tool 1200 includes requisition workflow tool 1210, purchase order setup tool 1220, and fulfillment setup tool 1230. These tools are used to setup various aspects of the workflow process as described above. For example, as shown in FIG. 12, the purchase order setup tool 1220 may be used to designate the names of approvers to review and approve purchase orders for a particular organization. As shown, the approver list may be customized for different departments (e.g., Math), types of products (e.g., non-catalog item), and even for specific users. Similarly, the requisition setup tool 1210 and fulfillment setup tool 1230 may be used to designate approvers for requests and fulfillment processes, respectively. Other workflow parameters may be further defined without departing from the scope of the present invention.

Figure 13:
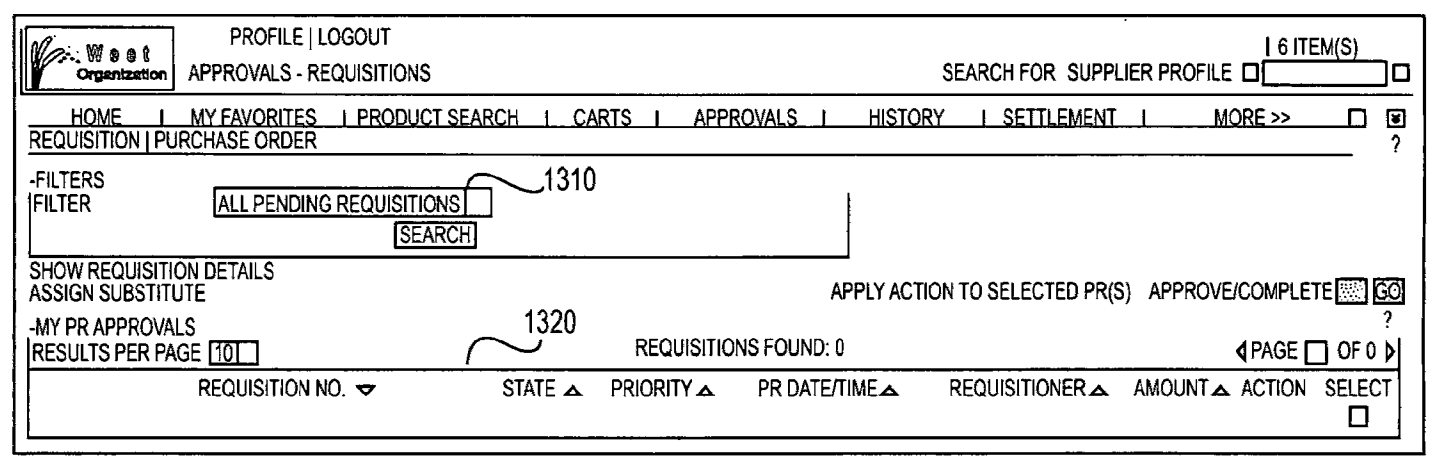

FIG. 13 illustrates an exemplary purchase order approval tool in accordance with the present invention. As shown, purchase order search engine 1310 searches through all of the purchase orders generated by the eProcurement system of the present invention for each of the hosted organizations. The results of the search may be filtered based on display criteria such as "Approver" (e.g., user responsible for approving the document), "Approval Queues," "All Pending Requisitions," "Urgent Approvals," "Unassigned Approvals," "Future Approvals," and "Manual Filter" options. The result list of the purchase orders are displayed in the display portion 1320 with such information as P.O. number, status of the P.O., priority level of the P.O., the date/time of the submission for approval, the name of the requester, the designated supplier, the amount, and selectable options. Using the purchase order approval tool, the approvers as well as the requisitioners may monitor the status of the requests and ascertain where the request is in the workflow process. Using the tools described above, the user may drill down to the lowest level of the request to determine what needs to be done to move the request along if it becomes bottlenecked in the process, for example.

At the conclusion of the ordering process, an approval/rejection of orders feature may be implemented also through the middleware/web methods server 224, as well as the transaction processing server 223. The approve/reject order feature is invoked via a transaction processing module that is executed on the transaction processing servers 223. This feature can be managed by the middleware/web methods server 224 such that it is executed consistently with end user and supplier user business rules. For example, one advantage of this feature is its ability to provide notice of an approved or rejected order to an end user or super user.

Figure 14:
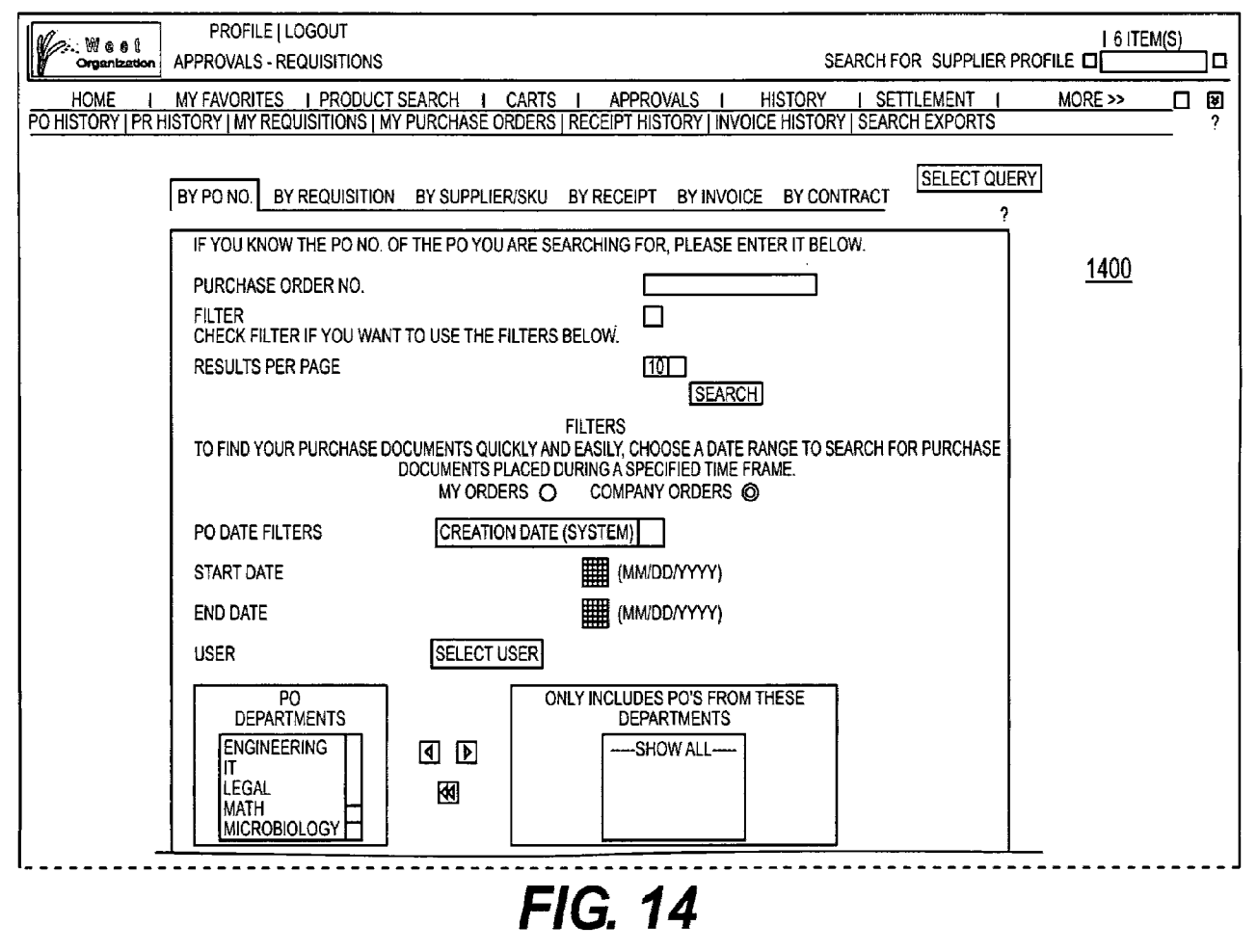

FIG. 14 illustrates an exemplary history tool in accordance with the present invention. The eProcurement system in accordance with the present invention keeps a history of all requests, purchase orders, receipts, invoices, and actions (e.g., edits to parameters) made in the system that may be searched and reviewed. History tool 1400, for example, includes a tool to search for purchase order histories, purchase request histories, receipt histories, and invoice histories. The searches may be made by purchase order number, by requisition, by supplier/SKU numbers, by receipts, by invoices, and by contracts. These parameters may be filtered by dates, users, as well as other specifics of the history being sought.

Finally, a supplier configuration feature may be implemented. This feature allows for the capability to have a supplier master that hosts multiple fulfillment centers. Also, this feature allows for an order processing feature with multiple payment/currency methods for each fulfillment center, the execution of shipping and handling rules, and order distribution features. The order distribution features can include such features as facsimile or email confirmation, as well as other delivery methods, organized hierarchically to ensure purchase order delivery.

Figure 15:
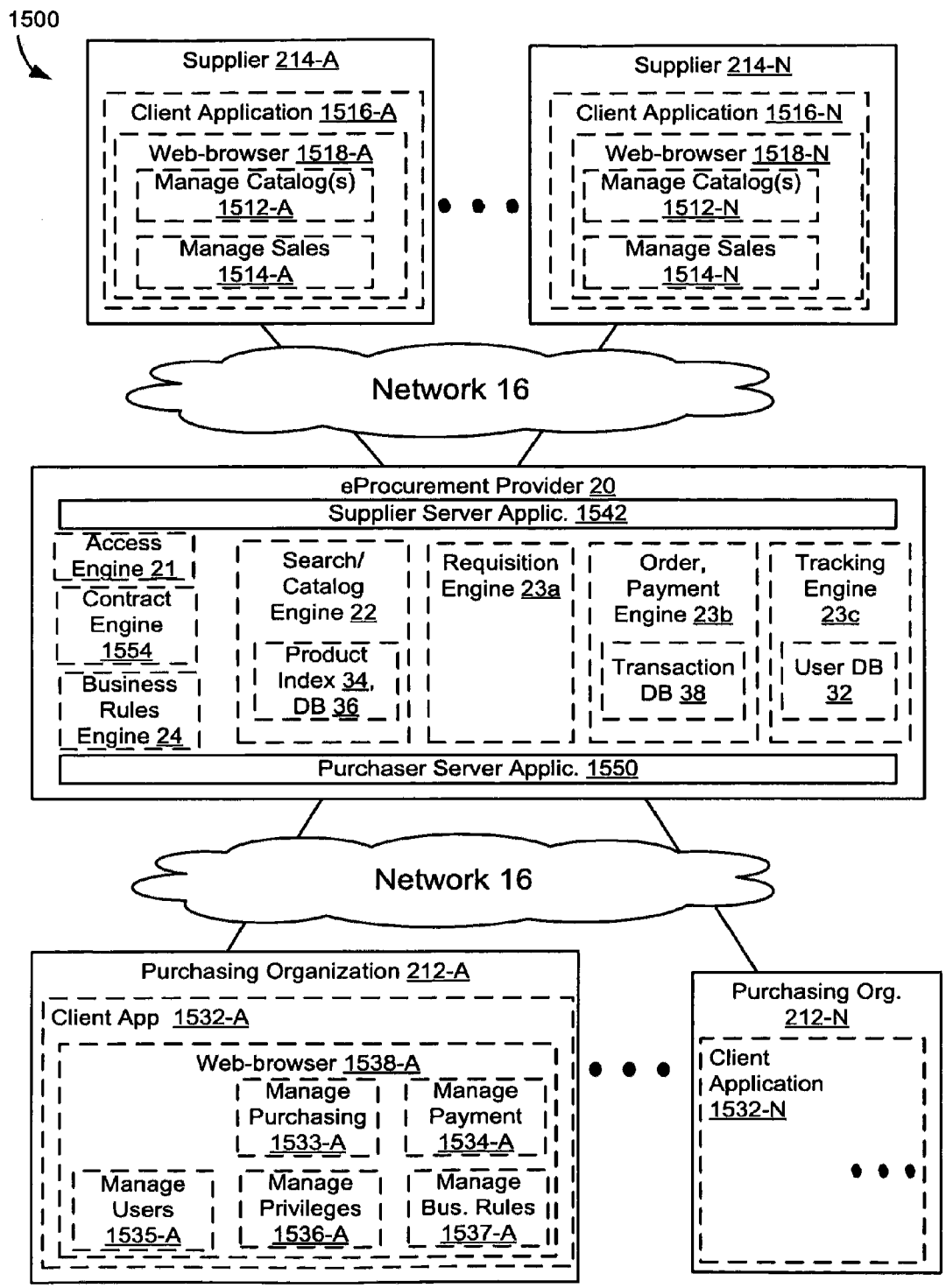
FIG. 15 illustrates the electronic procurement system communicating over a network with suppliers and purchasing organizations.

FIG. 15 is a block diagram of the electronic procurement system 20 communicating over a network 16 with suppliers 214-A (to 214-N) and purchasing organizations 212-A (to 212-N). The electronic procurement system 20 generally includes a supplier server application 1542 and purchaser server application 1550, which may interface with the access engine 21, contract engine 1554, search/catalog engine 22, requisition engine 23a, order/payment engine 23b, tracking engine 23c, and business rules engine 24.

As described, business rules describe and control the relationships between end users and suppliers based, in part, on contractual terms or other arrangements, as processed according to the price and file management feature. For example, supplier user-side business rules may, for example, designate preferences regarding delivery terms (e.g., restrictions against odd lot sales, FOB preference, carrier preference, etc.), and price and insurance terms (e.g., CIF preference, applicable sales tax, etc.). Similarly, end user-side business rules may, for example, designate preferences regarding preferred suppliers, delivery terms (e.g., FOB preference, default quantity, carrier preference, etc.), and price and insurance terms (e.g., CIF preference, applicable sales tax, etc.). At least one advantage of implementing end user-side and supplier user-side business rules is the capability to be able to generate customized purchase orders, in accordance with contractual or default business rules.

Non-limiting examples of business rules include:
  If the extended price of any line item exceeds the limit set in a users profile, route to the users financial approver.
  If the total value of the requisition exceeds the limit set in a users profile, route to the users financial approver.
  If a requisition sent to a user for financial approval exceeds the users approval authority set in the users profile, route the requisition to the users financial approver.
  If the requisition contains suppliers classified by a users organization as "IT Vendors," send the requisition to the CIO.
  Requisitions for the Math Department over $10,000 are routed to the Vice Chancellor of Liberal Arts.
  If any item on the PO is radioactive, route the PO to the environmental health and safety (EH&S) Department for review and approval.
  If any item on the PO is classified as hazardous, notify the EH&S Department. No approval is required.
  If the account code for a line item on the requisition has a budget, and the requisition will exceed the budget, route the requisition to the Budget Manager.
  If the user adds a non-catalog item to their requisition, route it to the Purchasing Department to validate the information entered.
  If a requisition is marked for expediting, skip all rules and route directly to the Purchasing Department.
  All the above examples of business rules are exemplary and not intended as limiting.

The supplier server application 1542 and purchaser server application 1550 may also interface with the transaction engine 23, which may include the requisition module 23*a*, order/payment engine 23*b*, and the tracking engine 23*c*. Moreover, the supplier server application 1542 and purchaser server application 1550 may send and receive data from the data repository 30, which includes the user database 32, the product index database 34, the product database 36, and the transaction database 38. The engines may communicate via function/method calls, file libraries, and database queries. The contract engine 1554 executes the necessary functions for implementing the contract management feature, which manages and links new or existing procurement contracts, formed between buyer organizations and supplier organization, with a group. For example, a new or existing contract is initially stored in the contracts database 3200 (as described in FIG. 32) and may routinely be updated in accordance with amendments (e.g., extensions, additions of agreed upon terms, assignments, or the like) or other contractual events (e.g., the expenditure of quantity/time/spending limits (i.e., tiers), price fluctuations—e.g., rebates or price reductions, item changes or additions, etc.); at such time intervals as determined by the contract engine 1554, the group is updated accordingly. The group includes, for example, buyer users, supplier users, the business rules engine 24, items, forms, purchase requisitions/orders, sales orders/invoices, and buyer invoices. Furthermore, the contract engine 1554 also supports contract searching (as described in FIG. 10) based on specific user-specified criteria like, for example, contract number, contract keyword, or supplier/catalog name.

The supplier server application 1542 communicates with a supplier 214-A (to (214-N) over network 16 and the purchaser server application 1550 communicates with a buyer 212-A (also referred to herein as a purchasing organization) over network 16. A supplier user would use a client application 1516-A (to 1516-N) to communicate with, generally, the electronic procurement provider 20 and, specifically, the supplier server application 1542. The client application 1516-A (to 1516-N) may be a web-browser 1518-A (to 1518-N) for the supplier user to use, or may be a standalone application. The web-browser 1518-A or standalone application may display features to manage catalog(s) 1512-A (to 1512-N) and manage sales 1514-A (to 1514-N), which may be communicated via the supplier server application 1542 and displayed to the supplier user. A buyer user would use a client application 1532-A (to 1532-N) to communicate with, generally, the electronic procurement provider 20 and, specifically, the purchaser server application 1550. The client application 1532-A (to 1532-N) may contain a web-browser 1538-A (to 1538-N) for the buyer user to use, or may be a standalone application. The web-browser 1538-A or standalone application may display features to manage purchasing 1533-A (to 1533-N), manage payment 1534-A (to 1534-N), manage users 1535-A (to 1535-N), manage privileges 1536-A (to 1536-N), and/or manage business rules 1537-A (to 1537-N), which may be communicated via the purchaser server application 1550 and displayed to a buyer user. For example, a user that sends a request to the system 20 that is outside the scope of that user's privileges would receive an appropriate denial response from the system 20 and, more specifically, for example, from the manage privileges 1536-A feature.

Figure 16:
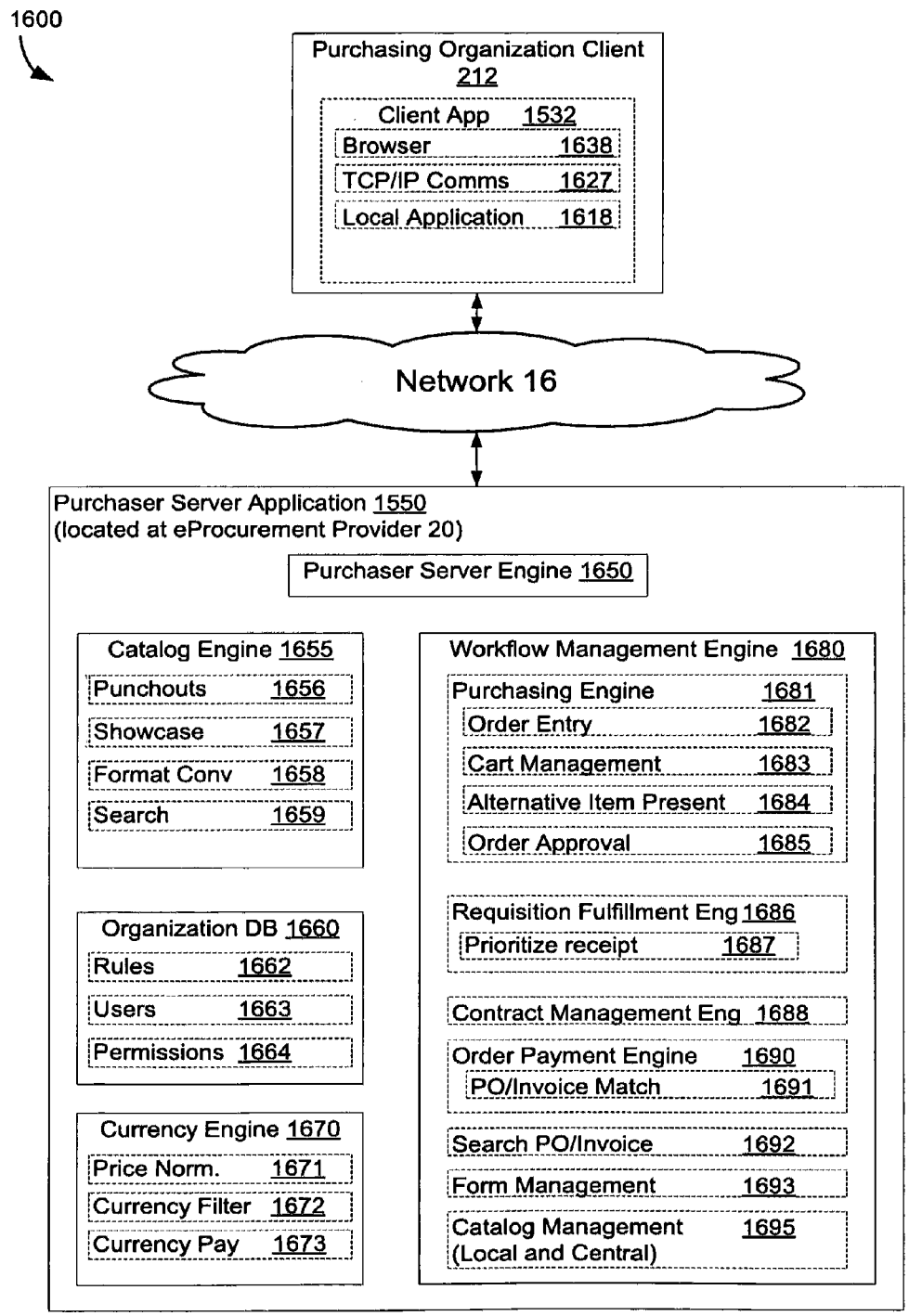
FIG. 16 illustrates the purchasing organization client communicating over a network with the purchaser server application to access the engines of the purchaser server application.

FIG. 16 is a block diagram of the buyer 212 communicating with the purchaser server application 1550, located at the electronic procurement provider 20, over a network 16. The purchaser server engine 1650 may interface with or include the following modules, or a subset thereof:

- a catalog engine 1655 for managing each supplier catalog by implementing features for uploading catalog data, linking to the proper punch-out catalog(s) (1656) via the punch-out module 22*a* and back to the buyer, managing supplier showcase promotions and overlays (1657), converting supplier catalog data into a common data format (1658), and interfacing with the search engine 22 for searching the master product database or other accessible database of the electronic procurement system 20;
- an organization database 1660 for storing organization specific information like, for example, business rules (1662), user-related data (1663), or permissions (1664);
- a currency engine 1670 for implementing multi-currency features like, for example, normalizing a plurality of currency data (1671) into a default or preferred currency, interfacing with the search engine 22 to return item search results to a buyer user who sent a request to organize/filter the search results (1672) according to a specific currency, or determining the default or preferred currency with which a supplier requests or requires payment; or
- a workflow management engine 1680 for managing the flow of purchase requisitions to the appropriate approver (via the requisition fulfillment engine 1686) (which may be prioritized via the prioritize receipt feature 1687 based on user hierarchy, privileges, or business rules), sending the approved requisition back to the appropriate buyer user (via the requisition fulfillment engine 1686), interfacing with the search engine 22 to locate an appropriate requisition and/or purchase order (via the search PO/Invoice feature 1692), forwarding a purchase order to the appropriate supplier (via the requisition fulfillment engine 1686), forwarding a sales order and/or invoice from the supplier to the appropriate buyer user (via the order payment engine 1690 and using the PO/Invoice match feature 1691 for linking a purchase order on the buyer user side with an incoming invoice from the supplier), or sending event updates to the contract engine 1554 (via the contract management engine 1688).

Moreover, the workflow management engine 1680 may also interface with a purchasing engine 1681 that receives orders (via an order entry feature 1682), manage the items a buyer user places in a cart or moves/assigns to a new cart (via a cart management feature 1683), present alternative items to a buyer in lieu of items chosen for requisitioning that are not available according to privileges, inventory or a contractual agreement (via an alternative item present feature 1684), or approve an order if approved by the appropriate approver user (via an order approval feature 1685). In addition, the workflow management engine 1680 may also interface with a form management engine 1693 for receiving requisitions and orders via user-created custom forms stored in a forms database 2300. Once received, the requisitions and orders are then routed to approvers and suppliers, respectively, according to workflow business rules. And, the workflow management engine 1680 also interfaces with the catalog management feature 1695 for retrieving item data related to the items present in the requisitions, orders, or invoices being processed by the workflow management engine 1680.

Figure 17:
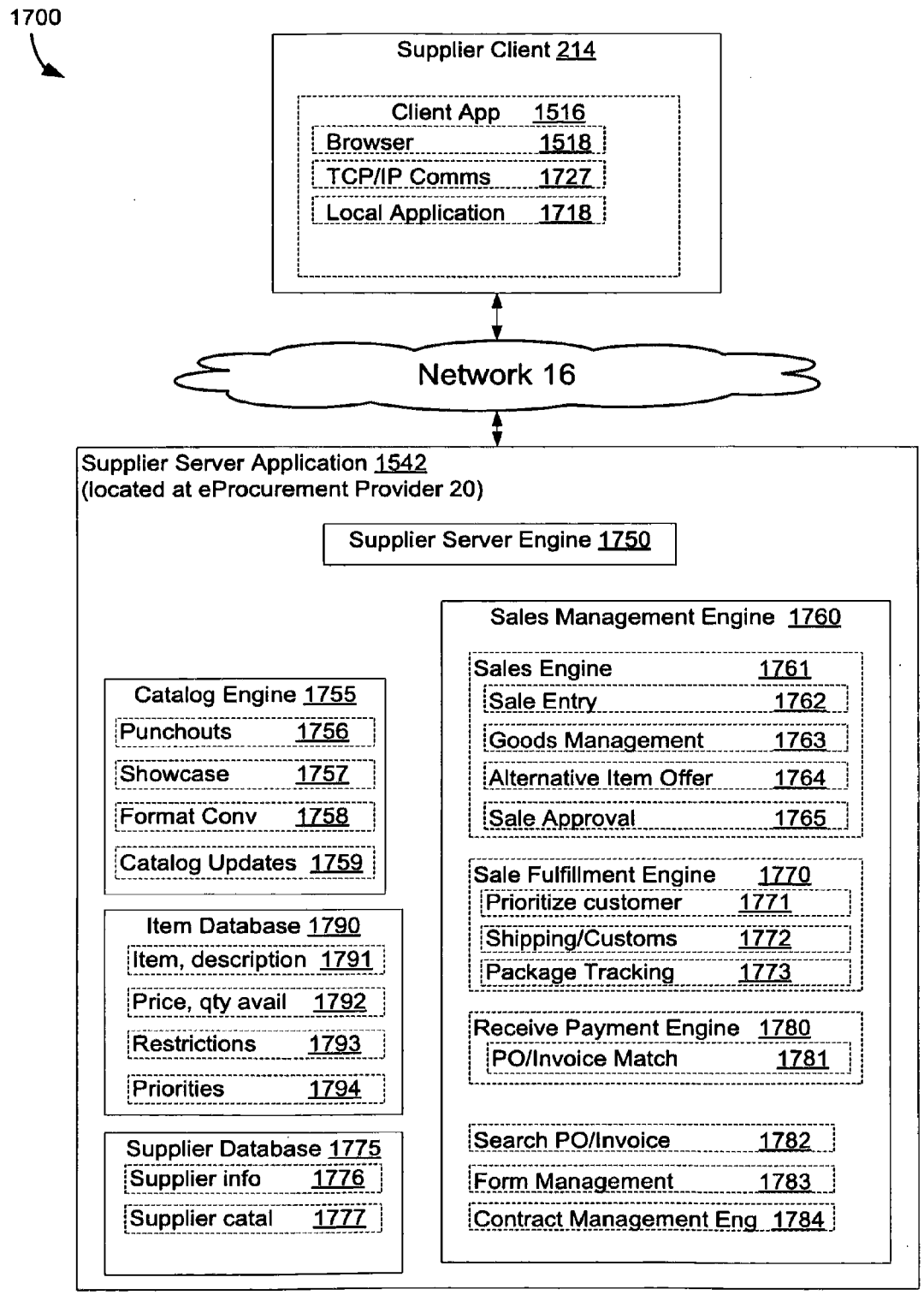
FIG. 17 illustrates the supplier client communicating over a network with the supplier server application to access the engines of the supplier server application.

FIG. 17 is a block diagram of the supplier 214 communicating with the supplier server application 1542, located at the electronic procurement provider 20, over a network 16. The supplier server engine 1750 may interface with or include the following modules, or a subset thereof:

- a catalog engine 1755 for managing each supplier catalog by implementing features for uploading catalog data, linking to the proper punch-out catalog(s) (1756) via the punch-out module 22*a* and back to the buyer, managing supplier showcase promotions and overlays (1757), converting supplier catalog data into a common data format (1758), and interfacing (1759) with the catalog management feature 1695 for updating the master product database or other accessible supplier-related database of the electronic procurement system 20;
- an item database 1790 for storing item specific information like, for example, item description (1791), price and quantity available (1792), restrictions (1793), or priorities (1794);
- a supplier database 1775 for storing supplier specific information like, for example, detailed supplier data (1776), or supplier catalog data (1777); or
- a sales management engine 1760 for managing the flow of sales orders and sales invoices from the appropriate buyer to the appropriate supplier (via the sale fulfillment engine 1770) (which may be prioritized (via the prioritize customer feature 1771) based on buyer/user hierarchy, privileges, or business rules), shipping (1772) and tracking (1773) the ordered item(s) to the appropriate buyer, interfacing with the search engine 22 to locate an appropriate purchase order and/or invoice (via the search PO/Invoice feature 1782), forwarding an invoice to the appropriate buyer (via the sale fulfillment engine 1770), receiving payment on an invoice from a buyer to the appropriate supplier (via the receive payment engine 1780 and using the PO/Invoice match feature 1781 for linking a sales order on the supplier user side with an outgoing invoice from the supplier), or sending event updates to the contract engine 1554 (via the contract management engine 1784).

Moreover, the sales management engine 1760 may also interface with a sales engine 1761 that receives sales orders (via an sale entry feature 1762), manage the items (e.g., goods and/or services) a buyer user requested via the sales order (via a goods management feature 1763), present alternative items to a buyer in lieu of items chosen for ordering that are not available according to inventory or business rules like a contractual agreement (via an alternative item present feature 1764), or approve a sales order if the item(s) is available and complies with business rules (via a sale approval feature 1765). In addition, the workflow management engine 1680 may also interface with a form management engine 1783 for receiving sales orders via user-created custom forms stored in a forms database 2300. Once received, the sales orders are then routed to the appropriate supplier user(s), respectively, according to workflow business rules. Then, the process of fulfilling the order is initiated and managed by the sales fulfillment engine 1770.

Figure 18:
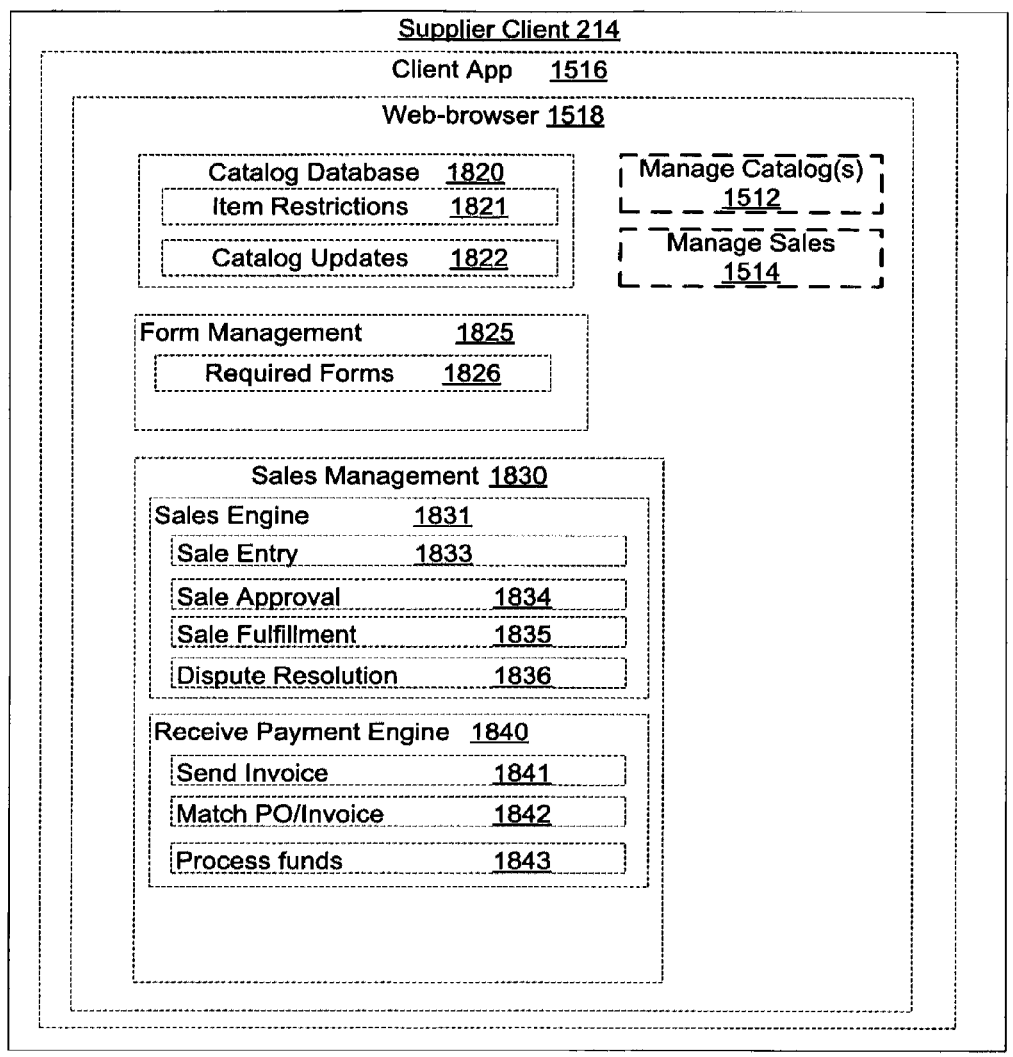
FIG. 18 illustrates the features and database accessible via the supplier client.

FIG. 18 is a block diagram of a supplier client 214. The client application 1516 may be a web-browser 1518 for the supplier user to use, or may be a standalone application. The web-browser 1518 or standalone application may display features for:

- managing catalog(s) 1512;
- managing sales 1514;
- interfacing with the catalog database 1820 to, for example, input or view item restrictions 1821, or to make catalog updates 1822;
- managing forms 1825 by, for example, customizing required forms 1826;
- managing sales 1830 by, for example, entering sales data 1833, approving sales 1834, fulfilling sales orders 1835, and addressing disputes that may arise 1836; or
- processing invoices and payments 1840 by, for example, sending invoices 1841, matching purchase orders to invoices 1842, or processing funds 1843.

Figure 19:
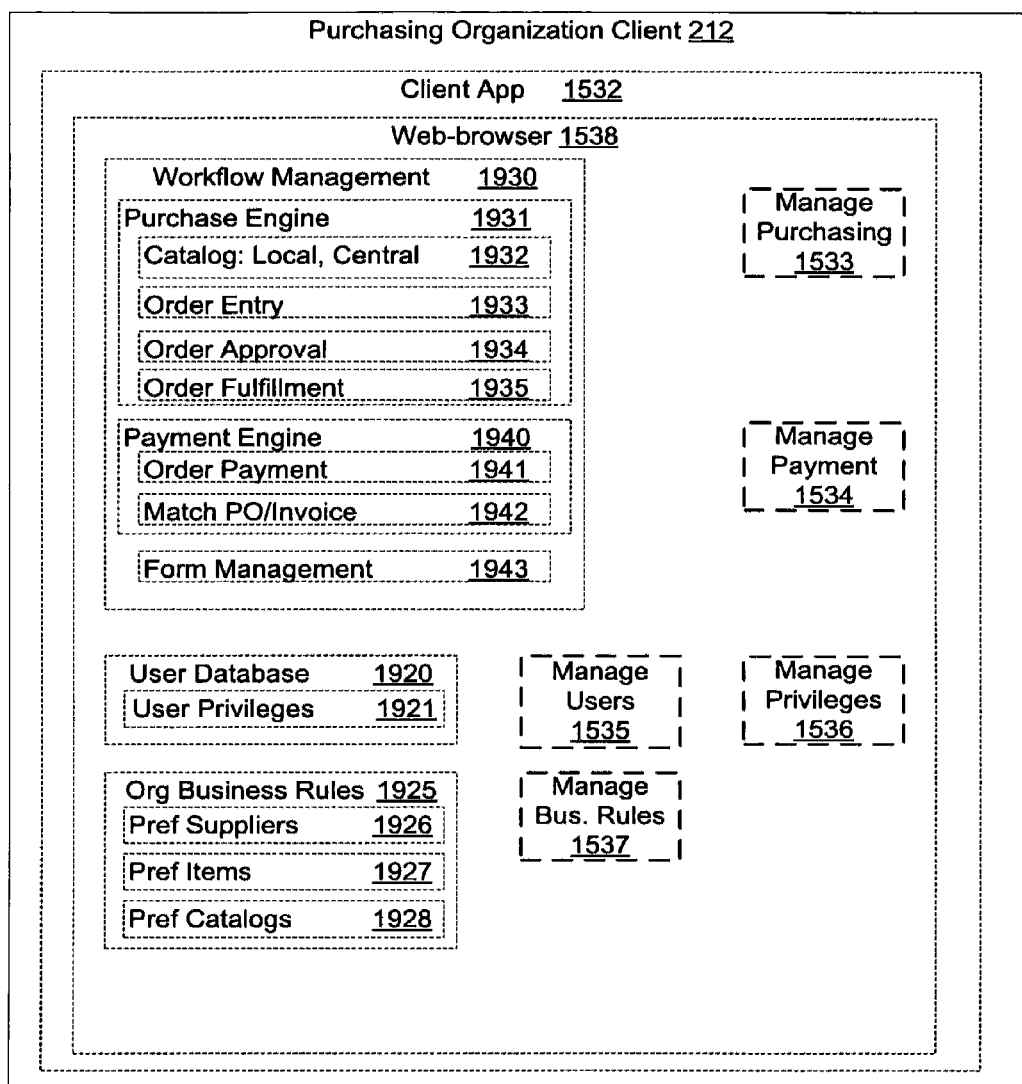
FIG. 19 illustrates the features and database accessible via the purchasing organization client.

FIG. 19 is a block diagram of a purchasing organization client 212. The client application 1532 may be a web-browser 1538 for the buyer user to use, or may be a standalone application. The web-browser 1538 or standalone application may display features to manage purchasing 1533, manage payment 1534, manage users 1535, manage privileges 1536, or manage business rules 1537. In addition, the web-browser 1538 or standalone application may also display features for:

- interfacing with the user database 1920 to, for example, access or define user privileges 1921;
- managing a buyer organization's business rules 1925 to, for example, define preferred suppliers 1926, items 1927, or catalogs 1928;
- managing workflows 1930 like, for example:
  - the flow of purchase requisitions within the buyer organization,
  - access to catalogs 1932 as may be necessary (via a purchase engine 1931) for forwarding a purchase requisition or order appropriately for approval,
  - order entry 1933, order approval 1934, order fulfillment 1935 (all via a purchase engine 1931), or
  - forwarding a sales order and/or invoice from the supplier to the appropriate buyer user (via the payment engine 1940 and using the PO/Invoice match feature 1942 for linking a purchase order on the buyer user side with an incoming invoice from the supplier), processing payment on the order's invoice 1941 (via the payment engine 1940), or forwarding of a user-customized form in accordance with business rules.

Figure 20:
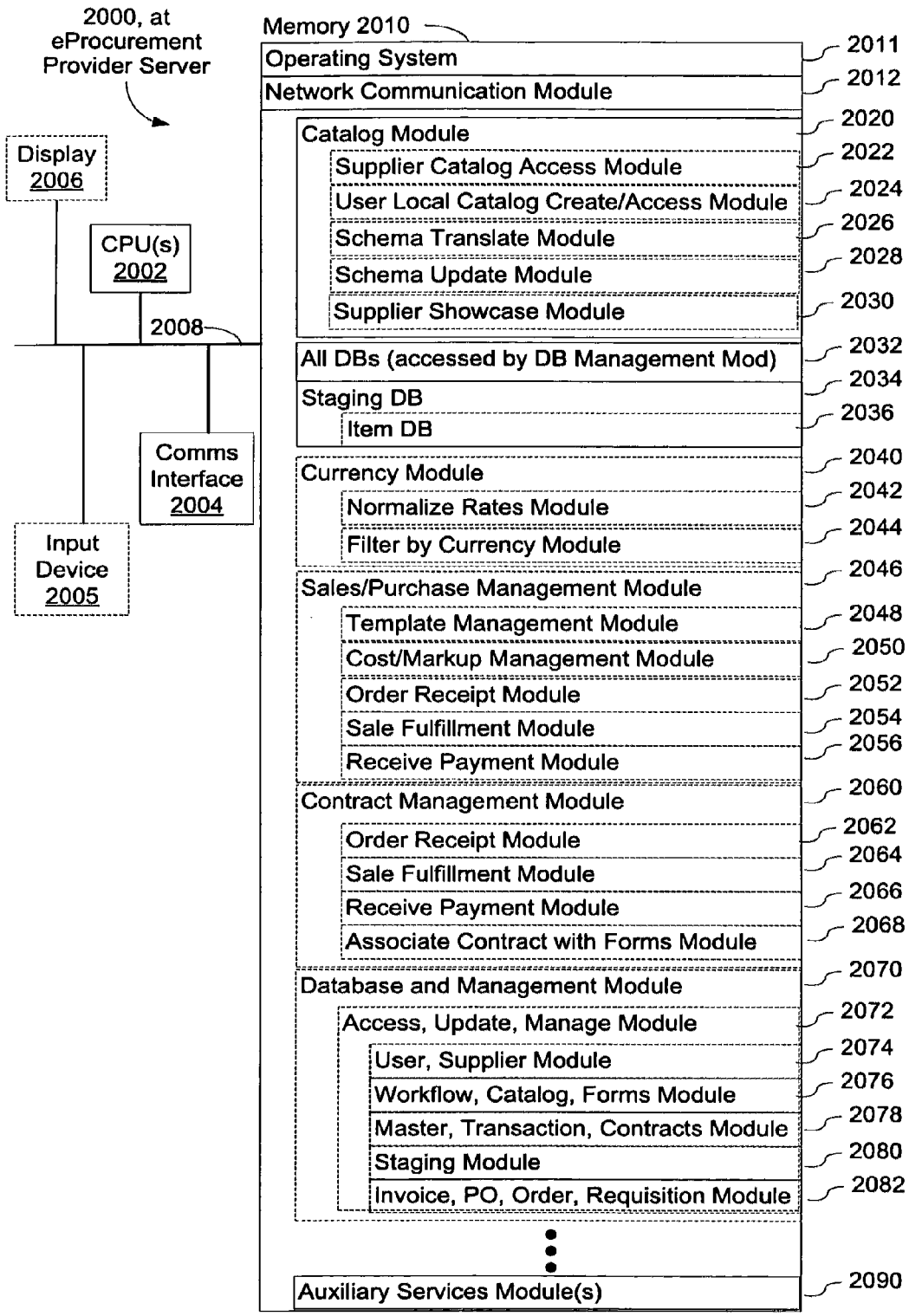
FIG. 20 illustrates a server system hosting an electronic procurement system running on the server.

FIG. 20 is a block diagram of a server system 2000. The server system 2000 generally includes one or more processing units (CPU's) 2002, one or more network or other communications interfaces 2004, memory 2010, and one or more communication buses 2008 for interconnecting these components. The communication buses 2008 may include circuitry (sometimes called a chipset) that interconnects and controls communications between system components. The server system 2000 may optionally include a user interface, for instance a display 2006 and an input device 2005. Memory 2010 may include high speed random access memory and may also include non-volatile memory, such as one or more magnetic disk storage devices. Memory 2010 may include mass storage that is remotely located from the central processing unit(s) 2002. Memory 2010 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

In some embodiments, memory 2010 stores the following programs, modules and data structures, or a subset thereof:

- an operating system 2011 that includes procedures for handling various basic system services and for performing hardware dependent tasks;
- a network communication module 2012 that is used for connecting the server system 2000 to other computers via the one or more communication network interfaces 2004 (wired or wireless) and one or more communication networks, such as the Internet, other wide area networks, local area networks, metropolitan area networks, and so on;

a catalog module 2020 that provides information and prices about products in hosted supplier product catalogs;

databases 2032;

a staging database 2034;

a currency module 2040;

a sales/purchase management module 2046;

a contract management module 2060;

a database and management module 2070; and auxiliary services modules 2090.

The catalog module 2020 may include the following modules, or a subset thereof:

supplier catalog access module 2022 for providing suppliers with access to their respective hosted supplier product catalogs;

a user local catalog create/access module 2024 for providing users (purchasing organizations) with local catalogs, in one embodiment generated by the respective users, from which the users can order products from suppliers who are not associated with hosted supplier product catalogs. In one embodiment, a supplier in the local catalogs is a local service provider (e.g. catering or a limousine service) from which a user wants to order products and services using the electronic procurement system;

a schema translate module 2026 for translating catalog data provided by suppliers or purchasing data provided by users into a common format associated with the electronic procurement system;

a schema update module 2028 for updating data in the common format associated with the electronic procurement system in response to changes in the respective catalog data or purchasing data; and a supplier showcase module 2030 for promoting certain suppliers to users of a purchasing organization, which in an embodiment may be performed according to business rules.

The databases 2032 may include all databases used by the system. These databases may in one embodiment be stored as logical partitions in a memory. These databases may in another embodiment be stored as tables in a larger database. These databases may in yet another embodiment be stored in separate memory or storage devices.

The staging database 2034 may comprise a catalog development environment (i.e., a staging area) for catalogs associated with suppliers. The data in the staging area may include complete catalogs, incomplete catalogs in development, partially uploaded catalogs, etc. A supplier can choose to make any or all portions of their respective catalog(s) in the staging database 'live' by syndicating the respective portions. A live catalog is one from which a user or purchasing organization may order items. The item database 2036, which may be a subset of the staging database 2034, contains descriptions, characteristics, price, pictures and other pertinent information for items listed in the catalogs.

The currency module 2040 may include the following modules, or a subset thereof:

a normalize rates module 2042 for normalizing currency rates visible by a purchaser of goods and/or services, purchasing from suppliers using different currencies to that of the purchaser, or by a supplier of goods and services selling to purchasers using different currencies to the supplier; and a filter by currency module for allowing purchasers to filter suppliers according to currencies they do business in, or allowing suppliers to filter purchasers similarly.

The sales/purchase management module 2046 may include the following modules, or a subset thereof:

a template management module 2048, for managing templates used by suppliers or purchasers of the system in placing orders for goods or services;

a cost/markup management module 2050 for determining characteristics (e.g., average cost) of inventory and managing the inventory based on the characteristics and a markup rate;

order receipt module 2052 for determining that an order has been received, and preparing to fulfill the order;

sale fulfillment module 2054 for fulfilling the order, including invoicing and shipping goods to the purchaser; and a receive payment module 2056 for receiving payment associated with an order (both for fulfilled and unfulfilled orders).

The contract management module 2060 may include the following modules, or a subset thereof:

order receipt module for 2062 for determining that an order has been received and matching the order to a contract;

sale fulfillment module 2064 for associating fulfillment of an order with a contract and verifying that the received order complies with the contract;

receive payment module 2066 for associating payments with a contract and verifying that appropriate discounts and terms of the contract are reflected in the payment;

associate contract with forms module 2068 for associating the contract with forms used by a supplier or purchaser, such that terms of the contract apply to the form.

The database and management module 2070 may include the following modules, or a subset thereof:

Access, update and manage database module 2072 for accessing, updating and managing databases in the system, including:

user (purchaser) and supplier module 2074, for managing user database 32 as described, which is accessed by a buyer user 12 or supplier user 14 through access module 21 as described;

workflow, catalog and forms module 2076, for managing workflow database 3000, catalog database 2400, and forms database 2300 as described;

master, transaction and contracts module 2078, for managing master database 236, transaction database 238 ad contracts database 3200 as described;

staging module 2080, for managing staging database 3100 as described;

invoice, purchase order, order, and requisition module 2082, for managing invoice databases 3300 and 3400, order database 2900 and 2500, requisition database 2700 as described.

The auxiliary services module may include additional features or services related to operation, management, security, authentication, maintenance or other aspects of the electronic procurement system.

Figure 21:
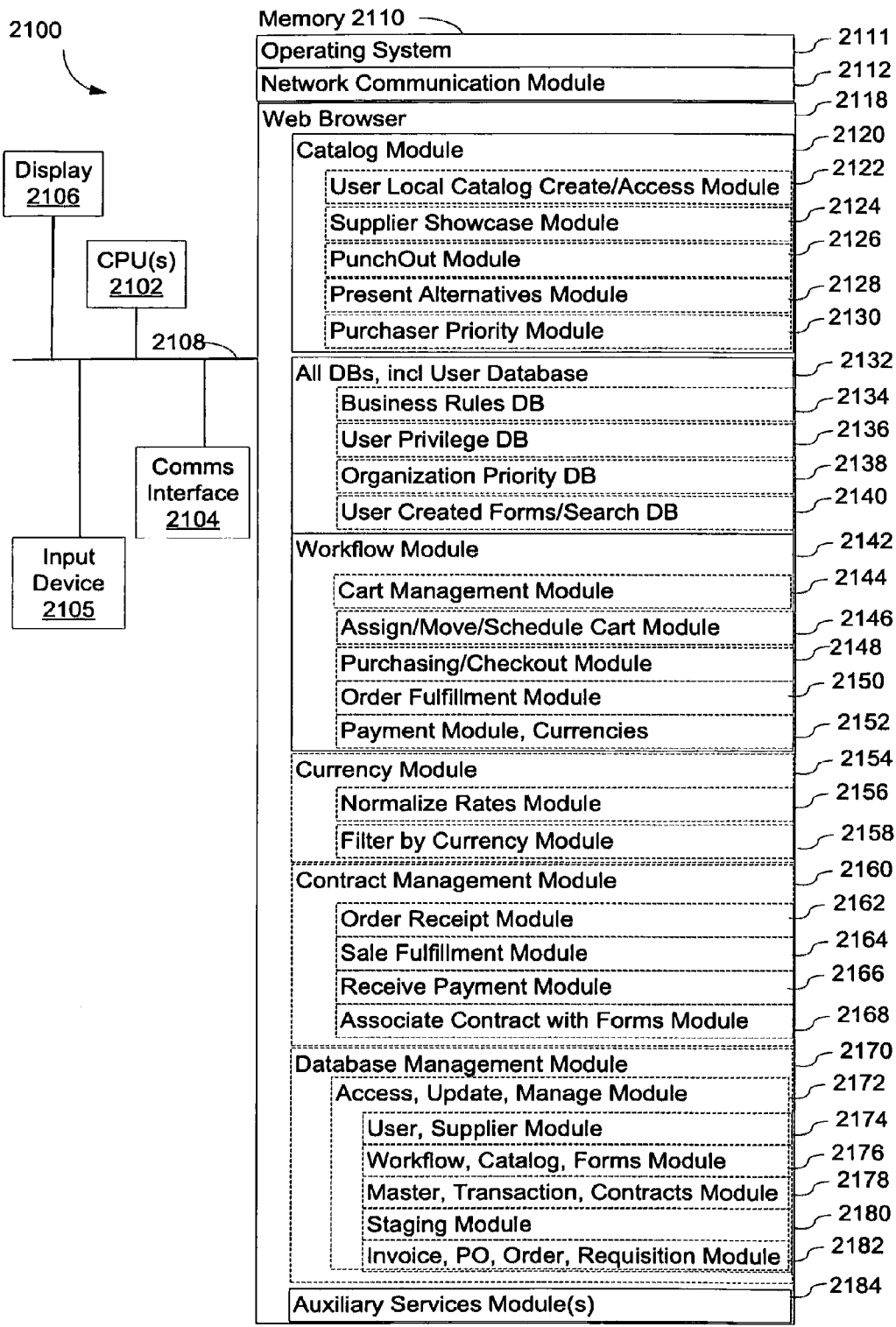
FIG. 21 illustrates a client system providing access to an electronic procurement system running on a server.

FIG. 21 is a block diagram of a server system 2100. The server system 2100 generally includes one or more processing units (CPU's) 2102, one or more network or other communications interfaces 2104, memory 2110, and one or more communication buses 2108 for interconnecting these components. The communication buses 2108 may include circuitry (sometimes called a chipset) that interconnects and controls communications between system components. The system 2100 may optionally include a user interface, for instance a display 2106 and an input device 2105. Memory 2110 may include high speed random access memory and may also include non-volatile memory, such as one or more magnetic, optical, or solid state disk storage devices. Memory 2110 may include mass storage that is remotely located from the central processing unit(s) 2102. Memory 2110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

In some embodiments, memory 2110 stores the following programs, modules and data structures, or a subset thereof:

- an operating system 2111 that includes procedures for handling various basic system services and for performing hardware dependent tasks;
- a network communication module 2112 that is used for connecting the server 2000 to other computers via the one or more communication network interfaces 2004 (wired or wireless) and one or more communication networks, such as the Internet, other wide area networks, local area networks, metropolitan area networks, and so on;
- a web browser 2118 or other tool for providing client access and visibility to the electronic procurement system, where in some embodiments some or all of the operations of the electronic procurement system are performed at a server, and in some embodiments some of the operations of the electronic procurement system are performed at the client;
- a catalog module 2120 that provides information and prices about products in hosted supplier product catalogs;
- databases 2132;
- a workflow module 2142;
- a currency module 2154;
- a contract management module 2160;
- a database management module 2170; and
- auxiliary services modules 2184.

The catalog module 2120 may include the following modules, or a subset thereof:

- a user local catalog create/access module 2122, in some embodiments similar to module 2024, for providing users (purchasing organizations) with local catalogs, in one embodiment generated by the respective users, from which the users can order products from suppliers who are not associated with hosted supplier product catalogs. In one embodiment, a supplier in the local catalogs is a local service provider (e.g. catering) from which a user wants to order products and services using the electronic procurement system;
- a supplier showcase module 2124, in some embodiments similar to module 2030, for promoting certain suppliers to users of a purchasing organization, which in an embodiment may be performed according to business rules;
- a Punch Out module 2126 for providing access to a catalog or website separate from the hosted supplier product catalogs, and allowing a purchaser to purchase an item from that catalog or website, and process the purchase through the electronic purchasing system;
- a present alternatives module 2128, for presenting alternative items to a prospective purchaser upon determining that an item requested by the purchaser cannot be fulfilled or that a better item might be available; and
- a purchaser priority module 2130 for prioritizing purchasers or purchaser orders associated with a user or purchasing organization.

The databases 2132 may include all databases used by the system, both on the server side and client side. These databases may in one embodiment be stored as logical partitions in a memory. These databases may in another embodiment be stored as tables in a larger database. These databases may in yet another embodiment be stored in separate memory or storage devices. The databases may include the following databases or modules, or a subset thereof:

- business rules database 2134 for storing business rules associated with a user, purchasing organization or supplier, wherein in some embodiments the business rules may be set by a super-user or administrator associated with an organization;
- user privilege database 2136 for storing privileges associated with users, such as purchasing privileges, approval privileges, etc.;
- organization priority database 2138 for storing priority information associated with users or purchasing organizations in the electronic procurement system; and
- user created forms/search database 2140 for storing forms, search queries, etc associated with a user or purchasing organization, or associated with a supplier.

The workflow module 2142 may include the following modules, or a subset thereof:

- cart management module 2144 for allowing a user or organization to manage a shopping cart associated with the purchase of items;
- assign/move/schedule cart module 2146 for allowing a user or organization to assign a cart to another user, to move items from one cart to another (including a new) cart, and to schedule a cart for purchasing;
- purchasing/checkout module 2148 for allowing a user to checkout one or more carts and purchase the items in the one or more carts;
- order fulfillment module 2150 for verifying that an order has been received and processed for fulfillment, wherein in some embodiments this may be similar to sale fulfillment module 2054 for fulfilling the order; and
- payment module/currencies 2152 for processing payment for an order, including converting currencies if necessary.

The currency module 2154 may include the following modules, or a subset thereof:

- a normalize rates module 2156 (in some embodiments similar to module 2042) for normalizing currency rates visible by a purchaser of goods and/or services, purchasing from suppliers using different currencies to that of the purchaser, or by a supplier of goods and services selling to purchasers using different currencies to the supplier; and
- a filter by currency module 2158 (in some embodiments similar to module 2044) for allowing a purchasers to filter suppliers according to currencies they do business in, or allowing suppliers to filter purchasers similarly.

The contract management module 2160 may include the following modules, or a subset thereof:

- an order receipt module 2162 (in some embodiments similar to module 2062) for determining that an order has been received and matching the order to a contract;
- a sale fulfillment module 2164 (in some embodiments similar to module 2064) for associating fulfillment of an order with a contract and verifying that the received order complies with the contract;

a receive payment module 2166 (in some embodiments similar to module 2066) for associating payments with a contract and verifying that appropriate discounts and terms of the contract are reflected in the payment; and an associate contract with forms module 2168 (in some embodiments similar to module 2068) for associating the contract with forms used by a supplier or purchaser, such that terms of the contract apply to the form.

The database management module 2170 may include the following modules, or a subset thereof:

Access, update and manage database module 2172 (in some embodiments similar to module 2072) for accessing, updating and managing databases in the system, including:

user (purchaser) and supplier module 2174 for managing user database 32 as described, which is accessed by a buyer user 12 or supplier user 14 through access module 21 as described;

workflow, catalog and forms module 2176 for managing workflow database 3000, catalog database 2400, and forms database 2300 as described;

master, transaction and contracts module 2178 for managing master database 236, transaction database 238 ad contracts database 3200 as described;

staging module 2080 for managing staging database 3100 as described; and an invoice, purchase order, order, requisition module 2182 for managing invoice databases 3300 and 3400, order database 2900 and 2500, requisition database 2700 as described.

The auxiliary services modules 2184 (in some embodiments similar to module 2090) may include additional features or services related to operation, management, security, authentication, maintenance or other aspects of the electronic procurement system.

Figure 22:
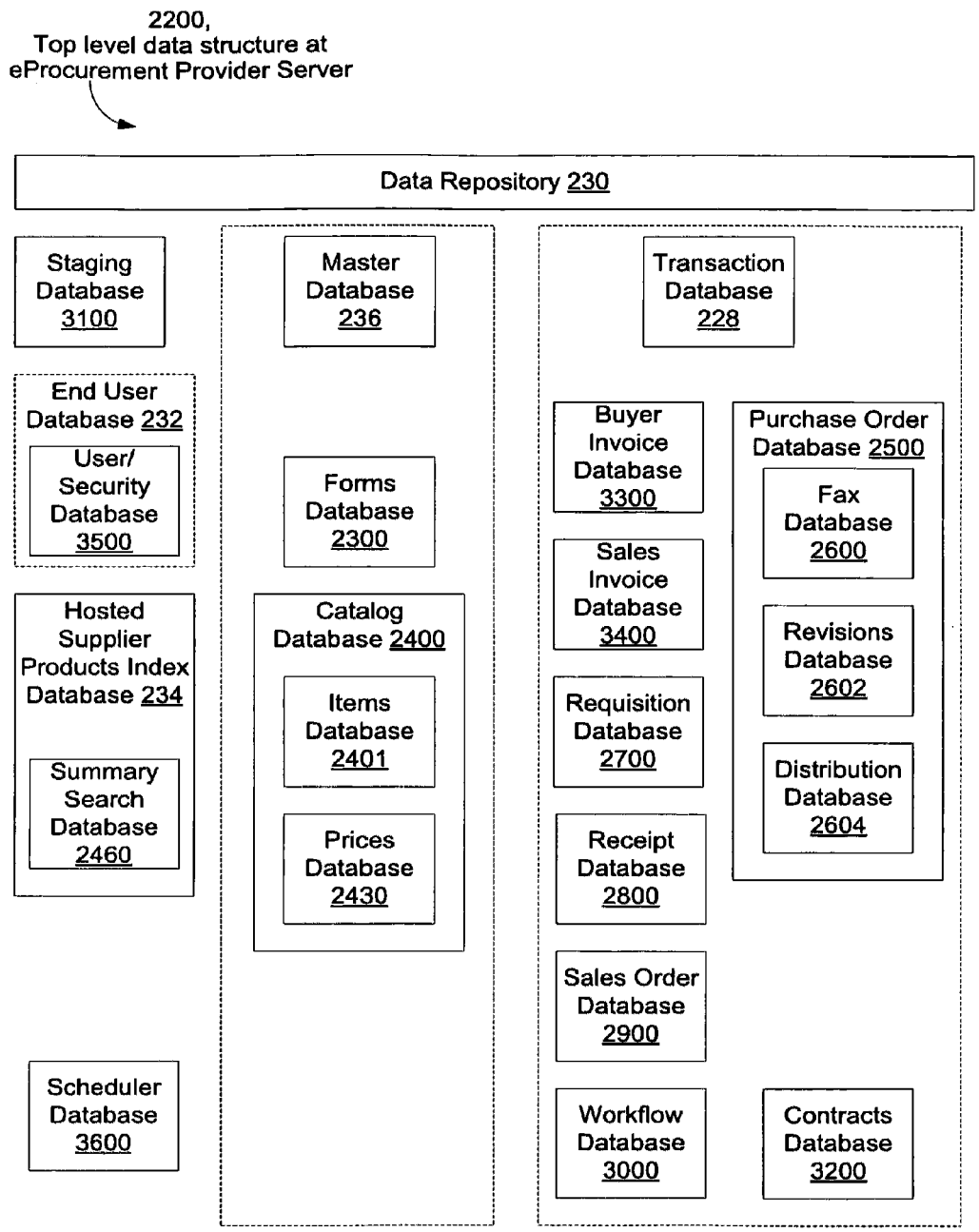
FIG. 22 illustrates a top-level data structure for electronic procurement system.

FIG. 22 shows a top level data structure 2200 at an electronic procurement provider server. The data structure includes data repository 230, end user database 232, hosted supplier product index 234, master product database 236, and transaction database 238. The end user database 232 may in an embodiment include user/security database 3500. The hosted product index 234 may in an embodiment include summary search database 2460. The data structure further includes staging database 3100, and scheduler database 3600.

The master database is associated with (and may in some embodiments include one or more of) a forms database 2300 and a catalog database 2400, which in an embodiment includes items database 2401 and prices database 2430.

The transaction database is associated with (and may in some embodiments include one or more of) buyer invoice database 3300, sales invoice database 3400, requisition database 2700, receipt database 2800, sales order database 2900, workflow database 3000, contracts database 3200, and purchase order database 2500. The purchase order database 2500 may in an embodiment include the fax database 2600, revisions database 2602, and distribution database 2604.

Figure 23:
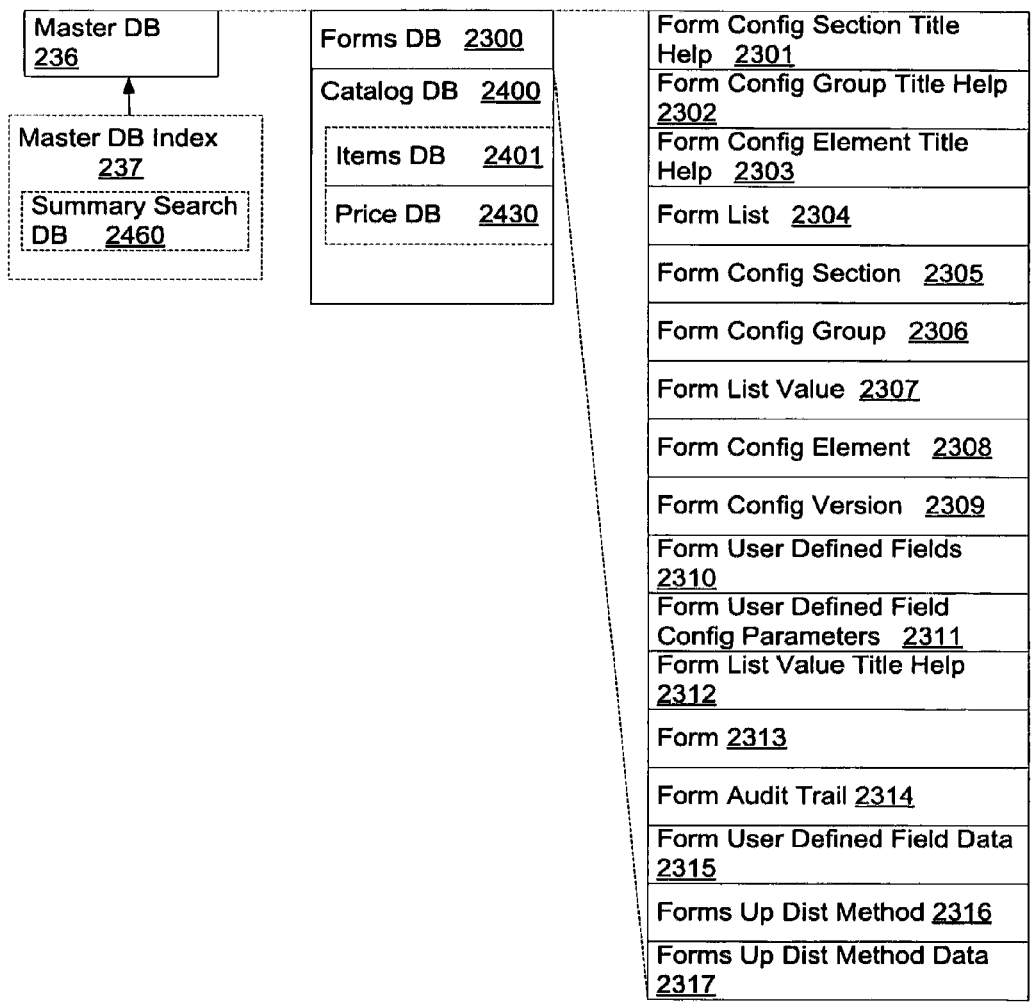
FIG. 23 illustrates a data structure for a master database, showing contents of a forms database.

FIG. 23 shows a database diagram 2300 including the master database 236, with master database index 237 indexing into the master database. Master database index 237 includes summary search database 2460.

In an embodiment, forms database 2300 includes one or more of:

Form Config Section Title Help 2301, in some embodiments help information for configuring a form section title;

Form Config Group Title Help 2302, in some embodiments help information for configuring a form group title;

Form Config Element Title Help 2303, in some embodiments help information for configuring a form element;

Form List 2304, in some embodiments a list of forms;

Form Config Section 2305, in some embodiments configuration of a form section;

Form Config Group 2306, in some embodiments configuration of a form group;

Form List Value 2307;

Form Config Element 2308, in some embodiments configuration of a form element;

Form Config Version 2309, in some embodiments configuration of a form version;

Form User Defined Fields 2310, in some embodiments user defined fields in a form;

Form User Defined Field Config Parameters 2311, in some embodiments parameters for configuring user defined fields in a form;

Form List Value Title Help 2312;

Form 2313;

Form Audit Trail 2314, in some embodiments a list of changes to a form for auditing purposes;

Forms User Defined Field Data 2315;

Forms Up Dist Method 2316, in some embodiments forms update distribution method details; and Forms Up Dist Method Data 2317, in some embodiments forms update distribution method data.

Figure 24:
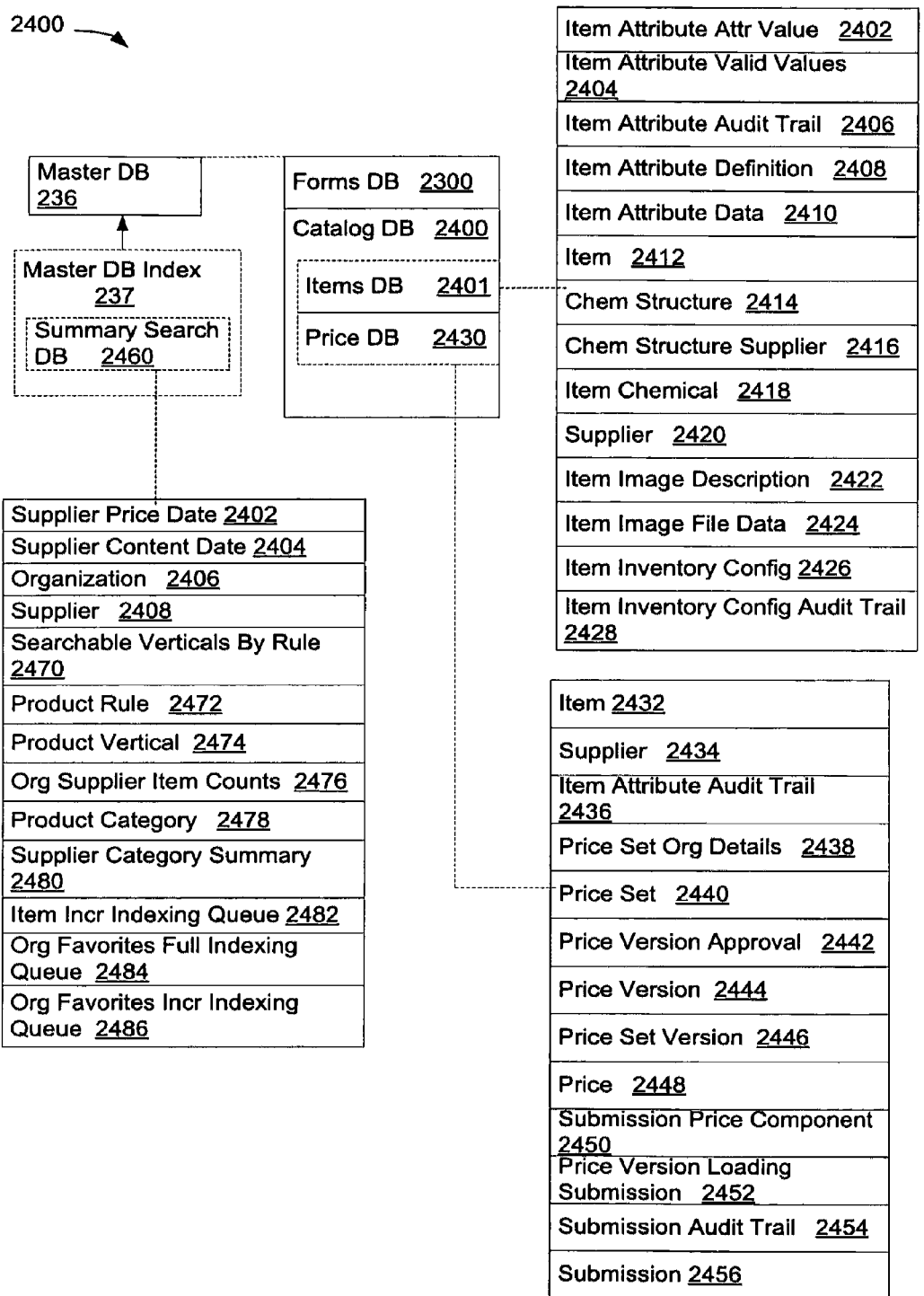
FIG. 24 illustrates a data structure for a master database, showing contents of a catalog database and search database for indexing the master database.

FIG. 24 shows a database diagram 2400 including the master database 236, with master database index 237 indexing into the master database. Master database index 237 includes summary search database 2460.

As described, the search architecture is based upon an indexed, tokenized-type implementation. This search architecture may include a search engine and a tokenization feature, both of which are invoked via processing modules executed on the custom database servers. Product elements such as the product name, industry, price, and availability, among others, are primarily used to generate a product search index (e.g., a token). The process of generating a product search index/token is called "tokenization" and may be executed by a tokenization feature invoked via a processing module. The indices/tokens generated as a result of the tokenization feature, which relate to various products of a multitude of suppliers, may be stored within and executed on the hosted supplier products catalog. Searching is actually executed against what are termed as "verticals." A vertical is designed similar to a drill-down menu architecture that consists of root nodes and leaf nodes, which are children of their respective roots.

The forms database 2300, and catalog database 2400 are associated with the master database. The catalog database includes items database 2401 and price database 2430.

In an embodiment, items database 2401 includes one or more of the following:

Item Attribute Attr Value 2402, in some embodiments a value for an item attribute;

Item Attribute Valid Values 2404, in some embodiments valid values value for an item attribute;

Item Attribute Audit Trail 2406, in some embodiments a list of changes to an item attribute for auditing purposes;

Item Attribute Definition 2408;

Item Attribute Data 2410;

Item 2412;

Chem Structure 2414, in some embodiments a description of a chemical structure that may be ordered through the procurement system;

Chem Structure Supplier 2416, in some embodiments a supplier of a chemical structure;

Item Chemical 2418, in some embodiments a commercial item of a chemical structure, e.g., a container of a certain chemical structure.

Supplier 2420;

Item Image Description 2422, in some embodiments a description of an image or picture associated with an item;

Item Image File Data 2424, in some embodiments an image data file (e.g., a JPEG image or GIF image, as commonly used in web applications);

Item Inventory Config 2426, in some embodiments data for configuring inventory of an item; and Item Inventory Config Audit Trail 2428, in some embodiments a list of changes to data for configuring inventory of an item.

In an embodiment price database 2430 includes one or more of the following:

Item 2432, in some embodiments an item for which a price is stored in the price database;

Supplier 2434, in some embodiments a supplier associated with the item;

Item Attribute Audit Trail 2436, in some embodiments a list of changes to an attribute associated with an item, for which a price is stored in the price database;

Price Set Org Details 2438, in some embodiments details of an organization price;

Price Set 2440, in some embodiments a price for the item;

Price Version Approval 2442, in some embodiments approval for a version of a price associated with the item;

Price Version 2444, in some embodiments a version of a price associated with the item;

Price Set Version 2446;

Price 2448, in some embodiments a price for the item;

Submission Price Component 2450;

Price Version Loading Submission 2452;

Submission Audit Trail 2454, in some embodiments for auditing submissions; and Submission 2456.

In an embodiment summary search database 2460 includes one or more of the following:

Supplier Price Date 2402, in some embodiments a date associated with a supplier price;

Supplier Content Date 2404, in some embodiments a date associated with supplier content (e.g., description);

Organization 2406;

Supplier 2408, in some embodiments a supplier of an item;

Searchable Verticals By Rule 2470, in some embodiments supporting rule-based searching;

Product Rule 2472, in some embodiments a rule related to a product;

Product Vertical 2474, in some embodiments supporting product-based searching;

Org Supplier Item Counts 2476, in some embodiments a count of items stored at an organization supplier;

Product Category 2478, in some embodiments a category related to a product;

Supplier Category Summary 2480, in some embodiments a summary of a supplier category;

Item Incr Indexing Queue 2482, in some embodiments a queue for incrementally indexing items;

Org Favorites Full Indexing Queue 2484, in some embodiments a full-indexing queue for organizational favorites; and Org Favorites Incr Indexing Queue 2486, in some embodiments an incremental-indexing queue for organizational favorites.

Figure 25:
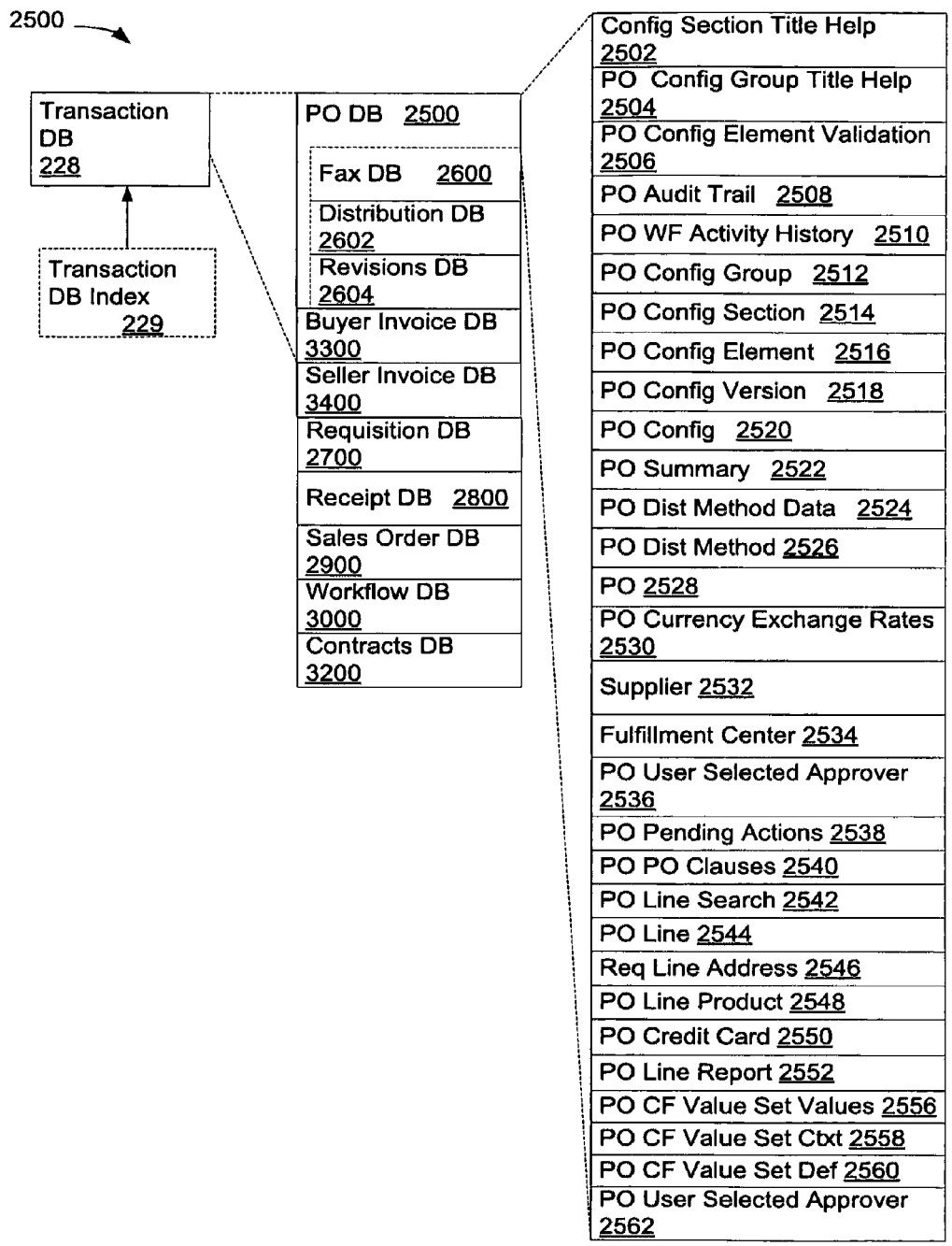
FIG. 25 illustrates a data structure for a transaction database, showing contents of a purchase order database.

FIG. 25 shows a database diagram 2500 including the transaction database 228, with transaction database index 229 indexing into the transaction database 228. Transaction database 228 is associated with (and in some embodiments includes one or more of) the following databases:

Purchase Order (PO) DB 2500, in some embodiments a database of purchase orders;

Fax DB 2600, in some embodiments a database of faxes;

Distribution DB 2602, in some embodiments for storing order distributions, where the order distribution features can include such features as facsimile or email confirmation, as well as other delivery methods, organized hierarchically to ensure purchase order delivery, as described;

Revisions DB 2604, in some embodiments for storing revisions to sales or purchase documents;

Buyer Invoice DB 3300, in some embodiments for storing buyer invoices;

Seller Invoice DB 3400, in some embodiments for storing seller invoices;

Requisition DB 2700, in some embodiments for storing purchase requisitions;

Receipt DB 2800, in some embodiments for storing receipts;

Sales Order DB 2900, in some embodiments for storing sales orders;

Workflow DB 3000, in some embodiments for storing workflow data relating to sales, purchases and transactions, etc.; and Contracts DB 3200, in some embodiments for storing contracts.

In an embodiment, Purchase Order (PO) DB 2500 includes one or more of:

Config Section Title Help 2502, in some embodiments help information for configuring a section title;

PO Config Group Title Help 2504, in some embodiments help information for configuring a purchase order group title;

PO Config Element Validation 2506, in some embodiments validation information for configuring a purchase order element;

PO Audit Trail 2508, in some embodiments a purchase order audit trail;

PO WF Activity History 2510, in some embodiments a purchase order workflow activity history;

PO Config Group 2512, in some embodiments configuration of a purchase order group;

PO Config Section 2514, in some embodiments configuration of a purchase order section;

PO Config Element 2516, in some embodiments configuration of a purchase order element;

PO Config Version 2518, in some embodiments configuration of a purchase order version;

PO Config 2520, in some embodiments configuration of a purchase order;

PO Summary 2522, in some embodiments a purchase order summary;

PO Dist Method Data 2524, in some embodiments data for a purchase order distribution method;

PO Dist Method 2526, in some embodiments a purchase order distribution method;

PO 2528, in some embodiments a purchase order;

PO Currency Exchange Rates 2530;

Supplier 2532;

Fulfillment Center 2534;

PO User Selected Approver 2536, in some embodiments a user-selected approver for a purchase order;

PO Pending Actions 2538, in some embodiments pending actions relating to a purchase order;

PO PO Clauses 2540, in some embodiments clauses relating to a purchase order;

PO Line Search 2542, in some embodiments line search details relating to a purchase order;

PO Line 2544, in some embodiments a line of a purchase order;

Req Line Address 2546, in some embodiments an address line relating to a purchase requisition;

PO Line Product 2548, in some embodiments a product line relating to a purchase order;

PO Credit Card 2550, in some embodiments a credit card associated with a purchase order;

PO Line Report 2552, in some embodiments a report line relating to a purchase order;

PO CF Value Set Values 2556, in some embodiments to set the value of a custom field value in a purchase order;

PO CF Value Set Ctxt 2558, in some embodiments to set the context of a custom field value in a purchase order; and PO CF Value Set Def 2560, in some embodiments to set the definition of a custom field value in a purchase order; and PO User Selected Approver 2562, in some embodiments a user-selected approver of the purchase order.

Figure 26:
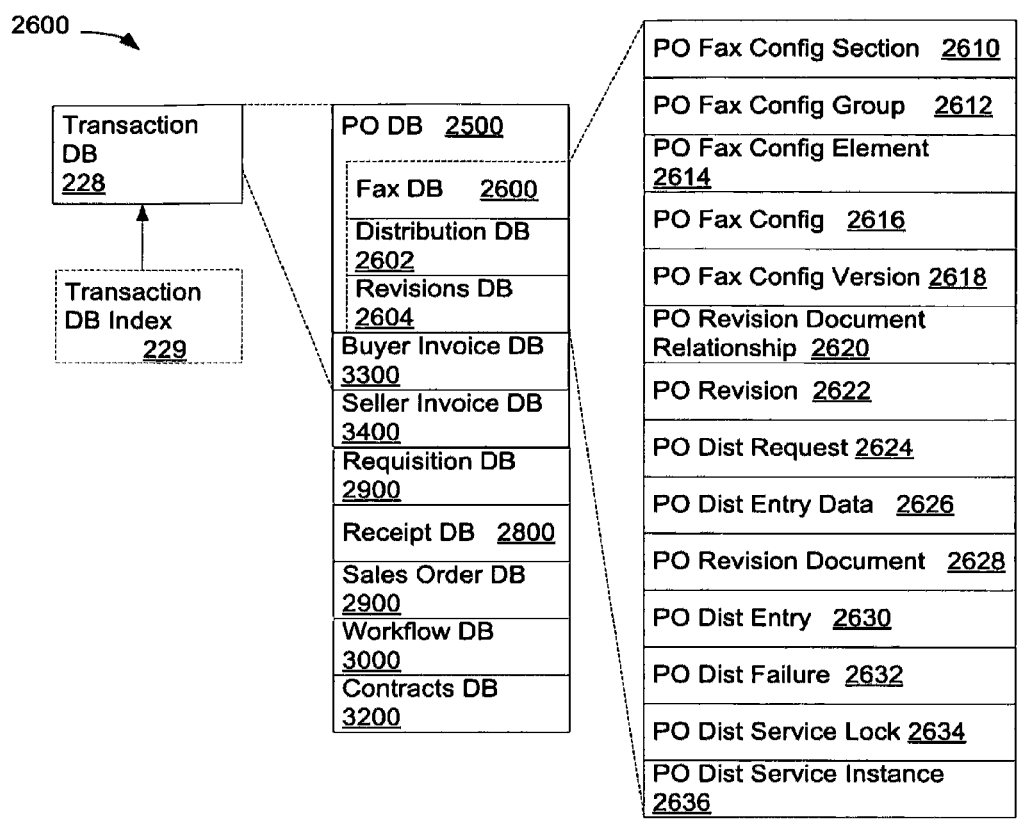
FIG. 26 illustrates a data structure for a transaction database, showing contents of a fax, distribution and revisions databases.

FIG. 26 shows a database diagram 2600 including the transaction database 228, with transaction database index 229 indexing into the transaction database. The fax database 2600, distribution database 2602 and revisions database 2604 are associated with the transactions database 228.

In an embodiment, the fax database 2600, distribution database 2602 and revisions database 2604 include one or more of:

PO Fax Config Section 2610, in some embodiments configuration of a purchase order fax section;

PO Fax Config Group 2612, in some embodiments configuration of a purchase order fax group;

PO Fax Config Element 2614, in some embodiments configuration of a purchase order fax element;

PO Fax Config 2616, in some embodiments configuration of a purchase order fax;

PO Fax Config Version 2618, in some embodiments configuration version of a purchase order fax;

PO Revision Document Relationship 2620, in some embodiments a document relationship of a purchase order revision PO Revision 2622, in some embodiments a purchase order revision;

PO Dist Request 2624, in some embodiments a purchase order distribution request;

PO Dist Entry Data 2626, in some embodiments purchase order entry data;

PO Revision Document 2628, in some embodiments a purchase order document revision;

PO Dist Entry 2630, in some embodiments entry of a purchase order distribution;

PO Dist Failure 2632, in some embodiments failure of a purchase order distribution;

PO Dist Service Lock 2634, in some embodiments locking of a purchase order distribution service; and PO Dist Service Instance 2636, in some embodiments an instance of a purchase order distribution service.

Figure 27:
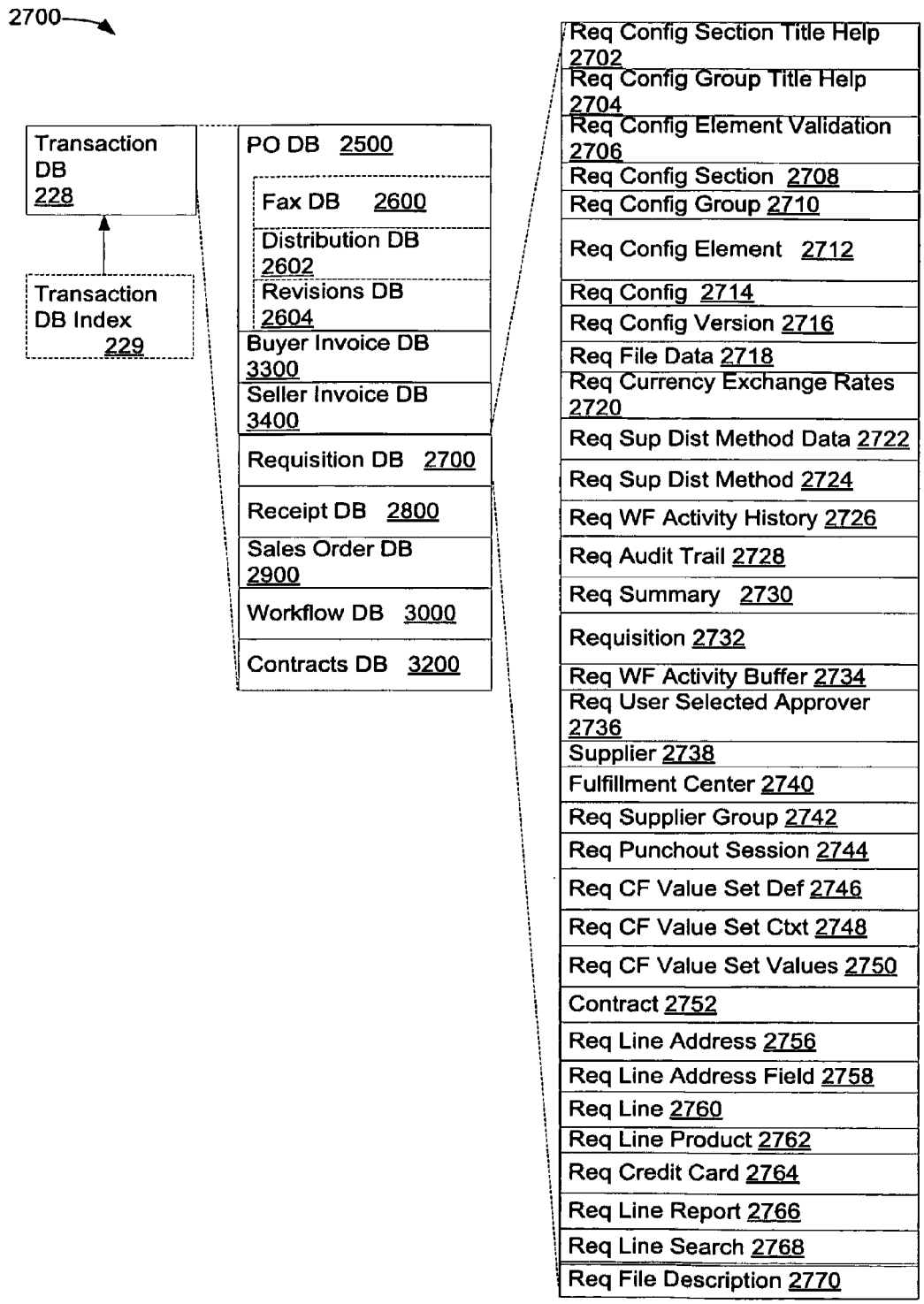
FIG. 27 illustrates a data structure for a transaction database, showing contents of a requisition database.

FIG. 27 shows a database diagram 2700 including the transaction database 228, and requisition database 2700 associated with the transaction database.

In an embodiment, requisition database 2700 includes one or more of:

Req Config Section Title Help 2702, in some embodiments help information for configuring a purchase requisition section title;

Req Config Group Title Help 2704, in some embodiments help information for configuring a purchase requisition group title;

Req Config Element Validation 2706, in some embodiments help information for configuring a purchase requisition element validation;

Req Config Section 2708, in some embodiments' configuration of a purchase requisition section;

Req Config Group 2710, in some embodiments configuration of a purchase requisition group;

Req Config Element 2712, in some embodiments configuration of a purchase requisition section element;

Req Config 2714, in some embodiments configuration of a purchase requisition;

Req Config Version 2716, in some embodiments configuration of a purchase requisition version;

Req File Data 2718, in some embodiments purchase requisition file data;

Req Currency Exchange Rates 2720, in some embodiments purchase requisition currency exchange rates;

Req Sup Dist Method Data 2722, in some embodiments data for a purchase requisition distribution method;

Req Sup Dist Method 2724, in some embodiments a purchase requisition distribution method;

Req WF Activity History 2726, in some embodiments purchase requisition workflow activity history;

Req Audit Trail 2728, in some embodiments changes to a purchase requisition for auditing purposes;

Req Summary 2730, in some embodiments a summary of a purchase requisition;

Requisition 2732;

Req WF Activity Buffer 2734, in some embodiments a purchase requisition workflow activity buffer;

Req User Selected Approver 2736, in some embodiments a purchase requisition user-selected approver;

Supplier 2738;

Fulfillment Center 2740, in some embodiments a fulfillment center for a purchase requisition;

Req Supplier Group 2742, in some embodiments a supplier group for a purchase requisition;

Req Punchout Session 2744, in some embodiments a punchout session for a purchase requisition;

Req CF Value Set Def 2746, in some embodiments for setting a definition of a purchase requisition custom field value;

Req CF Value Set Ctxt 2748, in some embodiments for setting a context of a purchase requisition custom field value;

Req CF Value Set Values 2750, in some embodiments for setting a value of a purchase requisition custom field value;

Contract 2752;

Req Line Address 2756, in some embodiments an address line for a purchase requisition;

Req Line Address Field 2758, in some embodiments an address field line for a purchase requisition;

Req Line 2760, in some embodiments a line for a purchase requisition;

Req Line Product 2762, in some embodiments a product line for a purchase requisition;

Req Credit Card 2764, in some embodiments a credit card for a purchase requisition;

Req Line Report 2766, in some embodiments a report line for a purchase requisition;

Req Line Search 2768; in some embodiments a search line for a purchase requisition; and Req File Description 2770, in some embodiments a file description for a purchase requisition.

Figure 28:
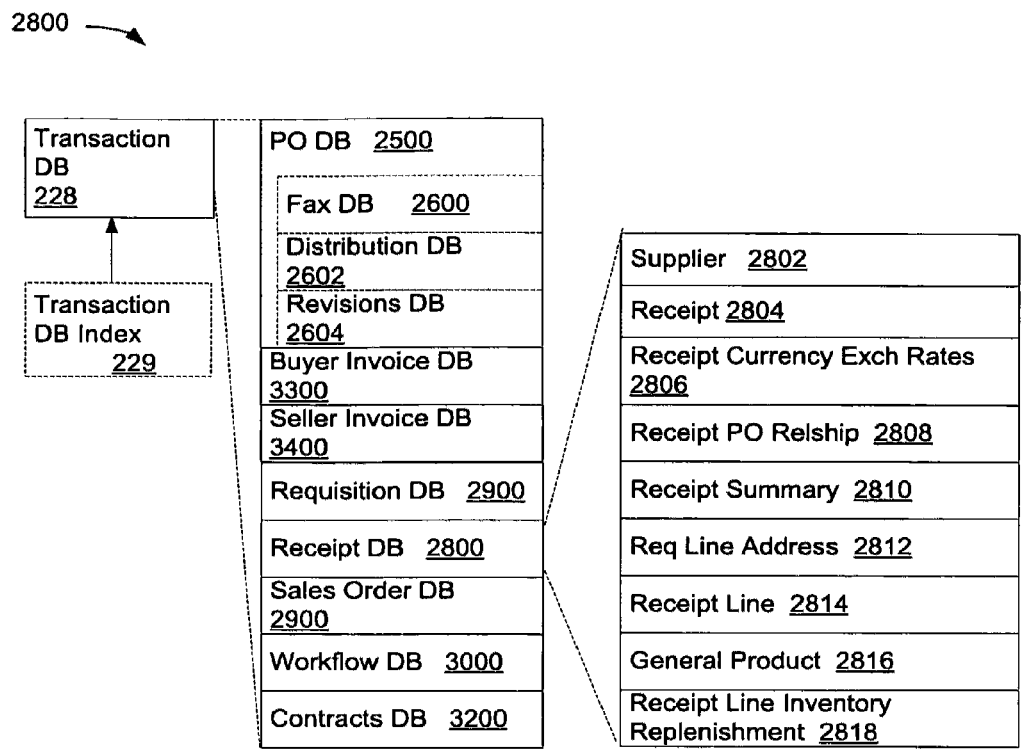
FIG. 28 illustrates a data structure for a transaction database, showing contents of a receipt database.

FIG. 28 shows a database diagram 2800 including the transaction database 228, and receipt database 2800 associated with the transaction database.

In an embodiment, receipt database 2800 includes one or more of:

Supplier 2802, in some embodiments a supplier for a receipt;

Receipt 2804;

Receipt Currency Exch Rates 2806, in some embodiments currency exchange rates associated with a receipt;

Receipt PO Relship 2808, in some embodiments a relationship between a purchase order and a receipt;

Receipt Summary 2810, in some embodiments a summary of a receipt;

Req Line Address 2812, in some embodiments an address line for a purchase requisition;

Receipt Line 2814;

General Product 2816; and

Receipt Line Inventory Replenishment 2818, in some embodiments an inventory replenishment line for a receipt.

Figure 29:
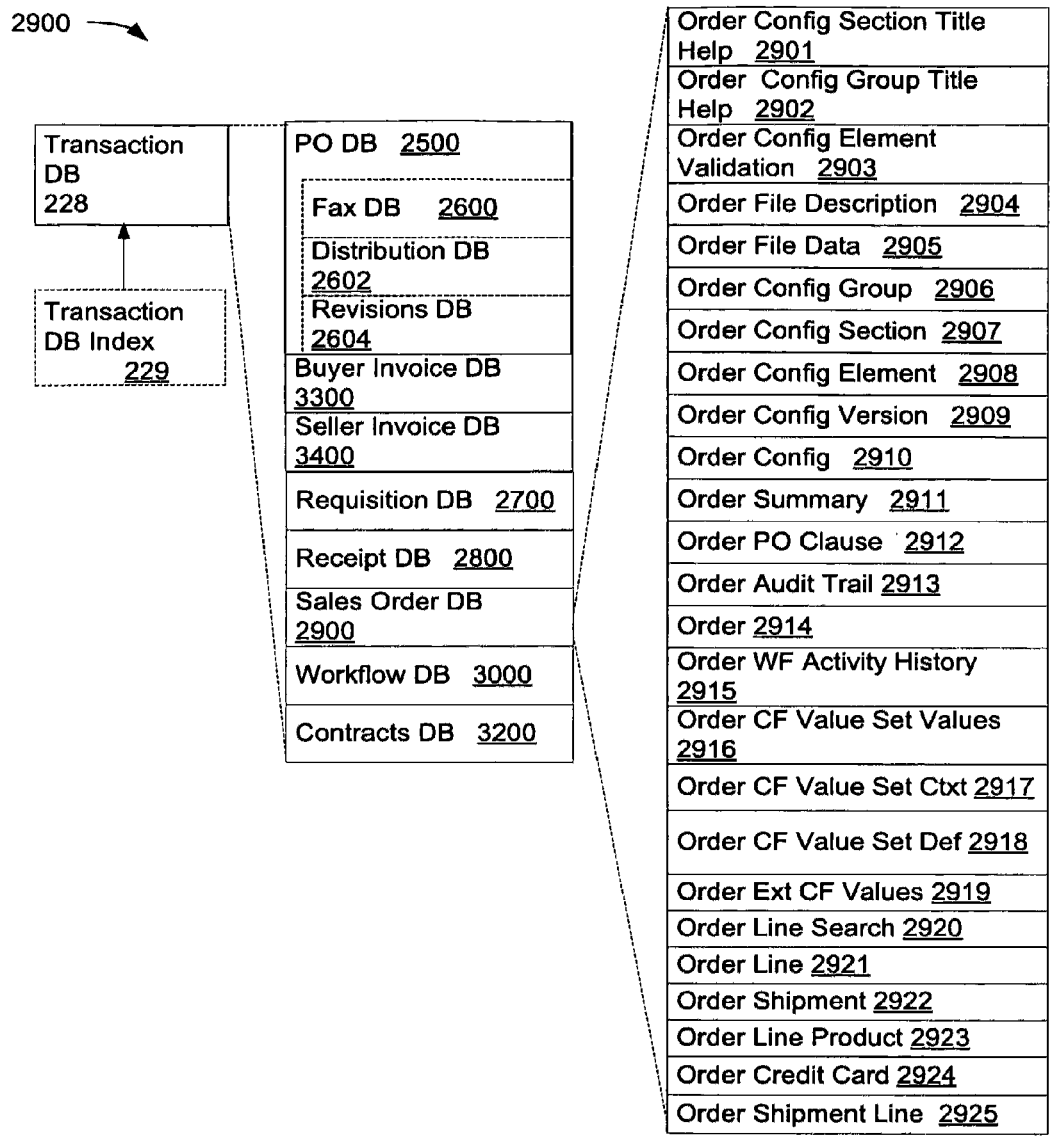
FIG. 29 illustrates a data structure for a transaction database, showing contents of a sales order database.

FIG. 29 shows a database diagram 2900 including the transaction database 228, and sales order database 2900 associated with the transaction database.

In some embodiments, the transaction database 228 and sales order database 2900 are accessed by transaction processing servers 223 and middleware/web methods servers 224.

In an embodiment, sales order database 2900 includes one or more of:

Order Config Section Title Help 2901, in some embodiments help information for configuring a sales order section title;

Order Config Group Title Help 2902, in some embodiments help information for configuring a sales order group title;

Order Config Element Validation 2903, in some embodiments validation for configuring a sales order element;

Order File Description 2904;

Order File Data 2905;

Order Config Group 2906, in some embodiments configuration of a sales order group;

Order Config Section 2907, in some embodiments configuration of a sales order section;

Order Config Element 2908, in some embodiments configuration of a sales order element;

Order Config Version 2909, in some embodiments configuration of a sales order version;

Order Config 2910;

Order Summary 2911;

Order PO Clause 2912, in some embodiments a purchase order clause;

Order Audit Trail 2913, in some embodiments changes for auditing a sales order;

Order 2914;

Order WF Activity History 2915, in some workflow activity history for a sales order;

Order CF Value Set Values 2916, in some embodiments values for a sales order custom field;

Order CF Value Set Ctxt 2917, in some embodiments context for a sales order custom field;

Order CF Value Set Def 2918, in some embodiments definition for a sales order custom field;

Order Ext CF Values 2919;

Order Line Search 2920, in some embodiments a search line for a sales order;

Order Line 2921;

Order Shipment 2922, in some embodiments a shipment for a sales order;

Order Line Product 2923, in some embodiments a product for a sales order;

Order Credit Card 2924, in some embodiments a credit card for a sales order; and Order Shipment Line 2925, in some embodiments a shipment line for a sales order.

Figure 30:
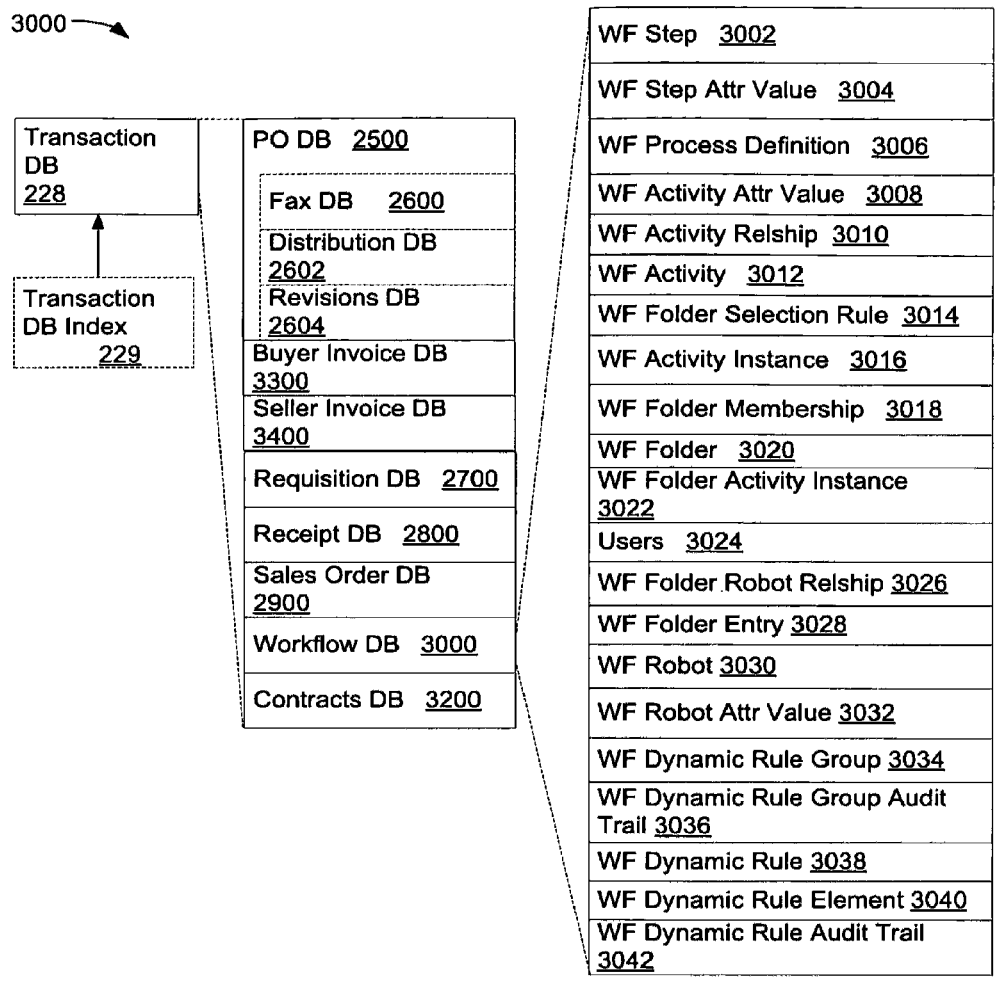
FIG. 30 illustrates a data structure for a transaction database, showing contents of a workflow database.

FIG. 30 shows a database diagram 3000 including the transaction database 228, and workflow database 3000 associated with the transaction database. In some embodiments, the transaction database 228 and workflow database 3000 are accessed by transaction processing servers 223 and middleware/web methods servers 224.

As described, supplier users can access the catalog via the middleware/web methods servers 224, which then forward the supplier access request to the custom database servers 222 and processing modules for execution, in order, for example, to update their own supplier data. End users may be able to search multiple suppliers within the catalog via the end user interface 212, subject to access rules set by the super user. End users may search the catalog for specific end user product requirements via the middleware/web methods servers 224, which forward the end user search request to custom database servers 222 and processing modules for execution. Subsequently, the end user may then invoke requisition and purchase orders via the middleware/web methods servers 224, which forward the end user order to the transaction processing servers 223 for execution.

In an embodiment, workflow database 3000 includes one or more of:

Workflow Step 3002;

Workflow Step Attr Value 3004, in some embodiments an attribute value for a workflow step;

Workflow Process Definition 3006;

Workflow Activity Attr Value 3008, in some embodiments an attribute value for a workflow activity;

Workflow Activity Relship 3010, in some embodiments an relationship for a workflow activity;

Workflow Activity 3012;

Workflow Folder Selection Rule 3014, in some embodiments a selection rule for a workflow folder;

Workflow Activity Instance 3016, in some embodiments an instance of workflow activity;

Workflow Folder Membership 3018, in some embodiments membership of a workflow folder;

Workflow Folder 3020;

Workflow Folder Activity Instance 3022, in some embodiments an activity instance for a workflow folder;

Users 3024;

Workflow Folder Robot Relship 3026;

Workflow Folder Entry 3028;

Workflow Robot 3030;

Workflow Robot Attr Value 3032;

Workflow Dynamic Rule Group 3034, in some embodiments an dynamic rule group associated with the workflow;

Workflow Dynamic Rule Group Audit Trail 3036, in some embodiments an audit trail for a dynamic rule group associated with the workflow;

Workflow Dynamic Rule 3038;

Workflow Dynamic Rule Element 3040, in some embodiments an element of a dynamic rule associated with the workflow; and Workflow Dynamic Rule Audit Trail 3042, in some embodiments an audit trail for a dynamic rule associated with the workflow.

Figure 31:
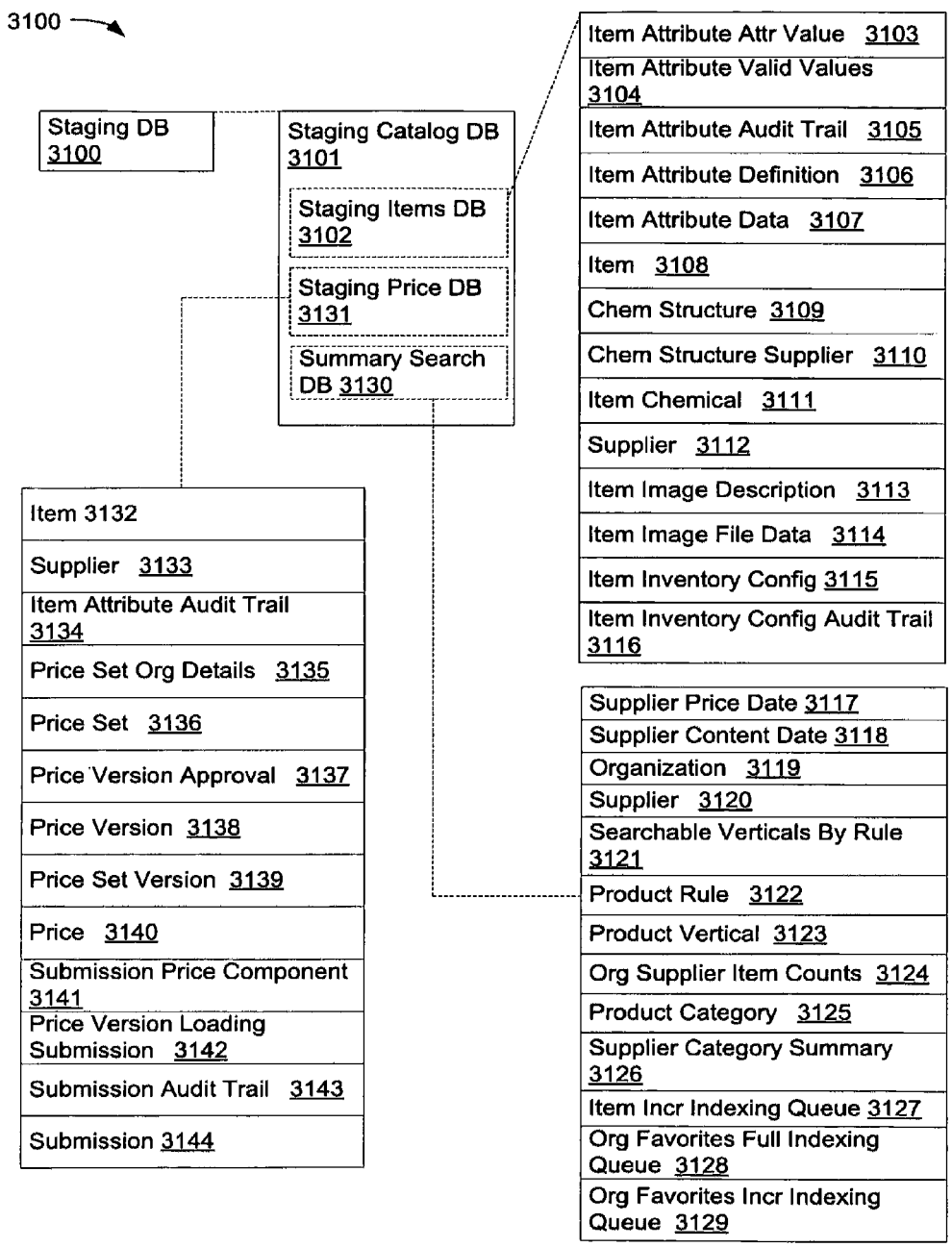
FIG. 31 illustrates a data structure for a staging database, showing contents of a staging catalog database.

FIG. 31 shows a database diagram 3100 including the staging database 3100, and staging catalog database 3101, associated with the staging database 3100.

In an embodiment, the staging catalog database 3101 includes one or more of a staging items database 3102, a staging price database 3131, and a summary search database 3130.

In an embodiment, staging items database 3102 includes one or more of:

Item Attribute Attr Value 3103, in some embodiments a value for an item attribute;

Item Attribute Valid Values 3104, in some embodiments a set of valid values for an item attribute;

Item Attribute Audit Trail 3105, in some embodiments an audit trail for an item attribute;

Item Attribute Definition 3106, in some embodiments a definition for an item attribute;

Item Attribute Data 3107, in some embodiments data for an item attribute;

Item 3108;

Chem Structure 3109, in some embodiments a description of a chemical structure that may be ordered through the procurement system;

Chem Structure Supplier 3110, in some embodiments a supplier of a chemical structure;

Item Chemical 3111 in some embodiments a commercial item of a chemical structure e.g., a container of a certain chemical structure;

Supplier 3112;

Item Image Description 3113, in some embodiments a description of an image or picture associated with an item;

Item Image File Data 3114, in some embodiments an image data file (e.g., a JPEG image or GIF image, as commonly used in web applications);

Item Inventory Config 3115, in some embodiments data for configuring inventory of an item; and Item Inventory Config Audi Trail 3116, in some embodiments a list of changes to data or an audit trail for configuring inventory of an item.

In an embodiment, staging price database 3131 includes one or more of:

Items 3132;

Supplier 3133;

Item Attribute Audit Trail 3134, in some embodiments a list of changes to data or an audit trail for an item attribute;

Price Set Org Details 3135, in some embodiments details of a price setting organization;

Price Set 3136, in some embodiments a set price;

Price Version Approval 3137, in some embodiments approval for a price version;

Price Version 3138;

Price Set Version 3139;

Price 3140;

Submission Price Component 3141;

Price Version Loading Submission 3142;

Submission Audit Trail 3143, in some embodiments a list of changes to data or an audit trail for a submission; and Submission 3144.

In an embodiment, summary search database 3130 includes one or more of:

Supplier Price Date 3117, in some embodiments a data associated with a supplier price;

Supplier Content Date 3118;

Organization 3119;

Supplier 3120;

Searchable Verticals by Rule 3121, in some embodiments supporting rule-based searching;

Product Rule 3122, in some embodiments a rule related to a product;

Product Vertical 3123, in some embodiments supporting product-based searching;

Org Supplier Item Counts 3124, in some embodiments a count of items stored at an organization supplier;

Product Category 3125, in some embodiments a category related to a product;

Supplier Category Summary 3126, in some embodiments a summary of a supplier category;

Item Incr Indexing Queue 3127, in some embodiments a queue for incrementally indexing items;

Org Favorites Full Indexing Queue 3128, in some embodiments a full-indexing queue for organizational favorites; and Org Favorites Incr Indexing Queue 3129, in some embodiments an incremental-indexing queue for organizational favorites.

Figure 32:
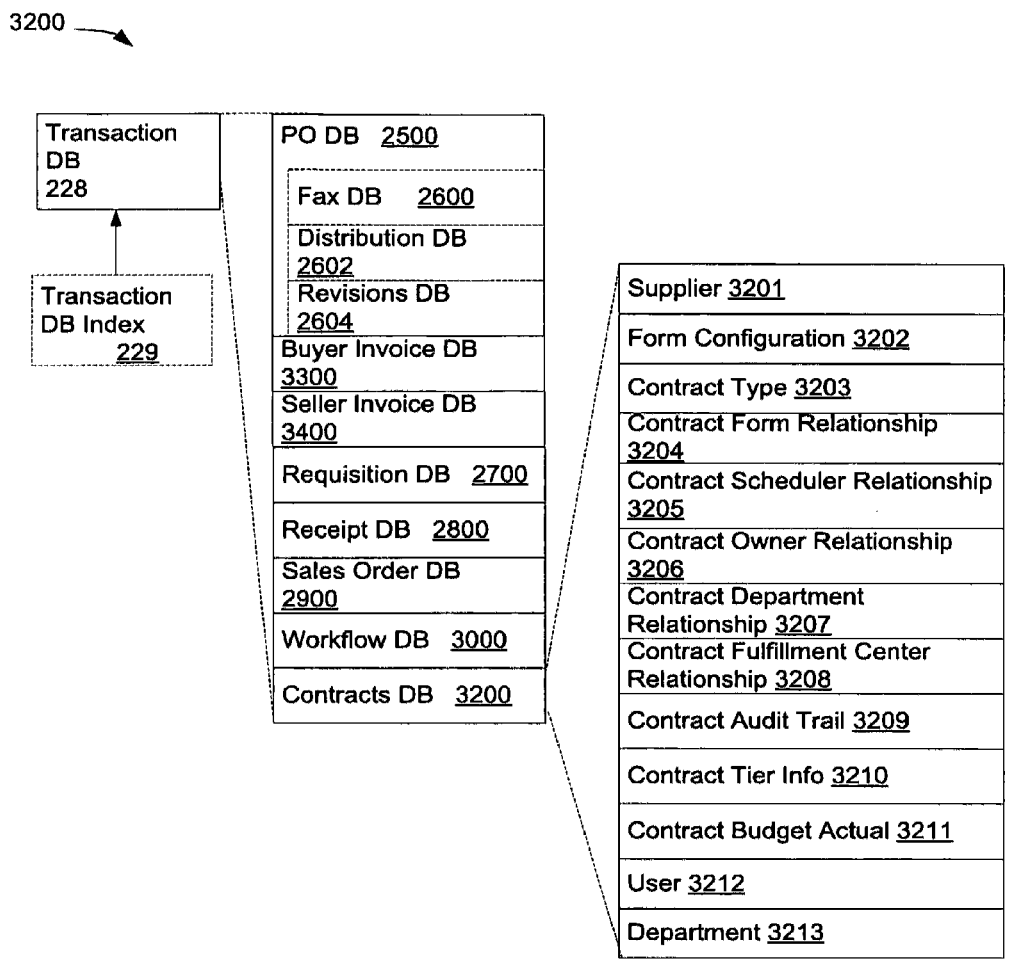
FIG. 32 illustrates a data structure for a transaction database, showing contents of a contracts database.

FIG. 32 shows a database diagram 3200 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the contracts database 3200 includes one or more of:

Supplier 3201;

Form Configuration 3202;

Contract Type 3203;

Contract Form Relationship 3204, in some embodiments an relationship between a contract and a form;

Contract Scheduler Relationship 3205, in some embodiments an relationship between a contract and a scheduler;

Contract Owner Relationship 3206, in some embodiments an relationship between a contract and an owner;

Contract Department Relationship 3207, in some embodiments an relationship between a contract and a department;

Contract Fulfillment Center Relationship 3208, in some embodiments an relationship between a contract and a fulfillment center;

Contract Audi Trail 3209, in some embodiments a list of changes to data or an audit trail for a contract;

Contract Tier Info 3210, in some embodiments tier information for a contract;

Contract Budget Actual 3211, in some embodiments an actual budget for a contract;

User 3212; and

Department 3213.

Figure 33:
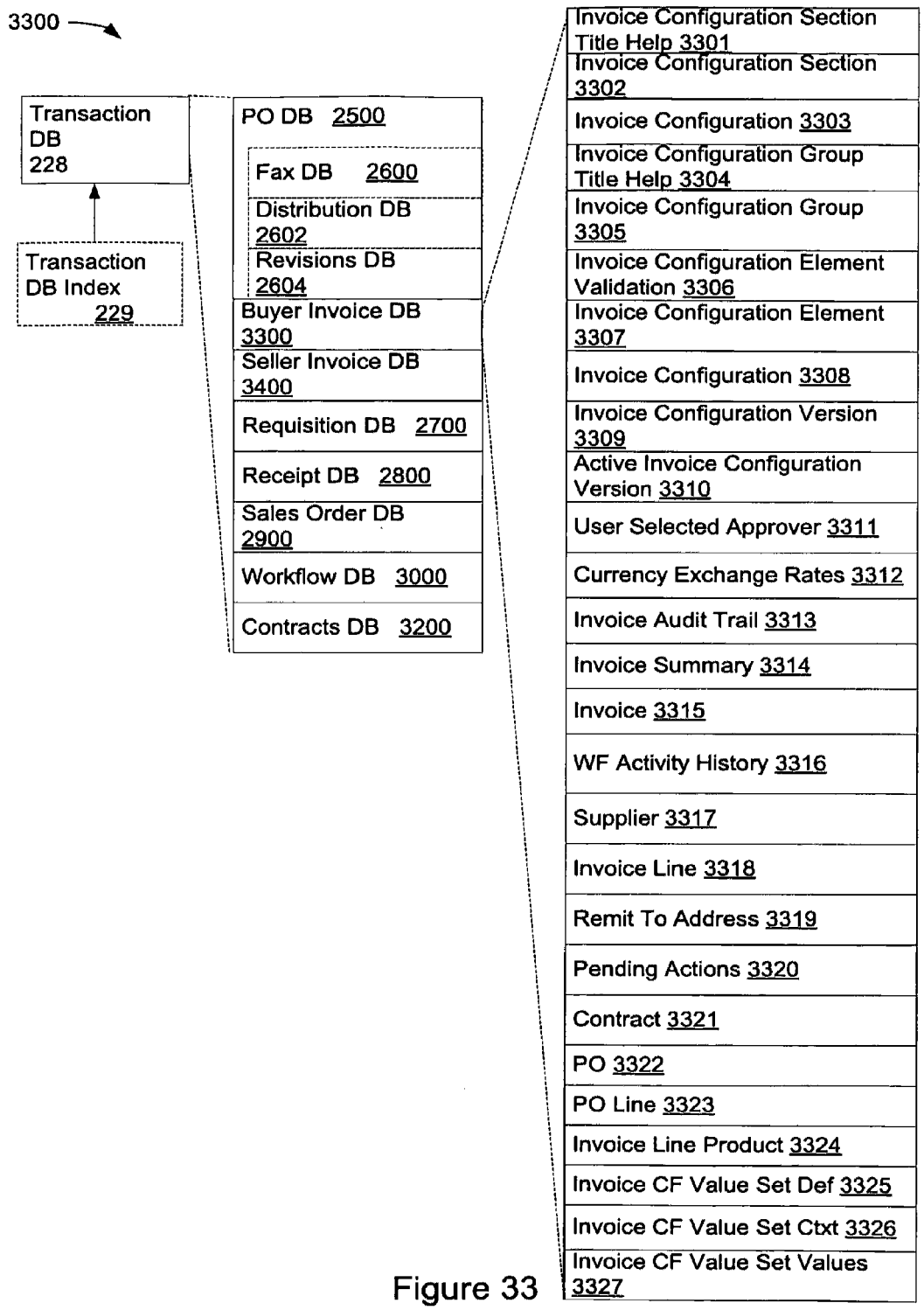
FIG. 33 illustrates a data structure for a transaction database, showing contents of a buyer invoice database.

FIG. 33 shows a database diagram 3300 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the buyer invoice database 3300 includes one or more of:

Invoice Configuration Section Title Help 3301, in some embodiments help information for configuring an invoice section title;

Invoice Configuration Section 3202, in some embodiments configuration of a invoice section;

Invoice Configuration 3203;

Invoice Configuration Group Title Help 3304, in some embodiments help information for configuring an invoice group title;

Invoice Configuration Group 3305, in some embodiments configuration of an invoice group;

Invoice Configuration Element Validation 3306;

Invoice Configuration Element 3307, in some embodiments configuration of an invoice element;

Invoice Configuration 3308;

Invoice Configuration Version 3309;

Active Invoice Configuration Version 3310;

User Selected Approver 3311;

Currency Exchange Rates 3312;

Invoice Audit Trail 3313, in some embodiments a list of changes (audit trail) to an item attribute for auditing purposes;

Invoice Summary 3314;

Invoice 3315;

Workflow Activity History 3316;

Supplier 3317;

Invoice Line 3318;

Remit to Address 3319;

Pending Actions 3320, in some embodiments pending actions relating to an invoice;

Contract 3321;

PO 3322, in some embodiments a purchase order;

PO Line 3323, in some embodiments a purchase order line;

Invoice Line Product 3324, some embodiments a product line relating to an invoice;

Invoice CF Value Set Def 3325, in some embodiments to set the definition of a custom field value in an invoice;

Invoice CF Value Set Ctxt 3326, in some embodiments to set the context of a custom field value in an invoice; and Invoice CF Value Set Value 3327, in some embodiments to set the value of a custom field value in an invoice.

Figure 34:
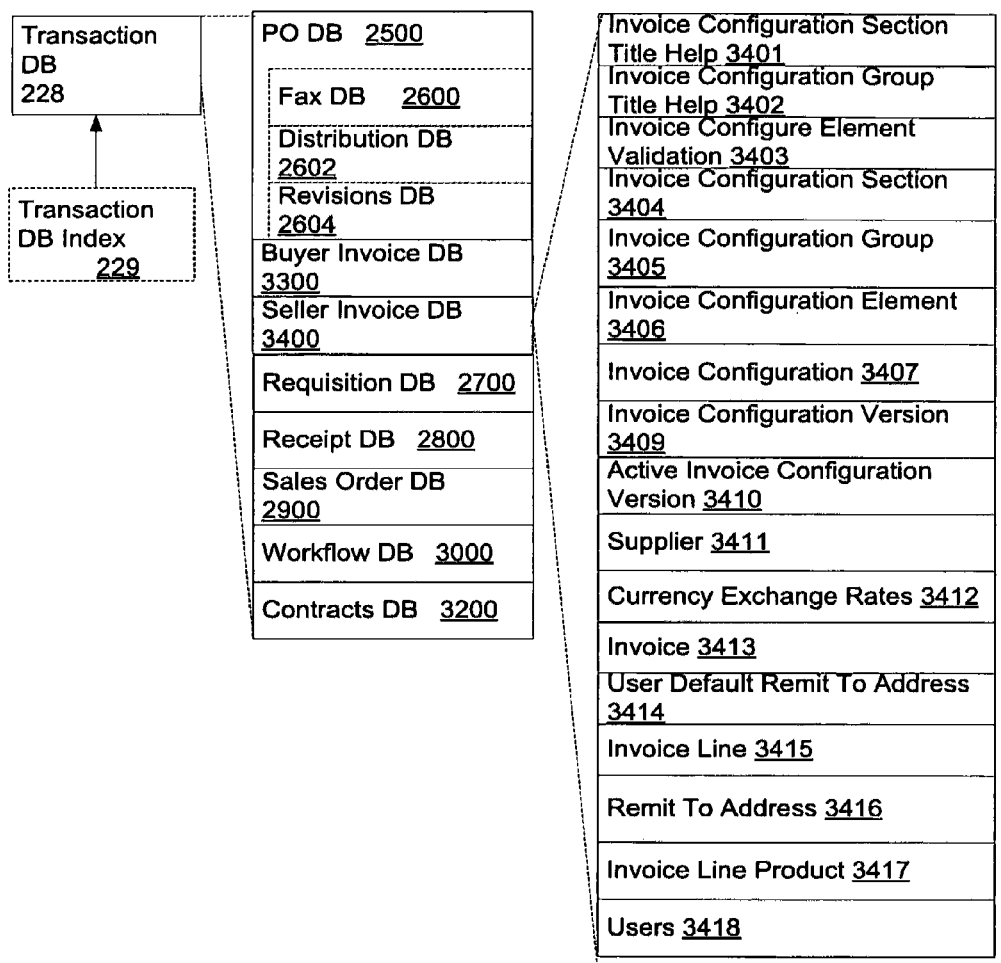
FIG. 34 illustrates a data structure for a transaction database, showing contents of a seller invoice database.

FIG. 34 shows a database diagram 3400 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the seller invoice database 3400 includes one or more of:

Invoice Configuration Section Title Help 3401, in some embodiments help information for configuring an invoice section title;

Invoice Configuration Group Title Help 3402, in some embodiments help information for configuring an invoice group title;

Invoice Configure Element Validation 3403;

Invoice Configuration Section 3404, in some embodiments configuration of an invoice section;

Invoice Configuration Group 3405, in some embodiments configuration of an invoice group;

Invoice Configuration Element 3406, in some embodiments configuration of an invoice element;

Invoice Configuration 3407, in some embodiments configuration of an invoice;

Invoice Configuration Version 3409, in some embodiments configuration version of an invoice;

Active Invoice Configuration Version 3410, in some embodiments configuration of an active invoice;

Supplier 3411;

Currency Exchange Rates 3412, in some embodiments currency exchange rates associated with an invoice;

Invoice 3413;

User Default Remit To Address 3414, in some embodiments a default remit-to address for a user associated with an invoice;

Invoice Line 3415;

Remit To Address 3416, in some embodiments a remit-to address associated with an invoice;

Invoice Line Product 3417; and

User 3418.

Figure 35:
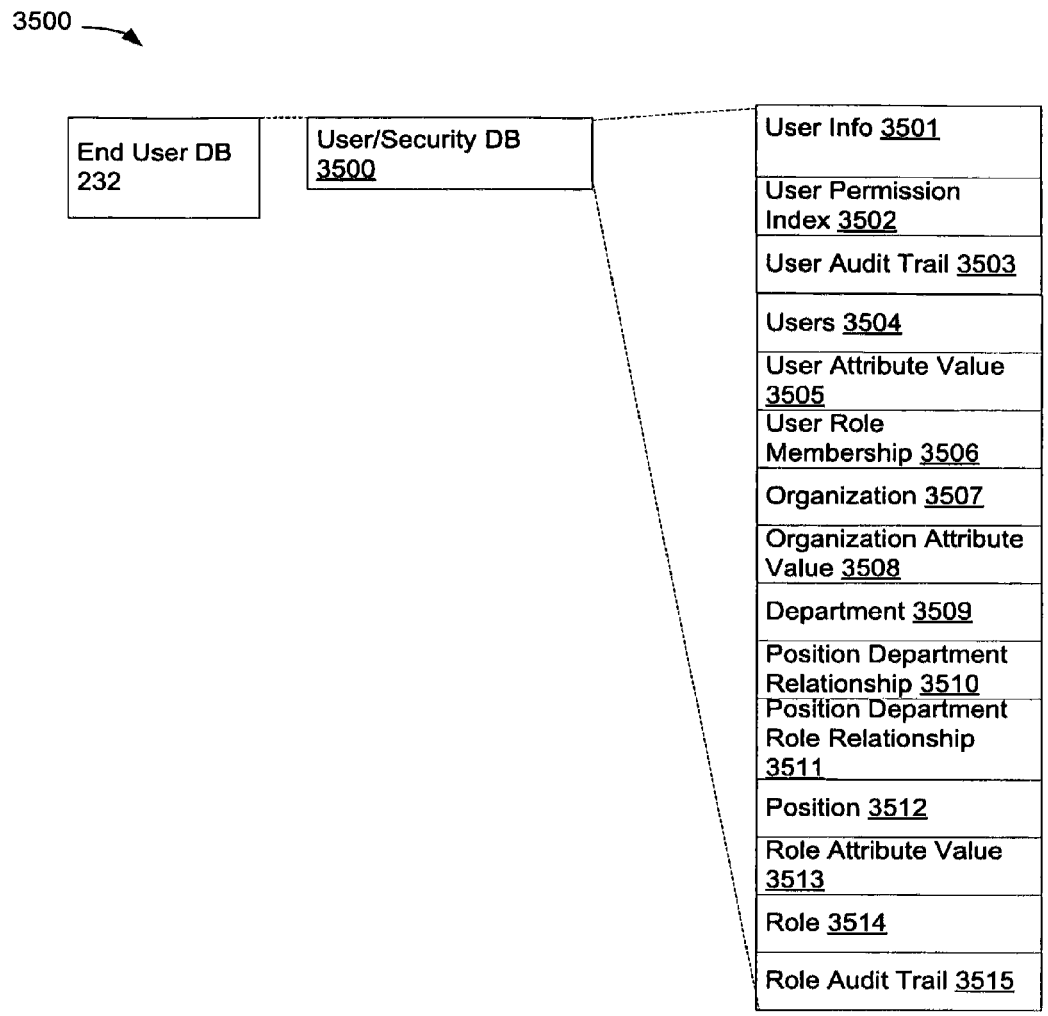
FIG. 35 illustrates a data structure for an end user database, showing contents of a user/security database.

FIG. 35 shows a database diagram 3500 including the end user database 232, associated with the user/security database 3500. In an embodiment, the user/security database 3500 includes one or more of:

User Info 3501, in some embodiments information relating to a user;

User Permission Index 3502, in some embodiments an index of permissions relating to a user;

User Audit Trail 3503, in some embodiments a list of changes (audit trail) for a user for auditing purposes;

Users 3504;

User Attribute Value 3505, in some embodiments the value of an attribute associated with a user;

User Role Membership 3506, in some embodiments membership associated with a user role;

Organization 3507;

Organization Attribute Value 3508, in some embodiments a value of an attribute associated with an organization;

Department 3509;

Position Department Relationship 3510, in some embodiments a relationship between a position and a department;

Position Department Role Relationship 3511, in some embodiments a relationship between a position and a department role;

Position 3512;

Role Attribute Value 3513, in some embodiments the value of an attribute associated with a role;

Role 3514; and

Role Audit Trail 3515, in some embodiments a list of changes (audit trail) for a role for auditing purposes.

Figure 36:
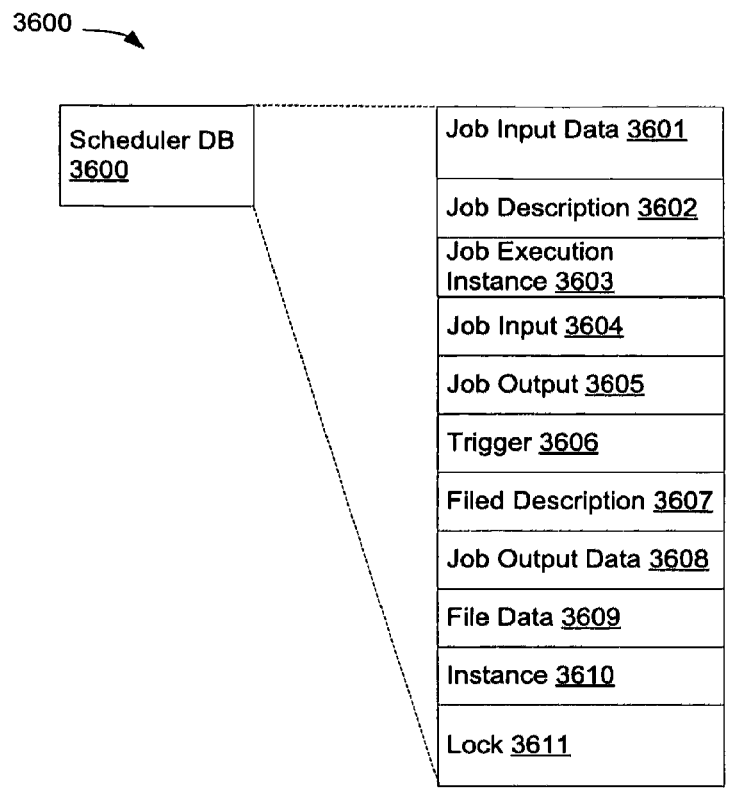
FIG. 36 illustrates a data structure for a scheduler database, showing contents of the scheduler database.

FIG. 36 shows a database diagram 3600 including the scheduler database 3600. In an embodiment, the scheduler database 3600 includes one or more of:

Job Input Data 3601, in some embodiments data relating to a job input;

Job Description 3602, in some embodiments a description relating to a job;

Job Execution Instance 3603, in some embodiments an execution instance relating to a job;

Job Input 3604;

Job Output 3605;

Trigger 3606;

Filed Description 3607;

Job Output Data 3608, in some embodiments data relating to a job output;

File Data 3609;

Instance 3610; and

Lock 3611.

Figure 37:
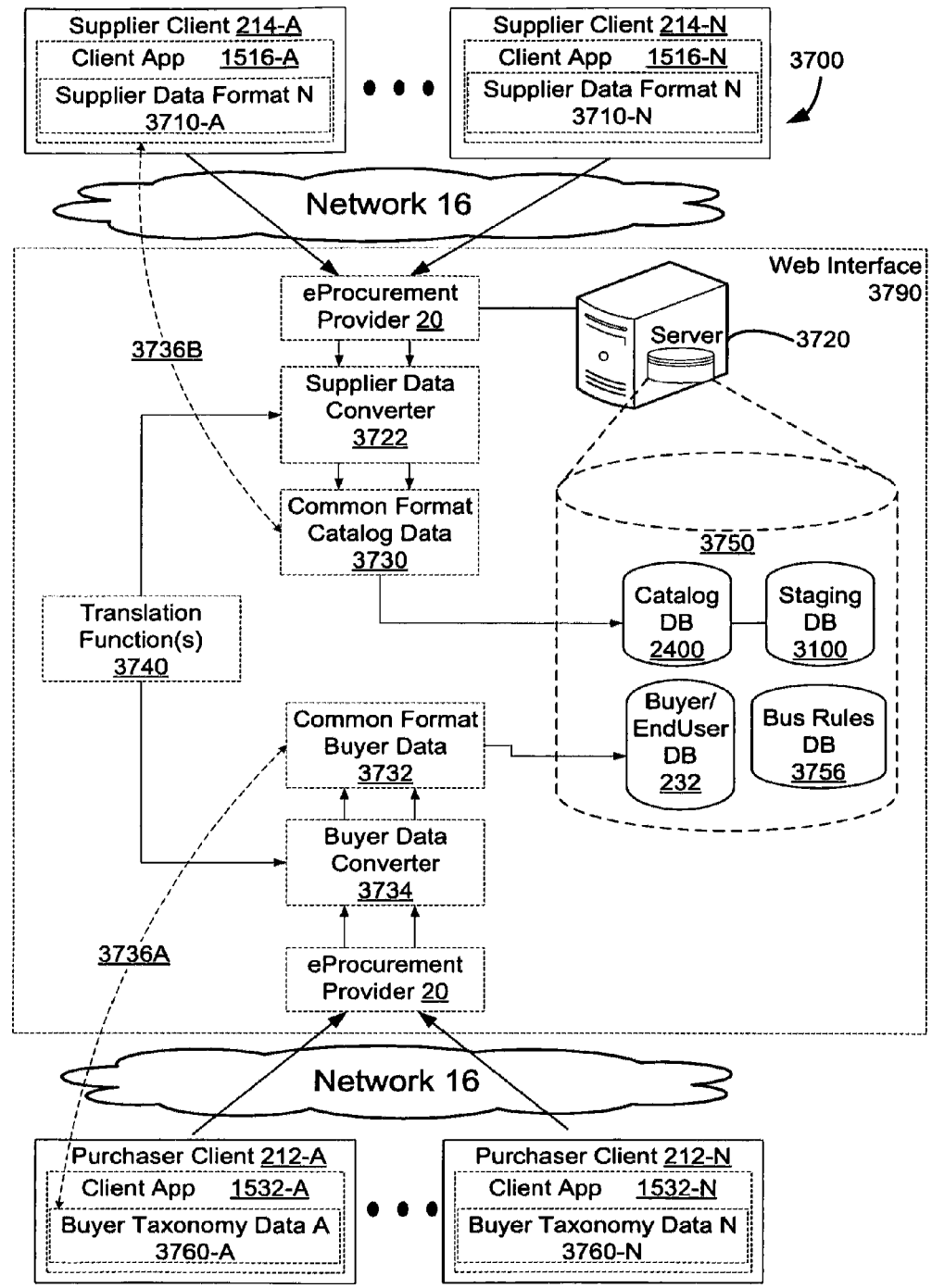
FIG. 37 illustrates an exemplary block diagram of an electronic procurement server system.

FIG. 37 is an exemplary block diagram of a server system 3700. The system 3700 includes an electronic procurement (eProcurement) server 3720, located at an eProcurement provider 20 as previously described. The server 3720 is coupled, either locally or remotely, to a database/storage 3750 that hosts a plurality of databases. These stored databases include one or more of a catalog database 2400, staging database 3100, buyer/end user database 232, and business rules database 3756. In some embodiments, the catalog database 2400 can correspond to a master product database 236 as described earlier.

In some embodiments, the server 3720 can include one or more of a web server 225, middleware/methods server 224, transaction processing server 223, custom database server 222, and end user processing server(s) 221, as described earlier.

The server 3720 runs programs for providing an electronic procurement (eProcurement) service to suppliers 214 and purchasers/buyers 212, across a network 16 as described earlier. In some embodiments, a first supplier associated with a supplier client 214-A operates a client application 1516-A, both as described in FIG. 15. The first supplier uses a first supplier data format 3710-A. Similarly, a second supplier associated with supplier client 214-N uses a second supplier data format 3710-N. In some embodiments, the first and second supplier data formats include data structures and/or taxonomies that a supplier uses to store information about items the supplier sells (generally from a catalog), including price, quantity, description, as discussed below. In some embodiments, the first and second supplier data formats include formats of sale and purchase document data, such as invoice data, receipt data, etc. that are provided by the supplier to a purchaser (e.g., purchaser client 212-A) through the electronic procurement system.

Figure 51:
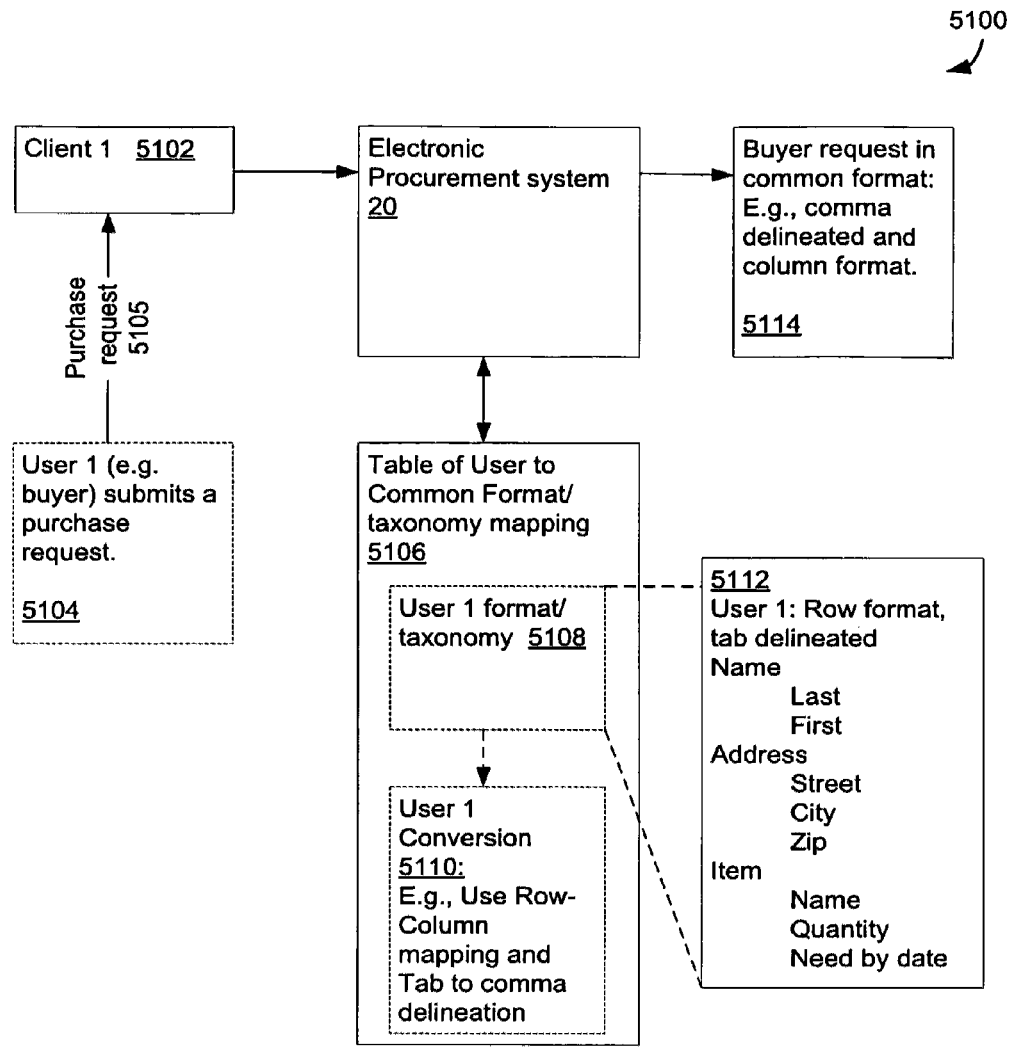
FIG. 51 illustrates an exemplary embodiment of a user format to common format mapping and conversion operation.

In some embodiments, an eProcurement provider module 20, operating at a server 3720, receives data in the first supplier catalog data format and data in the second supplier catalog data format, and provides them to supplier data converter 3722. The supplier data converter 3722 converts the data in the respective supplier catalog data formats to a respective common format catalog data 3730. In some embodiments, the server associates 3736B the common format catalog data 3730 with the original supplier data 3710 from which it came. The conversion may include converting data values, attributes and properties as described below. FIG. 51 illustrates details of a conversion operation associated with a user.

The associating 3736B may include recording (e.g., in a table or memory, such as catalog updates 1759) that a particular set of common format catalog data 3730 was generated from particular data in the first supplier catalog data format.

In some embodiments, the associating includes 3736B linking the respective supplier catalog data and the respective common format data, such that when the supplier catalog data changes, the common format catalog data 3730 is updated accordingly. In some embodiments, the catalog engine 1755 and catalog updates 1759 (FIG. 17) link the respective supplier catalog data 3710 with the common format catalog data 3730. In some embodiments, the linking is performed by storing in a memory a respective pointer between the respective common format catalog data 3720 to the respective supplier client 214A, such that when new catalog or other data arrives from the supplier client 214A, the electronic procurement system accesses the respective pointer to see which common format catalog data 3730 is associated with that client and updates the common format catalog data accordingly.

In some embodiments, the system performs a bulk translation of data in the supplier catalog format to data in the common format used by the electronic procurement system. This bulk translation takes all or substantially all of the data in the supplier catalog format and converts it to data in the common format. In some embodiments, the bulk translation of the supplier catalog data to common catalog format catalog data is performed when a supplier activates a new catalog on the electronic procurement system. Then after linking the catalog and common format data, a change in the supplier's catalog is automatically propagated by the server 3720 into common format catalog data stored in a catalog database 2400. This avoids the need to re-translate the supplier's catalog data every time a change is made to the catalog. In some embodiments, the automatic propagation of changes in the supplier catalog data means that when the supplier catalog data changes, a notification is sent to the server 3720 for catalog database 2400, and upon receiving this notification, the server retrieves the changed supplier catalog data from the supplier and converts it to the common format used by the electronic procurement system, and stores it in the catalog database 2400.

In some embodiments, supplier catalog data received by the electronic procurement system 20 is formatted in one or more proprietary data formats associated with a supplier's catalog. Examples of a supplier catalog data format for catalog items are shown in FIG. 24, with catalog database 2400, items 2401, and price 2430. In many cases, the supplier catalog data is not fully compliant with the common format used by the electronic procurement system, where compliant means that the supplier system and the electronic procurement system use the same data formats and/or taxonomies.

When the supplier catalog data is not fully compliant, the data converter 3722 effectively repairs or corrects errors in the supplier data to bring the data into compliance with the catalog data common format, as described below. For example, in the case outlined above, the data converter 3722 may determine that the supplier catalog data did not match the common format used by the electronic procurement system, and would attempt to repair or correct it. This repair or correction is performed by the schema translate module 2026 and/or schema update module 2028 (FIG. 20).

In some embodiments, the server stores the common format catalog data 3730 at a catalog database 2400, which in some embodiments is managed by a catalog management module 2076 and a catalog module 2072 (FIG. 20). In some embodiments, the server stores the common format catalog data 3730 at a staging database 3100 (in some embodiments managed by staging module 2080, FIG. 20) prior to being stored on the catalog database. The staging database may be a table in a larger database or may be a stand-alone database. In some embodiments, the staging database may replicate all or a portion of the catalog database. In some embodiments, the staging database may be a superset of the catalog database, containing both active and inactive (in development) portions of the catalog database. In some embodiments, the staging database may be used as a supplier catalog development environment to develop, test and finally activate (syndicate) the supplier catalog. In some embodiments, the server maps the supplier catalog data into the staging database in a plurality of data blocks, wherein the plurality of data blocks may be syndicated individually. In some embodiments, a data block may include catalog data representing an item, or a group of items, or a portion or a chapter of a catalog, or an entire catalog, or multiple catalogs. Syndication means that the server activates the syndicated data block or blocks (for example, representing items for sale in the catalog) as live catalogs, so a purchaser can select and purchase these items from the supplier, through the electronic procurement system.

The server may syndicate the blocks individually or by group, as specified by the supplier. The catalog may be very large and a supplier may choose to make parts accessible in stages to aid adoption of the catalog by users and fulfillment by the supplier. A supplier may also choose to activate or deactivate parts of a catalog according to seasonal demand (e.g., a holiday products portion of the catalog). This is described in more detail below, including in FIG. 50.

The staging database 3100 may provide a development environment where a supplier can upload all or portions of a catalog and test its operation. In some embodiments, upon or following a syndication operation, data in the staging database is transferred to a live catalog database accessible by users of the system. In some embodiments, upon or following a syndication operation, portions of the staging database are marked as being 'live' or 'active,' and these marked portions logically form the catalog database.

In some embodiments, a first purchaser associated with a purchaser client 212-A operates a client application 1532-A, both as described in FIG. 15. The first purchaser communicates with the electronic procurement system using data organized according to a respective first purchaser/buyer data taxonomy 3760-A. Similarly, a second purchaser associated with purchaser client 212-N communicates with the electronic procurement system using data organized according to a respective second purchaser/buyer data taxonomy 3760-N. The respective buyer data taxonomy includes the format and/or taxonomy used by buyers in submitting purchase request, purchase orders, payment, and other documents. The purchase order database 2500, buyer's invoice database 3300, and requisition database 2700 all contain examples of data that may be included in the buyer data taxonomy 3760 (see FIG. 22).

In some embodiments, the buyer data taxonomy format includes specific data formats, which may be in a specific order or structure, associated with a buyer's ordering process, used by a buyer to place purchase orders with the eProcurement system. For example, a first buyer A may use computer systems supplied by a company A, using company A's proprietary purchasing and operations management software. In this case, it is likely that any purchase requests by buyer A submitted to the electronic procurement system would contain data in a format associated with company A's software. Thus, this data format (with or without an associated order or structure called a taxonomy) associated with company A would be the buyer data taxonomy format. In some embodiments, buyer data may also include data that a buyer attempts to put in a common format buyer data 3732, but that is not fully compliant with the common format (i.e., not in the same format). Thus, where the buyer data is not fully compliant with the common format, the buyer data converter 3734 effectively repairs or corrects formatting errors in the buyer data, as described in at least FIGS. 47, 48 and/or 49.

In addition, if a buyer wishes to create a local catalog using user local catalog create/access module 2024 (FIG. 20), this local catalog input from the buyer is represented using the buyer's data, in the buyer's data format, arranged according to the buyer's data taxonomy. This must be converted to a common format by the eProcurement system 20.

In some embodiments, the eProcurement provider program 20 receives respective data in the first and second buyer data taxonomy formats from respective clients associated with the first and second buyer and provides them to buyer data converter 3734. The data in the respective first and second buyer data taxonomy formats may be different depending on requirements of each of the respective first and second buyer's purchasing system, software, internal procedures, etc. The data converter 3734 converts the data in the respective first and second buyer data taxonomy formats to a respective common format buyer data 3732, in some embodiments using schema translate module 2026 and schema update module 2028 (FIG. 20). In some embodiments, the server associates 3736A the common format buyer data 3732 with the respective buyer data taxonomy 3760 from which it came. In one embodiment, the associating may include recording a conversion process (i.e., recording a list of operations to be performed to data in the respective buyer data taxonomy formats to convert it to the common format buyer data), and when a change to the respective buyer data occurs, automatically converting it to the common format buyer data 3732. This associating means that when the respective buyer data changes, the respective common format buyer data will change accordingly. The conversion may also include operations to convert data values, formats, attributes, and properties as described below, including at least the formats shown in FIG. 47.

In some embodiments, the buyer data format and/or buyer taxonomy includes all buyer data formats, arrangements, taxonomies, and/or schemes that the eProcurement system needs to understand to interact with the buyer(s).

In some embodiments, the buyer data converter 3734 and supplier data converter 3722 may be combined into a single converter function. In some embodiments, the common format catalog data 3730 and common format buyer data 3732 may be combined using a converter 3724 or 3722 into a single common data format used by the eProcurement system.

In some embodiments, the supplier data converter 3722 receives input from a translation function 3740. The translation function 3740 converts amounts and units of supplier catalog data to amounts and units of common format catalog data, in some embodiments using schema translate module 2026 and schema update module 2028 (FIG. 20), in accordance with one or more of the translations of FIG. 47, FIG. 48, and/or FIG. 49. In some embodiments, the translation function converts units of measure associated with a data type from a first format to a second format. The translation function may recognize one or more spellings, abbreviations, etc., for a particular unit type. The translation function may convert both the name of the unit, and/or the actual quantity of the item associated with the unit. For example, an abbreviated description for liter might be "lt," "lit," or a European spelling of "liter." The translation function may translate this name to the common format catalog data used by the eProcurement system. In some embodiments, the translation function 3740 may also translate quantities of an item between unit types, e.g. between metric and imperial or American units, according to a user's preferences, as described in at least FIG. 48. For example, the translation function might translate volumes in liters to volumes in American or Imperial Units such as quarts and pints.

In some embodiments, the translation function 3740 may convert the product package quantity associated with an item from a first format to a second format. This conversion may include both spelling conversion and/or unit quantity conversion. For an example, an abbreviated spelling for "case" might be "cs.," etc. so the translation function would recognize this abbreviation and convert it to the standard formal (case) used by the common format data 3720. The translation function may also be able to determine the number of units of an item per package size (e.g. 10 reams of paper per box of paper), and present the appropriate package size (e.g. a box) given the number of units (e.g. 10 reams) requested by a user, as described in at least FIG. 49.

Figure 46:
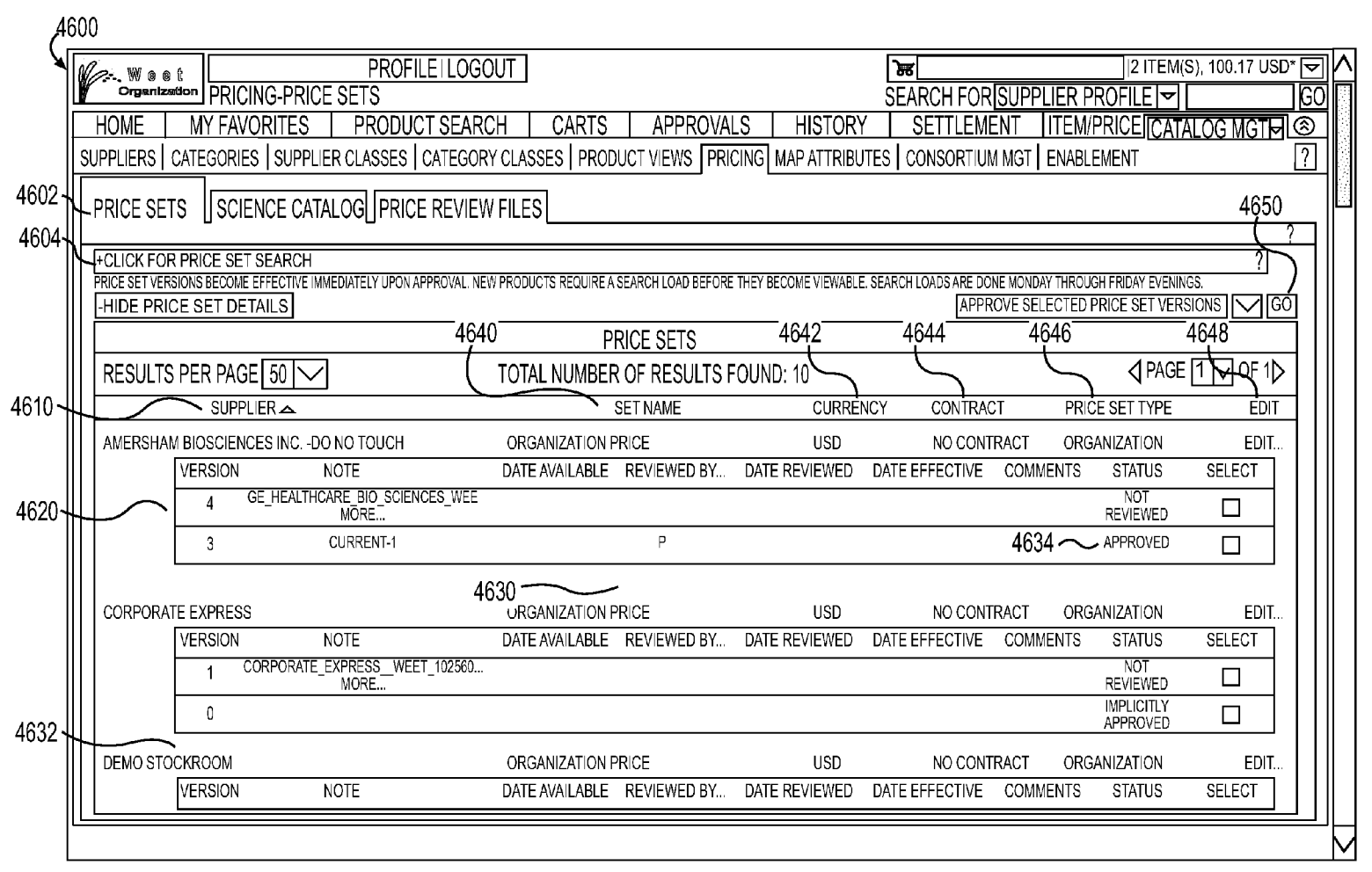
Figure 47:
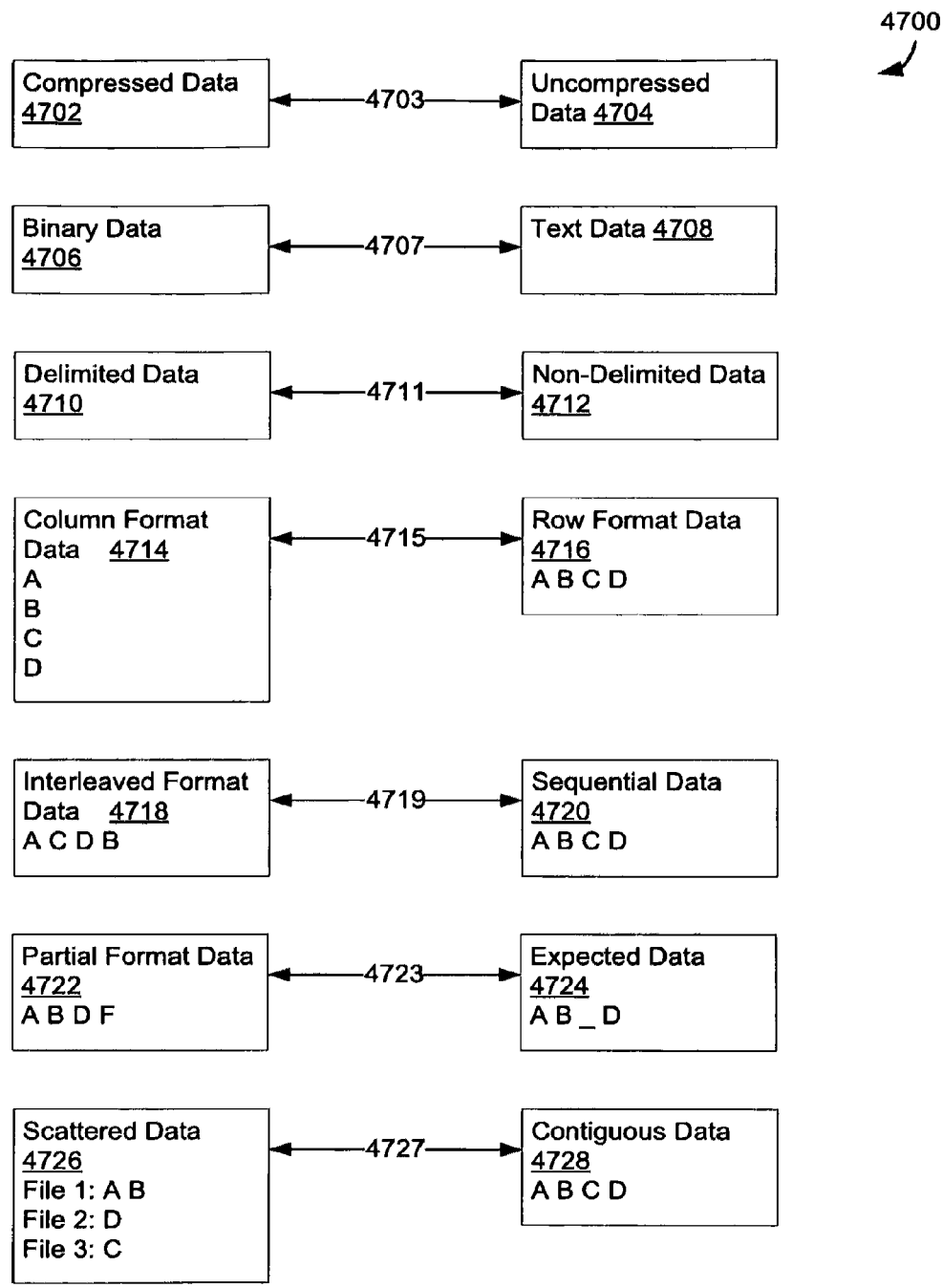
FIG. 47 illustrates a conversion mapping showing a plurality of conversion functions.

In some embodiments, the common format catalog data is a stockroom format associated with (for example) a corporate stockroom (e.g., FIG. 46, stock room 4632). This stockroom format may be used by a larger purchaser that maintains an internal stockroom or warehouse from which it fulfills internal orders. In some embodiments, the stockroom format may include data representing all or a subset of the items in catalog database 2400, including data representing items 2401 and in some embodiments, prices 2430 (FIG. 22). In an example, FIG. 47 illustrates translation of scattered data 4726, having data spread across three files. File 1 has data A, B. File 2 has data C. File 3 has data D. Through a conversion/translation 4727, the scattered data 4716 is mapped into a contiguous data 4728. Data A and B from File 1, data C from file 2, and data D from file 3 are mapped into the contiguous data 4728. In one embodiment, if part of the data was missing or could not be read (e.g., if data C from file 2 was missing) then the conversion of scattered data 4726 would fail and an error message would be generated.

In some embodiments, if applying the translation function (in some embodiments using schema translate module 2026 and/or schema update module 2028, FIG. 20) fails to translate supplier catalog data into respective common format data (e.g., the common format used in catalog database 2400, FIG. 22), the eProcurement system may reject the supplier catalog data and provide an error report to the supplier associated with the catalog data.

In some embodiments, if applying the translation function (e.g., schema translate module 2026 and/or schema update module 2028 as described above) fails to translate supplier catalog data into respective common format data (e.g., catalog database 2400, described above), the eProcurement system may accept the supplier catalog data and provide a warning report to the supplier associated with the catalog data.

In some embodiments, the supplier data converter 3722 treats different catalog data types in accordance with business rules. In some embodiments, the translation function 3722 treats different respective supplier catalog data types in accordance with business rules associated with each respective supplier. Business rules (e.g., stored in business rules database 3756) associated with a particular supplier may determine what translation function is applied to data associated with the respective supplier, whether the supplier data is converted automatically or whether the conversion requires approval (e.g., by an administrator of the electronic procurement system). In some embodiments, the supplier data converter accepts as input type-delimited input data. Examples of data formats that may be accepted by the buyer and supplier data converters are discussed below, including at least in FIG. 47.

In some embodiments, the supplier data converter is accessible through a supplier user interface (e.g., client application 1516, via web browser 1518, using manage catalog application 1512, FIG. 15) for uploading catalog data to the electronic procurement system.

In some embodiments, the supplier catalog data may include item data, standard attributes, and custom attributes. Item data may include an item name (e.g., "notebook boxes") and rudimentary description (e.g., "boxes for storing standard laboratory-size notebooks"). Standard attributes may include more detailed information such as size (e.g., in inches or centimeters), weight (e.g., in pounds or kilograms), catalog number, etc. Custom attributes are name-value pairs defined by the supplier. A name-value pair is a data representation used in computing systems and applications. It is an open-ended data structure that allows for future extension without modifying existing code or data. In name-value pairs, all or part of the data model may be expressed as a collection of tuples <attribute name, value>, where each element is an attribute-value pair, and where the attribute names may or may not be unique depending on implementation. An exemplary name value pair could be <color, beige> used in association with file covers, meaning that the color of the file covers is beige.

In some embodiments, the common format catalog data 3730 is provided to one or both of catalog database 2400 and staging database 3100 (FIG. 22). In some embodiments, the common format buyer data 3732 is provided to buyer/end user database 232. The data conversion and translation functions may be performed in accordance with business rules stored in business rules database 3756.

In some embodiments, the business rules 3756 are specified by a super user. The super user may be a system administrator or manager at a supplier or purchaser organization associated with a user. The super user determines the permissions associated with the user and the business rules 3756 applicable to the user and the supplier or purchaser organization.

In some embodiments, the business rules 3756 (e.g., in the context of a purchaser organization) may be customized according to at least one selected from the group consisting of by user (as described), by role, and/or by department. For example, certain classes (job roles) of users (e.g., lab technicians) may have business rules associated with that class, and different classes of users (e.g., senior scientist) may have different rules associated with their job role. In another example, users associated with a first department (e.g., engineering) may have different permissions (e.g., ability to purchase engine parts) associated with them than users associated with a second department (e.g., accounting, having permission to purchase calculators.)

In some embodiments, the business rules 3756 (e.g., in the context of a purchaser organization) may determine what items may be sold and whether any special rules or regulations are associated with particular items. For example, a certain item may be a restricted item that must comply with business rules (e.g., government or supplier regulations), such as a radioactive item. Government or supplier regulations may require that controlled substances, hazardous material, radioactive and minor radioactive materials, recycled materials, select agents, and toxins (referred to hereafter as special items) are treated differently than normal items, and may require a different supply process and/or a different catalog process. Business rules may require that requisitions, orders, or sales of special items can be tracked according to individual invoices or purchase documents associated with that special item. In some embodiments, a supplier may require receiving individual purchase orders for special items or high value items, even through the items may not be covered by government regulations.

In some embodiments, these databases are stored at the server 3720. In some embodiments, these databases are tables of a larger storage/database 3750.

In some embodiments, the suppliers 214 and purchasers 212 access the eProcurement provider 20 and server 3720 via a web interface 3790.

Figure 38:
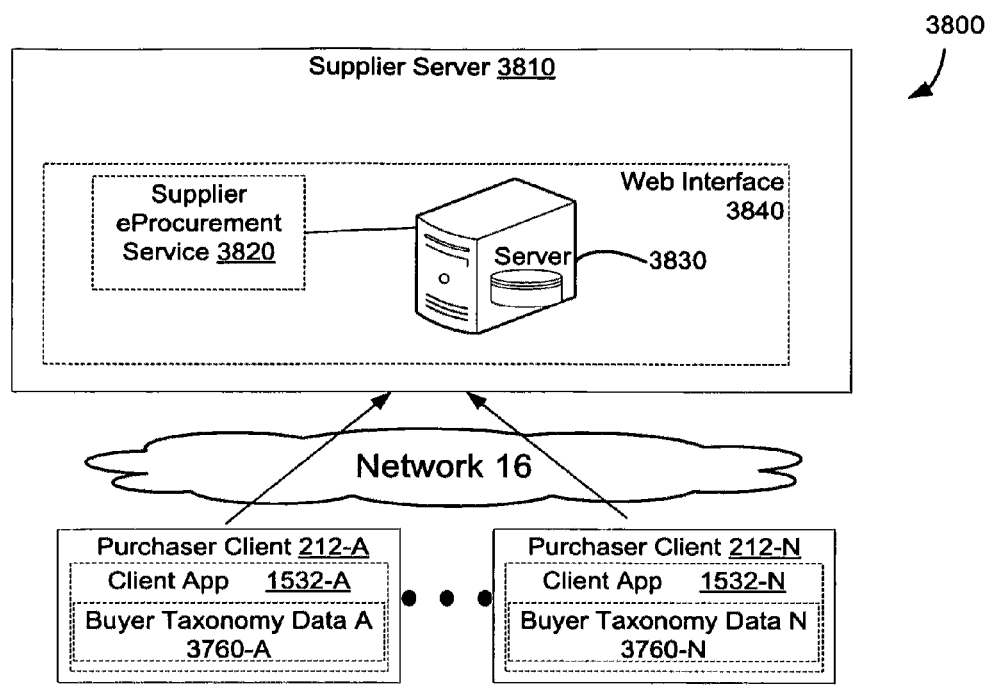
FIG. 38 illustrates an exemplary block diagram of a supplier electronic procurement server system.

FIG. 38 is an exemplary block diagram of a server system 3800. The system 3800 includes a Supplier eProcurement service 3820, running on the server 3830, located at the supplier server 3810 (e.g., a large supplier of wholesale goods to many smaller retailers). In some embodiments, the server 3830 may provide all or a subset of the functionality of server 3720 as described earlier. This functionality may include hosting the supplier electronic procurement system 3820, communicating with purchaser clients 212, translating respective data received from respective purchaser clients into a common format associated with the supplier electronic procurement system. This functionality may further include generating sales invoices, preparing shipment and receipt documents, and submitting them to the respective purchasers using data in a respective format compatible with the respective purchaser clients 212. This functionality may further include managing the web interface 3840 for both users in the supplier organization and for external purchaser clients 212 of the supplier organization.

Purchaser clients 212 (as described earlier) are coupled to the supplier server 3810 across a network 16, accessible via a web interface 3840.

FIG. 38 illustrates a situation where a large supplier wishes to host an eProcurement service directly (i.e., without using the service of a 3rd party eProcurement provider). This arrangement would allow the supplier to streamline purchases by many users of the system, while maintaining control of the data and hosting.

Figure 39:
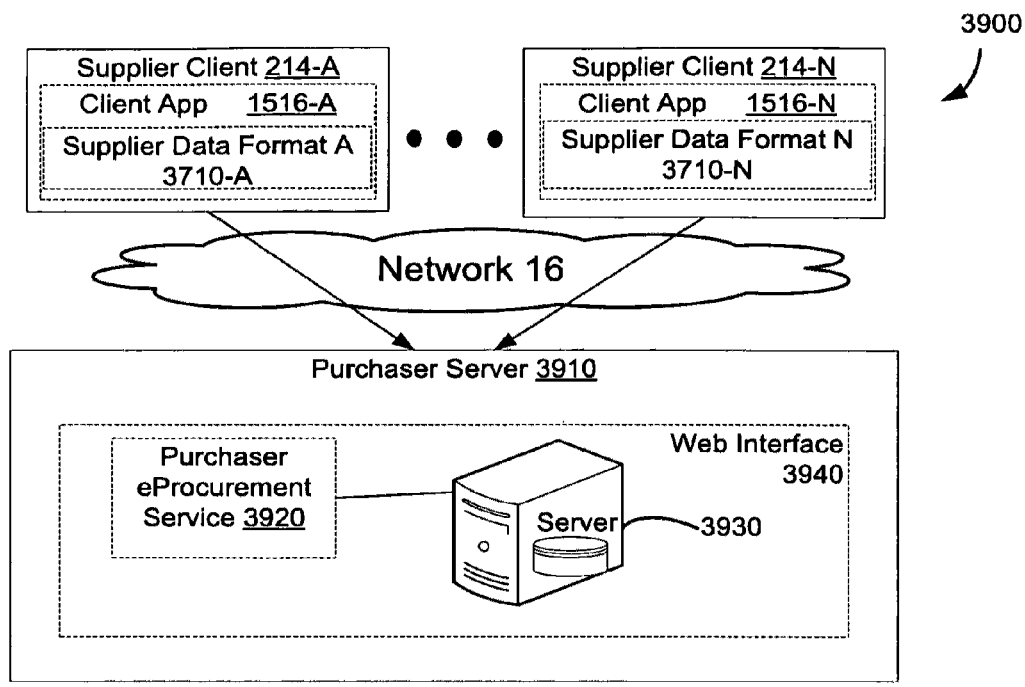
FIG. 39 illustrates an exemplary block diagram of a purchaser electronic procurement server system.

FIG. 39 is an exemplary block diagram of a server system 3900. The system 3900 includes a Purchaser eProcurement service 3920, running on the server 3930, located at the purchaser server 3910 of a purchasing organization (e.g., a large retailer purchasing for resale, or a government department purchasing for internal consumption). In some embodiments, the server 3930 may provide all or a subset of the functionality of the server 3720 as described earlier. This functionality may include hosting the purchaser electronic procurement system 3920, communicating with supplier clients, and/or translating respective data received from respective supplier clients into a common format associated with the purchaser electronic procurement system. This functionality may further include generating purchase orders and submitting them to the respective suppliers using data in a respective format compatible with the respective suppliers. This functionality may further include managing the web interface 3940 for internal purchasers, for users in the purchasing organization, and/or for external suppliers 214 to the purchasing organization.

Supplier clients 214 (as described earlier) are coupled to the purchaser server 3910 across a network 16, accessible via a web interface 3940.

FIG. 39 illustrates a situation where a large purchaser (e.g., a very large retailer purchasing from multiple product suppliers) wishes to host an eProcurement service directly (i.e., without using the service of a 3rd party eProcurement provider). This arrangement would allow the purchaser to streamline purchases by many users of the system. In some embodiments, the system 3900 illustrates a situation where a governmental agency wants to purchase from multiple vendors, and for security reasons wishes to host the purchasing server within a secure government firewall.

Figure 40:
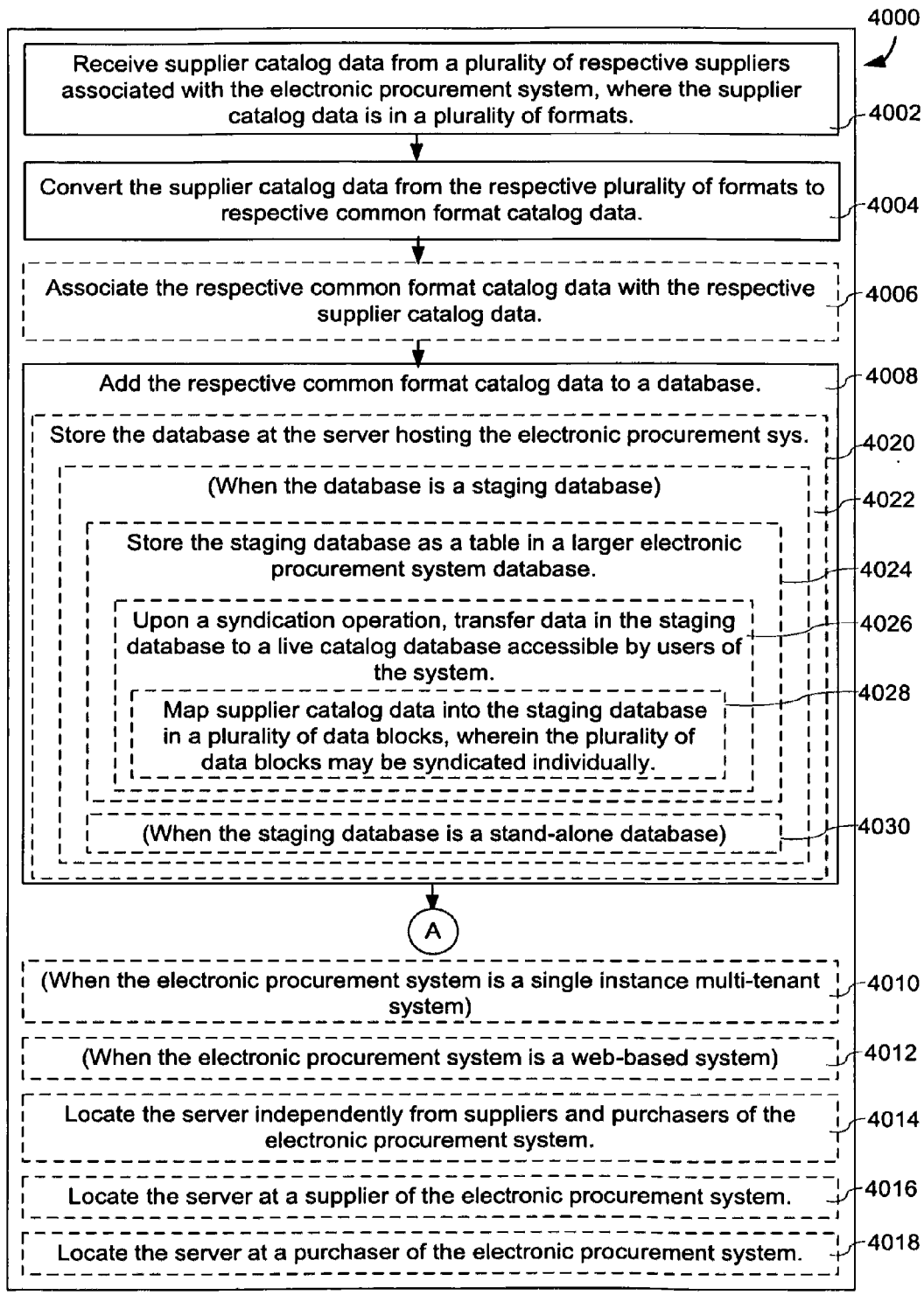
FIG. 40 illustrates an exemplary flowchart representing a server method for hosting an electronic procurement system.

FIG. 40 is an exemplary flowchart representing a server method 4000 for hosting an eProcurement system, according to certain embodiments of the invention. The server method 4000 may be governed by instructions that are stored in a computer readable storage medium and that are executed by one or more processors on one or more servers. Each of the operations shown in FIG. 40 may correspond to instructions stored in a computer memory or computer readable storage medium. The computer readable storage medium may include a magnetic or optical disk storage device, solid state storage devices such as flash memory, or other non-volatile memory device or devices. The computer readable instructions stored on the computer readable storage medium can be expressed in source code, assembly language code, object code, or another instruction format that can be interpreted by one or more processors.

In some embodiments, the server method 4000 includes the following operations, performed at a server hosting an electronic procurement system.

Supplier catalog data (e.g. science catalog data 4602, FIG. 46) is received (4002) from a plurality of respective suppliers (e.g., supplier clients 214, FIG. 37) associated with the electronic procurement system, where the supplier catalog data is in a plurality of formats (e.g., formats 3710, FIG. 37). The supplier catalog data is converted (4004) (e.g., using a supplier catalog data converter 3720, FIG. 37) from the respective plurality of formats to the respective common format catalog data (e.g., common format data 3730, FIG. 37, and FIG. 46, data 4610 and 4640 to 4650). In some embodiments, this converting is performed according to one or more of the operations described with respect to FIG. 47. In some embodiments, the respective common format catalog data is associated (4006) with the respective supplier catalog data. The respective common format catalog data is added (4008) to a database (e.g., catalog database 2400, FIG. 37).

An electronic procurement system implemented in accordance with the present invention can have a range of different embodiments. In some embodiments, there can be one or many institutional users (or tenants). In some embodiments, the electronic procurement system can be run at a central system accessible to one or more different suppliers and customers. In other embodiments, it can be run at the site(s) of one or more suppliers accessible to their users, or it can be run at the site of users that are very large/active users of the electronic procurement system.

In some embodiments, the electronic procurement system is a single instance multi-tenant system (4010)

In some embodiments 4012, the electronic procurement system is a web-based system (4012), e.g., accessed via web interface 3790, FIG. 37.

In some embodiments 4014, the electronic procurement system is located independently (e.g., separated by network 16) from suppliers and purchasers of the electronic procurement system. In some embodiments 4016, the electronic procurement system is located at a supplier of the electronic procurement system. In some embodiments 4018, the electronic procurement system is located at a purchaser of the electronic procurement system.

In some embodiments 4020, the database is stored at the server hosting the electronic procurement system. In some embodiments 4022, the database is a staging database (e.g., staging database 3100 (FIG. 31), managed by staging module 2080, FIG. 20. In some embodiments 4024, the staging database forms a table in a larger electronic procurement system database.

In some embodiments 4026, upon a syndication operation, data in the staging database 3100 is transferred to a live catalog database 2400 accessible by users of the system. In some embodiments, the catalog database is accessed by a hosted supplier products index database 234 and/or by a summary search database 2460. In some embodiments 4028, the staging database is a stand-alone database. As described, syndication means that the server activates the syndicated data block or blocks (for example, representing items for sale in the catalog) as live catalogs, so a purchaser can select and purchase these items from the supplier, through the electronic procurement system.

In some embodiments 4028, supplier catalog data at a supplier (e.g., supplier catalog 5002, FIG. 50) is mapped into the staging database (e.g., staging database 3100) in a plurality of data blocks (e.g., chapters 5004 through 5010), wherein the plurality of data blocks may be uploaded 5022, tested 5024, and syndicated 5026 individually. The syndicated blocks appear live (e.g. live chapter 1, 5042 and live chapter 4, 5044) in the catalog database (e.g., 2400).

Figure 41:
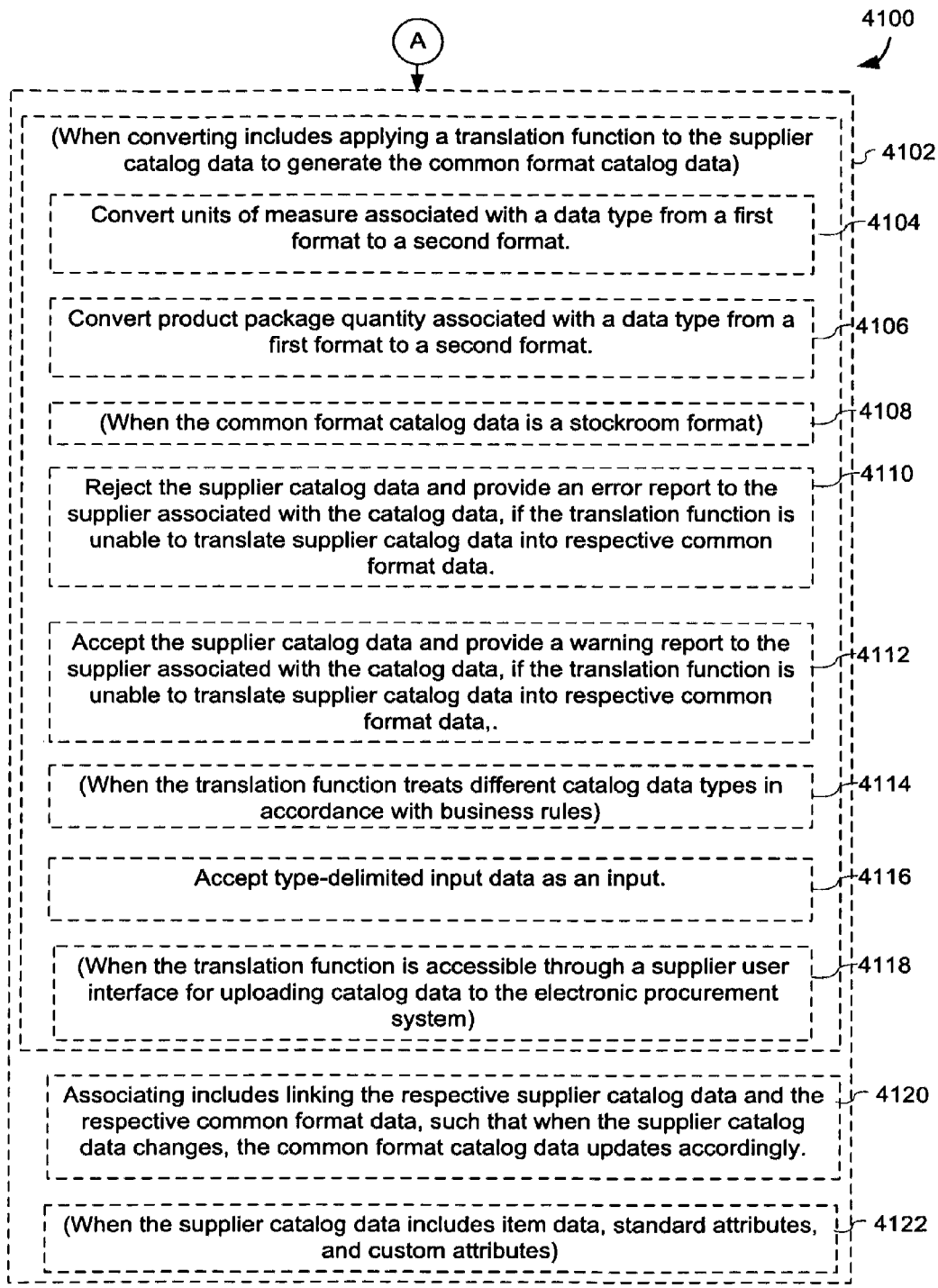
FIG. 41 illustrates an exemplary flowchart representing a server method for hosting an electronic procurement system.

FIG. 41 is an exemplary flowchart illustrating a server method 4100 for hosting an eProcurement system, according to certain embodiments of the invention. In some embodiments, the server method 4100 is a continuation of server method 4000.

In some embodiments 4102, converting supplier catalog data includes applying a translation function (e.g., one or more of translation functions 4703, 4704, 4711, 4715, 4819, 4723, 4727 shown on FIG. 47, or other translations functions) to the supplier catalog data (e.g., in format 3710, FIG. 37) to generate the common format catalog data (e.g., data 3730, FIG. 37).

In some embodiments 4104, the translation function converts names and/or quantities of units of measure associated with a data type (e.g., data types 4804, 4806, 4808, 4810, 4812, 4814) from a first format (e.g. imperial/American units 4802) to a second format (e.g. metric units 4820), see FIG. 48.

In some embodiments 4106, the translation function (e.g., quantity multiplier 4940, FIG. 49) converts product package quantity associated with a data type from a first format (e.g. packaging units 4902) to a second format (e.g. stock units 4918). In some embodiments 4108, the common format catalog data is a stockroom format.

In some embodiments 4110, if applying the translation function (FIG. 47, as described) fails to translate supplier catalog data (e.g., in format 3710, FIG. 37) into respective common format data (e.g., data 3730), the server rejects the supplier catalog data and provides an error report to the supplier associated with the catalog data. In some embodiments 4112, if applying the translation function fails to translate supplier catalog data into respective common format data, the server accepts the supplier catalog data and provides a warning report to the supplier associated with the catalog data, In some embodiments 4114, the translation function treats different catalog data types in accordance with business rules, stored in business rules database 3756 as described earlier. In some embodiments 4116, the translation function accepts as input type-delimited input data, (e.g., delimited data 4712, FIG. 47).

In some embodiments 4118, the translation function is accessible through a supplier user interface (e.g., client application 1516 or web-browser 1518, operating at supplier client 214, FIG. 18) for uploading (e.g., catalog updates 1822) catalog data to the electronic procurement system.

In some embodiments 4120, associating includes linking (e.g., link 3736B, FIG. 37) the respective supplier catalog data (e.g., 3710) and the respective common format data (e.g., 3730), such that when the supplier catalog data changes, the common format catalog data updates accordingly. In some embodiments, this linking is performed by catalog updates 1822 (FIG. 18) and/or schema update module 2028 (FIG. 20).

In some embodiments 4122, the supplier catalog data includes item data (e.g., stored in items database 2401, FIG. 22), standard attributes (e.g., prices stored in prices database 2430), and custom attributes.

Figure 42:
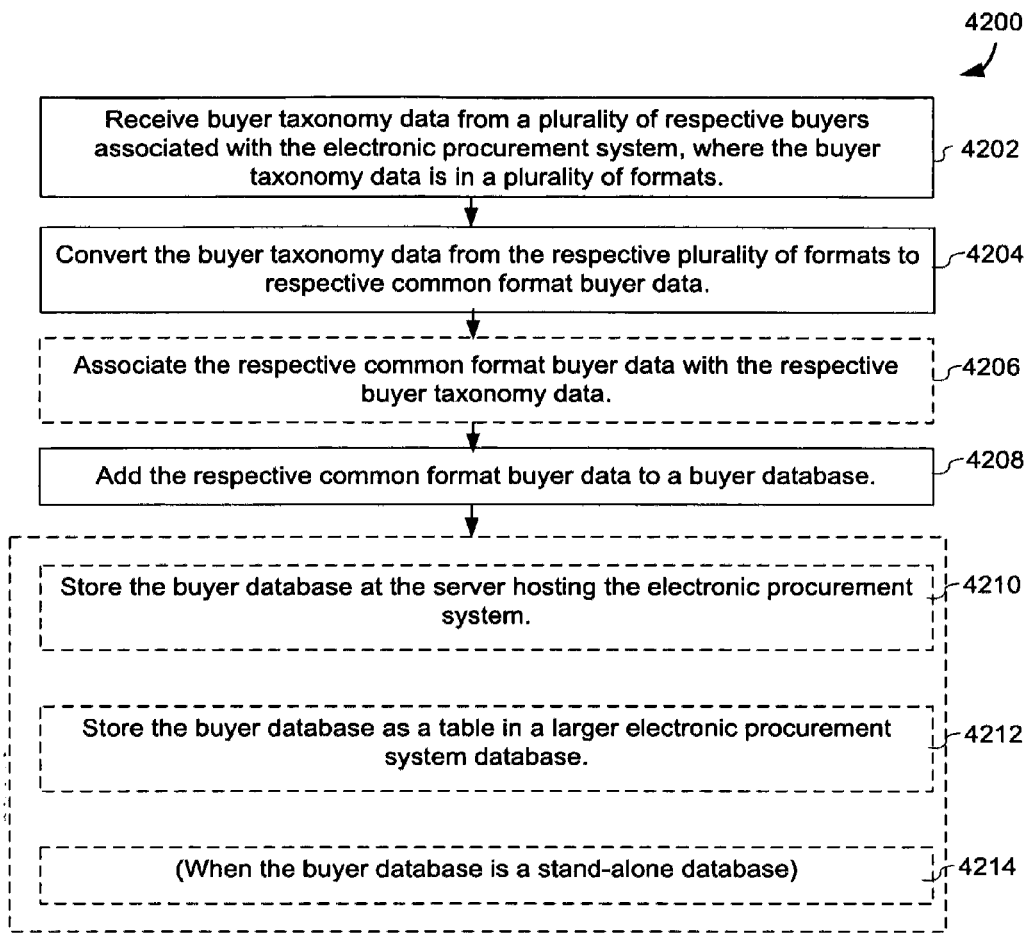
FIG. 42 illustrates an exemplary flowchart representing a server method for hosting an electronic procurement system.

FIG. 42 is an exemplary flowchart illustrating a server method 4200 for hosting an eProcurement system (e.g. supplier eProcurement service 10320, FIG. 103) at a server, according to certain embodiments of the invention. Server method 4200 may be governed by instructions that are stored in a computer readable storage medium, as described above.

In some embodiments, the server method 4200 includes the following operations that are performed at a server (e.g., 3720, FIG. 37) hosting an electronic procurement system. Buyer data (e.g., data associated with client app 1532, FIG. 37) is received (4202) from a plurality of respective buyers (purchaser clients 212) associated with the electronic procurement system, where the buyer data is in a plurality of formats (e.g., buyer taxonomy data 3760). The buyer data is converted (4204) from the respective plurality of formats to respective common format buyer data. This conversion may be performed according to one or more of the translations shown in FIGS. 47, 48, 49, or other translations. These translations may be performed by schema translate module 2026 and/or updated by schema update module 2028 (FIG. 20). In some embodiments, the respective common format buyer data is associated (4206) (e.g., 3736A, FIG. 37) with the respective buyer data, such that when the buyer data changes, the common format buyer data is updated accordingly, executed by the schema update module 2028. The respective common format buyer data is added (4208) to a buyer database (e.g., buyer/end user database 232).

In some embodiments 4210, the buyer database is stored (e.g., in databases 3750) at the server 3720 hosting the electronic procurement system. In some embodiments 4212, the buyer database forms a table in a larger electronic procurement system database. In some embodiments 4214, the buyer database is a stand-alone database.

Figure 43:
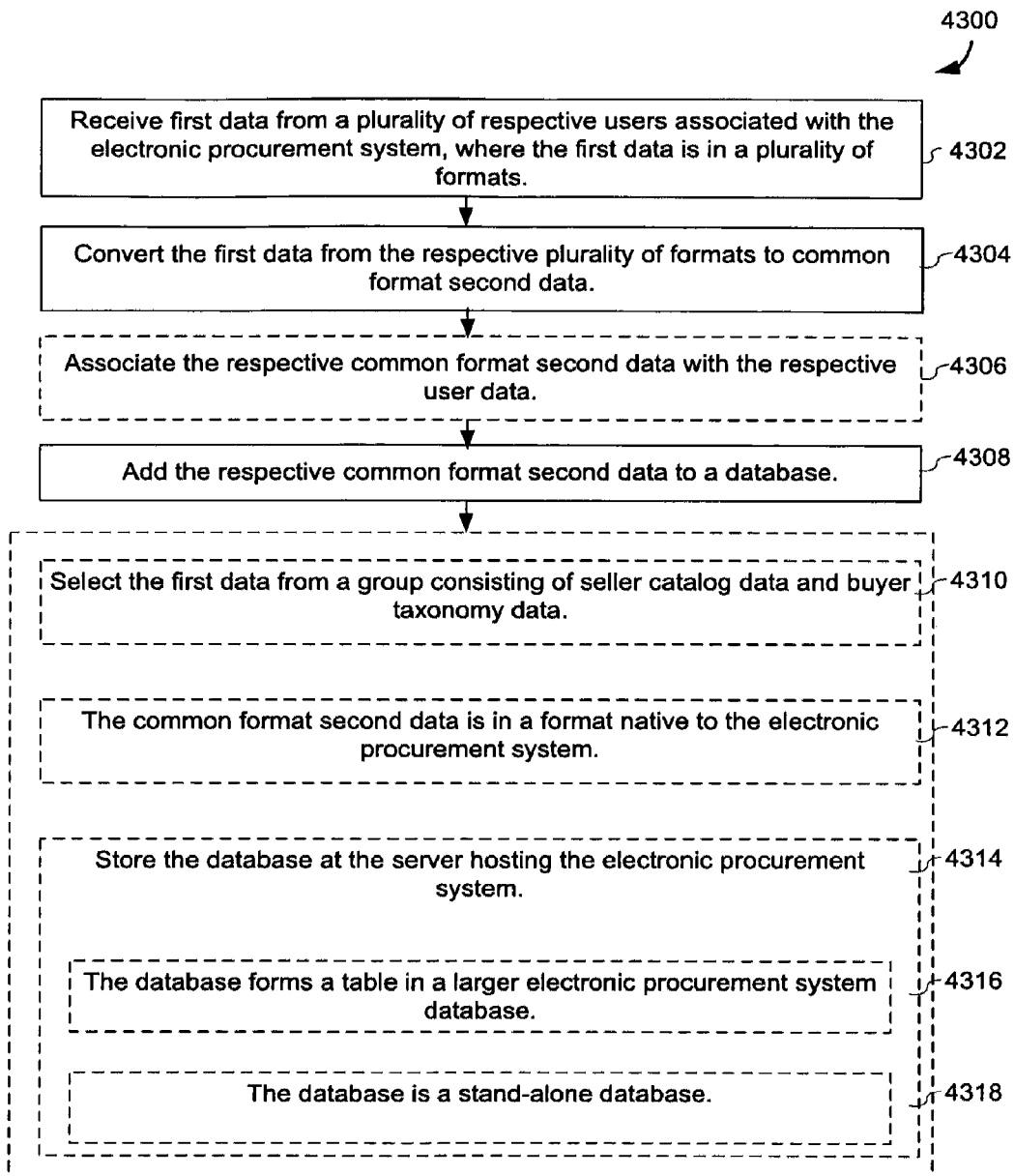
FIG. 43 illustrates an exemplary flowchart representing a server method for hosting an electronic procurement system.

FIG. 43 is an exemplary flowchart representing a server method 4300 for hosting an eProcurement system at a server associated with a supplier, according to certain embodiments of the invention. The server method 4300 may be governed by instructions that are stored in a computer readable storage medium, as described above.

In some embodiments, the server method 4300 includes the following operations that are performed a server (e.g., 3720, FIG. 37) hosting an electronic procurement system (e.g., eProcurement provider 20).

A first set of user data is received (4302) from a plurality of respective users associated with the electronic procurement system, where the first data is in a plurality of formats. The first data is converted (4304) (e.g., buyer data converter 3724 or supplier data converter 3722, FIG. 37) from the respective plurality of formats (e.g., buyer taxonomy data 3760 or supplier data format 3710, respectively) to common format second data (e.g., common format catalog data 3730 or common format buyer data 3732, respectively). In some embodiments, the respective common format second data is associated (4306) (e.g., association 3736A, 3736B) with the respective user data. The respective common format second data is added (4308) to a database (e.g., buyer/end user database 232 or catalog database 2400, respectively). For example, order data from multiple users can be presented to the eProcurement system in a number of different formats, some of which are likely to be different from the common format used in the eProcurement system. When presented with such disparate, non-standard data, the eProcurement system converts the user data to a standard (common) catalog format, and then stores the reformatted user requests in an appropriate one of the above-mentioned databases.

In some embodiments 4310, the first data is one selected from a group consisting of seller catalog data and buyer data. In some embodiments 4312, the common format second data is in a format native to the electronic procurement system. In some embodiments 4314, the database is stored at the server (e.g., server 3720) hosting the electronic procurement system. In some embodiments 4316, the database forms a table in a larger electronic procurement system database. In some embodiments 4318, the database is a stand-alone database.

FIG. 44 shows a data structure 4400 for catalog attributes that may be associated in some embodiments with items in a catalog. These attributes may be stored in the catalog database 2400 and/or staging database 3100 (FIG. 22). These attributes include:

- Category 4402;
- UNSPSC Part Number 4404, the United Nations Standard Products and Services Code, where UNSPSC is a coding system to classify both products and services for use throughout the global eCommerce marketplace;
- Product Description 4406;
- Packaging unit of measure (UOM) 4408, i.e. how many items are associated with a single package of the product;
- CorporateList (USD) 4410, the list price for corporate customers in US dollars, or in the US dollar equivalent of any other currency, such as Euro, Yen, Yuan, Rupee, etc.;
- Product Size 4412;
- Manufacturer Name 4414;
- Manufacturer Part Number 4416;
- Lead Time 4418, the time required to obtain an item after ordering it;
- Is Hazardous Material? 4420, a flag indication a potential restricted item;
- Health Hazards 4422, a flag indicating a potential hazardous (e.g., biohazard, fumes, etc) item;
- Physical Hazards 4424, a flag indicating a potential physically hazardous (e.g., heavy, sharp, etc.) item;
- Is Radioactive? 4426, a flag indicating a potential restricted radioactive item;
- Is Minor Radioactive? 4428, a flag indicating a potential restricted radioactive item;
- Is Recycled? 4430;
- Is Controlled Substance? 4432, a flag indicating a potential controlled substance such as certain drugs, opiates, etc.;
- Controlled Substance Flag Description 4434;
- Is Toxin? 4436 a flag indicating a potential toxic substance such as poison;
- Is Select Agent? 4438 a flag indicating select agents, which are pathogens or biological toxins that have been declared by the U.S. Department of Health and Human Services or by the U.S. Department of Agriculture to have the "potential to pose a severe threat to public health and safety";
- CAS Number 4440, unique numerical identifiers for chemical compounds, polymers, biological sequences, mixtures and alloys;
- MSDS URL 4442, material safety data sheet URL;
- Image URL 4444, product image URL;
- More Information URL 4446, URL link to more information about the item;
- Searchable Keywords 4448;
- Price Code 1 4450, a first price code associated with an item, e.g., regular price;
- Price Code 2 4452, a first price code associated with an item, e.g., discounted price; and
- Long Description 4454.

The above list is exemplary and the attributes can include different items, subsets, and supersets of these items.

In some embodiments, common attributes used in a Lab Supplies vertical, used for searching the catalog, that may be stored in the catalog database 2400 and/or staging database 3100, include the following. A Lab Supplies vertical is a list of products that fall under the category 'lab supplies', e.g., consumables, equipment, chemicals, protective apparel, etc.:
Antibody Type, Applications, Boiling Point, Brand, Capacity, CAS Number, Clone, Column Dimension, Column Size, Concentration, Configuration, Conjugate Type, Density, Diameter, Dimensions, EPA Number, Flash Point, Flask Capacity, Form, Grade, Health Hazards, Height, Host, Image URL, Is Controlled Substance?, Is Hazardous Material?, Is Minor Radioactive?, Is Radioactive?, Is Recycled?, Is Select Agent?, Is Toxin?, Isotope Enrichment, Isotype, Joint Size, Kit Contents, Lead Time, Lead Time, Length, Literature References, Loading, Lot Number, Manufacturer Name, Manufacturer Name, Manufacturer Name, Manufacturer Part Number, Manufacturer Part Number, Material, MDL Number, Melting Point, Mesh Size, Molecular Formula, Molecular Weight, More Information URL, Optical Purity, Optical Rotation, Particle Size, Phase, Physical Hazards, Pore Size, Product Classification, Product Height, Product Length, Product Literature, Product Size, Product Specifications, Product Weight, Product Width, Purity, Radionuclide, Range, Refractive Index, RTECS Code, Sensitivity, Sequence, Solubility, Special Notes, Special Shipping Instructions, Species Reactivity, Specific Activity, Specific Gravity, Specifications, Stationary Phase, Storage Conditions, Thickness, UNSPSC, Vector, Volume, and Width.

In some embodiments, common attributes used in an Office Supplies vertical, used for searching the catalog, which may be stored in the catalog database 2400 and/or staging database 3100, include the following. An Office Supplies vertical is a list of products that fall under the category 'office supplies', e.g., consumables, paper, printers, computers, pens, etc.:
Applications, Brand, Capacity, Certification, Chart Size, Color, Diameter, Dimensions, Features, Film Thickness, Image URL, Inner Diameter, Lead Time, Length×Width×Depth, Manufacturer Name, Manufacturer Part Number, Material Model, More Information URL, Outer Diameter, Path Length, Power Rating, Product Dimensions, Product Height, Product Length, Product Specifications, Product Type, Product Width, Publisher, Recycled, Size, Specifications, Thickness, Tradename, UNSPSC, UPC, Volume, Warranty, Weight, and Well Capacity.

In some embodiments, common attributes used in a MRO vertical, used for searching the catalog, that may be stored in the catalog database 2400 and/or staging database 3100, include the following. An MRO vertical is a list of products that fall under the category 'manufacturing', e.g., parts, consumables, equipment, safety apparel, etc.:
Accuracy Applications, Bore Size, Bottom Diameter, Capacity, Color, Configuration, Current Rating, Diameter, Dimensions, Displacement, Exterior Dimensions, Features, Finish, Fittings Type, Flow Rate, Flow Rate Range, Format, Gauge, Hose Connections, Image URL, Inlet Pressure, Inlet Size, Inner Diameter, Lead Time, Manufacturer Name, Manufacturer Part Number, Material, Material of Construction, Maximum Inlet Pressure, Maximum Operating Pressure, Maximum Vacuum, Mesh Size, Model, Model Number, More Information URL, Nominal Capacity, Operating Pressure, Operating Temperature, O-Ring Size, Outer Diameter, Overall Height, Particle Size, Pore Size, Power Requirements, Power Supply, Pressure Range, Pressure Rating, Product Depth, Product Dimensions, Product Height, Product Length, Product Weight, Product Width, Range, Reservoir Capacity, Resistance, Series Number, Specifications, Speed, Stopcock Size, Temperature Limits, Thickness, Thread Size, Throughput, Tolerance, Top Diameter, Tube Diameter, UNSPSC, UPC, Voltage, Volume, Wall Thickness, Warning, Warranty, Wattage, and Working Temperature Range.

Figure 45:
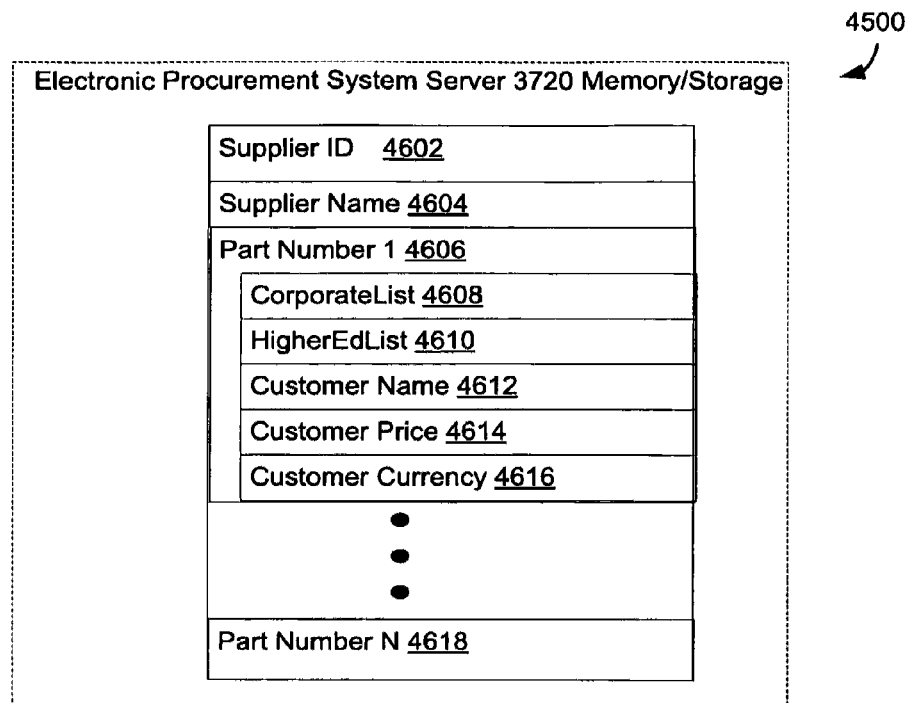
FIG. 45 illustrates a data structure showing supplier information and part number information for parts associated with that supplier.

FIG. 45 is a data structure 4500 showing supplier information (name 4604 and ID 4602), part number 4606, and part information for parts associated with that supplier. The part information includes:

CorporateList 4608, the list price for corporate customers in US dollars, or in the US dollar equivalent of any other currency, such as Euro, Yen, Yuan, Rupee, etc.;

HigherEdList 4610, the list price for academic customers in US dollars, or in the US dollar equivalent of any other currency, such as Euro, Yen, Yuan, Rupee, etc.;

Customer Name 4612;

Customer Price 4614; and

Customer Currency 4616.

FIG. 46 is an exemplary screenshot 4600 of a user's view of item pricing provided by suppliers. This screenshot is displayed to a user checking the pricing associated with items. In some embodiments, this screenshot is generated by a catalog management module 2076 and/or a catalog module 2072 (FIG. 20). In FIG. 46:

label 4602 shows a catalog (here, a science catalog) for which supplier prices are displayed and from which items may be ordered;

label 4604 shows an option to search price sets, and in one embodiment states that price set versions become effective immediately upon approval, that new products require a search load before they become viewable, and that search loads are done on weekday evenings;

label 4610 shows a supplier column, for suppliers associated with prices and items, row 4620 shows a price version associated with a supplier price;

label 4630 shows the review status associated with the supplier price;

label 4632 shows a stockroom label, in some embodiments associated with an internal stockroom maintained by a purchasing organization;

label 4634 shows an approval status associated with an item price;

label 4640 shows a set name column, showing a name associated with a price or with the supplier organization;

label 4642 shows a currency column, giving the currency in which the price is quoted (native or translated currency);

label 4644 shows a contract status associated with the item or with the supplier;

label 4646 shows a price set type, in some embodiments an organization price;

label 4648 shows an edit column, with checkboxes permitting a user to edit items ordered; and drop down menu 4650 allows a user to perform actions, including approving a selected price set version (there may be multiple versions of prices for an item in a catalog).

FIG. 47 illustrates a conversion mapping 4700, showing a plurality of conversion functions that in some embodiments are implemented both individually and in combination in one or more of the supplier 3720 and purchaser 3734 data converters.

In some embodiments, compressed data 4702 is decompressed, using compression/decompression function 4703 into uncompressed data 4704. The reverse compression procedure can also be performed. Data compression is the process of encoding information using fewer bits (or other information-bearing units) than an unencoded representation would use through use of specific encoding schemes. One popular compression utility is the ZIP file format, which, as well as providing compression using the LZW algorithm, acts as an archiver, storing many source files in a single destination output file.

In some embodiments, binary data 4706 is converted using binary/text function 4707 into plain text data 4708. The reverse conversion procedure can also be performed. A binary file is a computer file that may contain any type of data, encoded in binary form for computer storage and processing purposes, for example, computer document files containing formatted text. A plain text file is a type of binary file that contains only textual data—without, for example, any formatting information. A binary-to-text encoding is encoding of data in plain text. Binary data is encoded in a sequence of ASCII-printable characters. These encodings may be used for transmission of data when the channel or the protocol only allows ASCII-printable characters, such as e-mail or usenet. In an exemplary embodiment of a binary to text conversion algorithm, PGP documentation (RFC 2440) uses the term ASCII armor for binary-to-text encoding when referring to Radix-64.

In some embodiments, graphic files or images associated with a product (usually in binary format) are converted to thumbnail images. In some embodiments, this compression uses image compression techniques known in the art, such as run-length encoding (used as the default method in PCX and as one of several possible in BMP, TGA, and TIFF), entropy coding, adaptive dictionary algorithms such as LZW (used in GIF and TIFF), and/or deflation (used in PNG, MNG and TIFF). In some embodiments, the original file is preserved for viewing also.

In some embodiments, delimited data 4710 is converted using delimiting function 4711 to non-delimited data 4712. The reverse conversion procedure can also be performed. A delimiter is a sequence of one or more characters used to specify the boundary between separate, independent regions in plain text or other data stream. An example of a delimiter is the comma character, which acts as a field delimiter in a sequence of comma-separated values. Other examples are tab delimiters, space delimiters, semicolon delimiters, etc. An alternative to the use of field delimiters is declarative notation, which uses a length field at the start of a region to specify the boundary. In an exemplary embodiment, the Unix 'sed' algorithm may be used to perform text delimiter processing.

In some embodiments, column data 4714 is converted using a mapping function 4715 to row data 4716. The reverse conversion procedure can also be performed. Column data may be a list of elements in a spreadsheet, a table, or separated by carriage returns. Row data may be a list of elements in a spreadsheet, a table, or separated by spaces, commas, or some other linear spacer. In an exemplary mapping algorithm, a first row value "A" is selected and copied or moved to a first column. A second row value "B," typically below the first row, is copied or moved to a second column, typically to one side of the first column. This process continues until all row elements have been mapped to a corresponding column element.

In some embodiments, interleaved data 4718 is converted using an interleaver/deinterleaver function 4719 to sequential data 4720. The reverse conversion procedure can also be performed. Interleaving is a way to arrange data in a non-contiguous way, i.e., not in a direct order sequence. In an exemplary embodiment, a column to column or a row to row mapping algorithm could be used, where columns are mapped from a first order to a second order, or rows are mapped from a first order to a second order, or a combination of these techniques could be used.

In some embodiments, partial format data 4722 is converted using a mapper function 4723 to sequential data 4724. Partial format data 4722 contains some data items (A, B, D) expected by an electronic procurement system, and also some data not expected (F). The mapper 4723 takes the expected data (A, B, D) and maps it to the expected data format A, B, _, D 4724. Since the partial format data 4722 does not include a C value, this is left blank in the expected data mapping A, B, _, D 4724. In some embodiments, the data not expected (F) is discarded.

In some embodiments, scattered data format data 4726 is converted using a mapper function 4727 to contiguous data 4728. The reverse conversion procedure can also be performed. The scattered data format data 4726 may include data spread across a plurality of files or data structures. File 1 has data A, B. File 2 has data C. File 3 has data D. Through a conversion/translation 4727, the scattered data 4716 is mapped into a contiguous data 4728. Data A and B are selected from File 1, data C is selected from file 2, and data D is selected from file 3 are these data A, B, C, D are mapped into the contiguous data 4728.

The mapper function 4727 extracts the data A, B, C, D and maps them to a contiguous data structure 4728. An example of scattered data mapping is given with respect to FIG. 51.

In some embodiments, the mapping and conversions described above may be performed by taking each element of source (e.g., left hand side of FIG. 47) data and placing the element in a memory or register, and setting links or pointers between the registers such that the mapped (e.g., right hand side of FIG. 47) data is in sequential link order. Setting links or pointers may be performed by writing values to the links or pointers. In some embodiments, mapping may be performed by writing data to sequential registers or locations in memory. In some embodiments, the described mapping and translation functions may be used individually or in combination with one another and with other functions.

Figure 48A:
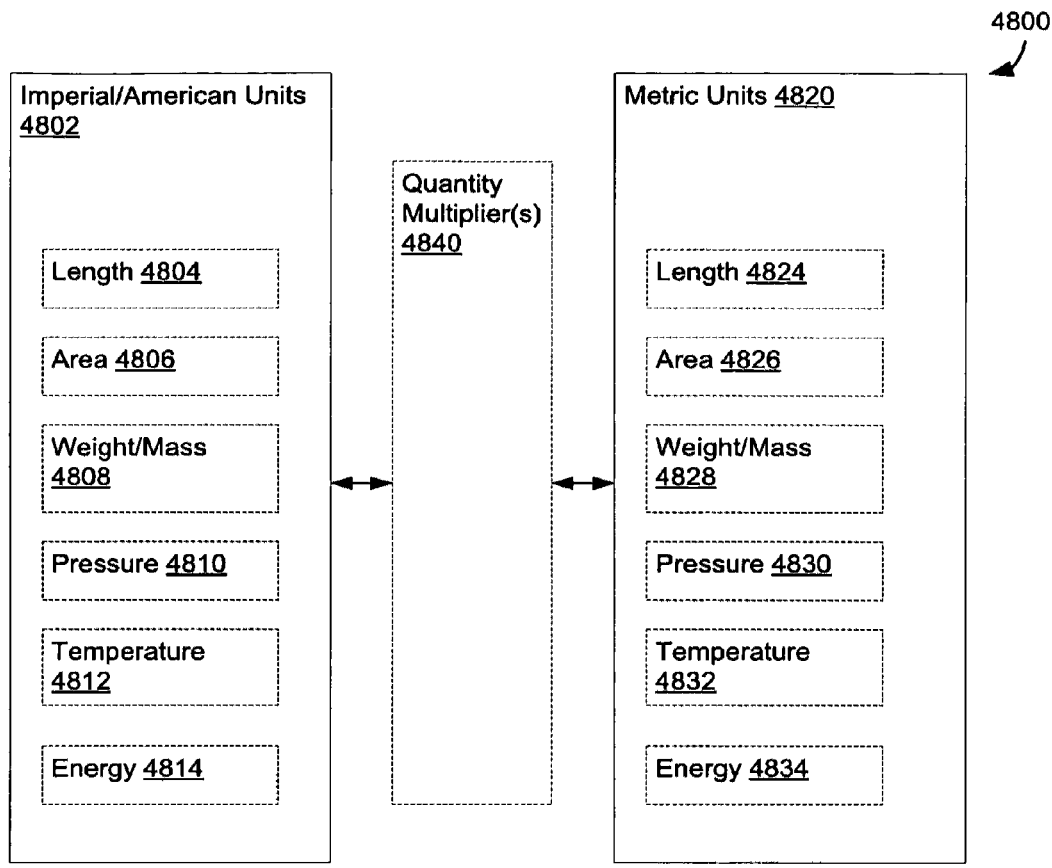
FIG. 48A illustrates a unit translation, showing a plurality of unit translation functions.

FIG. 48A illustrates a unit translation 4800, showing one or more translation functions that in some embodiments are implemented both individually and in combination in one or more of the supplier 3720 and purchaser 3734 data converters or translation block 3740, as described in FIG. 37.

In some embodiments, Imperial units 4802 are translated to metric units 4820. Imperial units 4802, also known as American units or Avoirdupois units, include length (e.g., feet) 4804, area (e.g., acre) 4806, weight/mass (e.g., pounds) 4808, pressure (e.g., pounds per square inch) 4810, temperature (e.g., degrees Fahrenheit) 4812, and energy (e.g., British thermal units or BTUs) 4814. Metric units include length 4834 (e.g., meters), area (e.g., hectare) 4826, weight/mass (e.g., kilogram) 4828, pressure (e.g., Pascal) 4830, temperature (e.g., degrees Celsius) 4832, and energy (e.g., Joules) 4834. The imperial units 4802 are converted by quantity multiplier(s) 4840 to metric units 4820. This multiplier may be implemented as a multiplication function, a look-up table, or any one of a variety of known functions for implementing multipliers.

The functions of FIG. 48A should not be read as limited to the units described, but apply to any commonly used units in scientific research, manufacturing, and commercial transactions. In some embodiments, the electronic procurement system may include a mapping of conversion of unit terms and designators from a supplier format to a format associated with the electronic procurement system, as described in FIG. 48B and FIG. 48C. In some embodiments, the electronic procurement system may include a similar mapping between purchase/buyer unit and/or quantity formats and formats associated with the electronic procurement system.

FIG. 48B illustrates exemplary container or quantity term mapping between supplier values 4852 and system values 4854. In some embodiments, the supplier value is a value descriptor used by a supplier of the system. In some embodiments, the system value is a value descriptor used by the electronic procurement system. A button 4950 allows a user or supplier to create a mapping of their own, i.e., from a term or value associated with their system to a term or value associated with the electronic procurement system. Exemplary container or quantity term mappings include, but are not limited to, those shown in Table 1 below.

TABLE 1

| Default Supplier Value | System Value |
|---|---|
| BAG | BG-Bag |
| BD | BD-Bundle |
| BG | BG-Bag |
| BK | BK-Book |
| BO | BO-Bottle |
| BOOK | BK-Book |
| BOT | BO-Bottle |
| BOTTLE | BO-Bottle |
| BOX | BX-Box |
| BT | BO-Bottle |
| BTL | BO-Bottle |
| BUNDLE | BD-Bundle |
| BX | BX-Box |
| C62 | PC-Piece |

FIG. 48C illustrates exemplary unit or size term mapping between supplier values 4862 and system values 4864. In some embodiments, the supplier value is a value descriptor used by a supplier of the system. In some embodiments, the system value is a value descriptor used by the electronic procurement system. A button 4960 allows a user or supplier to create a mapping of their own, i.e., from a term or value associated with their system to a term or value associated with the electronic procurement system. Exemplary mappings include, but are not limited to, those shown in Table 2 below.

TABLE 2

| Default Supplier Value | System Value |
|---|---|
| BAG | BG-Bag |
| BD | BD-Bundle |
| BG | BG-Bag |
| BK | BK-Book |
| BO | BO-Bottle |
| BOOK | BK-Book |
| BOT | BO-Bottle |
| BOTTLE | BO-Bottle |
| BOX | BX-Box |
| BT | BO-Bottle |
| BTL | BO-Bottle |
| BUNDLE | BD-Bundle |
| BX | BX-Box |
| C62 | PC-Piece |

Figure 49:
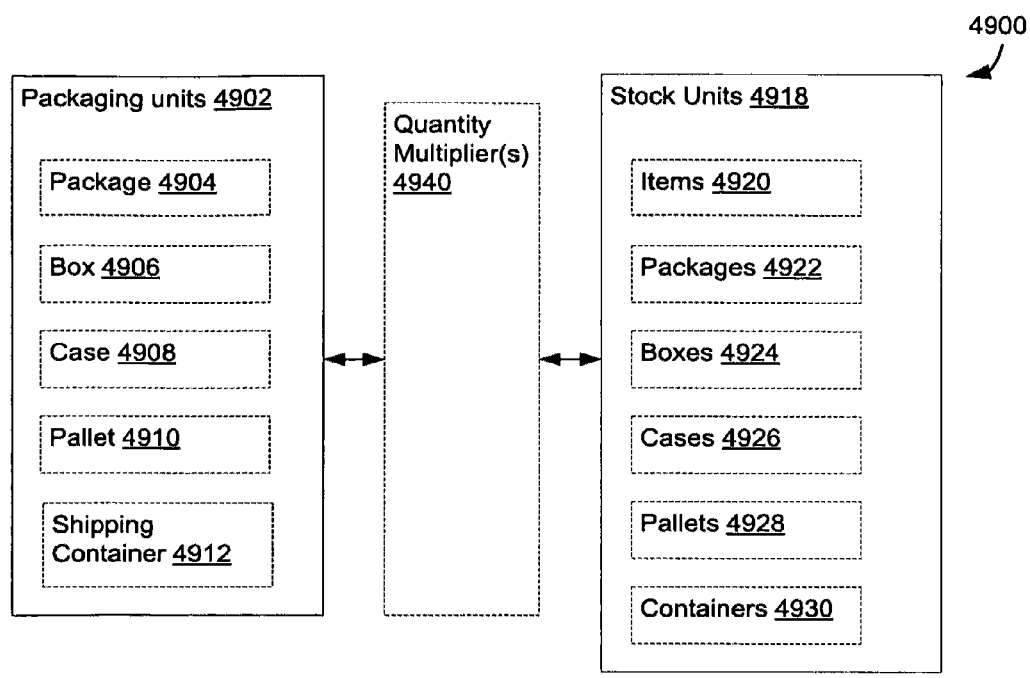
FIG. 49 illustrates a package translation, showing a plurality of package translation functions.

FIG. 49 illustrates a package translation 4900, showing one or more translation functions that in some embodiments are implemented both individually and in combination in one or more of the supplier 3720 and purchaser 3734 data converters or translation block 3740.

In some embodiments, packaging units (sizes and quantities in which goods are typically shipped) include package 4904, box 4906, case 4908, pallet 4910, and shipping container 4912. Corresponding stock units 4918 includes items 4920, packages 4922, boxes 4924, cases 4926, pallets 4928, and containers 4930. Other similar measures are used for fluid or gas quantities, e.g., vials, bottles, barrels, cubic feet/meters, etc.

In some embodiments, a quantity multiplier 4940 may determine how many stock units 4918 correspond to a packaging unit 4902, and vice versa. For this determination, the quantity multiplier 4940 may access an item database 2401 (e.g., via access module 2072, FIG. 20), in some embodiments within catalog database 2400, to look up in the supplier catalog information the number of stock units per packaging unit. In response to a user request to purchase a number of stock unit items, the quantity multiplier can calculate how many packaging units need to be ordered to satisfy the user request. In some embodiments, the quantity multiplier 4940 is linked to the purchase order database 2500 and to the catalog database 2400 (FIG. 22), such that when a purchase order is submitted for a number of items (e.g., submitted by purchasing/checkout module 2148 and/or order fulfillment module 2150, FIG. 21), order is placed in stock units (e.g., pallets, instead of a large number of individual items) that result in quantity discounts, etc. This quantity multiplier 4940 may be implemented as a multiplication function, a look-up table, or any one of a variety of known functions for implementing multipliers.

Figure 50:
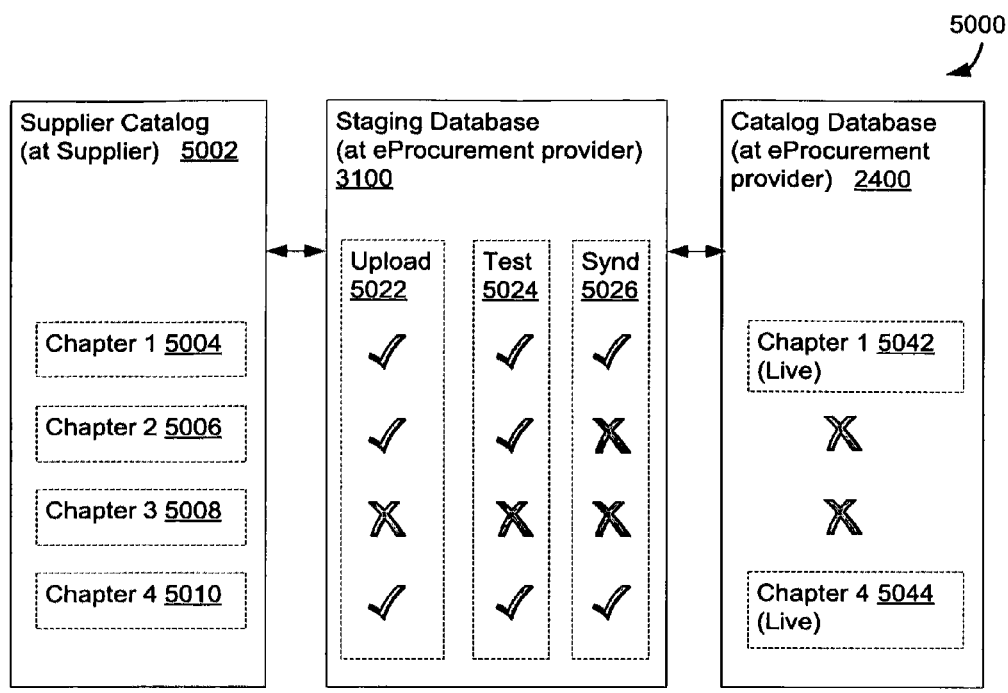
FIG. 50 illustrates an exemplary embodiment of a staging and syndication user interface showing options for staging and syndicating supplier catalog data.

FIG. 50 illustrates an exemplary embodiment of a staging and syndication user interface 5000 showing options for staging and syndicating supplier catalog data. Supplier catalog data 5002 (originating from supplier client 1516 via web browser 1518, FIG. 15) includes catalog chapter 1 5004, chapter 2 5006, chapter 3 5008, and chapter 4 5010. These chapters are purely exemplary and may correspond to sections or product lines, etc. from one or more supplier catalogs. In some embodiments, the supplier catalog(s) 5002 and associated data are generated and stored at the supplier's computer system. The staging database 3100 and catalog database 2400 are stored at the electronic procurement provider 3100, as described.

A supplier (e.g. a supplier client 214) uploads 5022 one or more of supplier catalog chapters to a staging database 3100 (at the eProcurement provider 20), as described. The staging database provides for upload 5022, testing 5024, and syndication 5026 of chapters of the supplier catalog. In some embodiments, the staging database provides an uploader tool (e.g., a user interface/menu allowing a supplier to browse, select, and upload catalog data) and storage for receiving the uploaded catalog data. In some embodiments, the staging database provides an integrated development environment (IDE) for the supplier catalogs. This development environment provides comprehensive facilities to suppliers for development of their catalogs. A development environment may include one or more of a source code editor (for use with scripting languages to describe or implement features of catalog entries), a compiler and/or interpreter, build automation tools, and a debugger. The development environment may also include a version control system and various tools to simplify the creation of catalog entries and their appearance. In some embodiments, the staging database provides a syndication tool (e.g., a menu with options selectable by the user) for syndicating (making active) some or all of the uploaded data provided by the user, as described.

In the example 5000, chapter 1 5004 has check mark entries for upload, test, and syndication. In an embodiment, these check marks indicate that chapter 1 is uploaded, tested and syndicated. As a result Chapter 1 is shown as live 5042 in the catalog database 2400, stored at the electronic procurement service 20. A live catalog is one from which a buyer/user of the system may purchase. In an embodiment, a supplier may select and make active (e.g., a check) or inactive (e.g., a cross) one or more supplier catalogs or chapters of catalogs, through an exemplary user interface such as that shown in FIG. 50.

In the example 5000, chapter 2 5006 has check marks for upload and test, but not for syndication, indicating that chapter 1 is uploaded to the staging database 3100 and has been tested but has not yet been syndicated (made active) to the catalog database 2400. Thus, Chapter 2 5006 is not listed on the catalog database 2400, as indicated by an X mark.

In the example 5000, chapter 3 5008 has no check marks for upload, test, or syndication, indicating that chapter 3 is not uploaded, and thus not tested or syndicated. Thus, Chapter 2 5006 is not listed on the catalog database 2400, as indicated by an X mark.

In the example 5000, chapter 4 5008 is uploaded and syndicated similarly to chapter 1 5002.

The staging database operations may be performed using staging database module 2080 and 2018, as discussed. The staging database may include items 3102 and prices 3131, as discussed. Similarly the catalog database may include items 2401 and prices 2430.

FIG. 51 illustrates an exemplary embodiment of a user format to common format mapping and conversion operation 5100. This figure shows a user purchases request being received by the procurement system, then a lookup being performed to determine how to map the user purchase request to a common format, and then the purchase request converted to the common format. In the example of FIG. 51, a user 5104 (in this example shown user 5104 is a purchaser user, but could also be a supplier user) submits a purchase request 5105 through a client 5102 to the electronic procurement system 20. The client 5102 is a client computer (e.g., client 212) at a purchasing organization associated with the user 5104.

The purchase request 5105 is in a first format (e.g., format 5112) associated with the first user 5104 or first user's client 5102. For example, the first format 5112 shows data in a row format, delineated by tabs. The first format 5112 also shows purchaser details such as name, listed by last name, then first name, and address listed by street, then city, then zip code. This example is for illustrative purposes, and any other formats or orders could be used.

The electronic procurement system 20 may include the data converters 3724, 3722 as described with respect to FIG. 37. In some embodiments, the electronic procurement system 20 includes a table 5106 of user to common format/taxonomy mapping. In some embodiments, this table lists users of the system 20 (in some embodiments, buyer users, or supplier users, or both). In some embodiments, the table lists the first user format/taxonomy 5108 including details of first format 5112 as described. The table 5106 also includes a user conversion 5110 associated with the user 5104 or first user's client 5102. In this example, the user conversion 5110 specifies that data received from the user 5104 should be mapped from row to column format, and that the delineation should be changed from tab to comma delineation. Thus, when the electronic procurement system 20 receives data from the user 5104, the system knows how to convert it to the common format 5114.

The electronic procurement system 20 converts the user purchase request 5105 into the common format 5114 associated with the system 20, based on the conversion 5110 specified in table 5106. In the example shown, the common format 5114 includes comma formatted data in a column format.

Similarly, supplier data formats may be stored in a supplier format/taxonomy mapping, and used to convert supplier requests, invoices, catalog data, etc. to the common format used by electronic procurement system 20.

Figure 52:
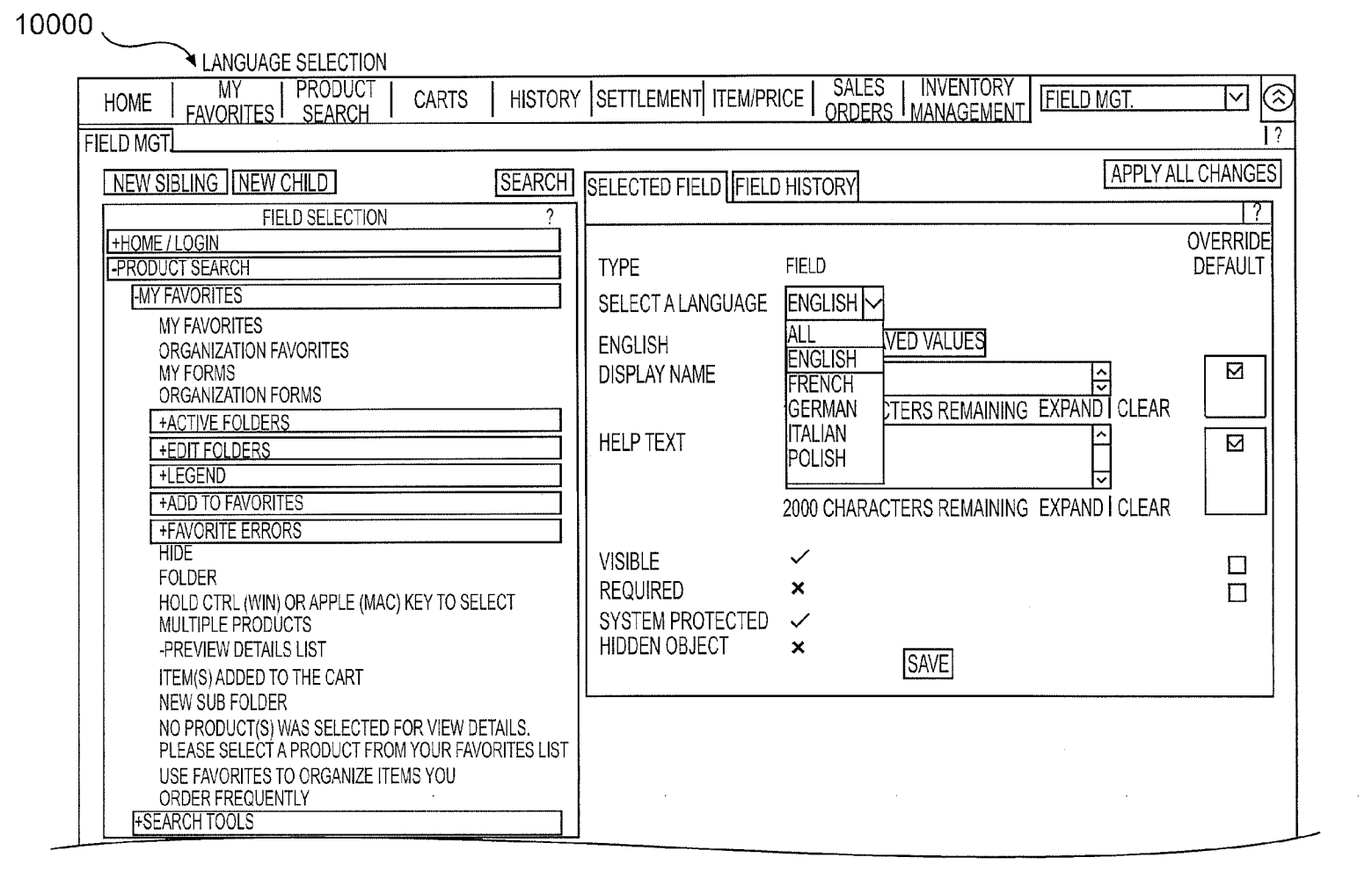

FIG. 52 illustrates an exemplary field management interface in accordance with the present invention, as described. A Language Selection is illustrated, including a 'select a language' option for selecting a language for use in the electronic procurement system. A Field Management selection is illustrated, allowing a user to select fields from a field selection menu, showing a field history, and showing options for creating a new sibling or a new child. A 'save option' and an 'apply all changes' option is shown also.

FIG. 53 illustrates an exemplary update favorite(s) process flow in accordance with the present invention, as described. An option is provided for a user to select a favorite description, which may be applied to a product, and which may be placed in a favorites menu.

Figure 54:
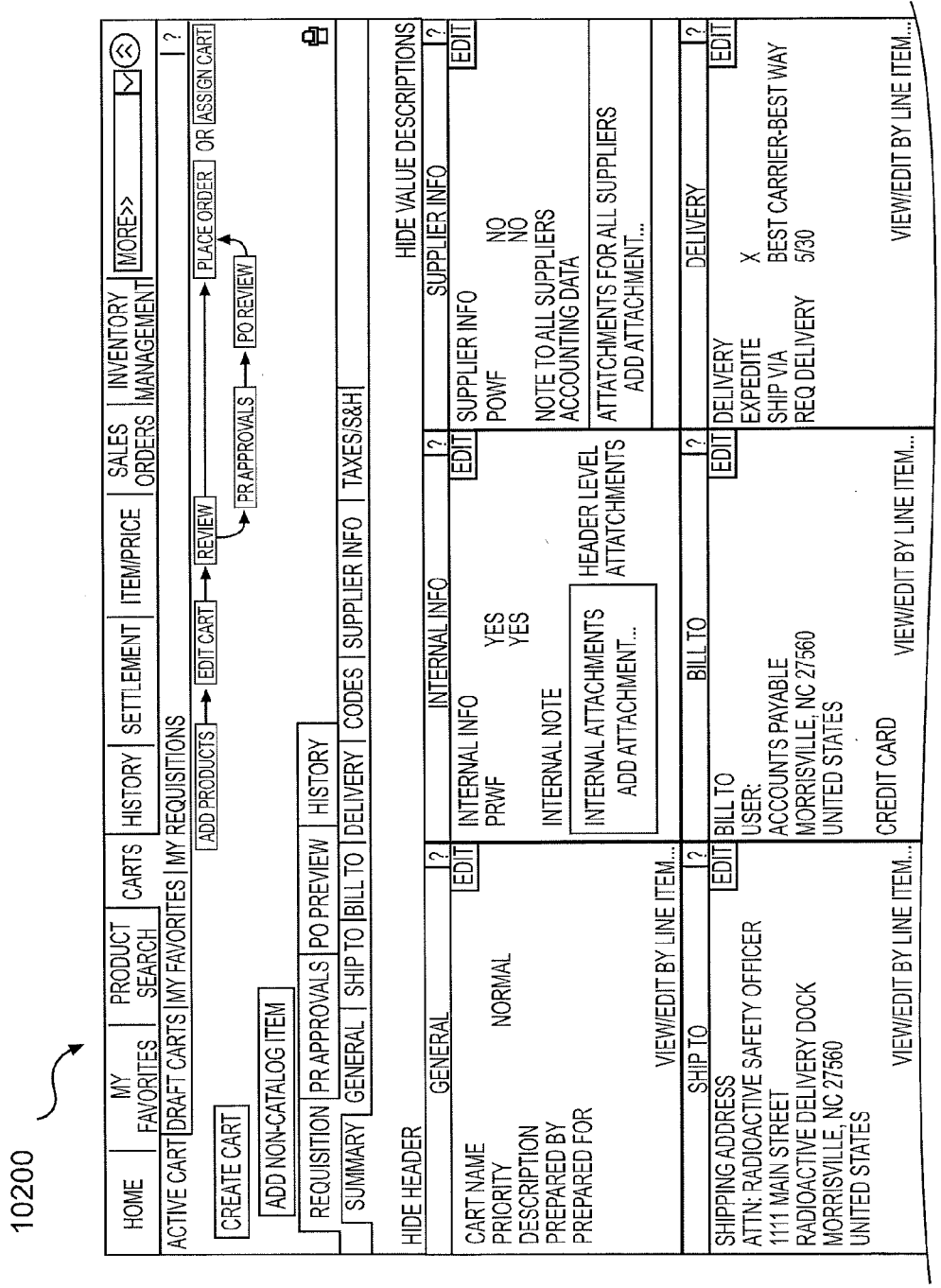
FIG. 54 illustrates an exemplary document setup interface in accordance with the present invention.

FIG. 54 illustrates an exemplary document setup interface in accordance with the present invention, as described. An option to add internal attachments is shown. An option to add attachments for all suppliers is shown.

Figure 55:
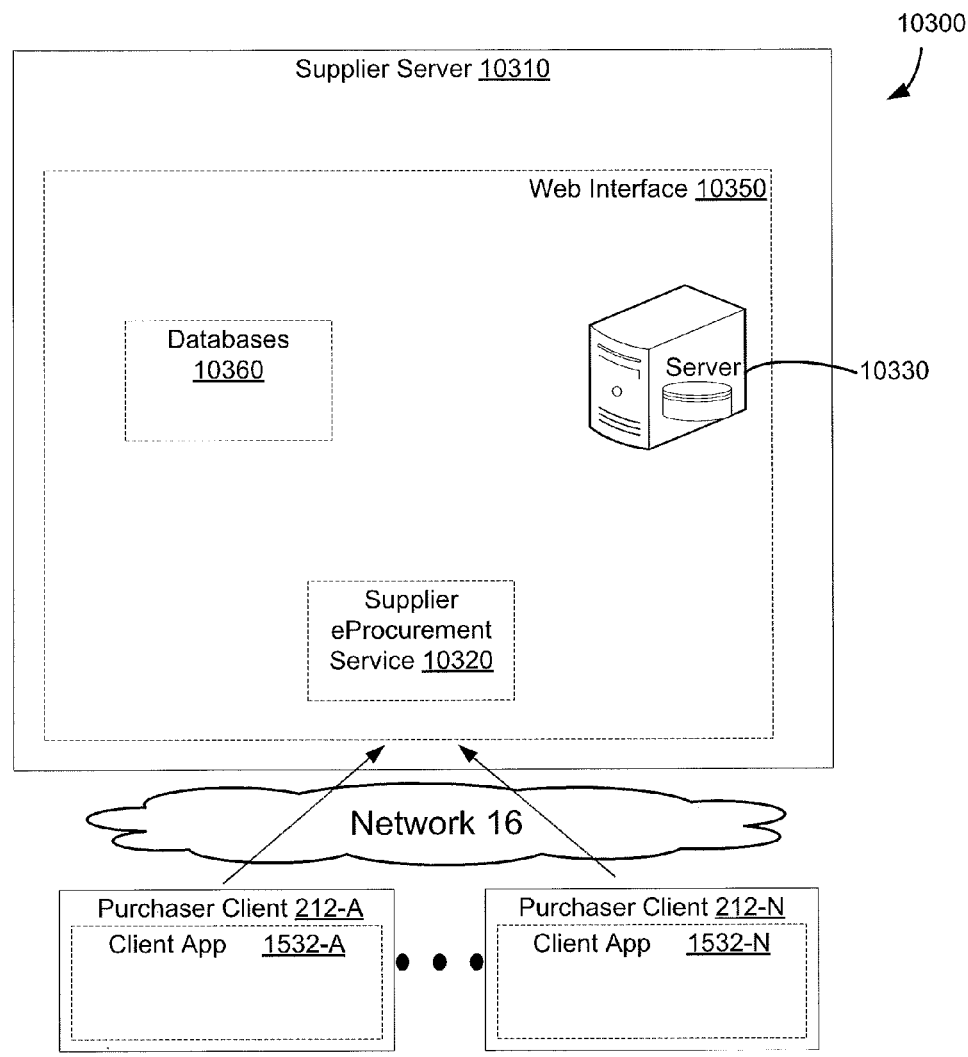
FIG. 55 illustrates an electronic procurement system hosted at a supplier server.

FIG. 55 illustrates shows a system 10300 hosted at a supplier server 10310, which interacts over a network 16 with a plurality of purchaser clients 212, both as described earlier. The purchaser clients run client applications 1532. This application may include a web-browser interface or a stand alone application, for accessing the supplier electronic procurement service 10320 and server 10330. The server 10330 may provide a web interface 10350 as describe earlier. The electronic procurement provider 10320 hosts a plurality of databases 10360, including databases 2200 as described earlier.

Figure 56:
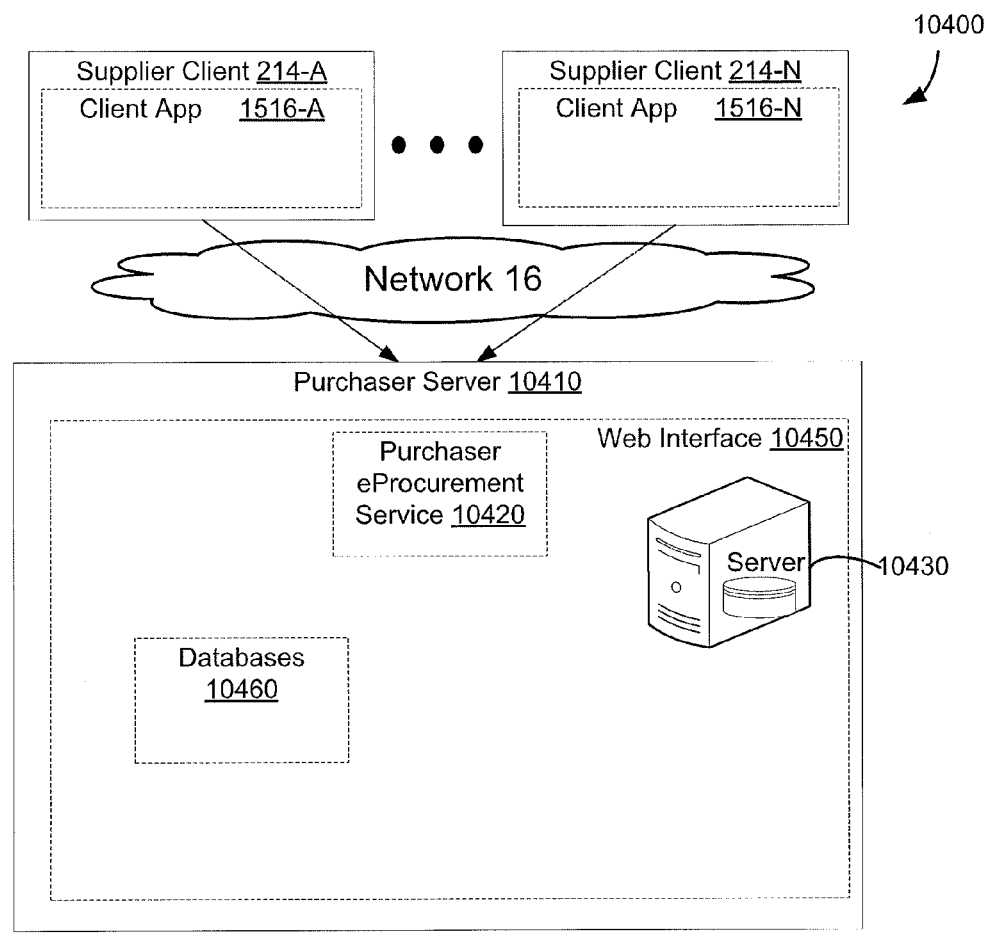
FIG. 56 illustrates an electronic procurement system hosted at a purchaser server.

FIG. 56 illustrates shows a system 10400 hosted at a purchaser server 10410, which interacts over a network 16 with a plurality of supplier clients 214, both as described earlier. The supplier clients run client applications 1516. This application may include a web-browser interface or a stand alone application, for accessing the purchaser electronic procurement service 10420 and server 10430. The server 10430 may provide a web interface 10450 as describe earlier. The electronic procurement provider 10420 hosts a plurality of databases 10460, including databases 2200 as described earlier.

In some embodiments, the electronic procurement system 20 is a single instance multi-tenant system. In some embodiments the electronic procurement system 20 is a web-based system.

In some embodiments the electronic procurement system 20 is located independently from suppliers and purchasers of the electronic procurement system. In some embodiments the electronic procurement system 20 is located at a supplier of the electronic procurement system. In some embodiments the electronic procurement system 20 is located at a purchaser of the electronic procurement system.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 2010 and 2110 may store a subset of the modules and data structures identified above. Furthermore, memory 2010 and 2110 may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising: at a server hosting an electronic procurement system,
    receiving supplier catalog data from a plurality of respective suppliers associated with the electronic procurement system, where the supplier catalog data is in a plurality of formats;
    converting the supplier catalog data from the respective plurality of formats to respective common format catalog data,
    adding the respective common format catalog data to a database, wherein the database is stored at the server hosting the electronic procurement system and the database is a staging database; and
    wherein:
        upon a syndication operation, data in the staging database is transferred to a live catalog database accessible by purchaser users of the system; and
        supplier catalog data is mapped into the staging database in a plurality of data blocks, wherein some of the plurality of data blocks are syndicated individually.

2. The method of claim 1, further comprising associating the respective common format catalog data with the respective supplier catalog data.

3. The method of claim 2, wherein associating includes linking the respective supplier catalog data and the respective common format data, such that when the supplier catalog data received at the server changes, the common format catalog data updates accordingly.

4. The method of claim 1, wherein the electronic procurement system is a single instance multi-tenant system.

5. The method of claim 1, wherein the electronic procurement system is a web-based system.

6. The method of claim 1, wherein the server is located independently from suppliers and purchasers of the electronic procurement system.

7. The method of claim 1, wherein the server is located at a supplier of the electronic procurement system.

8. The method of claim 1, wherein the server is located at a purchaser of the electronic procurement system.

9. The method of claim 1, wherein the staging database forms a table in a larger electronic procurement system database.

10. The method of claim 1, wherein the staging database is a stand-alone database.

11. The method of claim 1, wherein the common format catalog data is a stockroom format.

12. The method of claim 1, wherein the supplier catalog data includes item data, standard attributes, and custom attributes.

13. A computer-implemented method, comprising: at a server hosting an electronic procurement system,
    receiving first data from a plurality of respective users associated with the electronic procurement system, where the first data is in a plurality of formats;
    converting the first data from the respective plurality of formats to common format second data; and
    adding the respective common format second data to a database, wherein the database is stored at the server hosting the electronic procurement system and the database is a staging database; and
    transferring data in the staging database to a live database accessible by users of the system; wherein data is mapped into the staging database in a plurality of data blocks, wherein some of the plurality of data blocks are transferred individually.

14. The method of claim 13, further comprising associating the respective common format second data with the respective user data.

15. The method of claim 13 wherein the first data is one selected from a group consisting of seller catalog data and buyer data.

16. The method of claim 13 wherein the common format second data is in a format native to the electronic procurement system.

17. The method of claim 16, wherein the database is stored at the server hosting the electronic procurement system.

18. The method of claim 17, wherein the database forms a table in a larger electronic procurement system database.

19. The method of claim 17, wherein the database is a stand-alone database.

20. A server system, comprising:
one or more processors;
memory; and
one or more programs stored in the memory, the one or more programs comprising instructions to:
at a server hosting an electronic procurement system:
receive supplier catalog data from a plurality of respective suppliers associated with the electronic procurement system, where the supplier catalog data is in a plurality of formats;
convert the supplier catalog data from the respective plurality of formats to respective common format catalog data, and
add the respective common format catalog data to a database, wherein the database is stored at the server hosting the electronic procurement system and the database is a staging database; and
wherein:
upon a syndication operation, data in the staging database is transferred to a live catalog database accessible by purchaser users of the system; and
supplier catalog data is mapped into the staging database in a plurality of data blocks, wherein some of the plurality of data blocks are syndicated individually.

21. The system of claim 20, further comprising instructions to associate the respective common format catalog data with the respective supplier catalog data.

22. A non-transitory computer readable storage medium storing one or more programs configured for execution by a computer, the one or more programs comprising instructions to:
at a server hosting an electronic procurement system:
receive supplier catalog data from a plurality of respective suppliers associated with the electronic procurement system, where the supplier catalog data is in a plurality of formats;
convert the supplier catalog data from the respective plurality of formats to respective common format catalog data, and
add the respective common format catalog data to a database, wherein the database is stored at the server hosting the electronic procurement system and the database is a staging database; and
wherein:
upon a syndication operation, data in the staging database is transferred to a live catalog database accessible by purchaser users of the system; and
supplier catalog data is mapped into the staging database in a plurality of data blocks, wherein some of the plurality of data blocks are syndicated individually.

23. The computer readable storage medium of claim 22, further comprising instructions to associate the respective common format catalog data with the respective supplier catalog data.

24. A server system, comprising:
one or more processors;
memory; and
one or more programs stored in the memory, the one or more programs comprising instructions to:
at a server hosting an electronic procurement system:
receive first data from a plurality of respective users associated with the electronic procurement system, where the first data is in a plurality of formats;
convert the first data from the respective plurality of formats to common format second data; and
add the respective common format second data to a database, wherein the database is stored at the server hosting the electronic procurement system and the database is a staging database; and
transfer data in the staging database to a live database accessible by users of the system; wherein data is mapped into the staging database in a plurality of data blocks, wherein some of the plurality of data blocks are transferred individually.

25. The system of claim 24, further comprising instructions to associate the respective common format second data with the respective user data.

26. The system of claim 24, wherein the first data is one selected from a group consisting of seller catalog data and buyer data.

27. The system of claim 24, wherein the common format second data is in a format native to the electronic procurement system.

28. The system of claim 27, wherein the database is stored at the server hosting the electronic procurement system.

29. The system of claim 28, wherein the database forms a table in a larger electronic procurement system database.

30. The system of claim 28, wherein the database is a stand-alone database.

31. A non-transitory computer readable storage medium storing one or more programs configured for execution by a computer, the one or more programs comprising instructions to:
at a server hosting an electronic procurement system:
receive first data from a plurality of respective users associated with the electronic procurement system, where the first data is in a plurality of formats;
convert the first data from the respective plurality of formats to common format second data; and
add the respective common format second data to a database, wherein the database is stored at the server hosting the electronic procurement system and the database is a staging database; and
transfer data in the staging database to a live database accessible by users of the system; wherein data is mapped into the staging database in a plurality of data blocks, wherein some of the plurality of data blocks are transferred individually.

32. The computer readable storage medium of claim 31, further comprising instructions to associate the respective common format second data with the respective user data.

33. The non-transitory computer readable storage medium of claim 31 wherein the first data is one selected from a group consisting of seller catalog data and buyer data.

34. The non-transitory computer readable storage medium of claim 31 wherein the common format second data is in a format native to the electronic procurement system.

35. The non-transitory computer readable storage medium of claim 34, wherein the database is stored at the server hosting the electronic procurement system.

36. The non-transitory computer readable storage medium of claim 35, wherein the database forms a table in a larger electronic procurement system database.

37. The non-transitory computer readable storage medium of claim 35, wherein the database is a stand-alone database.

* * * * *